(12) United States Patent
Yoshida et al.

(10) Patent No.: US 7,787,013 B2
(45) Date of Patent: *Aug. 31, 2010

(54) MONITOR SYSTEM AND CAMERA

(75) Inventors: Atsushi Yoshida, Neyagawa (JP); Katsuji Aoki, Nara (JP); Shouichi Araki, Osaka (JP)

(73) Assignee: Panasonic Corporation, Osaka (JP)

( * ) Notice: Subject to any disclaimer, the term of this patent is extended or adjusted under 35 U.S.C. 154(b) by 1297 days.

This patent is subject to a terminal disclaimer.

(21) Appl. No.: 11/125,390

(22) Filed: May 10, 2005

(65) Prior Publication Data

US 2005/0206726 A1 Sep. 22, 2005

Related U.S. Application Data

(63) Continuation of application No. PCT/JP2005/000545, filed on Jan. 18, 2005.

(30) Foreign Application Priority Data

Feb. 3, 2004 (JP) ............................. 2004-027295
Mar. 31, 2004 (JP) ............................. 2004-105855

(51) Int. Cl.
*H04N 7/18* (2006.01)
(52) U.S. Cl. ....................................... 348/159; 348/153
(58) Field of Classification Search .................. 348/143
See application file for complete search history.

(56) References Cited

U.S. PATENT DOCUMENTS

| | | | |
|---|---|---|---|
| 6,698,021 B1 * | 2/2004 | Amini et al. ................. | 725/105 |
| 7,212,228 B2 * | 5/2007 | Utsumi et al. ............... | 348/139 |
| 7,242,423 B2 * | 7/2007 | Lin ............................... | 348/169 |
| 7,292,264 B2 * | 11/2007 | Itokawa ....................... | 348/143 |

(Continued)

FOREIGN PATENT DOCUMENTS

JP 7-303207 11/1995

(Continued)

OTHER PUBLICATIONS

Japanese Office Action issued Oct. 10, 2008 in Chinese Patent Application No. 200580004014.X.

*Primary Examiner*—Mehrdad Dastouri
*Assistant Examiner*—Jeremaiah C Huber
(74) *Attorney, Agent, or Firm*—Wenderoth, Lind & Ponack, L.L.P.

(57) ABSTRACT

A monitor system which can flexibly deal with changes in the system structure and perform monitoring of high quality includes a plurality of cameras and connected via a communication medium. Each of the plurality of cameras includes: an image capturing device which captures an image of an image capturing area included in a monitoring area and changes the image capturing area; a communication unit which (i) transmits, to another camera via the communication medium, the image capturing characteristics information for identifying the image capturing area and (ii) receives image capturing characteristics information from another camera; and an image capturing characteristics change unit which changes the image capturing area by controlling the image capturing device of the camera based on the image capturing characteristics information of the camera and the image capturing characteristics information of another camera received in the communication unit so that the image capturing area of the camera and the image capturing area of another camera have a predetermined relation.

28 Claims, 96 Drawing Sheets

U.S. PATENT DOCUMENTS

| | | | |
|---|---|---|---|
| 7,346,187 B2 * | 3/2008 | Buehler | 382/103 |
| 2002/0122113 A1 * | 9/2002 | Foote | 348/48 |
| 2003/0085999 A1 * | 5/2003 | Okamoto et al. | 348/148 |
| 2005/0134685 A1 * | 6/2005 | Egnal et al. | 348/157 |

FOREIGN PATENT DOCUMENTS

| | | |
|---|---|---|
| JP | 8-265741 | 10/1996 |
| JP | 11-103457 | 4/1999 |
| JP | 2000-83243 | 3/2000 |
| JP | 2000-083243 | 3/2000 |
| JP | 2001-094975 | 4/2001 |
| JP | 2001-142138 | 5/2001 |
| JP | 2001-325695 | 11/2001 |
| JP | 2002-077887 | 3/2002 |
| JP | 2004-72628 | 3/2004 |
| JP | 2004-080090 | 3/2004 |

* cited by examiner

Object to be detected

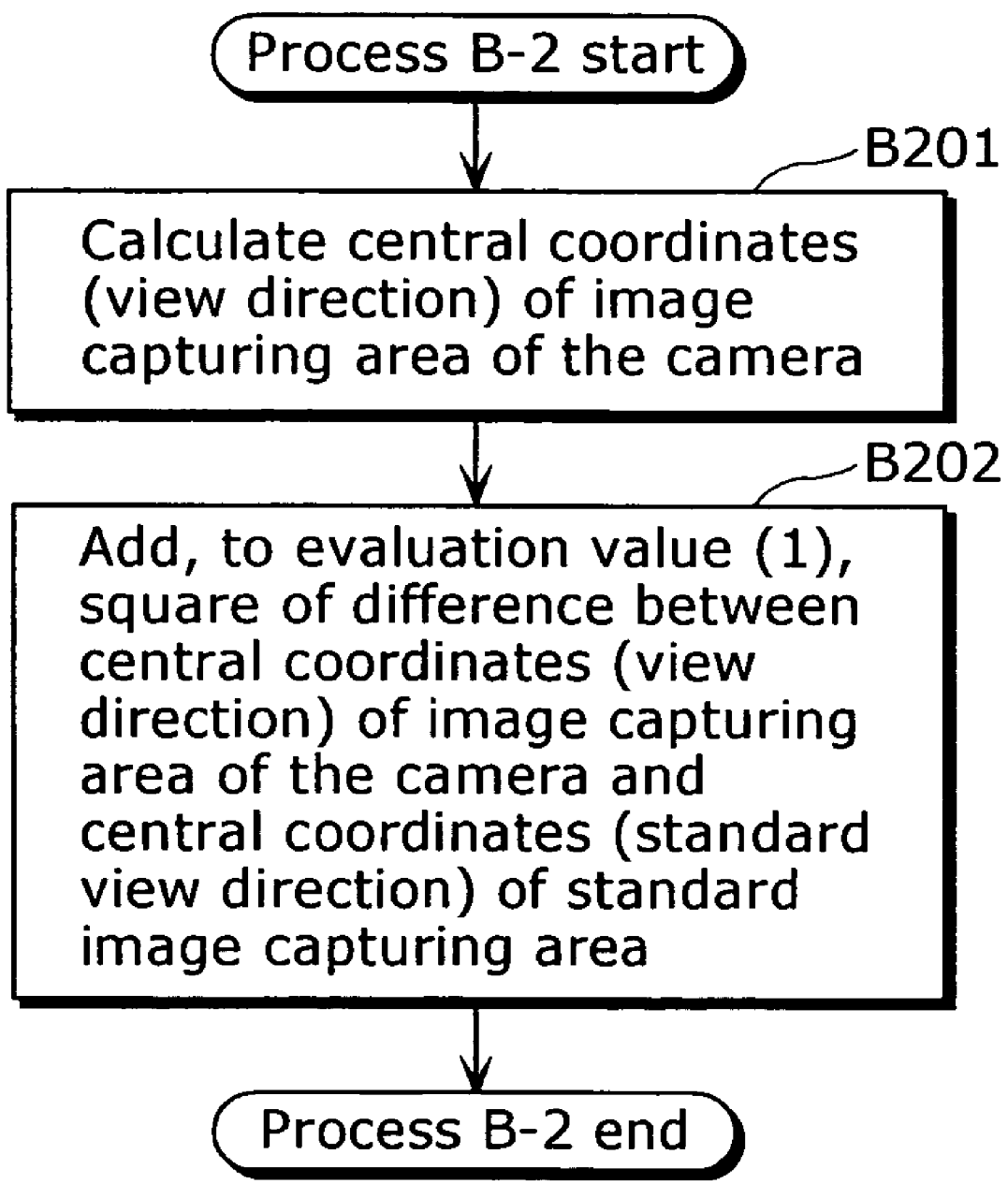

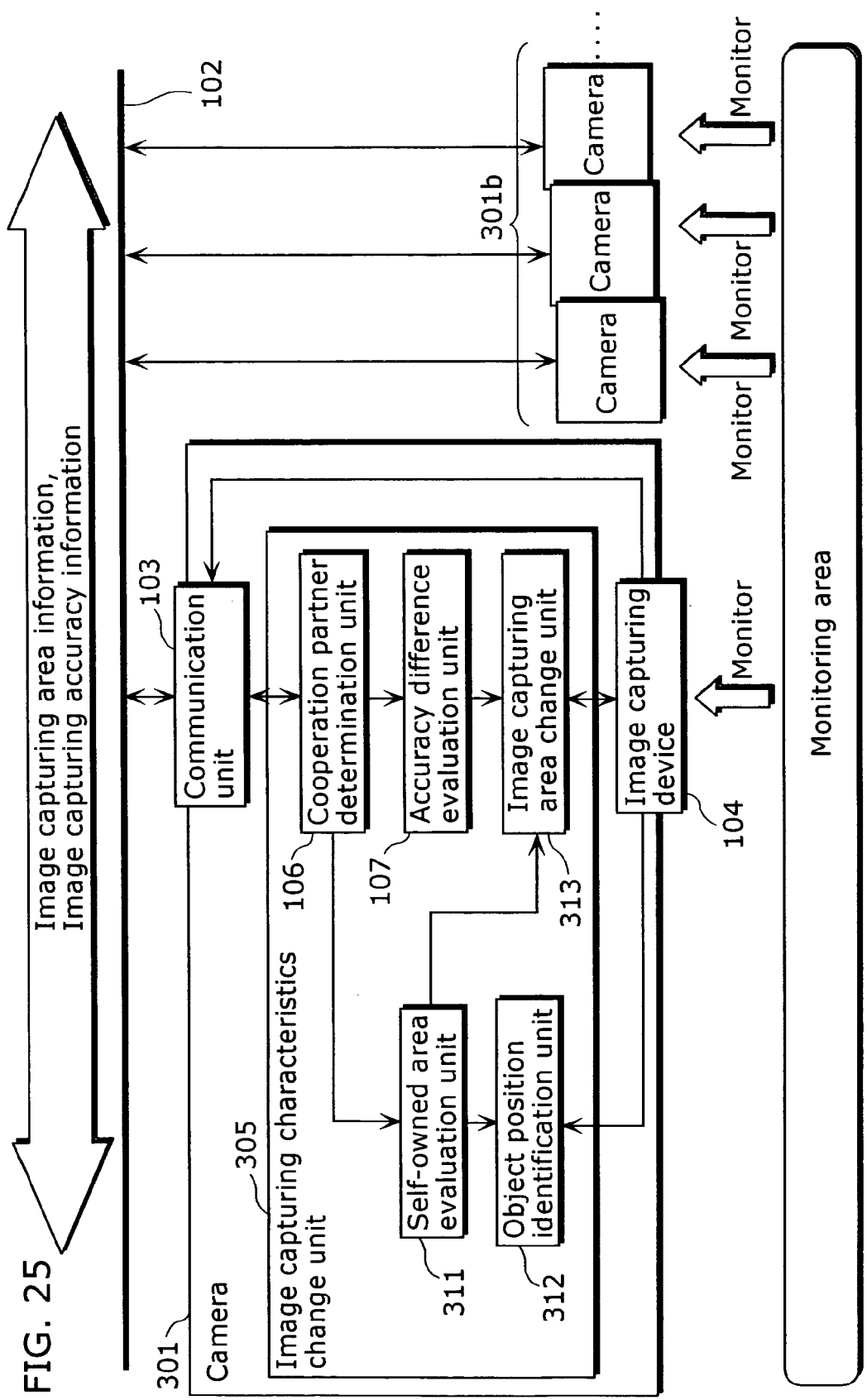

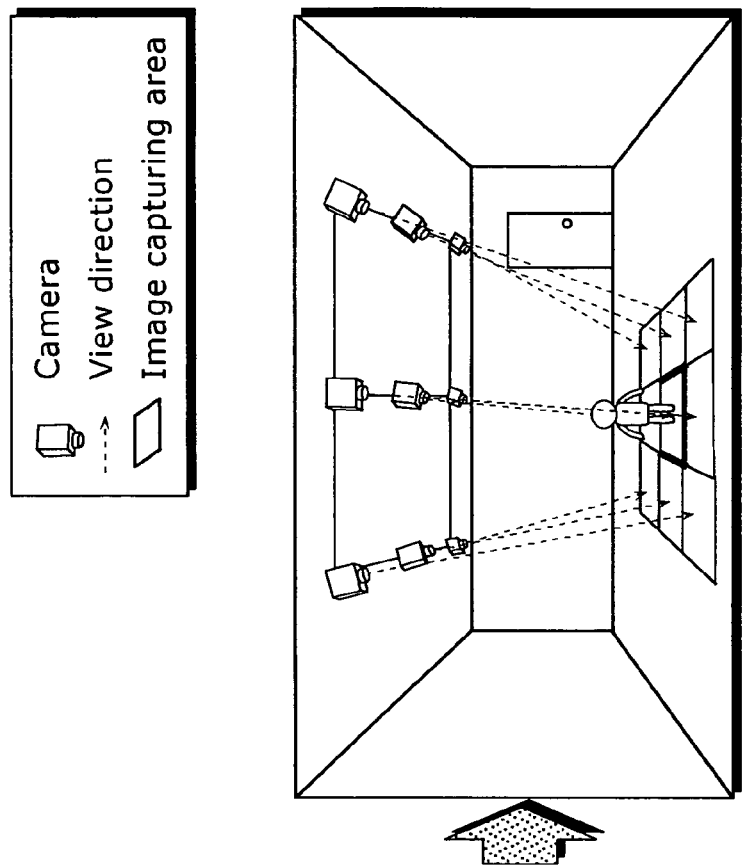
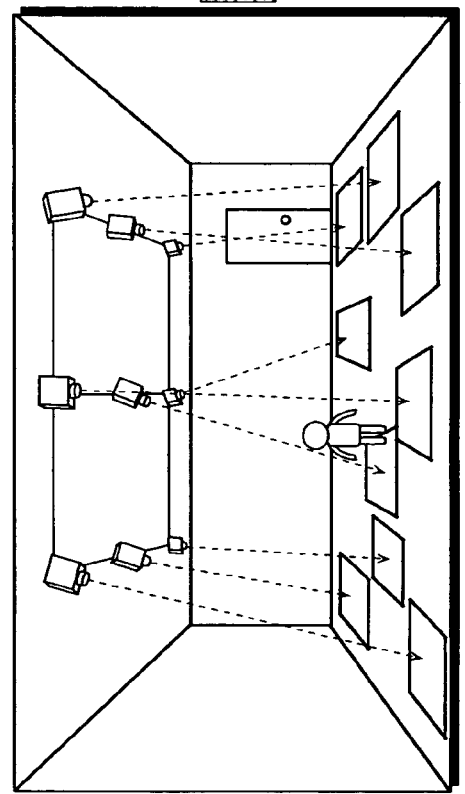
FIG. 29

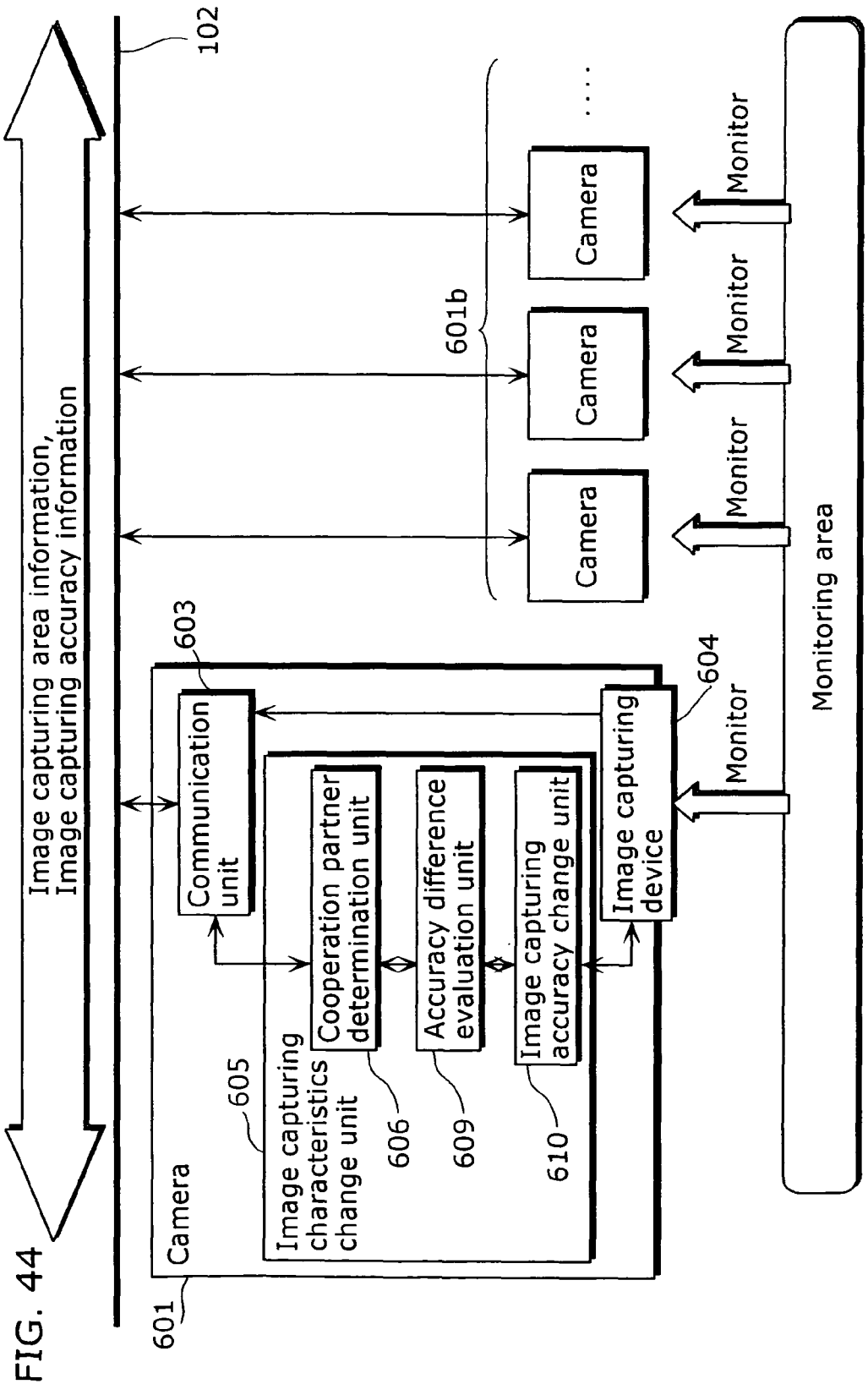

FIG. 82
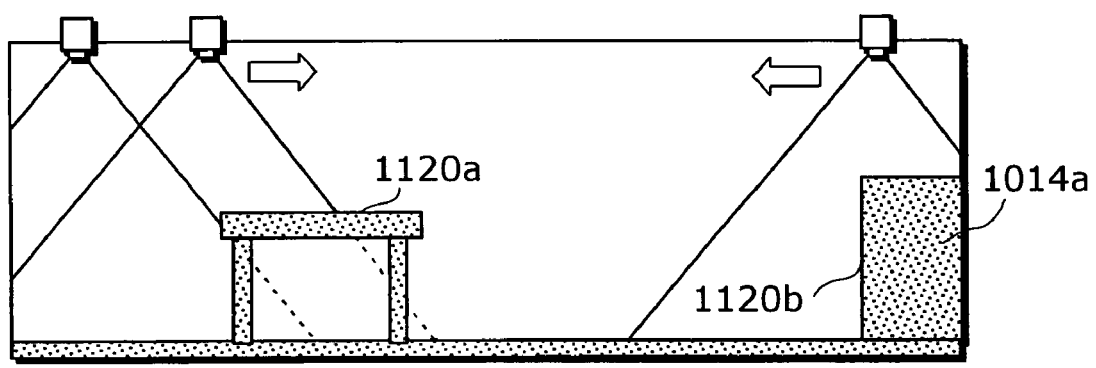
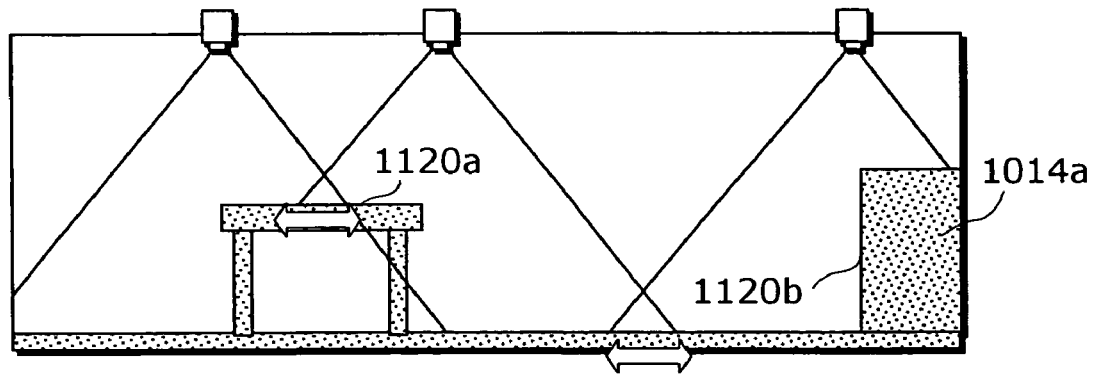

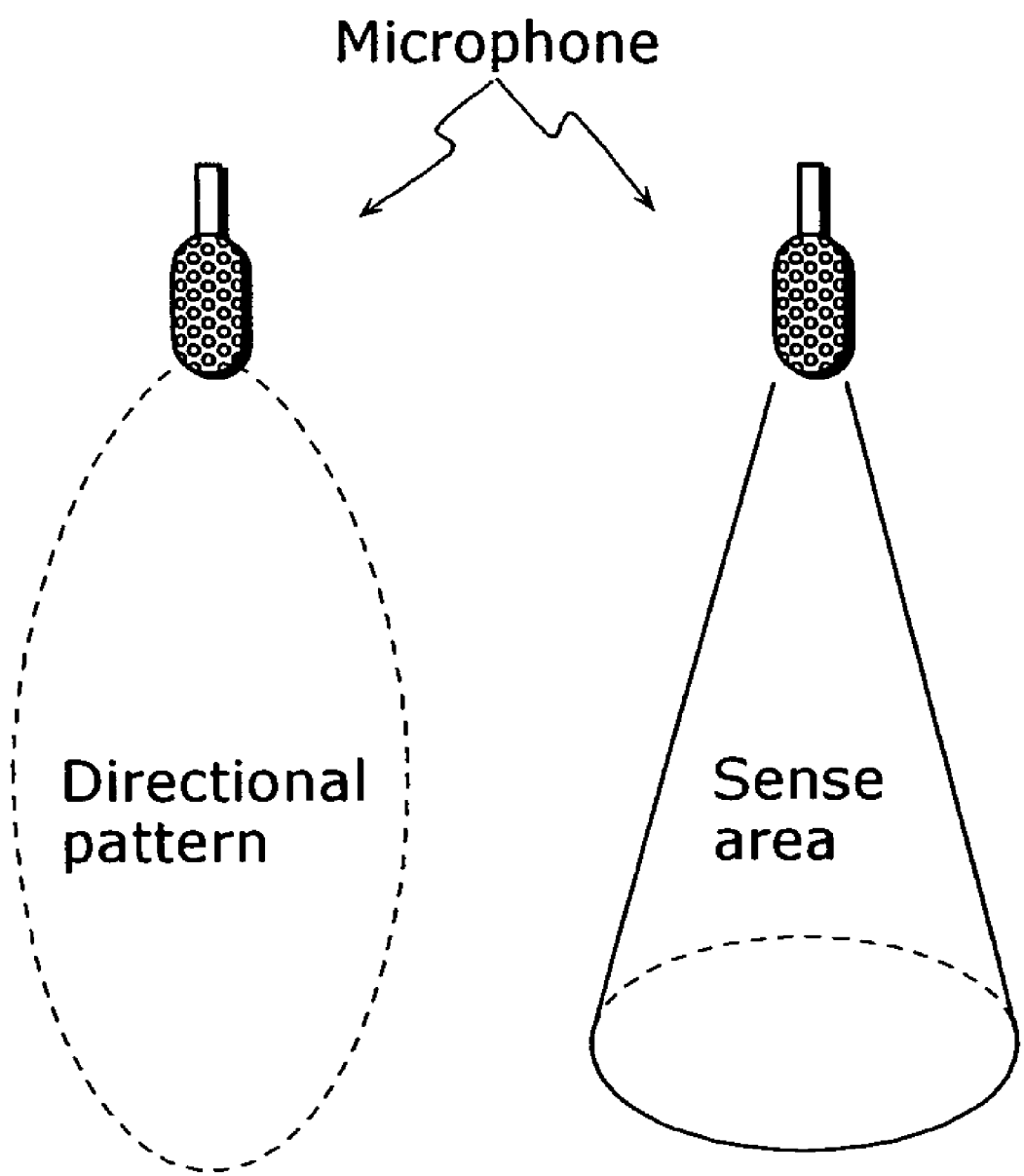

US 7,787,013 B2

MONITOR SYSTEM AND CAMERA

CROSS REFERENCE TO RELATED APPLICATION

This is a continuation of PCT application No. PCT/JP2005/000545, filed on Jan. 18, 2005.

BACKGROUND OF THE INVENTION (1) Field of the Invention

The present invention relates to a monitor system comprising a plurality of cameras. In particular, the present invention relates to a monitor system in which each of the plurality of cameras operates in cooperation with the other cameras so that the whole monitoring area can be monitored.

(2) Description of the Related Art

A high-performance monitor which is impossible with only one camera can be achieved by using a plurality of cameras.

Conventionally, as a monitor system using a plurality of cameras, for example, Japanese Laid-Open Patent application No. 11-103457 discloses a technique. FIG. 1 is a diagram showing a structure of an apparatus which automatically adjusts detection areas of a plurality of cameras. In FIG. 1, a moving object detection specific camera 10011 changes its image capturing range using an attitude control unit 10012, the moving object detection specific camera 10011 capturing an image of an object to be detected in a wide image capturing range. And, a monitor specific camera 10021 changes its image capturing range using the attitude control unit 10022, the monitor specific camera 10021 capturing an enlarged image of the object to be detected. The image capturing range of each camera is determined using (i) a position of the object to be image-captured which is extracted from a captured image captured by the moving object detection specific camera 10011 in an image processing apparatus 10040 and (ii) a detection range of each camera, based on information previously stored in camera view angle storage units 10031 and 10032.

FIGS. 2, 3 and 4 are illustrations showing procedures for determining the image capturing range of each camera in the above mentioned apparatus. And, these illustrations show respective images captured by the moving object detection specific camera 10011, the respective images being divided into several blocks.

The image capturing range of the moving object detection specific camera 10011 is determined as follows. In the case where an object to be image-captured exists in the blocks shown with oblique lines, the attitude of the moving object detection specific camera 10011 is changed to the direction as shown with the arrows in respective blocks of FIG. 3 corresponding to each block position as shown in FIG. 2. And, the image capturing range of the camera is changed. The image capturing range of the moving object detection specific camera 10011 corresponding to each block position is previously determined by a person, and preset in the camera view angle storage unit 10031.

On the other hand, the image capturing range of the monitor specific camera 10021 is determined as follows. In the case where the object to be image-captured exists in the block positions as shown in FIG. 4, the attitude of the monitor specific camera 10021 is changed so that the image capturing range becomes as the part shown with broken lines. And the image capturing range of the camera is changed. The image capturing range of the monitor specific camera 10021 corresponding to each block position is previously determined by a person, and preset in the camera view angle storage unit 10032.

As described above, according to the monitor system as disclosed in the Japanese Laid-Open Patent application No. 11-103457, the wide-range image capturing within the monitoring area and the detailed image capturing of the predetermined object are simultaneously performed.

Also, as another conventional technique used for a monitor system using a plurality of cameras, there is a monitor system in which a wide range is monitored using moving cameras that can change image capturing positions (for example, refer to Japanese Laid-Open Patent application No. 2001-142138). FIG. 5 is a diagram showing the structure of the moving camera 10 described in the Japanese Laid-Open Patent application No. 2001-142138. As shown in FIG. 5, the moving camera 10 includes a casing 12 and a camera unit 14 attached to the bottom of the casing 12. And, the moving camera 10 can move along the rail 20. Inside the casing 12, general control units which control various functions, such as a programming controller unit for controlling the movement and a motor control unit for controlling the transport mechanism, are placed. And, these general control units can control a speed of moving on the orbit of the rail 20, positions, zoom and the like according to the purpose of monitoring. According to the structure as described above, the moving camera 10 performs image-capturing while moving on the orbit of the rail 20 set in a predetermined monitoring area inside a shop, for example, a rental video shop and the like as shown in FIG. 6. Thereby, monitoring can be performed using a small number of cameras so that there are few blind spots in the monitoring area.

Also, as another conventional technique for acquiring images by using a plurality of cameras, Japanese Laid-Open Patent application No. 07-303207 discloses an image capturing apparatus. In the case of acquiring a plurality of image information from a plurality of image capturing systems by using (i) the plurality of image capturing systems for capturing an object and (ii) a convergence angle control unit for providing an arbitrary convergence angle to each of the plurality of image capturing systems, this image capturing apparatus controls each convergence angle in a plurality of image capturing systems so that the overlapping area of the image capturing ranges among the plurality of image capturing systems can be kept within a constant range by using (i) image capturing information provided from a detection unit which detects image capturing conditions of the plurality of image capturing systems and (ii) image magnification information provided from a storage unit which previously stores the image magnification information of the plurality of image capturing systems. Thus, in the case where the plurality of image information is acquired from the plurality of image capturing systems, the image capturing range can be effectively used without missing the overlapping area of the image capturing range between the image capturing systems.

Moreover, as another conventional technique used for a monitor system using a plurality of cameras, Japanese Laid-Open Patent No. 08-265741 discloses an area monitor apparatus using video. This apparatus includes: a fixed pilot camera for monitoring the area; and one or more mobile remote-operated cameras for monitoring at least a part of the area. The pilot camera generates a signal indicating the area. The pilot camera determines the position of the moving object in the monitoring area, and generates a signal indicating the position of the object. The remote-operated camera tracks the object based on the signal indicating the position of the object. The pilot camera has a fisheye lens, thus has a wider view than the remote-operated camera. The area during the monitoring is divided into Cartesian coordinates, polar coordinates and global coordinates, and using these coordinates, an instruction to cause a computer to track the object can be provided to the remote-operated camera. The signal indicating the area is compressed and transmitted via a communication channel for the remote monitoring. Thus, the monitoring of the whole area and the monitoring of the moving object can be performed.

However, according to the conventional techniques disclosed in the above mentioned Japanese Laid-Open Patent applications, there is a problem that the structures and the functions of the cameras included in each system are fixed, and not flexible. Due to this problem, in the case where the system structure is extended or changed by increasing the number of cameras included in the monitor system or by breakdown of some of the cameras, the whole system must be restructured. For example, in the case where one camera breaks down, the monitor system cannot function.

For example, in the camera disclosed in the Japanese Laid-Open Patent application No. 11-103457, predetermined functions are provided respectively to the moving object detection specific camera 10011 which captures an image in a wide range and the monitor specific camera 10021 which captures an enlarged image of an object to be detected. And, it is not possible for the moving object detection specific camera 10011 and the monitor specific camera 10021 to operate in cooperation and to capture an image in a wider range than the range in which one moving object detection specific camera 10011 can capture the image. Also, it is not possible for one camera to substitute for the function of the other camera such as that the moving object detection specific camera 10011 captures an enlarged image of the area which is a blind spot for the monitor specific camera 10021. Therefore, it is necessary to previously determine the setting of the monitor specific camera 10021 so that the camera does not have a blind spot in the monitoring area.

Moreover, in the cooperating operations of the two cameras disclosed in the above mentioned Japanese Laid-Open Patent application No. 11-103457, each set of procedures for changing the image capturing details of the monitor specific camera 10021 is associated with each detection result of the object detected by the moving object detection specific camera 10011. For example, in the case where the number of the moving object detection specific camera 10011 is increased, and accuracy of the moving object detection is improved, it is necessary to newly associate all the combination patterns of the respective detection results detected by the plurality of moving object detection specific cameras 10011 with the operations of the monitor specific camera 10021.

According to the conventional techniques disclosed in the above mentioned Japanese Laid-Open Patent applications, a different function is provided to each of the plurality of cameras. Thereby, there is a problem that a blind spot can be easily generated in monitoring, and monitoring ability is not sufficient.

For example, the plurality of moving cameras 10 included in the monitor system disclosed in the Japanese Laid-Open Patent application No. 2001-142138 can perform monitoring with less blind spots in the monitoring area by capturing the image of the monitoring area while moving inside the monitoring area along with the orbit of the rail 20 within a constant time. However, it is not possible for all of the moving cameras to simultaneously continue monitoring the whole monitoring area. Therefore, for example, in the case where an intruder constantly moves in the area which is the blind spot of the moving camera 10 in association with the movement of the moving camera 10, the monitor system cannot detect the intruder.

SUMMARY OF THE INVENTION

An object of the present invention, in view of the above mentioned problems, is to provide a monitor system which can flexibly deal with changes in the system structure and perform monitoring of high quality.

In order to achieve the above mentioned object, the monitor system for capturing an image of a monitoring area includes a plurality of cameras connected via a communication path, wherein each of the plurality of cameras has: an image capturing device which captures an image of an image capturing area included in the monitoring area, and to change the image capturing area; a communication unit which transmits, to another camera via the communication path, image capturing characteristics information for identifying the image capturing area, and to receive image capturing characteristics information from said another camera; an image capturing characteristics change unit which changes the image capturing area by controlling the camera based on the image capturing characteristics information of the camera and the image capturing characteristics information of said another camera received by the communication unit so that the image capturing area of the camera and the image capturing area of said another camera have a predetermined relation.

For example, the image capturing characteristics information may include information for identifying a position of the image capturing area, and the image capturing characteristics change unit may have: a cooperation partner determination unit which identifies another camera whose image capturing area is adjacent to the image capturing area of the camera; an area difference evaluation unit which provides an evaluation value for a position relation between (i) the image capturing area of said another camera which has been identified and (ii) the image capturing area of the camera, based on the image capturing characteristics information from said another camera and the image capturing characteristics information of the camera; and an image capturing area change unit which changes the image capturing area by controlling the camera so that the evaluation value approaches a predetermined target value, the evaluation value being provided by the area difference evaluation unit.

Thus, each of the plurality of cameras exchanges information with the other cameras, and changes the position and the size of its own image capturing area so that the image capturing area of the camera has a constant relation with the adjacent image capturing area. As a result, each image capturing area is dispersed equally in the whole monitor system, and the high-performance monitoring can be maintained. Also, a special central controller is not necessary, and each of the plurality of cameras has the same function. Thereby, even in the case where some cameras are broken, or additional cameras are set, monitoring can be continued without changing the system structure.

Each of the plurality of cameras may further include: a moving unit which moves the camera; and a moving control unit which changes the position of the image capturing area of the camera by controlling the moving unit, and the moving control unit may control the moving unit based on the image capturing characteristics information of the camera and the image capturing characteristics information of said another camera received by the communication unit so that the monitoring area can be thoroughly image-captured simultaneously by the plurality of cameras.

Thus, the monitoring area can be easily controlled so that the portion of the image capturing area can be increased, the image capturing area being simultaneously image-captured by the plurality of cameras. Also, the monitoring area can be easily controlled so that the image capturing areas of the plurality of cameras can be dispersed more equally.

Also, the present invention cannot only be realized as a monitor system, but also as (i) a single camera included in a monitor system, (ii) a monitoring method using a plurality of cameras and (iii) a program which causes a computer to execute processes such as the image capturing characteristics change unit and the moving control unit included in a camera. Needless to say, the program can be distributed via a storage medium such as CD-ROM and a transmission medium such as Internet.

The monitor system according to the present invention includes a plurality of cameras which operate in cooperation with each other, and each camera has the same function. Thereby, even in the case where some of the cameras lose their image capturing functions due to breakdown and stop, the other cameras operate in cooperation to cover the monitoring area. Thus, monitoring can be continued without restructuring the system.

Also, according to the monitor system of the present invention, even in the case where the plurality of cameras are set in arbitrary positions within the monitoring area, or additional cameras are set in arbitrary positions, the image capturing areas are changed so that the adjacent image capturing areas have a constant relation. Thus, a flexible monitor system can be realized, the monitor system having few restrictions on the functional division and the number of cameras which can be set.

In addition, according to the monitor system of the present invention, the image capturing area of each camera is automatically changed so that the non-image captured area can be reduced in the whole monitoring area, the non-image captured area being image-captured by none of the cameras. Thereby, the high-performance monitoring can be maintained.

Moreover, according to the monitor system of the present invention, the image capturing area is automatically changed so that an area with few image distortions is preferentially image-captured for each setting position of the cameras. Thus, an image of a wide range can be captured with few distortions by a plurality of cameras.

Also, according to the monitor system of the present invention, in the case where an object exists in the image capturing area, functions are automatically divided into a camera which tracks and captures the image of the object and a plurality of cameras which capture images of the object by surrounding the object. Thereby, while the object is tracked, the surrounding wide range can be image-captured.

Also, according to the monitor system of the present invention, even in the case where the image capturing accuracies of the plurality of cameras included in the monitor system are set to an arbitrary image capturing accuracy within the monitoring area, the setting is automatically changed so that the image capturing accuracies become equal among the surrounding cameras. Thereby, size comparison and image synthesis of the images captured by the respective cameras can be easily performed.

Also, according to the monitor system of the present invention, in the case where an object appears within the image capturing area, an image of the object can be captured using a detailed accuracy. In the case where the object disappears from the image capturing area, the current image capturing accuracy is automatically adjusted so that the camera performs image-capturing using the same image capturing accuracy as the surrounding cameras again. Thereby, troublesome operations need not be performed even in the case where the object appears and disappears.

Also, according to the monitor system of the present invention, even in the case where a plurality of moving cameras are set in arbitrary positions, each moving camera moves so that (i) the image capturing area of the current moving camera has a predetermined overlapping area with each adjacent image capturing area, and (ii) a predetermined distance can be kept between the image capturing area of the current moving camera and the border of the monitor area. Thereby, in the simultaneous image-capturing performed by the plurality of moving cameras, the respective moving cameras are automatically set in the positions where blind spots can be reduced in the monitoring area. Thus, the high-performance monitoring can be maintained.

Also, according to the monitor system of the present invention, each moving camera stores information regarding the position, the shape and the direction of the object existing in the monitoring area. And, each moving camera more accurately identifies the positions of image capturing parts and blind spots according to the position, the shape and the direction of the object, and then moves. Thus, in the simultaneous image-capturing performed by the plurality of moving cameras, the respective moving cameras are automatically set in the positions where the blind spots can be reduced in the monitoring area.

In addition, according to the monitor system of the present invention, the state of the object existing in the monitoring area is detected using predetermined conditions. Thereby, even in the case where the state of the object existing in the monitoring area changes, and the state of the object differs from the details stored in each moving camera, each moving camera changes the information regarding the state of the object again. And, each moving camera more accurately identifies the positions of image capturing parts and blind spots according to the position, the shape and the direction of the object, and then moves. Thus, in the simultaneous image-capturing performed by the plurality of moving cameras, the respective moving cameras can be automatically set in the positions where the blind spots can be reduced in the monitoring area.

In addition, according to the monitor system of the present invention, in the simultaneous image-capturing performed by the plurality of moving cameras, the respective moving cameras move to the directions where the blind spots can be reduced in the monitoring area. Moreover, in the case where an arbitrary moving camera captures the object in the image capturing area, the moving camera moves to a position where the image of the object can be captured from a predetermined position (distance and direction). Thereby, it is possible to simultaneously perform: the wide-range image capturing of the monitoring area having fewer blind spots; and the detailed image capturing of the object from the predetermined position (distance and direction).

Furthermore, according to the monitor system of the present invention, even in the case where information such as the position, the shape and the direction of the object existing in the monitoring area is not provided to the respective moving cameras, the respective moving cameras compare the images captured by the respective moving cameras, and distinguish the actually image-captured area from the area which is a blind spot in the monitoring area. Thus, even in the case where the map information is not provided, the respective moving cameras can move to the positions where the blind spots can be reduced in the monitoring area.

FURTHER INFORMATION ABOUT TECHNICAL BACKGROUND TO THIS APPLICATION

The disclosure of Japanese Patent Applications No. 2004-027295 filed on Feb. 3, 2004 and No. 2004-105855 filed on Mar. 31, 2004 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 22 is a flow chart explaining procedures for evaluating an image capturing area of a camera;

FIG. 25 is a block diagram showing a structure of the third embodiment according to the present invention;

FIG. 29 is a diagram illustrating operations of a camera;

FIG. 44 is a block diagram showing a structure of the sixth embodiment according to the present invention;

FIG. 82 is a diagram illustrating operations of a moving camera;

FIGS. 98A and 98B are diagrams illustrating an example in which the present invention is applied to a microphone.

DESCRIPTION OF THE PREFERRED EMBODIMENT(S)

The embodiments according to the present invention will be explained in reference to the drawings as follows.

Figure 1:
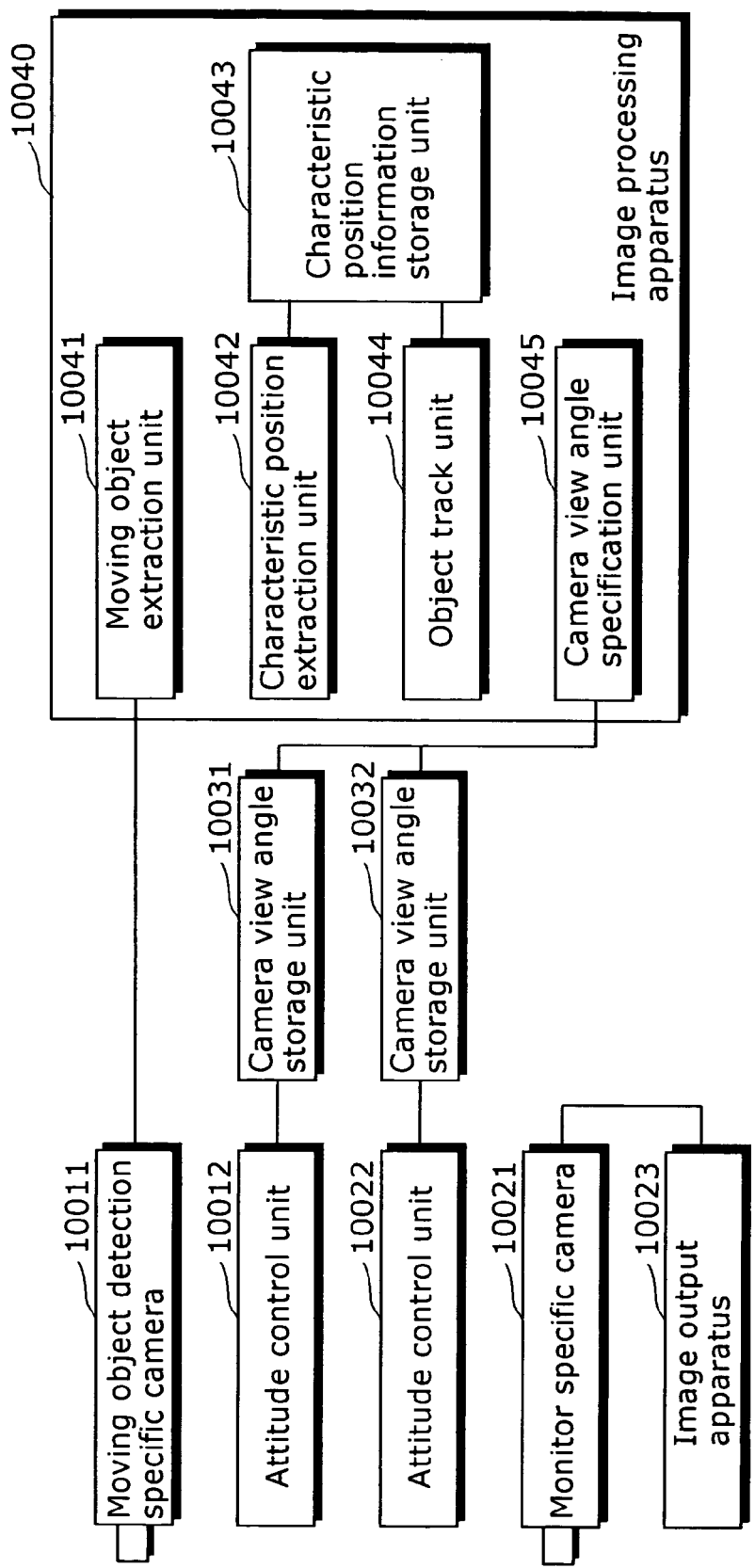
FIG. 1 is a diagram showing a structure of an apparatus according to a conventional technique.
Figure 2:
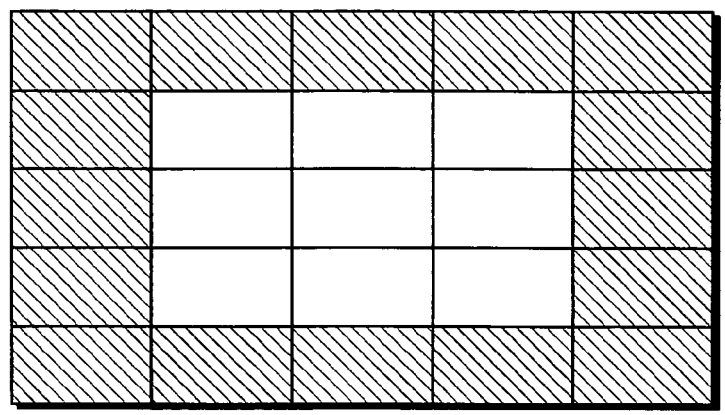
FIG. 2 is a diagram illustrating operations of an apparatus according to a conventional technique.
Figure 3:
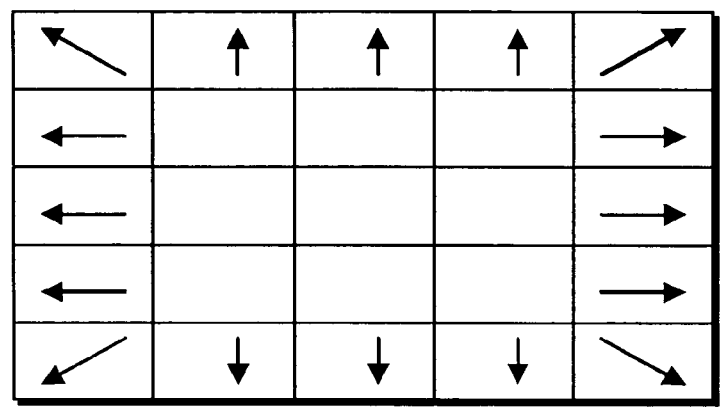
FIG. 3 is a diagram illustrating operations of an apparatus according to a conventional technique.
Figure 4:
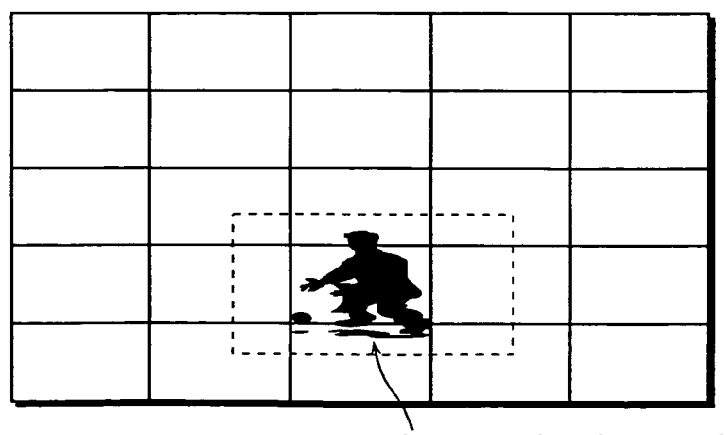
FIG. 4 is a diagram illustrating operations of an apparatus according to a conventional technique.
Figure 5:
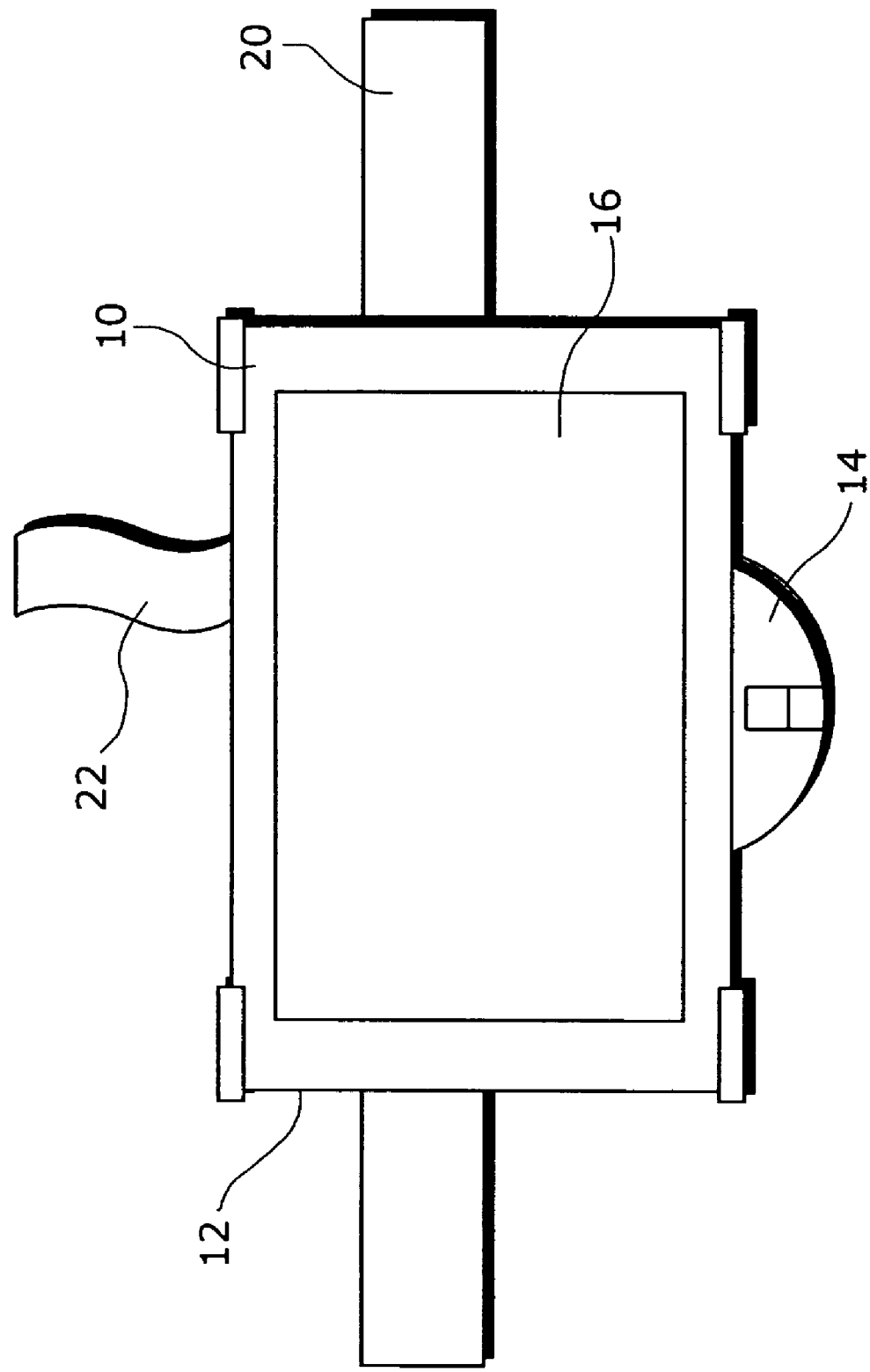
FIG. 5 is a diagram showing a structure of a moving camera according to a conventional technique.
Figure 6:
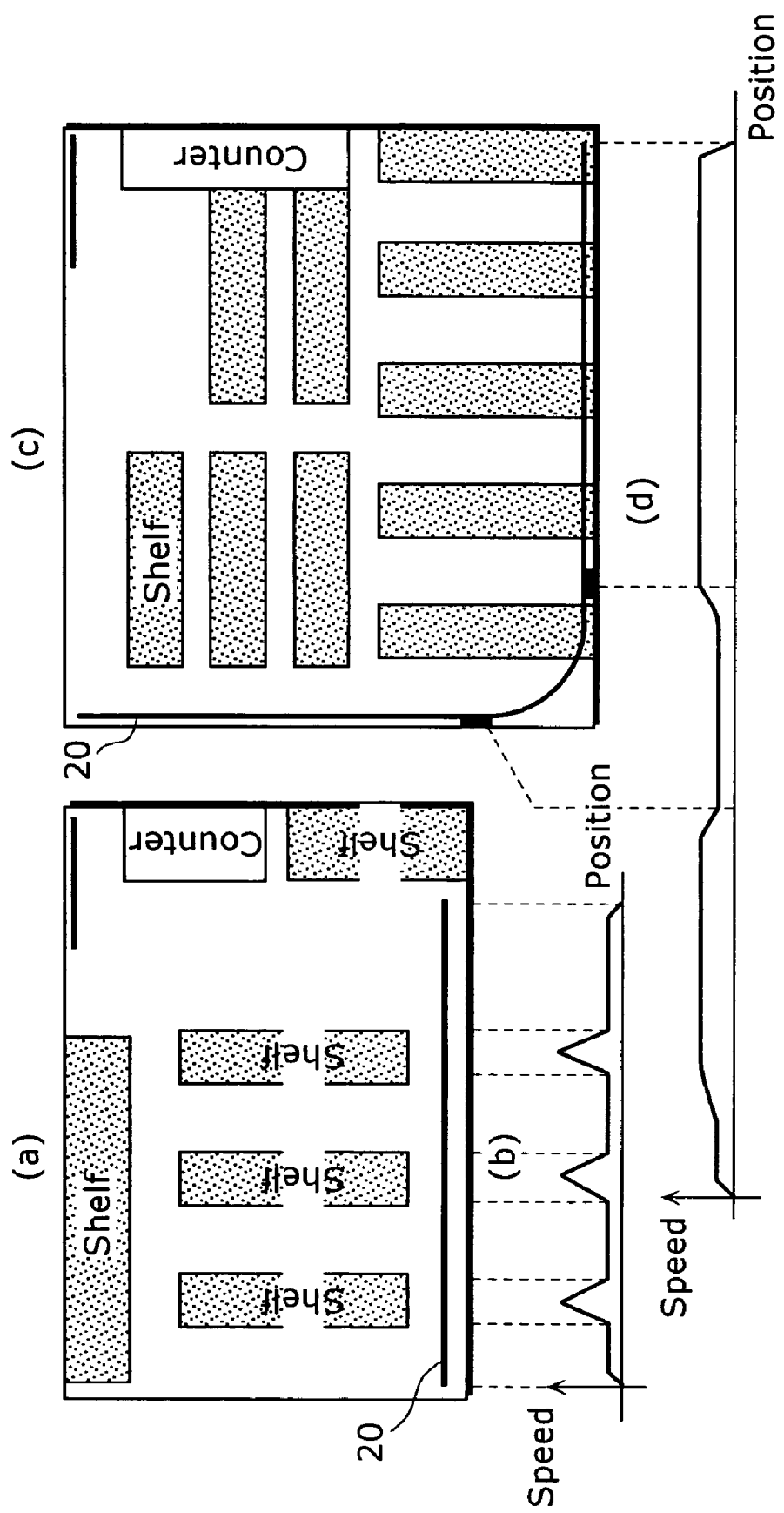
FIG. 6 is a diagram illustrating operations of a moving camera according to a conventional technique.
Figure 7:
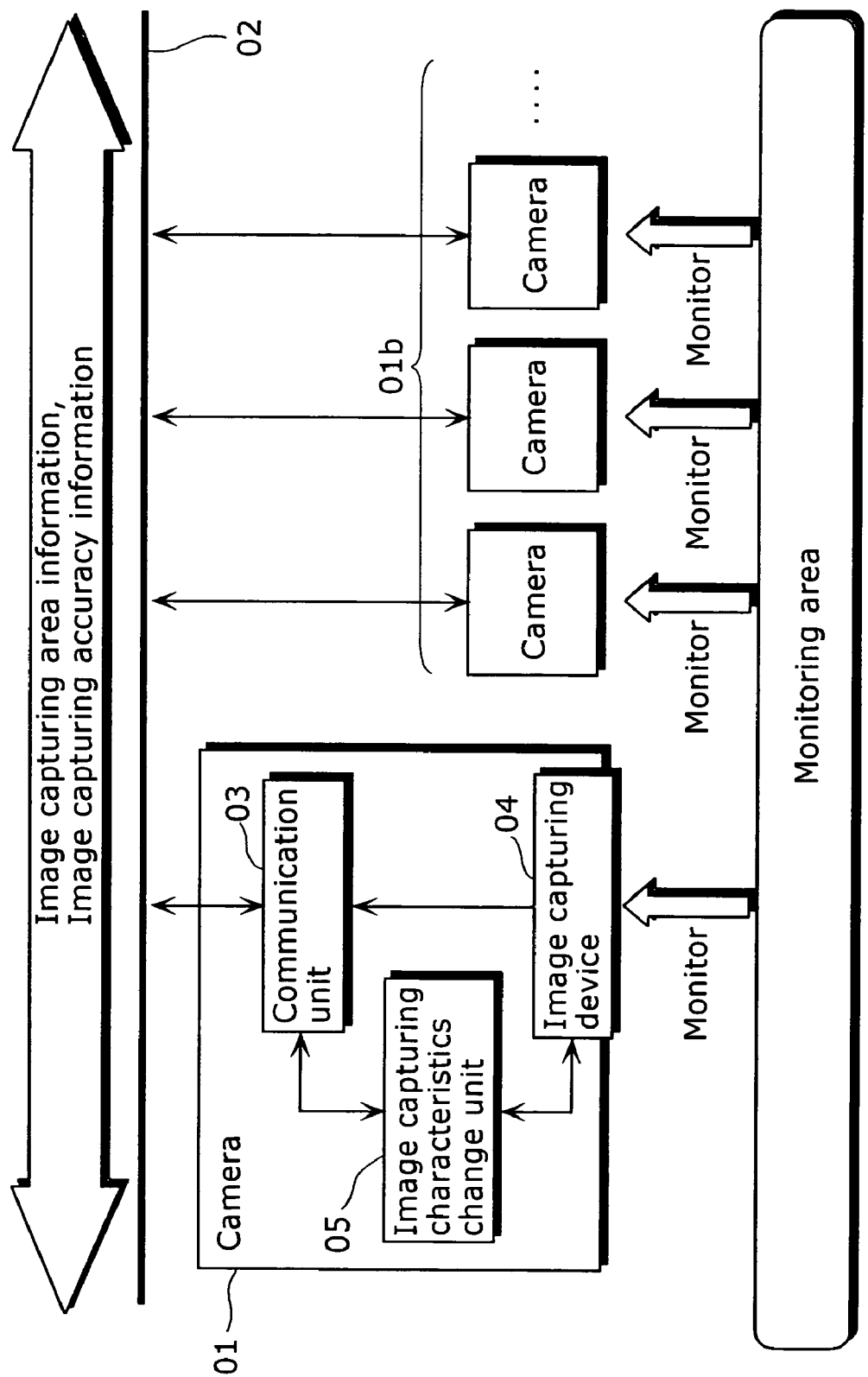
FIG. 7 is a block diagram showing a basic structure of a monitor system according to the present invention.

FIG. 7 is a block diagram showing a basic structure of a monitor system according to the embodiment of the present invention. FIG. 7 shows a monitor system including components which are common to each of the later mentioned embodiments.

This monitor system includes: a plurality of camera terminals (hereinafter referred to as cameras) 01 and 01*b* made up of the same components; and a communication medium 02 which transmits information related to image capturing characteristics of each of the cameras 01 and 01*b*. And, each of the cameras 01 and 01*b* changes image capturing characteristics in cooperation with the other cameras so that the whole monitoring area can be monitored in further detail. One camera 01 will be mainly explained as follows.

The camera 01 is an autonomous cooperation camera which changes image capturing characteristics autonomously in cooperation with the other cameras. And, the camera 01 is made up of: a communication unit 03 for communicating information related to image capturing details with the other cameras 01*b*; an image capturing device 04 which can change image capturing characteristics; and an image capturing characteristics change unit 05 which changes the image capturing characteristics of the image capturing device 04. The image capturing characteristics change unit 05 changes the image capturing characteristics of the image capturing device 04 so that the relations with the image capturing characteristics of the camera 01 and the image capturing characteristics of the camera 01*b* fulfill predetermined conditions.

Figure 8:
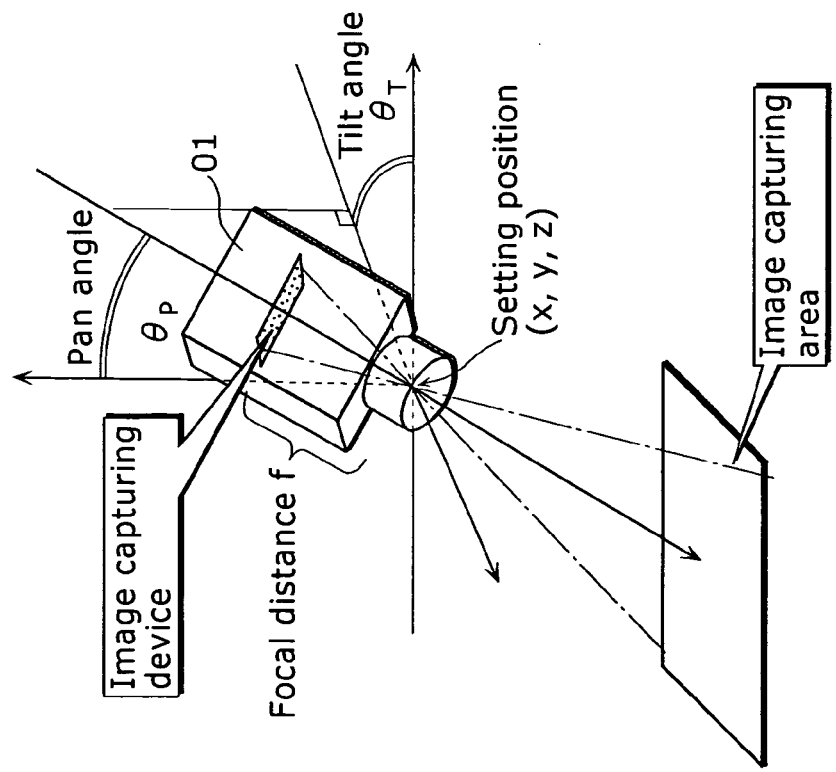
FIGS. 8A and 8B are diagrams explaining: image capturing area information and area determination parameters, and image capturing accuracy information and accuracy determination parameters.

Next, the image capturing characteristics of the image capturing device 04 will be explained, the image capturing device 04 being changed by the image capturing characteristics change unit 05 included in the monitor system according to the present invention. FIGS. 8A and 8B show various information related to image capturing characteristics used by the image capturing characteristics change unit 05.

The image capturing area information as shown in FIG. 8B is information related to the image capturing area of the camera 01. This image capturing area information includes position coordinates of the image capturing area, central coordinates, size and the like. Also, the area determination parameters as shown in FIGS. 8A and 8B are parameters which determine the image capturing area information of the camera 01. The area determination parameters include: a setting position of the camera 01 (x, y, z); a pan angle $\theta_P$; a tilt angle $\theta_T$; and a focal distance f.

Also, image capturing accuracy information as shown in FIG. 8B is information related to accuracy of the captured image of the camera 01. This image capturing accuracy information indicates, for example, resolution of the captured image or size of the area in which the image is actually captured. In addition, the area determination parameters as shown in FIG. 8B are parameters which determine image capturing area information of the camera 01, such as the focal distance f.

First Embodiment

First, the first embodiment of the present invention will be explained.

Figure 9:
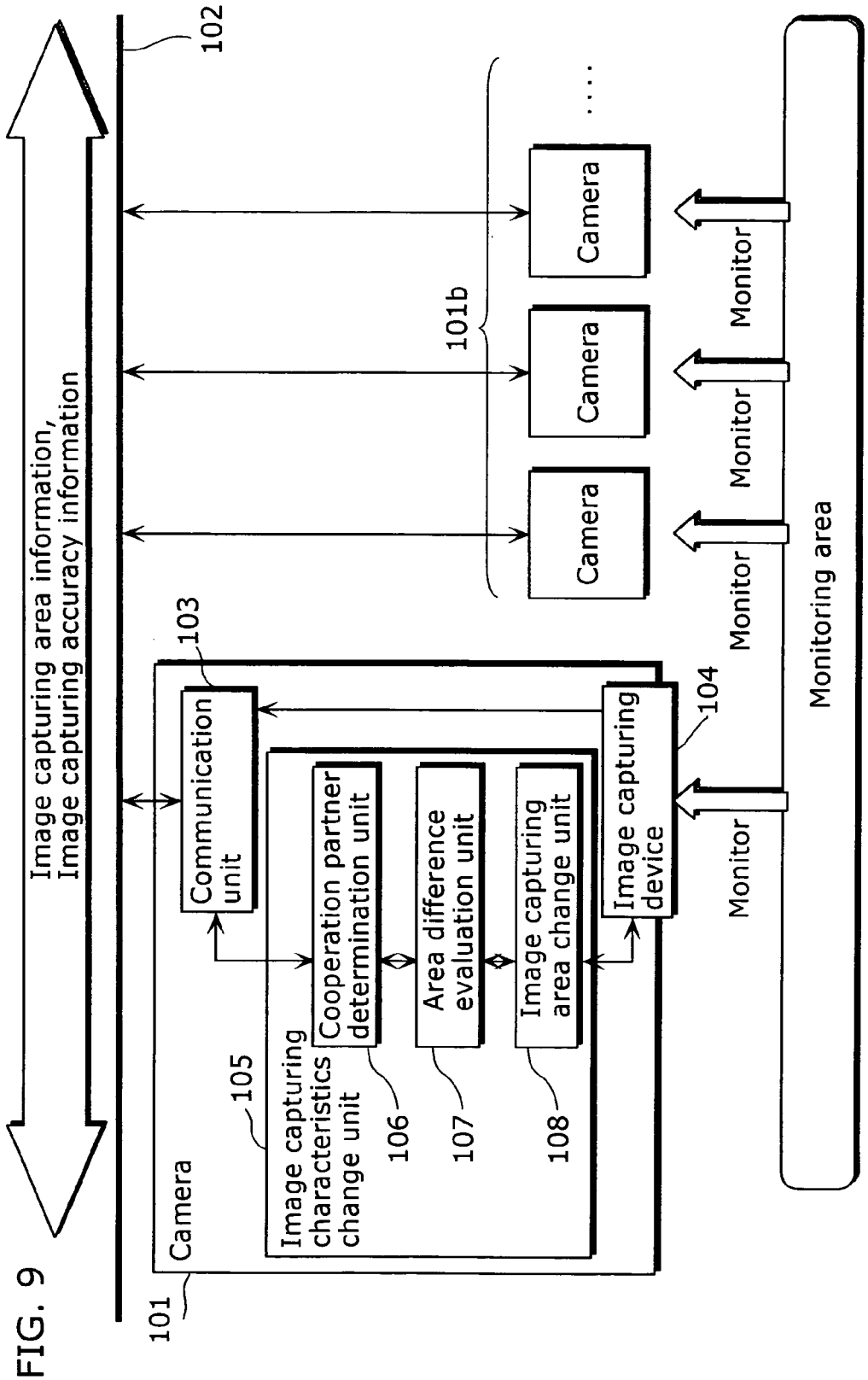
FIG. 9 is a block diagram showing a structure of the first embodiment according to the present invention.

FIG. 9 is a block diagram showing a structure of a monitor system according to the first embodiment of the present invention. This monitor system includes: a plurality of cameras 101 and 101b made up of the same components; and a communication medium 102 which transmits information related to the image capturing characteristics of each of the cameras 101 and 101b. And, each of the cameras 101 and 101b changes the image capturing characteristics in cooperation with the other cameras so that the whole monitoring area can be monitored in further detail as a whole monitor system. One camera 101 will be mainly explained as follows.

The camera 101 is an autonomous cooperation camera according to the first embodiment.

The communication medium 102 is a communication network which connects a plurality of cameras.

The communication unit 103 is a communication interface which communicates the image capturing area information and area determination parameters of the camera 101.

The image capturing device 104 is a Charge Coupled Device (CCD) camera and the like which can change the above mentioned image capturing area.

The image capturing characteristics change unit 105 is a processing unit which changes the image capturing characteristics in cooperation with the other cameras. And, the image capturing characteristics change unit 105 includes: a cooperation partner determination unit 106; an area difference evaluation unit 107; and an image capturing area change unit 108.

The cooperation partner determination unit 106 determines cameras 101b whose image capturing areas are adjacent to the image capturing area of the camera 101 from among the other cameras 101b based on the image capturing area information and area determination parameters of the other cameras 101b received in the communication unit 103.

The area difference evaluation unit 107 provides an evaluation value A for the distance between the image capturing area of each camera 101b and the image capturing area of the camera 101, based on the respective image capturing area information and area determination parameters of the camera 101 and the cameras 101b determined in the cooperation partner determination unit 106.

The image capturing area change unit 108 changes the area determination parameters of the image capturing device 104 so that the evaluation value A approaches a predetermined target value A. In other words, the image capturing area change unit 108 changes the image capturing area by controlling the image capturing device 104 of the camera 101 so that each image capturing area of the cameras 101b and the image capturing area of the camera 101 have a predetermined relation, based on the respective image capturing area information and area determination parameters of the camera 101 and the cameras 101b determined by the cooperation partner determination unit 106.

According to the background art, in the whole monitoring area, it is not possible to capture an image in a wider range than the range in which one camera can capture an image at one time. There is a case where a plurality of cameras are used in order to solve this problem, but it is necessary to determine how to assign each image capturing area to each camera.

Figure 16:
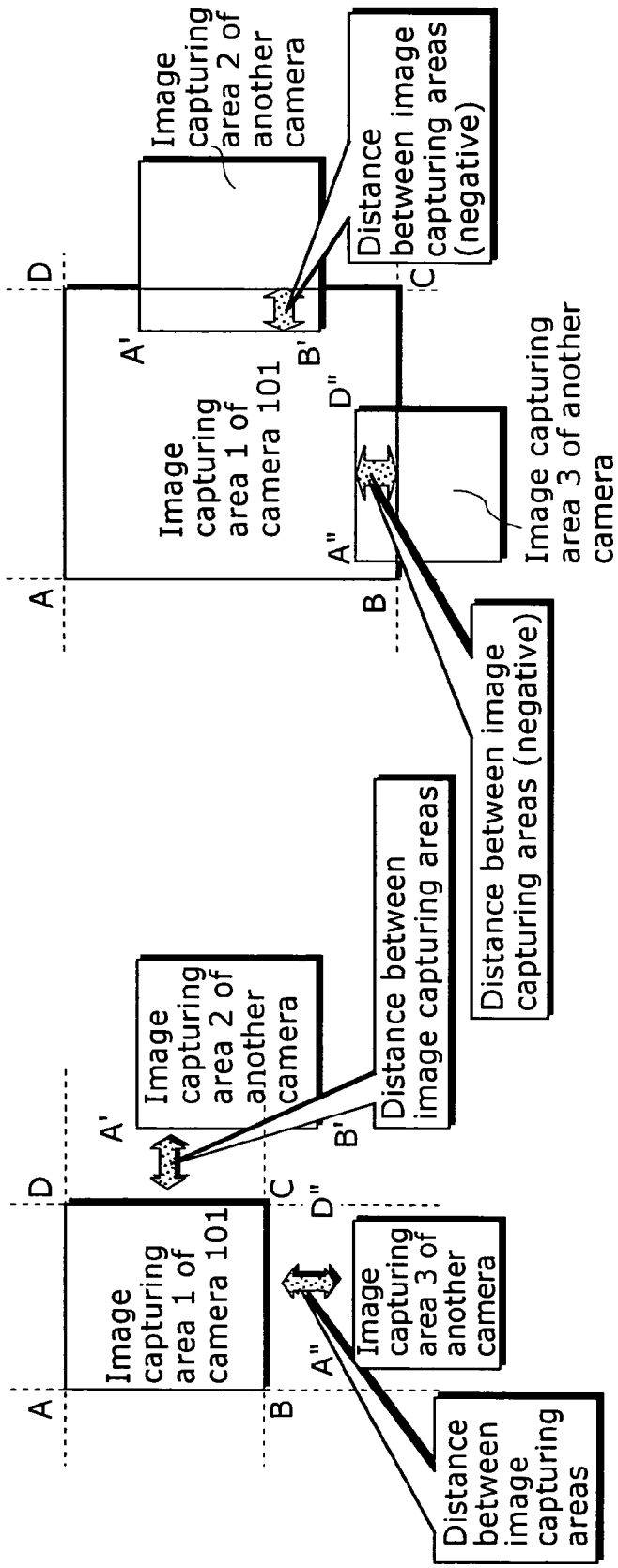
FIGS. 16A and 16B are diagrams illustrating procedures for evaluating a position relation of an image capturing area of a camera.

On the other hand, according to the structure of the first embodiment, each camera 101 identifies cameras whose image capturing areas are adjacent to the image capturing area of the camera 101 using the cooperation partner determination unit 106 from among the other cameras 101b which are communicated via the communication unit 103. And, the area difference evaluation unit 107 calculates the evaluation value A for the distance between (i) the image capturing area of the camera 101 and (ii) each image capturing area which is adjacent to the image capturing area of the camera 101. Then, the image capturing area change unit 108 changes the image capturing area of each camera so that the image capturing area of the camera 101 and each adjacent image capturing area have a distance by which the evaluation value A becomes the predetermined target value. Thus, each camera 101 can change the image capturing area of each camera included in the monitor system so that a predetermined distance can be kept between (i) the image capturing area of the camera 101 and (ii) each image capturing area which is adjacent to the image capturing area of the camera 101. Moreover, as shown in FIGS. 16A and 16B, by setting a negative value for the distance between the image capturing area of the camera 101 and each adjacent image capturing area, the image capturing area can be changed so that each adjacent image capturing area has a predetermined overlapping area. And, it is possible for a plurality of cameras 101 and 101b to capture an image in a gapless wider range than the range in which one camera can capture an image, the plurality of cameras 101 and 101b having the adjacent image capturing areas to each other.

Figure 10A:
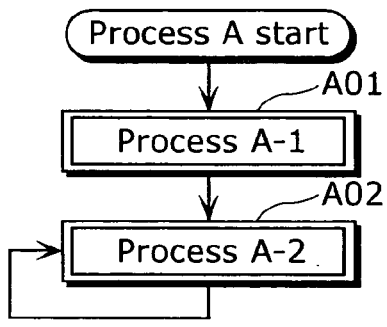
FIGS. 10A, 10B and 10C are flow charts explaining operations of the first embodiment.
Figure 10B:
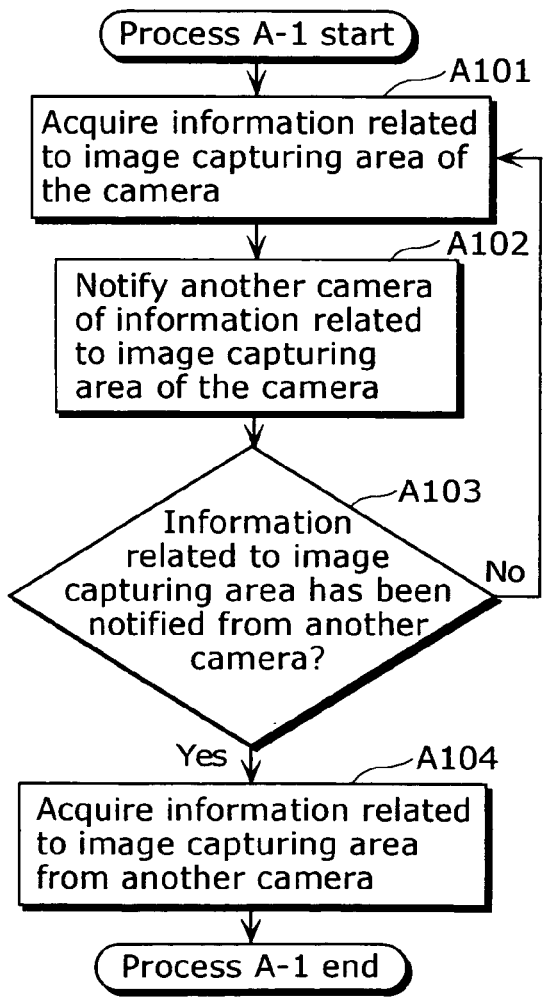
Figure 10C:
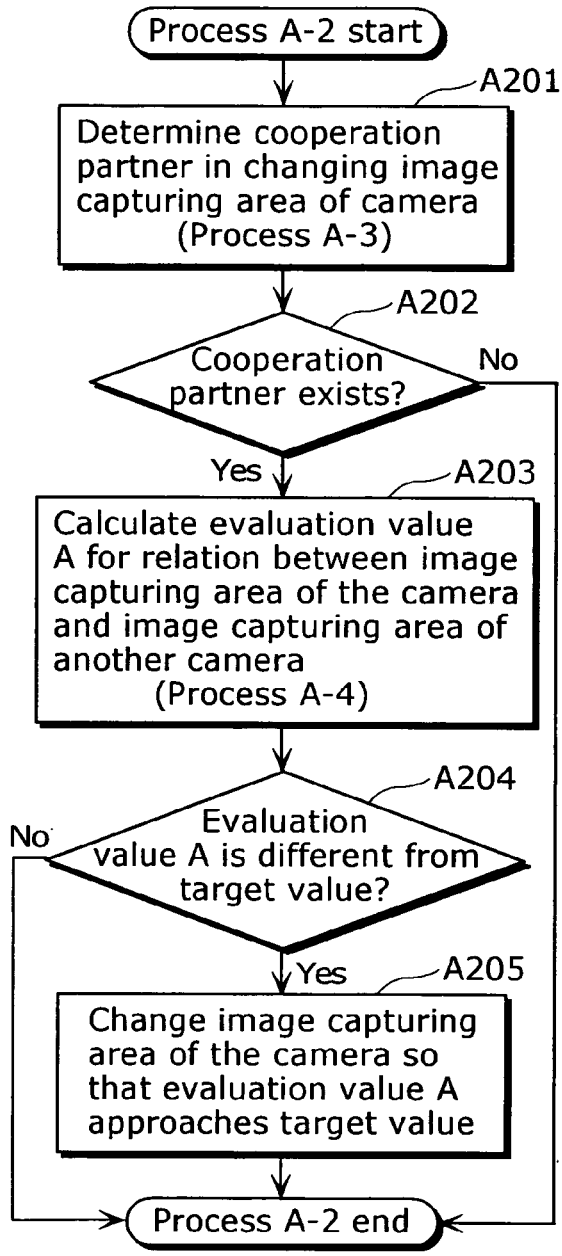

Next, the procedures for changing the image capturing area of the camera 101 included in the monitor system will be explained using FIGS. 10A, 10B and 10C.

(Process A)
(Step A01) First, the process in the communication unit 103 is started.

(Process A-1)
(Step A101) Image capturing area information and area determination parameters of the camera 101 are acquired.
(Step A102) Image capturing area information and area determination parameters of the camera 101 are notified to another camera 101b.
(Step A104) It is judged whether or not there is notification of the image capturing area information and area determination parameters from another camera 101b. If there is notification, the process is proceeded to step A105. If there is no notification, the process is returned to the step A101.
(Step A105) The image capturing area information and area determination parameters notified from another camera 101b are acquired, and the process A-1 is ended.

Figure 11:
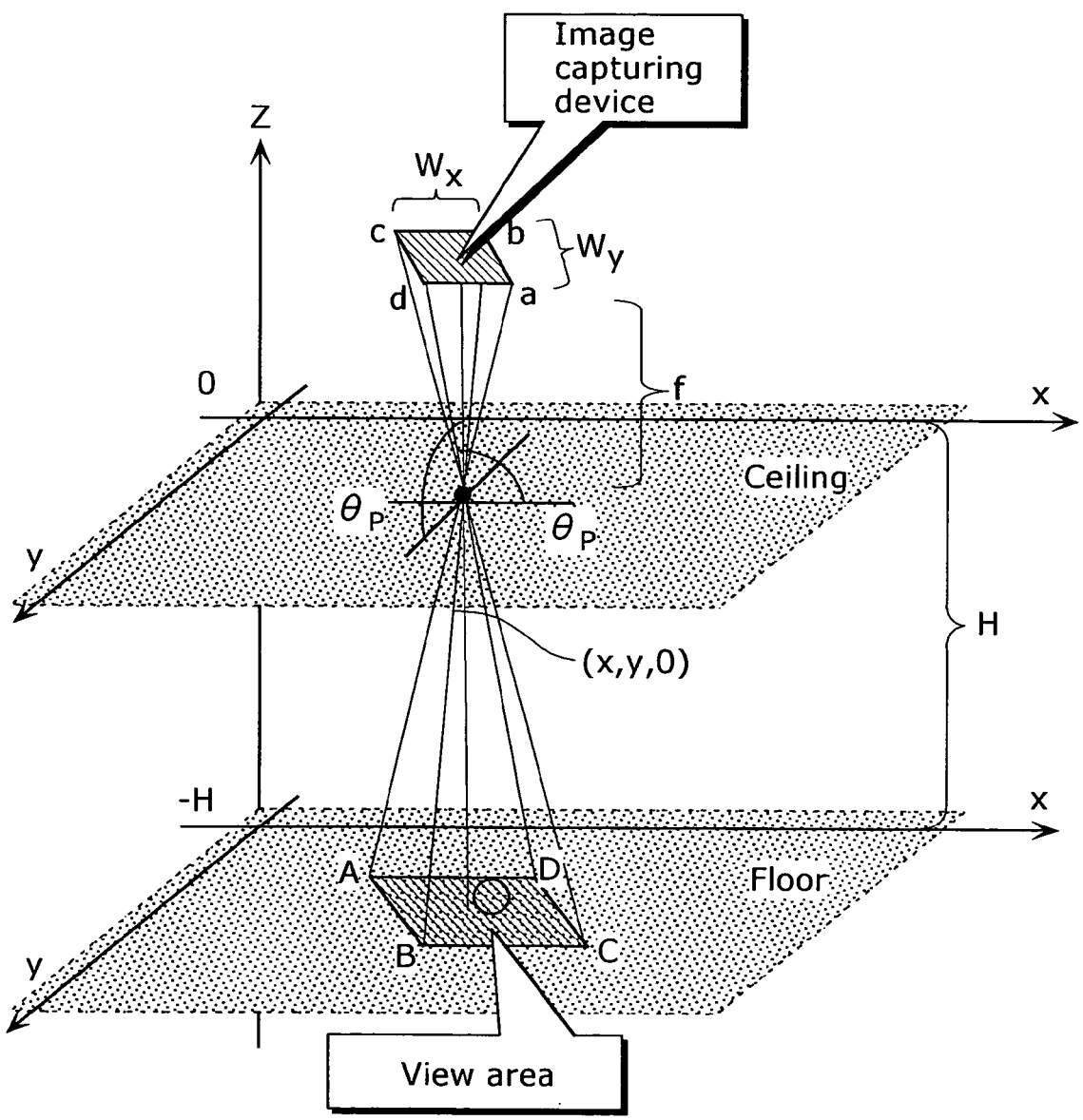
FIG. 11 is a diagram showing relations between area determination parameters and a view area of a camera.

Here, the relation between the image capturing area information and area determination parameters acquired in the step A101 will be explained using FIG. 11 referring to an example of the case where the image capturing device has a rectangular shape. In FIG. 11 it is assumed that the camera 101 is set on the ceiling facing the direction of the floor. In the case where the focal point of the camera 101 is (x, y, 0), the ceiling height is H, the image capturing device has a rectangular shape whose vertical and horizontal lengths are ($W_x$, $W_y$), the focal distance is f, the pan angle and the tilt angle indicating the view directions of the camera 101 are $\theta_P$, $\theta_T$, the position of the floor area whose image is captured by the camera 101 can be expressed by the following equations 1, 2, 3 and 4. In other words, the position relation between the image capturing device 104 and the view area of the camera 101 is expressed by the equations 1, 2, 3 and 4. Here, the position coordinates of the image capturing device used in the above equations 1, 2, 3 and 4 are expressed by the following equations 5, 6, 7 and 8. In other words, the equations 5, 6, 7 and 8 express the relation between the area determination parameters of the camera 101 (pan angle $\theta_P$, tilt angle $\theta_T$, focal distance f and setting position (x, y, z) of the camera 101) and the position of the image capturing device 104.

$$\begin{pmatrix} A_x \\ A_y \\ A_z \end{pmatrix}^T = \begin{pmatrix} -(a_x - x)H/a_z + x \\ -(a_y - y)H/a_z + y \\ -H \end{pmatrix}^T \quad \text{(Equation 1)}$$

$$\begin{pmatrix} B_x \\ B_y \\ B_z \end{pmatrix}^T = \begin{pmatrix} -(b_x - x)H/b_z + x \\ -(b_y - y)H/b_z + y \\ -H \end{pmatrix}^T \quad \text{(Equation 2)}$$

$$\begin{pmatrix} C_x \\ C_y \\ C_z \end{pmatrix}^T = \begin{pmatrix} -(c_x - x)H/c_z + x \\ -(c_y - y)H/c_z + y \\ -H \end{pmatrix}^T \quad \text{(Equation 3)}$$

$$\begin{pmatrix} D_x \\ D_y \\ D_z \end{pmatrix}^T = \begin{pmatrix} -(d_x - x)H/d_z + x \\ -(d_y - y)H/d_z + y \\ -H \end{pmatrix}^T \quad \text{(Equation 4)}$$

$$\begin{pmatrix} a_x \\ a_y \\ a_z \end{pmatrix}^T = \frac{1}{2}\begin{pmatrix} w_x \cos\theta_P - 2f \sin\theta_P + 2x \\ w_x \sin\theta_T \sin\theta_P + w_y \cos\theta_T + 2f \sin\theta_T \cos\theta_P + 2y \\ w_x \cos\theta_T \sin\theta_P - w_y \sin\theta_T + 2f \cos\theta_T \cos\theta_P \end{pmatrix}^T \quad \text{(Equation 5)}$$

$$\begin{pmatrix} b_x \\ b_y \\ b_z \end{pmatrix}^T = \frac{1}{2}\begin{pmatrix} w_x \cos\theta_P - 2f \sin\theta_P + 2x \\ w_x \sin\theta_T \sin\theta_P - w_y \cos\theta_T + 2f \sin\theta_T \cos\theta_P + 2y \\ w_x \cos\theta_T \sin\theta_P + w_y \sin\theta_T + 2f \cos\theta_T \cos\theta_P \end{pmatrix}^T \quad \text{(Equation 6)}$$

$$\begin{pmatrix} c_x \\ c_y \\ c_z \end{pmatrix}^T = \frac{1}{2}\begin{pmatrix} -w_x \cos\theta_P - 2f \sin\theta_P + 2x \\ -w_x \sin\theta_T \sin\theta_P - w_y \cos\theta_T + 2f \sin\theta_T \cos\theta_P + 2y \\ -w_x \cos\theta_T \sin\theta_P + w_y \sin\theta_T + 2f \cos\theta_T \cos\theta_P \end{pmatrix}^T \quad \text{(Equation 7)}$$

$$\begin{pmatrix} d_x \\ d_y \\ d_z \end{pmatrix}^T = \frac{1}{2}\begin{pmatrix} -w_x \cos\theta_P - 2f \sin\theta_P + 2x \\ -w_x \sin\theta_T \sin\theta_P + w_y \cos\theta_T + 2f \sin\theta_T \cos\theta_P + 2y \\ -w_x \cos\theta_T \sin\theta_P - w_y \sin\theta_T + 2f \cos\theta_T \cos\theta_P \end{pmatrix}^T \quad \text{(Equation 8)}$$

Figure 12:
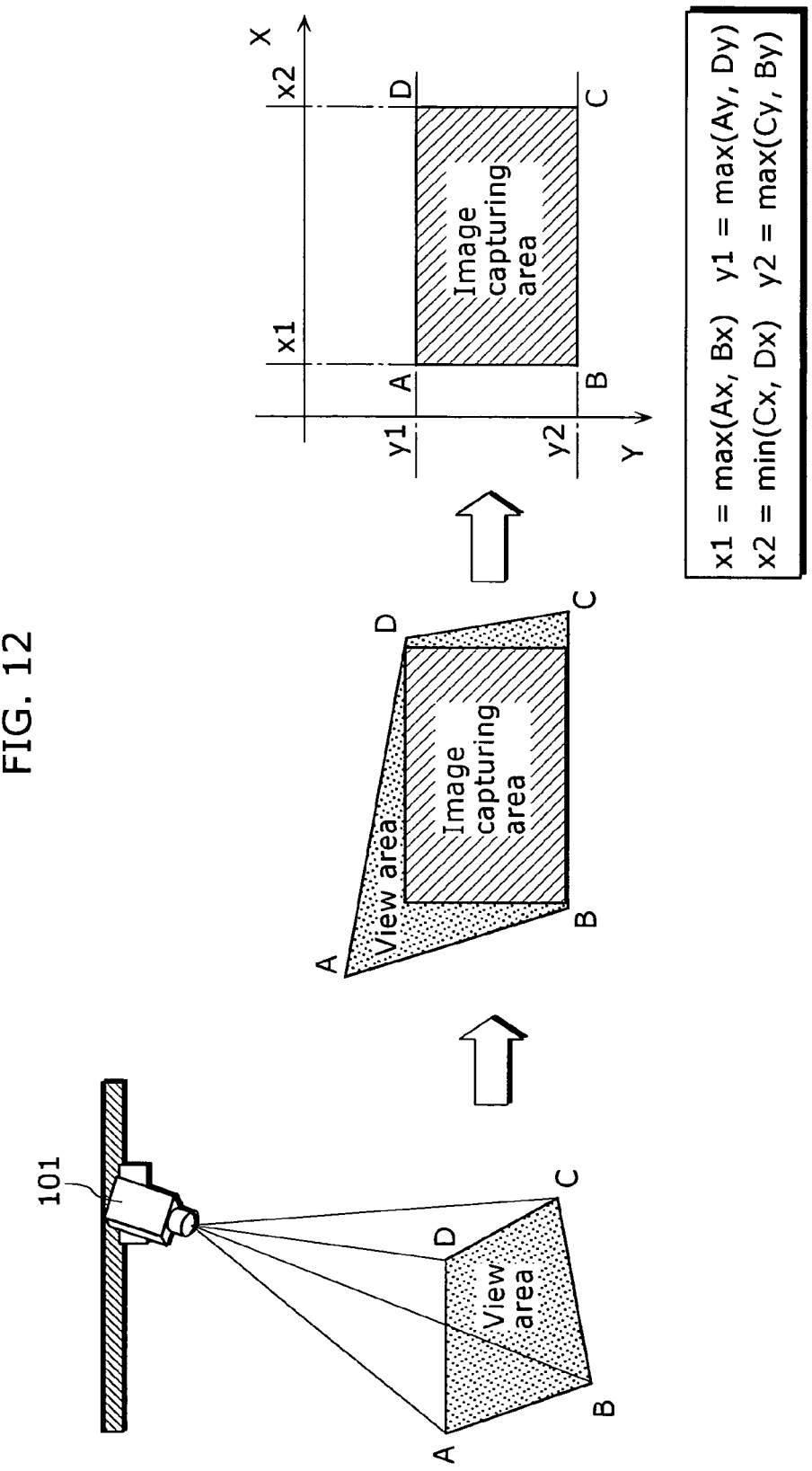
FIG. 12 is a diagram showing a relation between a view area and an image capturing area of a camera.

Also, the view area associated with the image capturing device 104 is turned into a distorted shape from a rectangle due to the view direction of the camera 101. Thus, in the following explanation, as shown in FIG. 12, the rectangular area inscribed in the view area will be explained as the image capturing area of the camera 101.

(Step A02) Next, the process in the image capturing characteristics change unit 105 is started.

(Process A-2)

(Step A201) The cooperation partner determination unit 106 determines cameras 101b which have image capturing areas adjacent to the image capturing area of the camera 101.

(Step A202) The cooperation partner determination unit 106 judges whether or not the cameras 101b which have the image capturing areas adjacent to the image capturing area of the camera 101 exists. In the case where the cameras 101b exist, the process is proceeded to step A203. In the case where the cameras 101b do not exist, the process A-2 is ended.

(Step A203) The area difference evaluation unit 107 calculates an evaluation value A for a distance between each of the cameras 101b and the image capturing area of the camera 101, the cameras 101b having the image capturing areas adjacent to the image capturing area of the camera 101.

(Step 204) It is judged whether or not the evaluation value A is different from a predetermined target value. In the case where the evaluation value A is different from the target value, the process is proceeded to step A205. In the case where the evaluation value A is equal to the target value, the process A-2 is ended.

(Step A205) The image capturing area change unit 108 changes the area determination parameters of the camera 101 so that the evaluation value A approaches the target value, and the process A-2 is ended.

The steps A01 (process A-1) and A02 (process A-2) are repeated subsequently.

Figure 13:
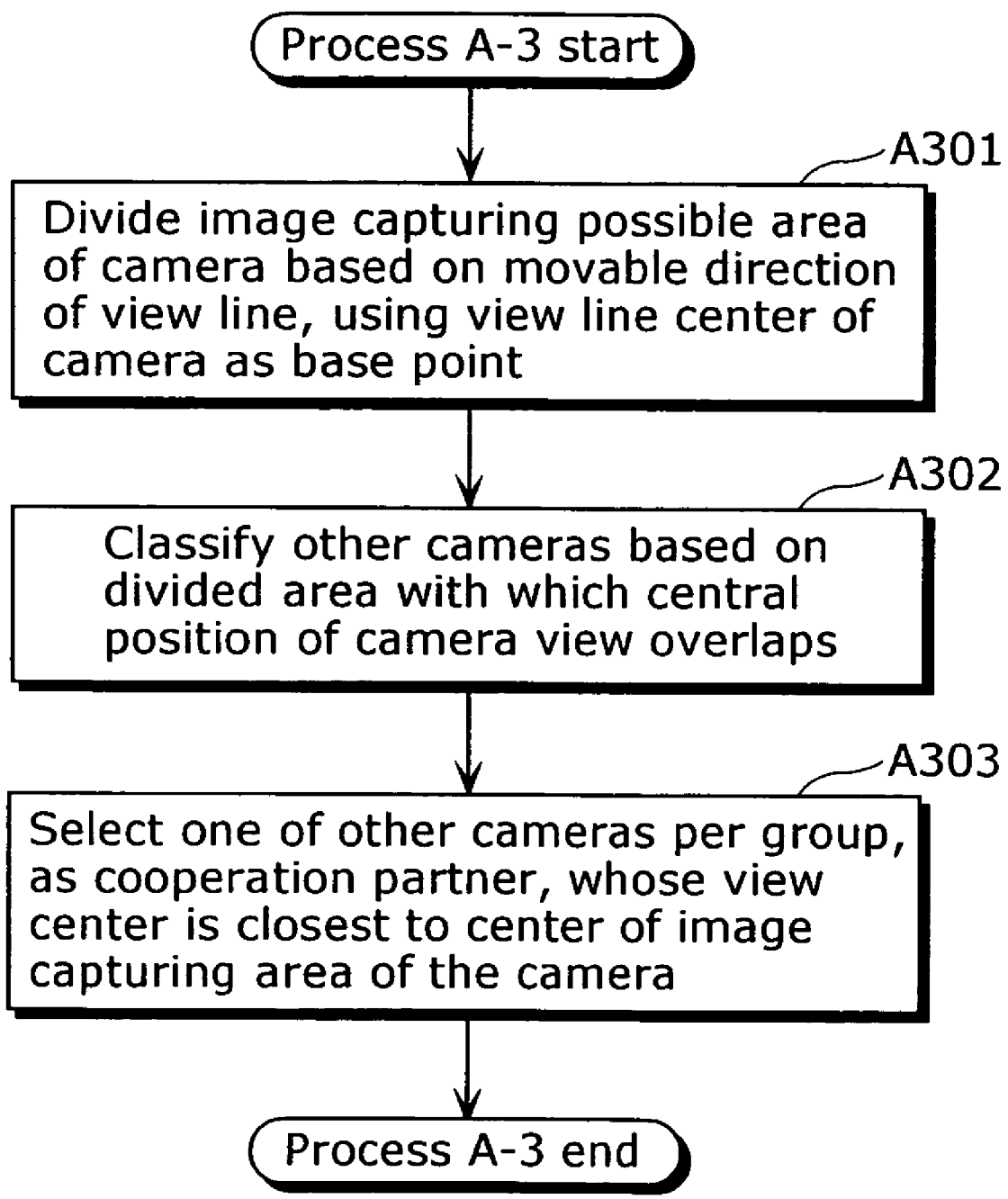
FIG. 13 is a flow chart explaining procedures for determining a cooperation partner of a camera.
Figure 14:
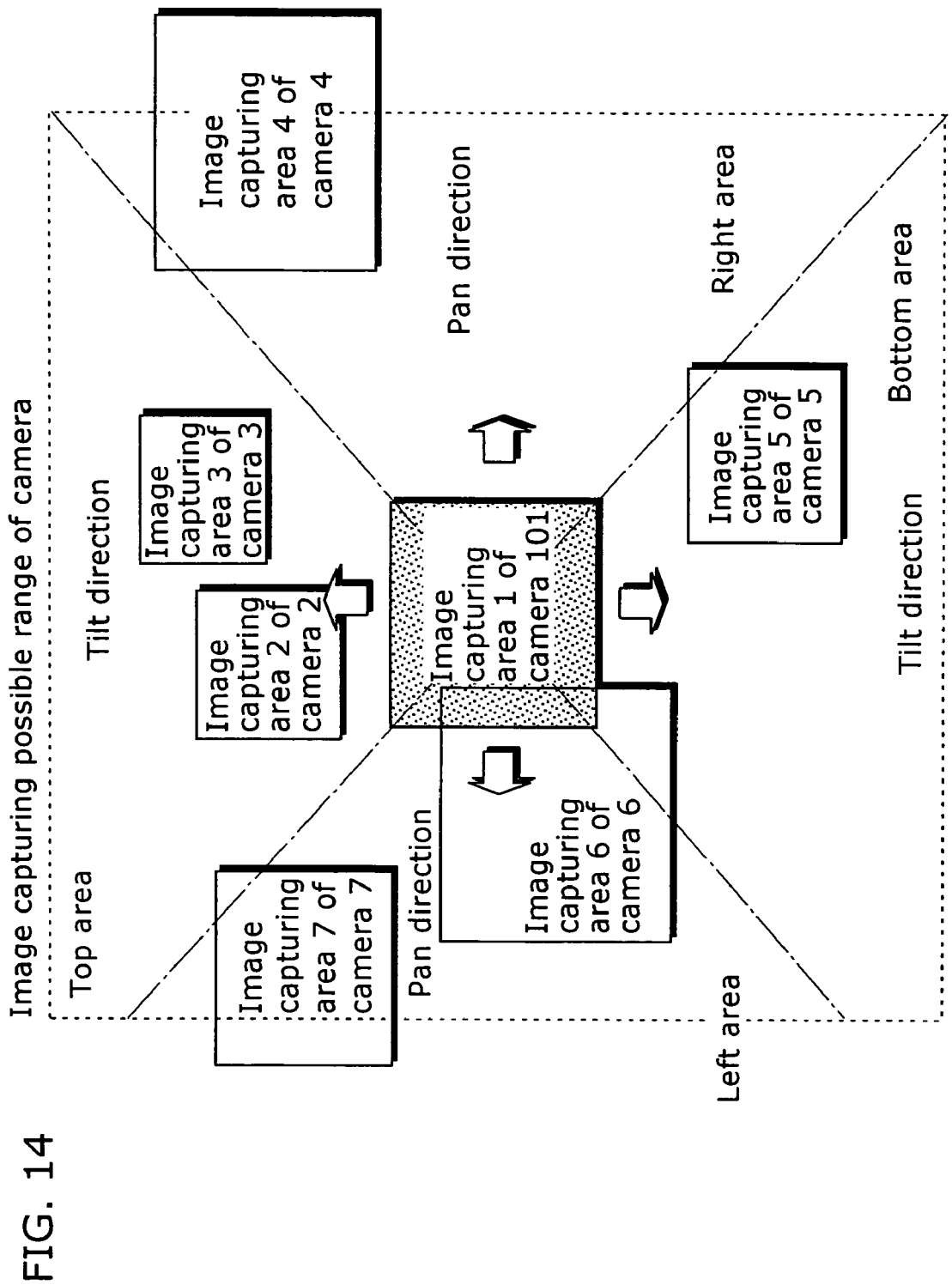
FIG. 14 is a diagram illustrating procedures for determining a cooperation partner of a camera.

An example of concrete procedures for determining the cameras 101b which have image capturing areas adjacent to the image capturing area of the camera 101 in the step A201 will be explained using the flow chart as shown in FIGS. 13A and 13B. Here, the procedures will be explained assuming that the position relation between the image capturing area of the camera 101 and each image capturing area of the other cameras 101b is the position relation as shown in FIG. 14.

(Process A-3)

(Step A301) The whole image capturing possible area of the camera 101 is divided into a plurality of areas based on a movable direction of the image capturing area of the camera, using the center of the image capturing area (1) of the camera 101 as a base point. In the example of FIG. 14, the image capturing area of the camera 101 is divided into four areas which are separated with dotted lines in the movable pan direction and tilt direction.

(Step A302) The other cameras 101b are classified based on the area in which each center of the image capturing areas of the other cameras 101b exists, the areas being divided in the step A301.

In the example of FIG. 14, in each of the four areas divided into top, bottom, left and right, the other cameras are classified as: top area group (camera 2, camera 3), right area group (camera 4), bottom area group (camera 5) and left area group (camera 6, camera 7).

(Step A303) From among each of the classified groups, a camera is determined as a cooperation partner, the camera having the center of the image capturing area closest to the center of the image capturing area of the camera 101.

In the example as shown in FIG. 14, the cooperation partner is determined respectively as follows: the camera 2 in the top direction; the camera 4 in the right direction; the camera 5 in the bottom direction; and the camera 6 in the left direction.

Next, the procedures (step A203) for evaluating the relation between the image capturing area of the camera 101 and each image capturing area of the other cameras 101b will be explained.

Figure 15:
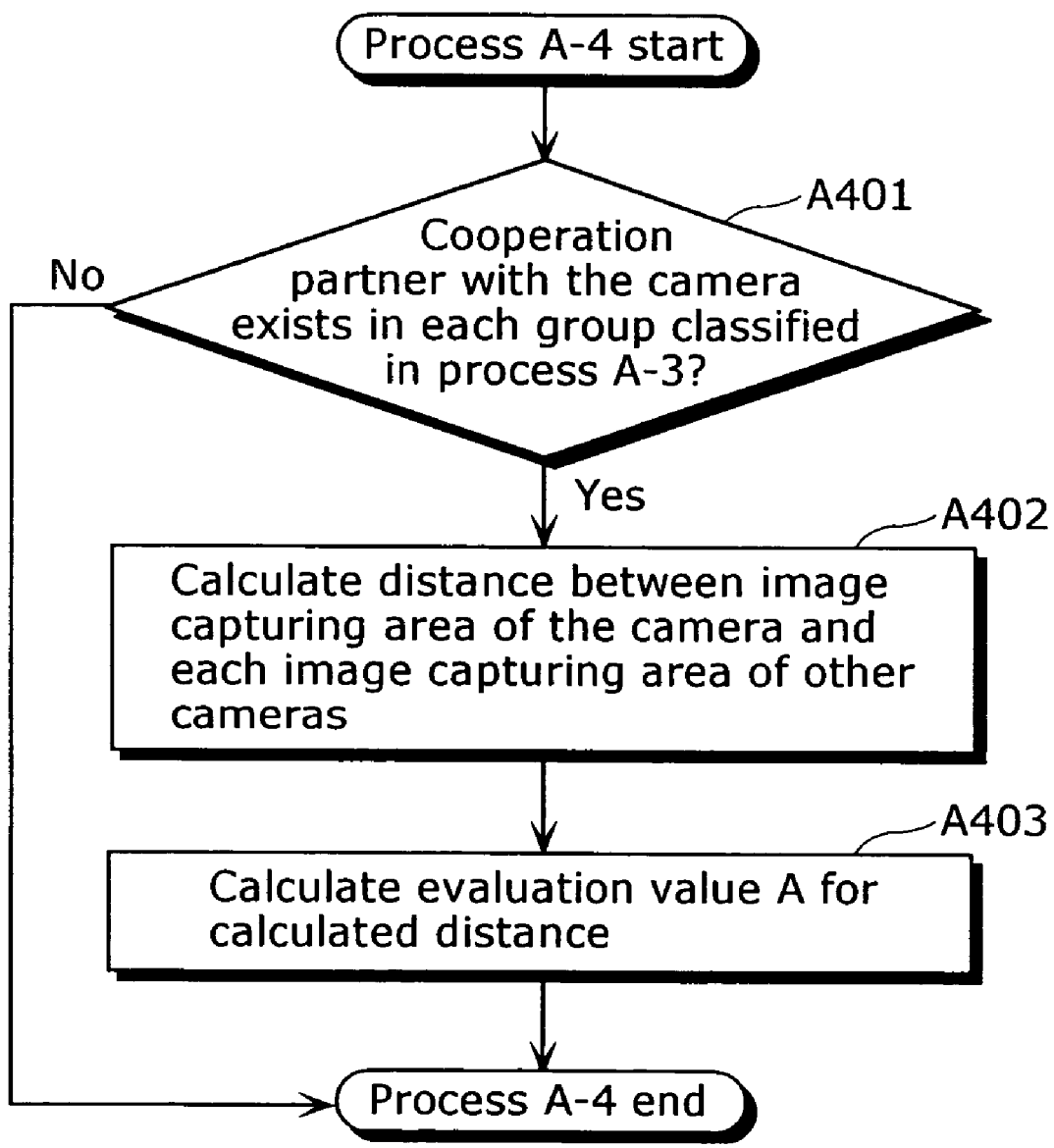
FIG. 15 is a flow chart explaining procedures for evaluating a position relation of an image capturing area of a camera.
Figure 17:
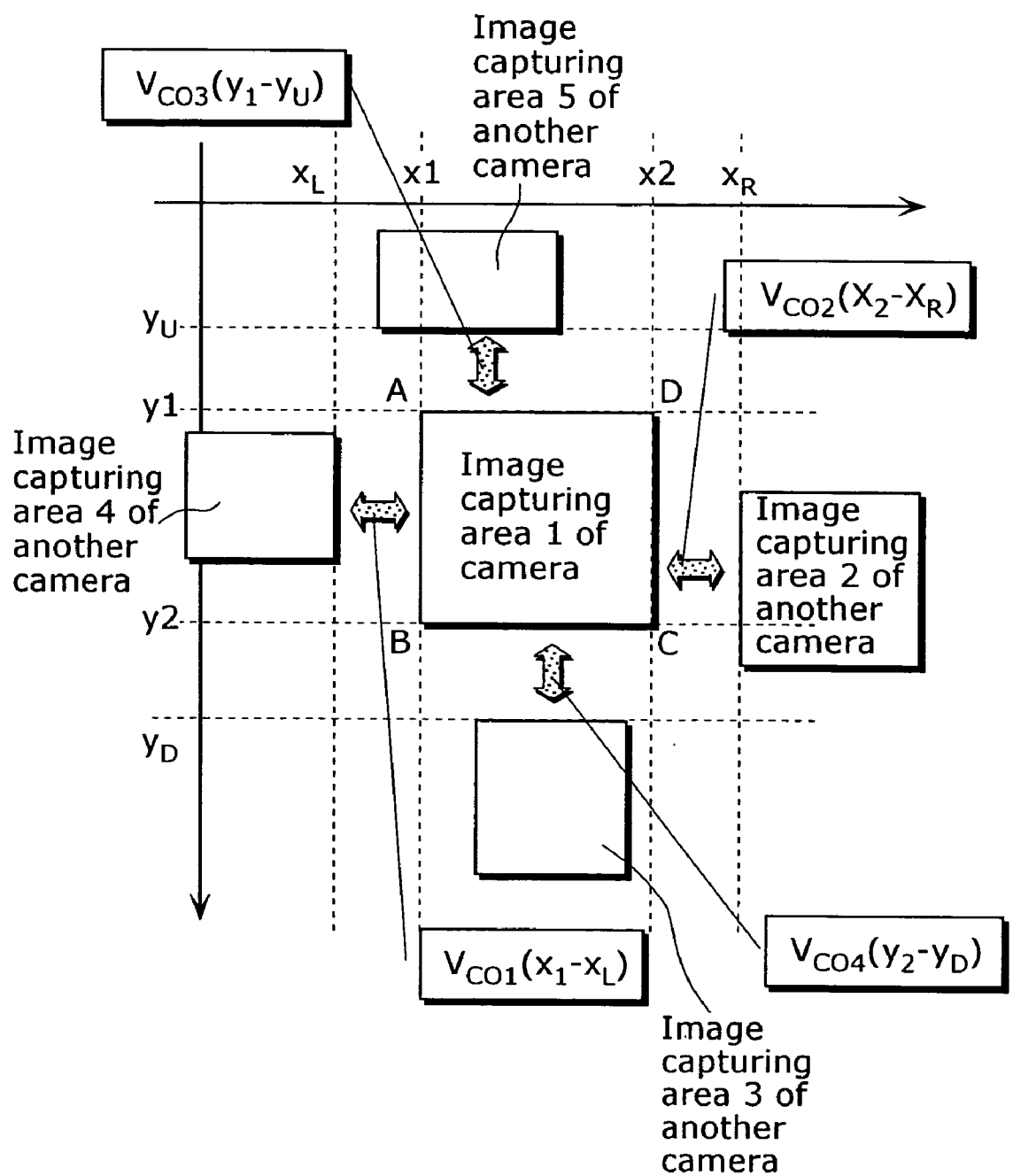
FIG. 17 is a diagram illustrating an evaluation function A of a camera.

The flow chart as shown in FIG. 15 shows an example of the procedures for calculating the evaluation value A for the position relation between the image capturing area of the camera 101 and each image capturing area of the other cameras 101b in the step A203. FIG. 17 shows the position relation between the image capturing area of the camera 101 and each image capturing area of the other cameras 101b according to the first embodiment. Each of the following equations 9, 10, 11 and 12 expresses an example of the evaluation function A which determines the evaluation value A for the distance relation between the image capturing area of the camera 101 and each adjacent image capturing area of the other cameras 101b.

$$V_{co1}(x_1-x_L)=((x_1-x_L)-C)^2 \quad \text{(Equation 9)}$$

$$V_{co2}(x_2-x_R)=((x_2-x_R)+C)^2 \quad \text{(Equation 10)}$$

$$V_{co3}(y_1-y_U)=((y_1-y_U)-C)^2 \quad \text{(Equation 11)}$$

$$V_{co4}(y_2-y_D)=((y_2-y_D)+C)^2 \quad \text{(Equation 12)}$$

(Process A-4)
(Step A401) In changing the image capturing area, in each group of the cameras classified in the process A-3, it is examined whether or not a cooperation partner with the camera 101 exists. In the case where the cooperation partner exists, the process is proceeded to step A403. In the case where the cooperation partner does not exist, the process A-4 is ended.
(Step A402) The distance between each image capturing area of the other cooperation cameras and the image capturing area of the camera 101 is calculated.

In the example of FIG. 17, the distance ($X_L$–X1) between the image capturing area 4 and the image capturing area 1 of the camera 101 is calculated, the image capturing area 4 being to the left of the image capturing area of the camera 101.
(Step A403) The evaluation value A is calculated for the difference between the distance ($X_L$–X1) calculated in the step A402 and a predetermined constant C.

For the image capturing area 5, the image capturing area 2 and the image capturing area 3, the same steps A401 to A404 are repeated as well as the image capturing area 4. Each evaluation value A is expressed respectively by the above equations 10, 11 and 12. And, the average value of the three evaluation values becomes the evaluation value A for the position relation between the camera 101 and the other cameras 101b whose image capturing areas are adjacent to the image capturing area of the camera 101.

Here, as long as the evaluation function A evaluates the relation between the distance ($X_L$–X1) and a predetermined distance C, the distance ($X_L$–X1) being between the image capturing area of the camera 101 and each of the adjacent image capturing areas, in addition to the above equations 9, 10, 11 and 12, another function by which, within the range in which the area determination parameters ($\theta_P$, $\theta_T$, f) can be changed, (i) the evaluation value A becomes the smallest (or largest) when the distance ($X_L$–X1) is equal to the predetermined constant C, and (ii) the evaluation value A monotonically increases (or decreases) as the difference between the distance ($X_L$–X1) and a predetermined constant C increases.

Next, the procedures in which the image capturing area change unit 108 changes the image capturing area in the step A205 will be explained.

The image capturing area change unit 108 changes the area determination parameters ($\theta_P$, $\theta_T$, f) according to the following update equations 13, 14 and 15 which include respective derivatives derived by partially differentiating the above mentioned evaluation function A using the area determination parameters ($\theta_P$, $\theta_T$, f) in order to change the image capturing area so that the evaluation value A approaches the minimum value (or the maximum value) as the target value.

$$\frac{d\theta_P}{dt} = -\frac{\alpha_P}{N} \frac{\partial \sum_{n=1}^{N} V_{con}}{\partial \theta_P} \quad \text{(Equation 13)}$$

$$\frac{d\theta_T}{dt} = -\frac{\alpha_T}{N} \frac{\partial \sum_{n=1}^{N} V_{con}}{\partial \theta_T} \quad \text{(Equation 14)}$$

$$\frac{df}{dt} = -\frac{\alpha_f}{N} \frac{\partial \sum_{n=1}^{N} V_{con}}{\partial f} \quad \text{(Equation 15)}$$

According to the above mentioned procedures, each camera 101 can automatically change the image capturing area by changing the area determination parameters ($\theta_P$, $\theta_T$, f) so that the distance between the image capturing area of the camera and each adjacent image capturing area can be kept as the predetermined constant distance C.

Next, concrete operational examples of the monitor system including the camera 101 according to the first embodiment will be explained using FIGS. 18 and 19. Here, the operational examples will be explained assuming that a plurality of cameras 101 are set in a ceiling of a room where the level of the ceiling is equal, and the distance between the adjacent image capturing areas is a negative value C.

Figure 18:
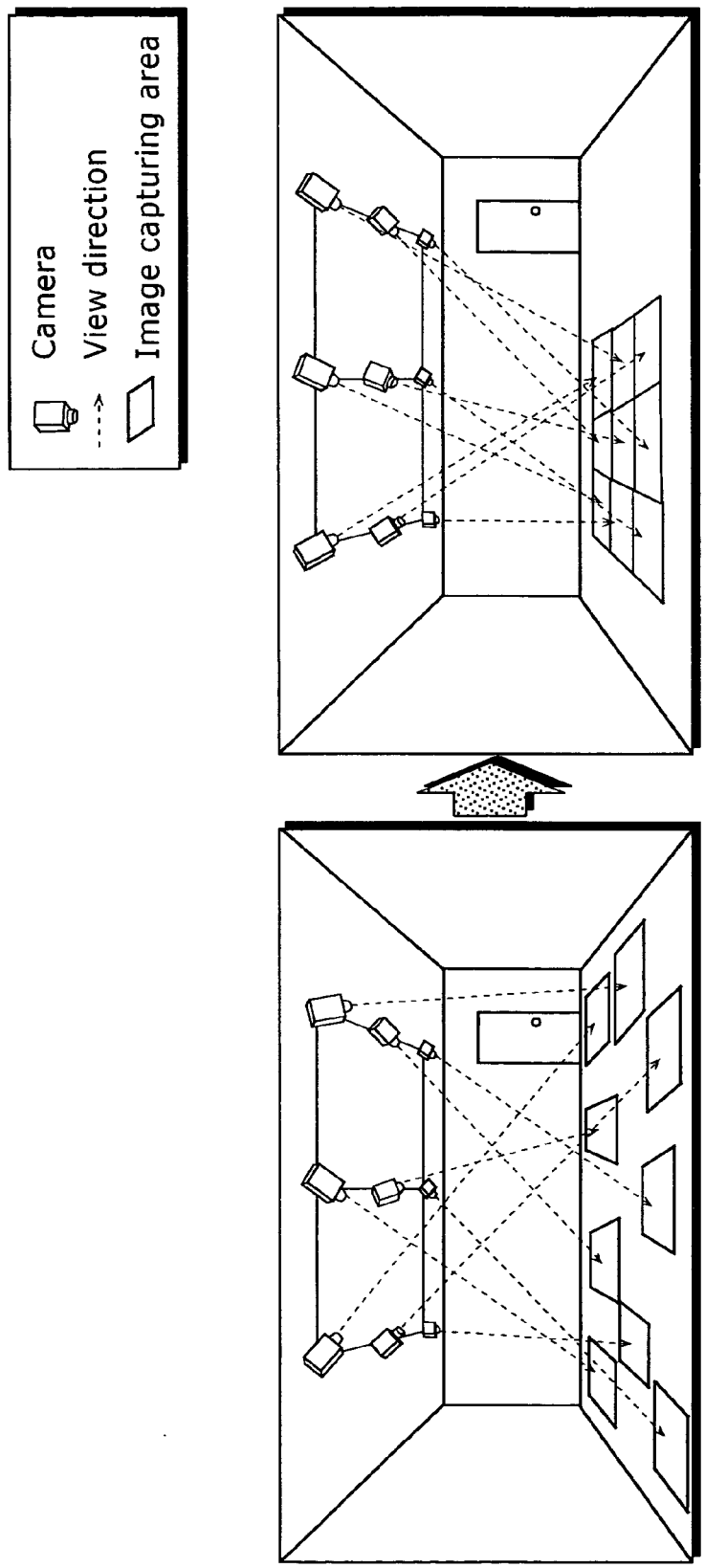
FIG. 18 is a diagram illustrating operations of a camera.

As shown in FIG. 18, in the monitor system according to the first embodiment, even if the direction and position of each camera is arbitrarily set, by changing the image capturing areas so that the adjacent image capturing areas have the overlapping area which is equivalent to the distance C, it is possible to cooperatively capture an image of a wide image capturing area which has no gaps between the adjacent image capturing areas.

Figure 19:
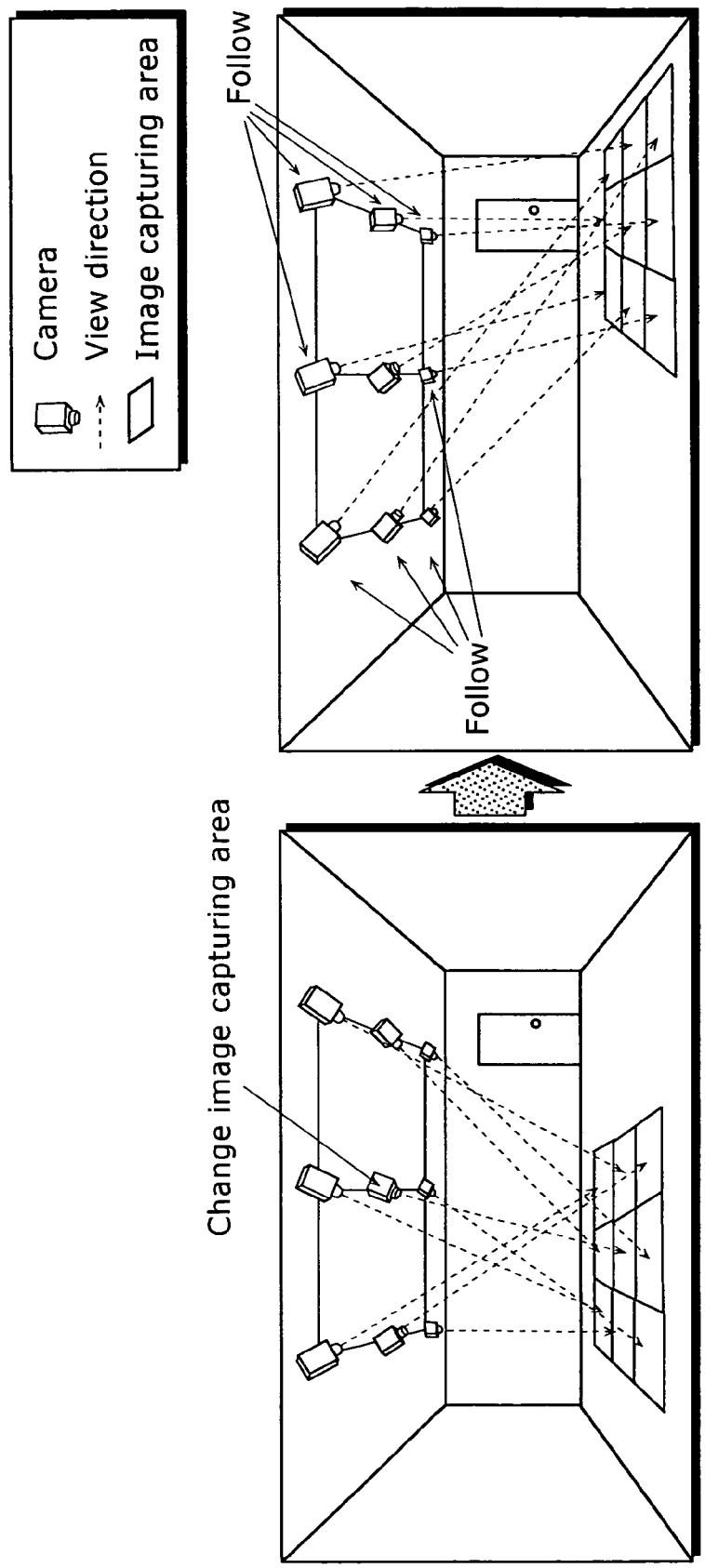
FIG. 19 is a diagram illustrating operations of a camera.

Also, as shown in FIG. 19, in the case where the image capturing area of an arbitrary camera 101 is changed among a plurality of cameras 101, the other cameras 101b change each image capturing area in association with the movement of the camera 101 which has changed the image capturing area. Thus, in the monitor system according to the present invention, a plurality of cameras can be operated like one camera which has a wide image capturing area.

Second Embodiment

Next, the second embodiment of the present invention will be explained.

Figure 20:
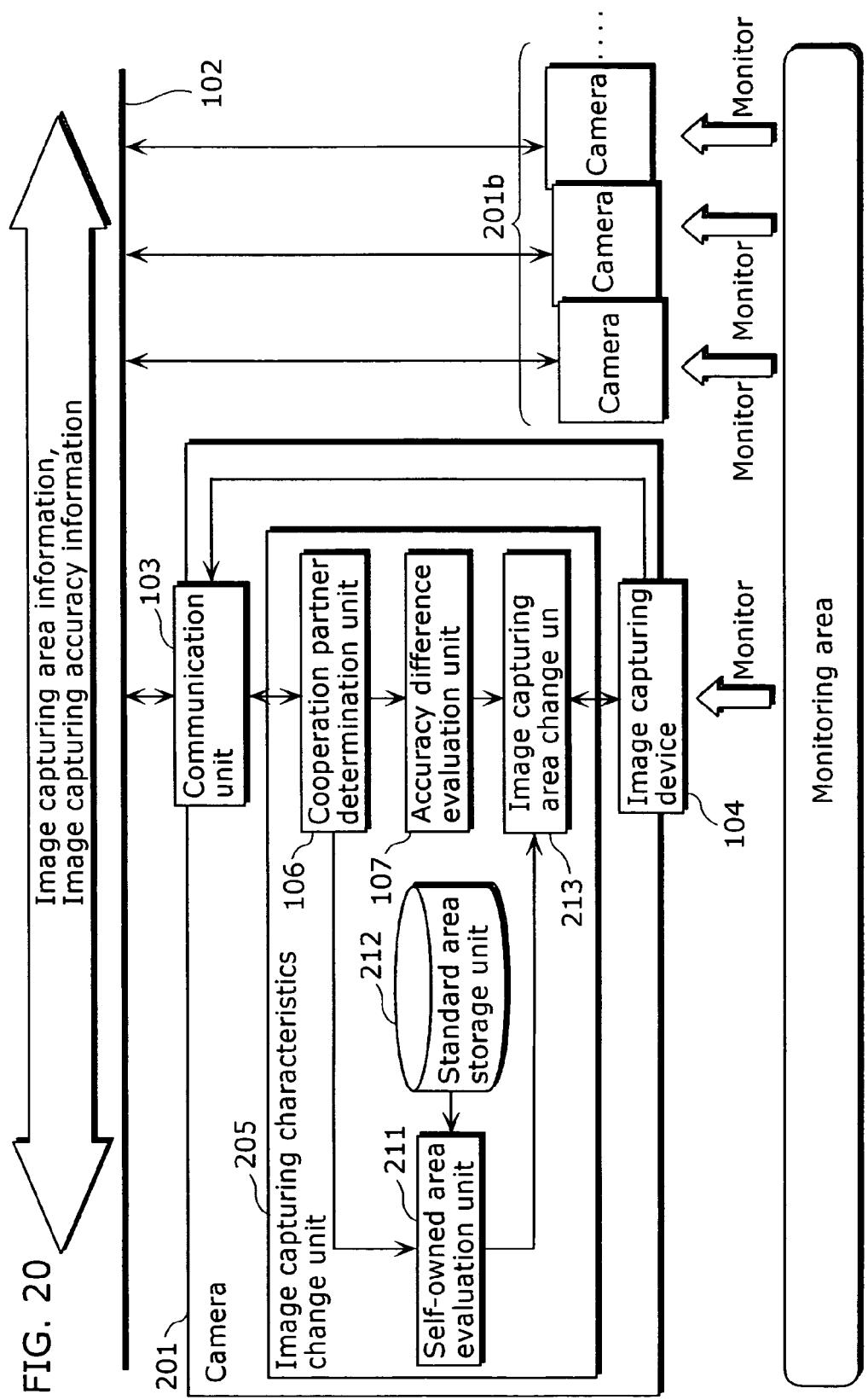
FIG. 20 is a block diagram showing a structure of the second embodiment according to the present invention.

FIG. 20 is a diagram showing a structure of a monitor system according to the second embodiment of the present invention. This monitor system includes: a plurality of cameras 201 and 201b made up of the same components; and a communication medium 102 which transmits information related to image capturing characteristics of each of the cameras 201 and 201b. In addition to controlling the image capturing area as described in the first embodiment, each of the cameras 201 and 201b adjusts the image capturing area so that the image capturing area has a constant position relation with a predetermined standard area. One camera 201 will be mainly explained as follows. In FIG. 20 the same components as shown in FIG. 9 are assigned with the same codes, and the explanation will be omitted.

The camera 201 is an autonomous cooperation camera according to the second embodiment.

The image capturing characteristics change unit 205 is a processing unit which changes the image capturing characteristics in cooperation with the other cameras. And, the image capturing characteristics change unit 205 includes: a cooperation partner determination unit 106; an area difference evaluation unit 107; a self-owned area evaluation unit 211; a standard area storage unit 212; and an image capturing area change unit 213.

The self-owned area evaluation unit 211 is a processing unit which (i) provides a target value B for a position relation in the case where the central coordinates of the image capturing area of the camera 201 and the predetermined position exist in the same position, and (ii) provides an evaluation value B for a position relation, the evaluation value B monotonically receding from the target value as the distance increases.

The standard area storage unit 212 is a memory and the like which store position information of the standard area in image capturing.

The image capturing area change unit 213 is a processing unit which changes area determination parameters of the image capturing device 104 so that the evaluation value B approaches a predetermined target value as well as the evaluation value A. In other words, in addition to the function of the image capturing area change unit 108 according to the first embodiment, the image capturing area change unit 213 changes the image capturing area by controlling the image capturing device 104 of the camera 201 so that the image capturing area of the camera 201 has a constant position relation (for example, the positions match) with the standard area.

In the background art, one camera captures an image of a wide range. And, in the case where the camera captures an image around the border of the image capturing possible area, there is a problem that distortions occur in the captured image, and recognition rate decreases in the recognition process of the image.

On the other hand, according to the structure of the second embodiment, an area in which a captured image has few distortions is provided as a standard area to the standard area storage unit 212. The self-owned area evaluation unit 211 calculates an evaluation value B for the distance between the image capturing area of the camera 201 and the standard area. And, the image capturing area change unit 213 changes the image capturing area of each camera 201 so that the image capturing area can approach the standard area. Thus, each camera 201 can cover an area which has few distortions while keeping the adjacent image capturing areas with the other cameras 201b. As a result, by synthesizing each image which has few distortions, an image of a wide range having few distortions can be acquired in the monitor system.

Next, the operational procedures for changing the image capturing area of the camera 201 according to the second embodiment will be explained.

Figure 21A:
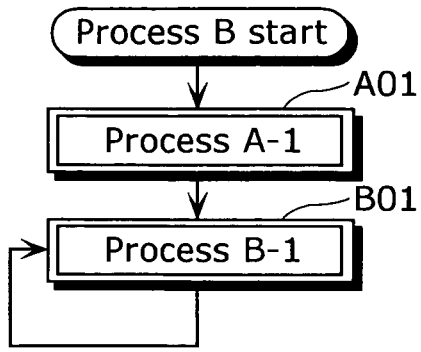
FIGS. 21A and 21B are flow charts explaining operations of the second embodiment.
Figure 21B:
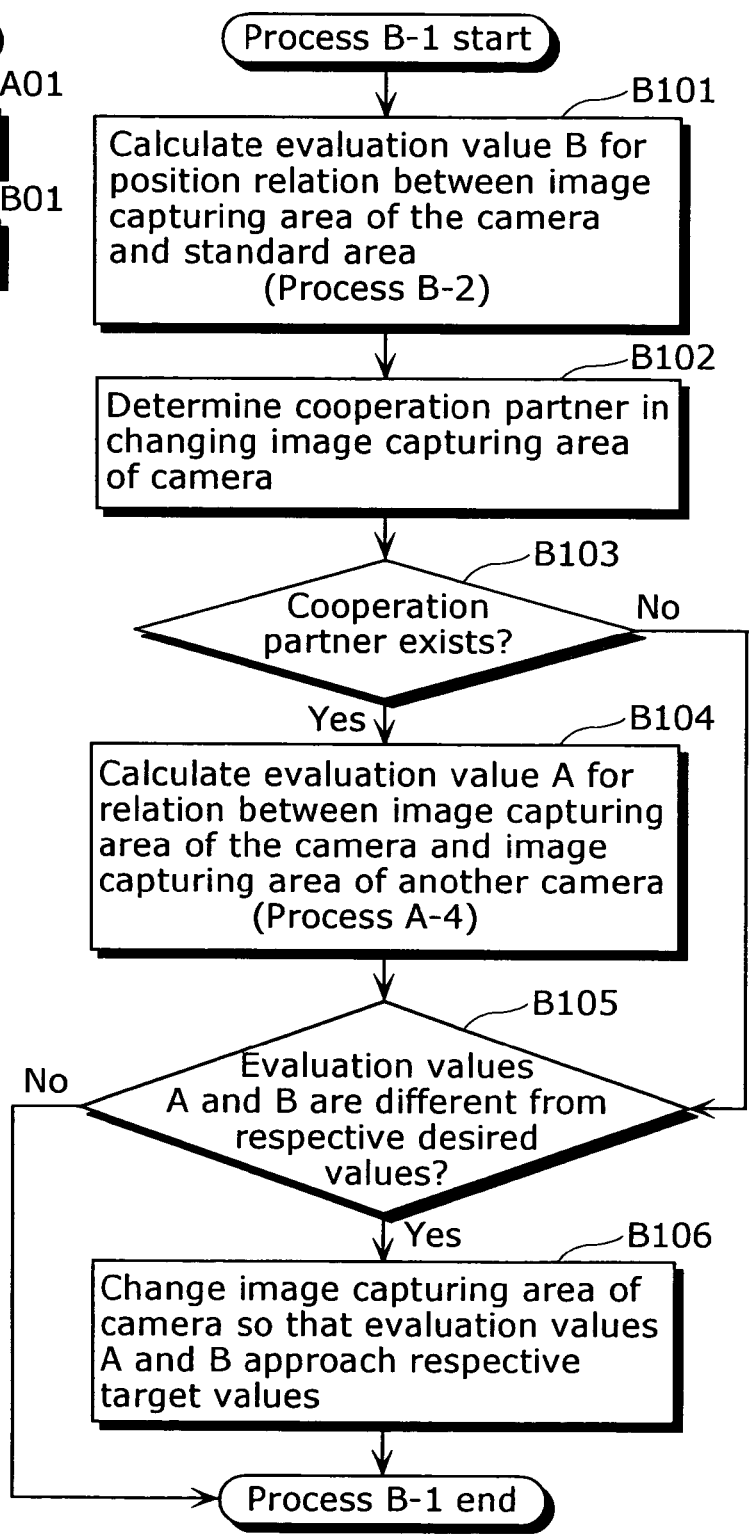

FIGS. 21A and 21B are flow charts showing the procedures in which the camera 201 changes the image capturing area. Here, in FIGS. 21A and 21B, the same operational procedures as FIGS. 10A, 10B and 10C are assigned with the same codes and the explanation will be omitted.

(Process B)

(Step B01) Next, the process in the image capturing characteristics change unit 205 is started.

(Process B-1)

(Step B101) The self-owned area evaluation unit 211 calculates an evaluation value B for the image capturing area of the camera 201.

(Step B102) The cooperation partner determination unit 106 determines a cooperation partner in changing the image capturing area of the camera 201.

(Step B103) The cooperation partner determination unit 106 judges whether or not the cooperation partner exists in changing the image capturing area of the camera 201. In the case where the cooperation partner exists, the process is proceeded to the step B104. In the case where the cooperation partner does not exist, the process is proceeded to the step B105.

(Step B104) The area difference evaluation unit 107 calculates an evaluation value A for the position relation between the image capturing area of the cooperation partner and the image capturing area of the camera.

(Step B105) The image capturing area change unit 213 judges whether or not the evaluation values A and B are different from the target values A and B. In the case where the evaluation values are different from the respective target values, the process is proceeded to the step B106. In the case where the evaluation values are equal to the respective target values, the process B-2 is ended.

(Step A106) The image capturing area change unit 213 changes area determination parameters of the camera 201 so that the evaluation values A and B approach respective target values, and the process B-2 is ended.

The steps A01 (process A-1) and B01 (process B-1) are repeated subsequently.

Figure 23:
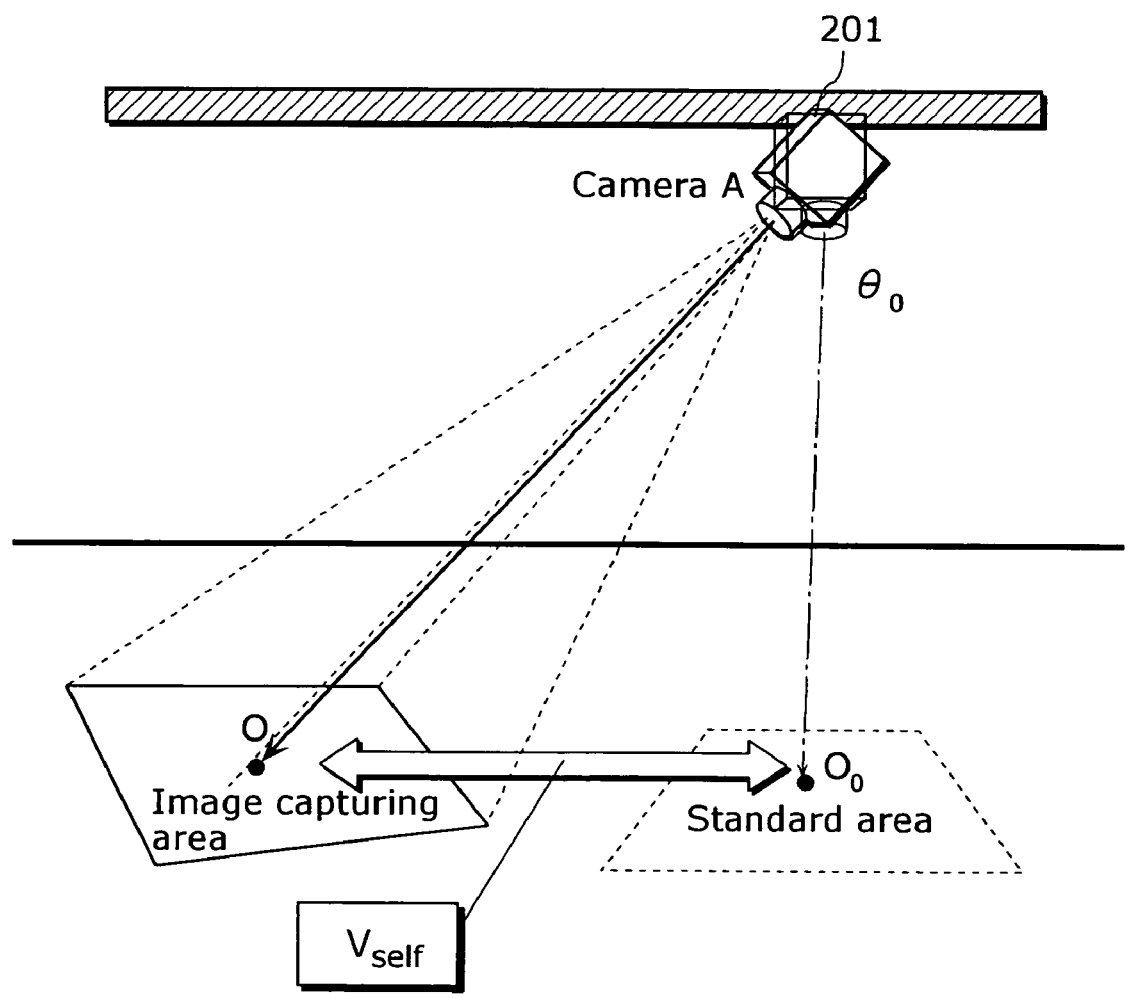
FIG. 23 is a diagram illustrating an evaluation function B of a camera.

Next, the procedures of the step B101 will be explained using a flow chart of FIG. 22. In the procedures the self-owned area evaluation unit 211 provides an evaluation value B for the distance between the central coordinates of the image capturing area of the camera 201 and the central coordinates of the standard area stored in the standard area storage unit 212. Here, the procedures will be explained referring to the example in which the position relation between the image capturing area of the camera 201 and the standard area is the position relation as shown in FIG. 23, and the evaluation function B is expressed by the following equations.

$$\begin{cases} V_{selfx}(x) = (x - x_0)^2 & \text{(Equation 16)} \\ V_{selfy}(y) = (y - y_0)^2 & \text{(Equation 17)} \\ V_{selfz}(z) = (z - z_0)^2 & \text{(Equation 18)} \end{cases}$$

or $$\begin{cases} V_{self\theta P}(\theta_P) = (\theta_P - \theta_{P0})^2 & \text{(Equation 19)} \\ V_{self\theta T}(\theta_T) = (\theta_T - \theta_{T0})^2 & \text{(Equation 20)} \end{cases}$$

Here, standard coordinates: $O_o(x_o, y_o, z_o)$ (Standard angles: $\theta_o(\theta_{po}, \theta_{to})$)

$$\begin{pmatrix} O_x \\ O_y \\ O_z \end{pmatrix}^T = \begin{pmatrix} -(fH \sin\theta_P / f \cos\theta_T \cos\theta_P) + x \\ -(fH \sin\theta_T \cos\theta_P / f \cos\theta_T \cos\theta_P) + y \\ -H \end{pmatrix}^T \quad \text{(Equation 21)}$$

(Step B201) The central coordinates (x, y, z) of the image capturing area of the camera 201 or the view direction ($\theta_P$, $\theta_T$) of the camera 201 is calculated.

(Step B202) The evaluation value is calculated for the position relation between the central coordinates (x, y, z) of the image capturing area of the camera 201 and the central coordinates ($x_{self}$, $y_{self}$, $z_{self}$) of the standard area, using the equations 16, 17 and 18 expressing the evaluation function B. Here, the central coordinates (x, y, z) of the image capturing area of the camera 201 can be calculated by the following equation 21. Also, the evaluation value may be calculated for the relation between (i) the view direction ($\theta_P$, $\theta_T$) of the camera 201 to the central coordinates of the image capturing area and (ii) the view direction ($\theta_{self}$, $\theta_{self}$) of the camera 201 to the central coordinates of the standard area, using the equations 19 and 20 expressing the evaluation function B. After the evaluation value is calculated, the process B-3 is ended.

Here, in addition to the above equations 16, 17, 18, 19 and 20, the evaluation function B may be a function by which, within the range in which the area determination parameters ($\theta_P$, $\theta_T$, f) can be changed, (i) the evaluation value B becomes the smallest (or largest) when the central coordinates of the image capturing area of the camera 201 are in the equal position with the central position of the standard area, and (ii) the evaluation value B monotonically increases (or decreases) as the distance between the central coordinates of the image capturing area of the camera 201 and the central coordinates of the standard area increases.

Step B102 has the same procedures as the step A201 in the first embodiment.

Step B104 has the same procedures as the step A203 in the first embodiment.

Next, the procedures in which the image capturing area change unit 213 changes the image capturing area in the step B106 will be explained.

The image capturing area change unit 213 according to the second embodiment changes the area determination parameters ($\theta_P$, $\theta_T$) so that the evaluation values A and B approach the minimum value (or the maximum value) respectively as the target values A and B.

The procedures for having the evaluation value A approach the minimum value (or the maximum value) are the same as the first embodiment. In the procedures for having the evaluation value B approach the minimum value (or the maximum value), for example, the area determination parameters ($\theta_P$, $\theta_T$) are changed by the following update equations 22, 23, 24 and 25 which use derivatives derived by partially differentiating the above mentioned evaluation function B using the area determination parameters ($\theta_P$, $\theta_T$).

$$\frac{d\theta_P}{dt} = -\alpha_P \frac{\partial(V_{seflx} + V_{sefly} + V_{seflz})}{\partial \theta_P}$$ (Equation 22)

$$\frac{d\theta_T}{dt} = -\alpha_T \frac{\partial(V_{seflx} + V_{sefly} + V_{seflz})}{\partial \theta_T}$$ (Equation 23)

or $$\frac{d\theta_P}{dt} = -\alpha_P \frac{\partial(V_{sefl\theta T} + V_{self\theta P})}{\partial \theta_P}$$ (Equation 24)

$$\frac{d\theta_T}{dt} = -\alpha_T \frac{\partial(V_{sefl\theta T} + V_{self\theta P})}{\partial \theta_T}$$ (Equation 25)

Here, $\alpha_P$, $\alpha_T$, $\alpha_f$ are coefficients.

Next, an operational example of the monitor system according to the second embodiment will be explained using FIG. 24. Here, a plurality of cameras 201 are arbitrarily set in the ceiling of a room where the ceiling level is equal, and the standard areas are set just under the setting positions.

Figure 24:
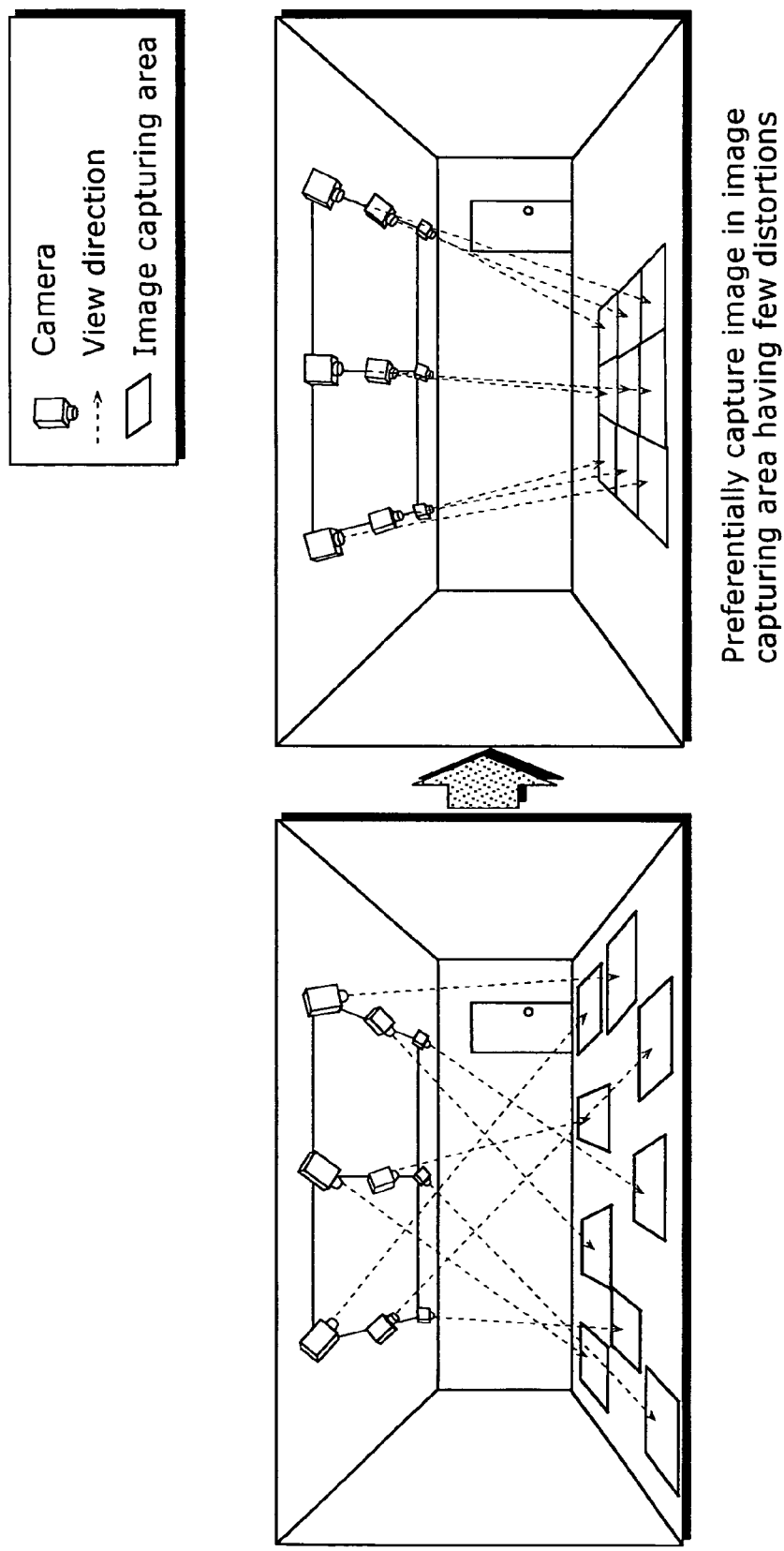
FIG. 24 is a diagram illustrating operations of a camera.

As shown in the left diagram of FIG. 24, in the case where the view direction of each of the cameras 201 largely deviates from the vertical direction, the view area as shown in FIG. 12 gets largely distorted from a rectangle. Thereby, the shape of the captured image gets largely distorted, as well. On the other hand, as shown in the right diagram of FIG. 24, by previously setting the area just under each camera setting position as the standard area, each camera 201 changes the image capturing area to the position where the following two functions can be balanced: a function to change the image capturing area to the area just under the setting position where an image having relatively few distortions can be captured; and a function to change the image capturing area in order to keep the overlapping areas with the other cameras 201b. Thus, each camera 201 can select the area as the image capturing area where the captured image has relatively few distortions, the area being adjacent to the image capturing areas of the other cameras 201b.

Also, by synthesizing the parts having relatively few distortions (for example, central parts) among the images captured by each camera 201, the image having few distortions can be captured in a wide range as the whole monitor system.

Third Embodiment

Next, the third embodiment of the present invention will be explained.

FIG. 25 is a diagram showing a structure of a monitor system according to the third embodiment of the present invention. This monitor system includes: a plurality of cameras 301 and 301b made up of the same components; and a communication medium 102 which transmits information related to image capturing characteristics of each of the cameras 301 and 301b. In addition to controlling the image capturing area as described in the first embodiment, each of the cameras 301 and 301b adjusts the image capturing area so that the image capturing area has a constant position relation with the object existing in the monitoring area. One camera 301 will be mainly explained as follows. In FIG. 25 the same components as shown in FIG. 9 are assigned with the same codes, and the explanation will be omitted.

The camera 301 is an autonomous cooperation camera according to the third embodiment.

The image capturing characteristics change unit 305 is a processing unit which changes image capturing characteristics in cooperation with the other cameras. And, the image capturing characteristics change unit 305 includes: a cooperation partner determination unit 106; an area difference evaluation unit 107; a self-owned area evaluation unit 311; an object position identification unit 312; and an image capturing area change unit 313.

The self-owned area evaluation unit 311 is a processing unit which (i) provides a target value C for a position relation in the case where the central coordinates of the image capturing area of the camera 201 and the predetermined position exist in the same position, and (ii) provides an evaluation value C for a position relation, the evaluation value C monotonically receding from the target value as the distance increases.

The object position identification unit 312 is a processing unit which identifies a position of an object in the case where an object exists in the image capturing area.

The image capturing area change unit 313 is a processing unit which changes the area determination parameters of the image capturing device 104 so that the evaluation value C approaches a predetermined target value as well as the evaluation value A. In other words, in addition to the function of the image capturing area change unit 108 as described in the first embodiment, the image capturing area change unit 313 changes the image capturing area by controlling the image capturing device 104 of the camera 301 so that the image capturing area of the camera 301 has a constant position relation (for example, the positions match) with the object identified by the object position identification unit 312.

In the background art, in the case where an image of an object is captured, the image of the object's surroundings can be captured only within the range covered by one camera.

On the other hand, according to the structure of the third embodiment, the camera 301 has a function to capture an image while tracking the object. The camera 301 which has discovered the object captures the image while tracking the movement of the object. And, the other cameras 301*b* change the image capturing areas while keeping the image capturing areas adjacent to the image capturing area of the camera 301 that is tracking the object. Thereby, it is possible to capture the image in the wide range of the object's surroundings using the plurality of cameras 301.

Next, the operational procedures in changing the image capturing area of the camera 301 according to the third embodiment will be explained.

Figure 26A:
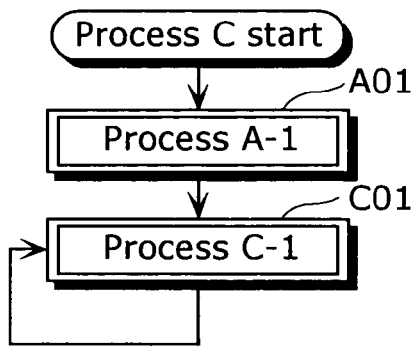
FIGS. 26A and 26B are flow charts explaining operations of the third embodiment.
Figure 26B:
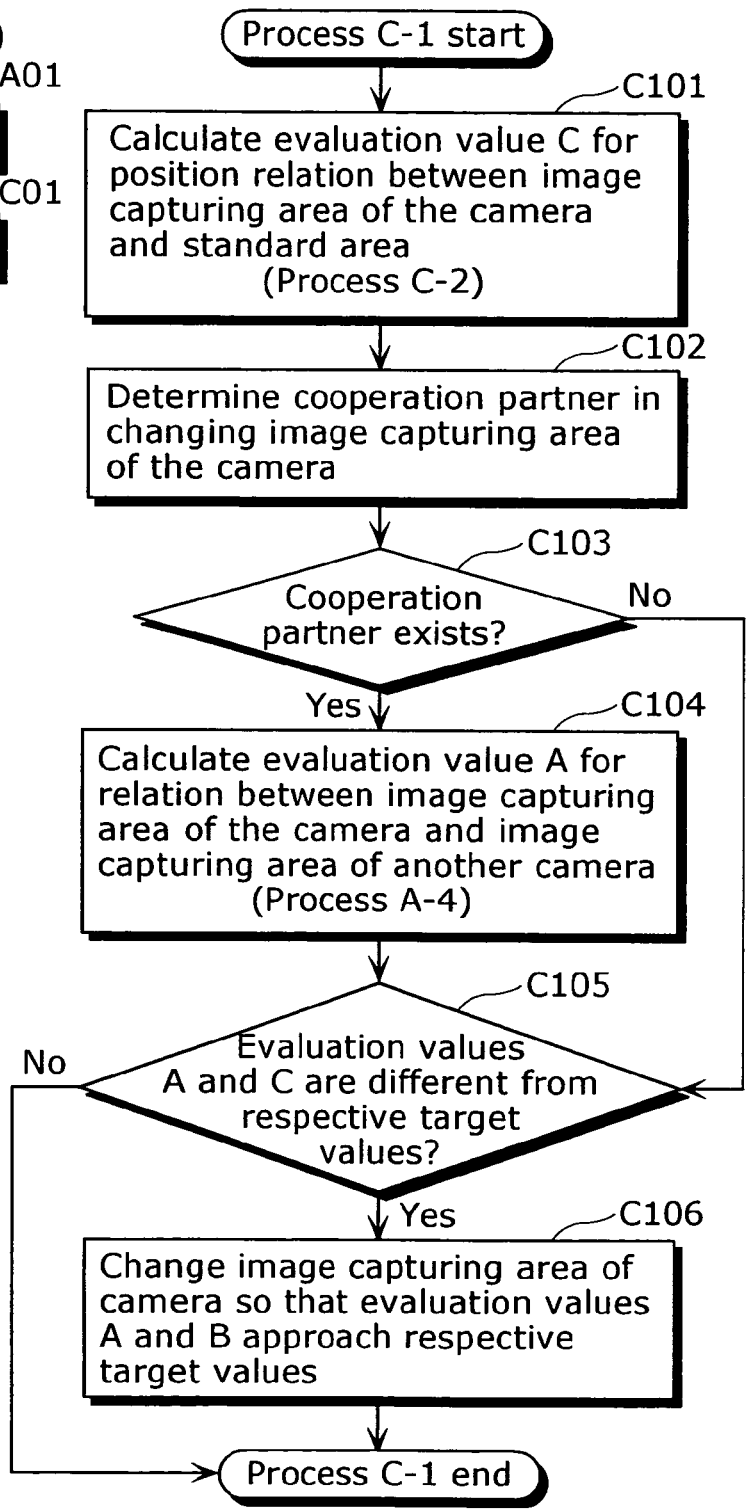

FIGS. 26A and 26B are flow charts showing the procedures in which the camera 301 changes the image capturing area. Here, in FIGS. 26A and 26B, the same operational procedures as described in FIGS. 10A, 10B and 10C are assigned with the same codes, the explanation will be omitted.

(Process C)
(Step C01) The process in the image capturing characteristics change unit 305 is started.

(Process C-1)
(Step C101) The self-owned area evaluation unit 311 calculates the evaluation value C for the image capturing area of the camera 301.
(Step C102) The cooperation partner determination unit 106 determines the cooperation partner in changing the image capturing area of the camera 301.
(Step C103) The cooperation partner determination unit 106 judges whether or not the cooperation partner exists in changing the image capturing area of the camera 301. In the case where the cooperation partner exists, the process is proceeded to the step C104. In the case where the cooperation partner does not exist, the process is proceeded to the step C105.
(Step C104) The area difference evaluation unit 107 calculates the evaluation value A for the position relation between the image capturing area of the cooperation partner and the image capturing area of the camera.
(Step C105) The image capturing area change unit 313 judges whether or not the evaluation values A and C are different from the predetermined target values A and C. In the case where the evaluation values are different from the respective target values, the process is proceeded to the step C106. In the case where the evaluation values are equal to the respective target values, the process C-2 is ended.
(Step C106) The image capturing area change unit 313 changes the area determination parameters of the camera 301 so that the evaluation values A and C approach the respective target values, and the process C-1 is ended.

The steps A01 (process A-1) and C01 (process C-1) are repeated subsequently.

Figure 27:
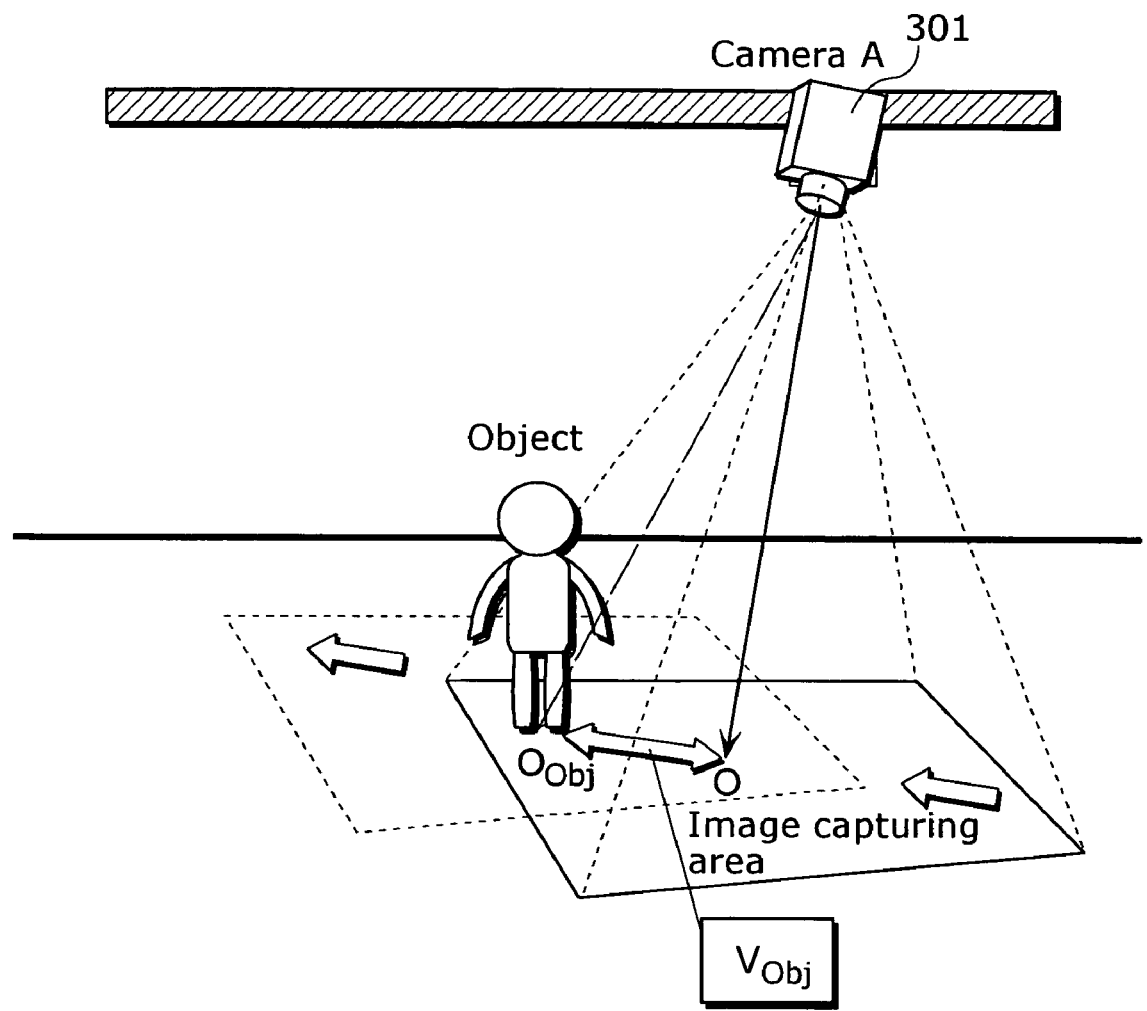
FIG. 27 is a diagram illustrating an evaluation function C of a camera.
Figure 28:
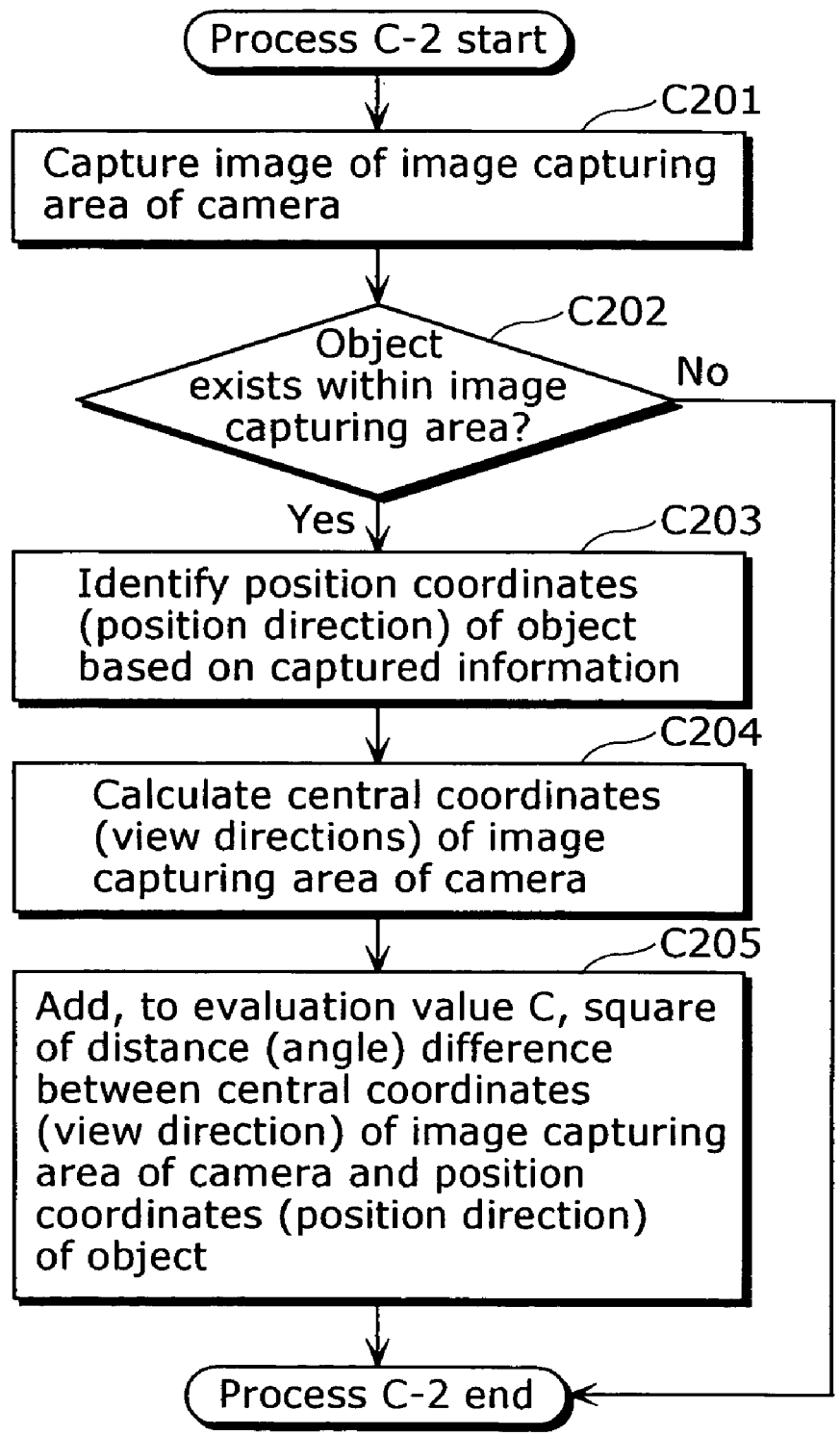
FIG. 28 is a flow chart explaining procedures for evaluating an image capturing area of a camera.

Next, the procedures of the step C101 in which the self-owned area evaluation unit 311 provides the evaluation value C for the distance between the central coordinates of the image capturing area of the camera 301 and the position coordinates of the object will be explained using the flow chart as shown in FIG. 28. Here, the position relation between the image capturing area of the camera 301 and the object is shown in FIG. 27. And, the evaluation function C for calculating the evaluation value C is expressed by the following equation. Also, the position coordinates of the object (person) are the center of gravity in the ground plane between the object and the floor.

If Object ∈ "image capturing area" then $$\begin{cases} V_{objx}(x) = (x - x_{obj})^2 & \text{(Equation 26)} \\ V_{objy}(y) = (y - y_{obj})^2 & \text{(Equation 27)} \\ V_{objz}(z) = (z - z_{obj})^2 & \text{(Equation 28)} \end{cases}$$

or $$\begin{cases} V_{obj\theta P}(\theta_P) = (\theta_P - \theta_{Pobj})^2 & \text{(Equation 29)} \\ V_{obj\theta T}(\theta_T) = (\theta_T - \theta_{Tobj})^2 & \text{(Equation 30)} \end{cases}$$

Here, coordinates of object: $Oobj(x_{obj}, y_{obj}, z_{obj})$
(directions of object: $\theta obj(\theta_{Pobj}, \theta_{Tobj})$)

(Process C-2)
(Step C201) The image of the image capturing area of the camera 301 is captured.
(Step C202) The object position identification unit 312 judges whether or not an object exists within the image capturing area. In the case where the object exists within the image capturing area, the process is proceeded to the step C203. In the case where the object does not exist within the image capturing area, the process C-2 is ended.
(Step C203) The position coordinates $(x_{obj}, y_{obj}, z_{obj})$ or the position directions $(\theta_{Pobj}, \theta_{Tobj})$ of the object are calculated based on the captured image.
(Step C204) The central coordinates $(x, y, z)$ or view directions $(\theta_P, \theta_T)$ of the camera 301 are calculated.
(Step C205) The evaluation values are calculated for the relation between the central coordinates $(x, y, z)$ of the image capturing area of the camera 201 and the position coordinates $(x_{obj}, y_{obj}, z_{obj})$ of the object, using the above equations 26, 27 and 28 expressing the evaluation function C. After the evaluation value C is calculated, the process C-2 is ended.

Here, in addition to the above equations 26, 27, 28, 29 and 30, the evaluation function C may be a function by which, within the range in which the area determination parameters $(\theta_P, \theta_T, f)$ can be changed, (i) the evaluation value C becomes the smallest (or largest) when the central coordinates of the image capturing area of the camera 301 are in the equal position with the position coordinates of the object, and (ii) the evaluation value C monotonically increases (or decreases) as the distance between the central coordinates of the image capturing area of the camera 301 and the position coordinates of the object increases.

Next, changing the area determination parameters of the camera 301 (step C106) will be explained.

The image capturing area change unit 313 according to the third embodiment changes the area determination parameters $(\theta_P, \theta_T)$ so that the evaluation values A and C approach the minimum value (or the maximum value) respectively as the target values A and C.

The procedures for having the evaluation value A approach the minimum value (or the maximum value) are the same as the first embodiment. In the procedures for having the evaluation value C approach the minimum value (or the maximum value), for example, the area determination parameters $(\theta_P, \theta_T)$ are changed by the following update equations 31, 32, 33 and 34 which use derivatives derived by partially differentiating the above mentioned evaluation function C using the area determination parameters $(\theta_P, \theta_T)$.

$$\frac{d\theta_P}{dt} = -\alpha_P \frac{\partial(V_{objx} + V_{objy} + V_{objz})}{\partial \theta_P} \quad \text{(Equation 31)}$$

$$\frac{d\theta_T}{dt} = -\alpha_T \frac{\partial(V_{objx} + V_{objy} + V_{objz})}{\partial \theta_T} \quad \text{(Equation 32)}$$

or $$\frac{d\theta_P}{dt} = -\alpha_P \frac{\partial(V_{obj\theta T} + V_{obj\theta P})}{\partial \theta_P} \quad \text{(Equation 33)}$$

$$\frac{d\theta_T}{dt} = -\alpha_T \frac{\partial(V_{obj\theta T} + V_{obj\theta P})}{\partial \theta_T} \quad \text{(Equation 34)}$$

Here, $\alpha_P$, $\alpha_T$, $\alpha_f$ are coefficients.

Next, an example of the cooperation operation performed by the cameras 301 according to the third embodiment will be explained using FIG. 29. In FIG. 29 a plurality of cameras 301 are arbitrarily set in a ceiling of a room where the ceiling level is equal and the floor is rectangular. And, the image of the floor is captured.

As shown in FIG. 29, in the case where an object intrudes in the image capturing area of an arbitrary camera 301, the camera 301 changes the image capturing area so that the object comes in the center of the image capturing area. Also, the other cameras 301b change the image capturing areas so that the distance between the image capturing area of the camera 301 and each adjacent image capturing area is kept as the predetermined distance C. Thereby, as a whole cooperative distributed monitor system, the image capturing area of the camera can be changed so that the image of the object and the peripheral wide range can be captured.

Thus, even in the case where the object suddenly changes the moving direction and disappears from the view at a speed faster than the speed at which one camera can follow, the other cameras surrounding the camera that has been tracking the object can catch the movement of the object in a wider range. And, the plurality of cameras cooperatively change each image capturing area. Thus, tracking of the object can be maintained.

Also, it is possible to quickly discover danger and the like such as a street bump and an approaching car which exist around the moving object (for example, a person). Thereby, the monitor system according to the third embodiment can be used to quickly notify the object of danger.

Fourth Embodiment

Next, the fourth embodiment of the present invention will be explained.

Figure 30:
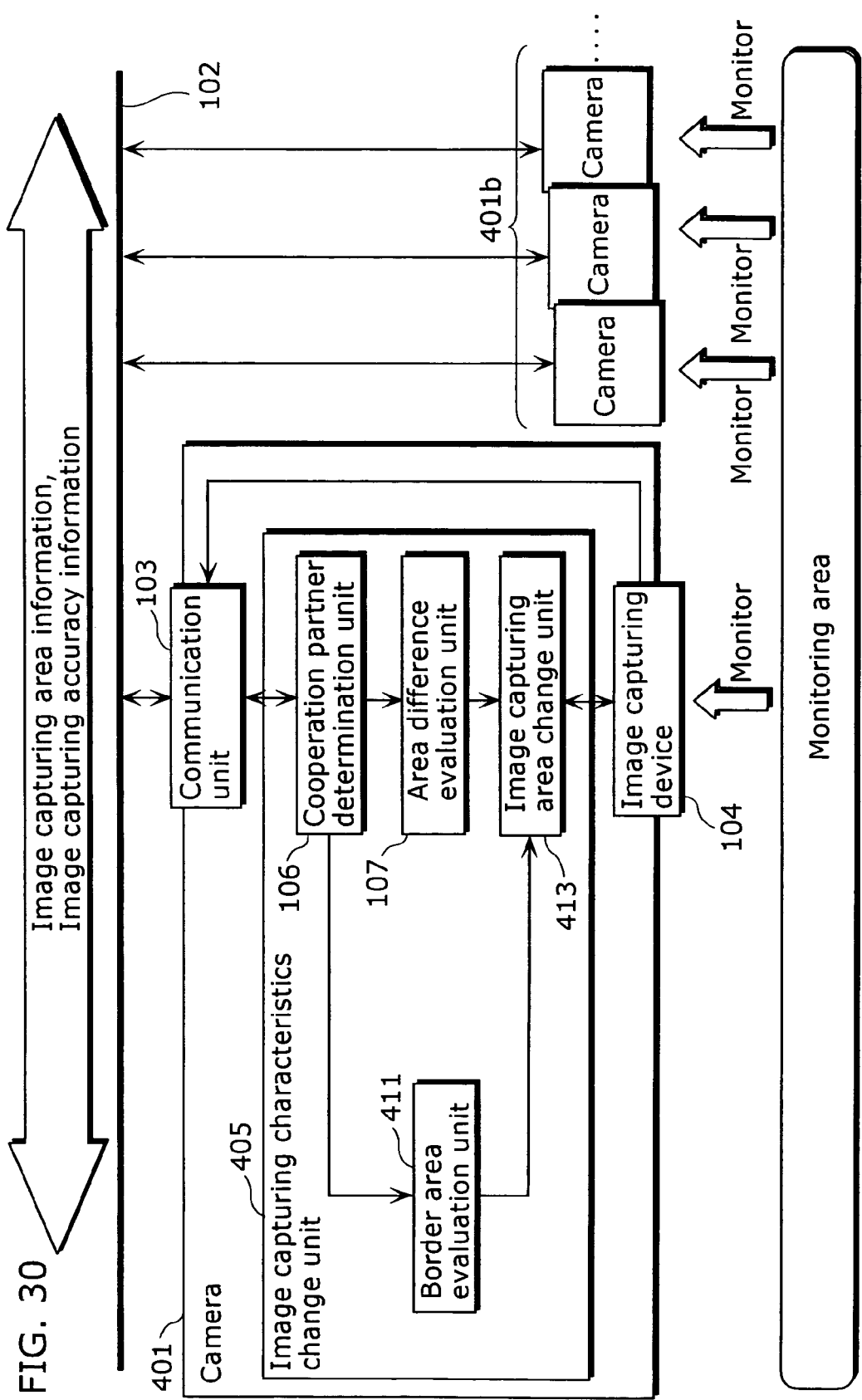
FIG. 30 is a block diagram showing a structure of the fourth embodiment according to the present invention.

FIG. 30 is a diagram showing a structure of a monitor system according to the fourth embodiment of the present invention. This monitor system includes: a plurality of cameras 401 and 401b made up of the same components; and a communication medium 102 which transmits information related to image capturing characteristics of each of the cameras 401 and 401b. In addition to controlling the image capturing area as described in the first embodiment, each of the cameras 401 and 401b adjusts the image capturing area so that the image capturing area has a constant position relation with a predetermined standard area. One camera 401 will be mainly explained as follows. In FIG. 30 the same components as shown in FIG. 9 are assigned with the same codes, and the explanation will be omitted.

The camera 401 is an autonomous cooperation camera according to the fourth embodiment.

The image capturing characteristics change unit 405 is a processing unit which changes image capturing characteristics in cooperation with the other cameras. And, the image capturing characteristics change unit 405 includes: a cooperation partner determination unit 106; an area difference evaluation unit 107; a self-owned area evaluation unit 411; and an image capturing area change unit 413.

The self-owned area evaluation unit 411 is a processing unit which provides an evaluation value D for a distance relation between the image capturing area of the camera 401 and the border area whose image can be captured by the camera 401.

The image capturing area change unit 413 is a processing unit which changes the area determination parameters of the image capturing device 104 so that the evaluation value D approaches a predetermined target value as well as the evaluation value A. In other words, in addition to the function of the image capturing area change unit 108 as described in the first embodiment, the image capturing area change unit 413 changes the image capturing area by controlling the image capturing device 104 of the camera 401 so that the image capturing area of the image capturing device 104 of the camera 401 has a constant position relation with the border area whose image can be captured by the camera 401 (for example, the border of the monitoring area).

In the background art, the image of the whole monitoring area which is wider than the range that can be covered by one camera cannot be captured at once. Also, in order to solve this problem, it is conceivable to use a plurality of cameras. However, in such case as described above, it is necessary to determine each image capturing area for the respective cameras so that the image of the whole monitoring area can be captured.

On the other hand, according to the structure of the fourth embodiment, the camera 401 changes the image capturing area so that a predetermined distance can be kept between (i) the image capturing area of the camera 401 and the adjacent image capturing area and (ii) the image capturing area of the camera 401 and the border area whose image can be captured. Thereby, it is possible to change the image capturing area of each camera 401 in order to thoroughly capture the image of the whole monitoring area as the whole monitor system.

Next, the operational procedures in changing the image capturing area of the camera 401 according to the fourth embodiment will be explained.

Figure 31A:
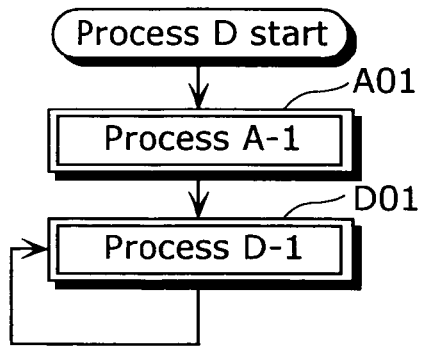
FIGS. 31A and 31B are flow charts explaining operations of the fourth embodiment.
Figure 31B:
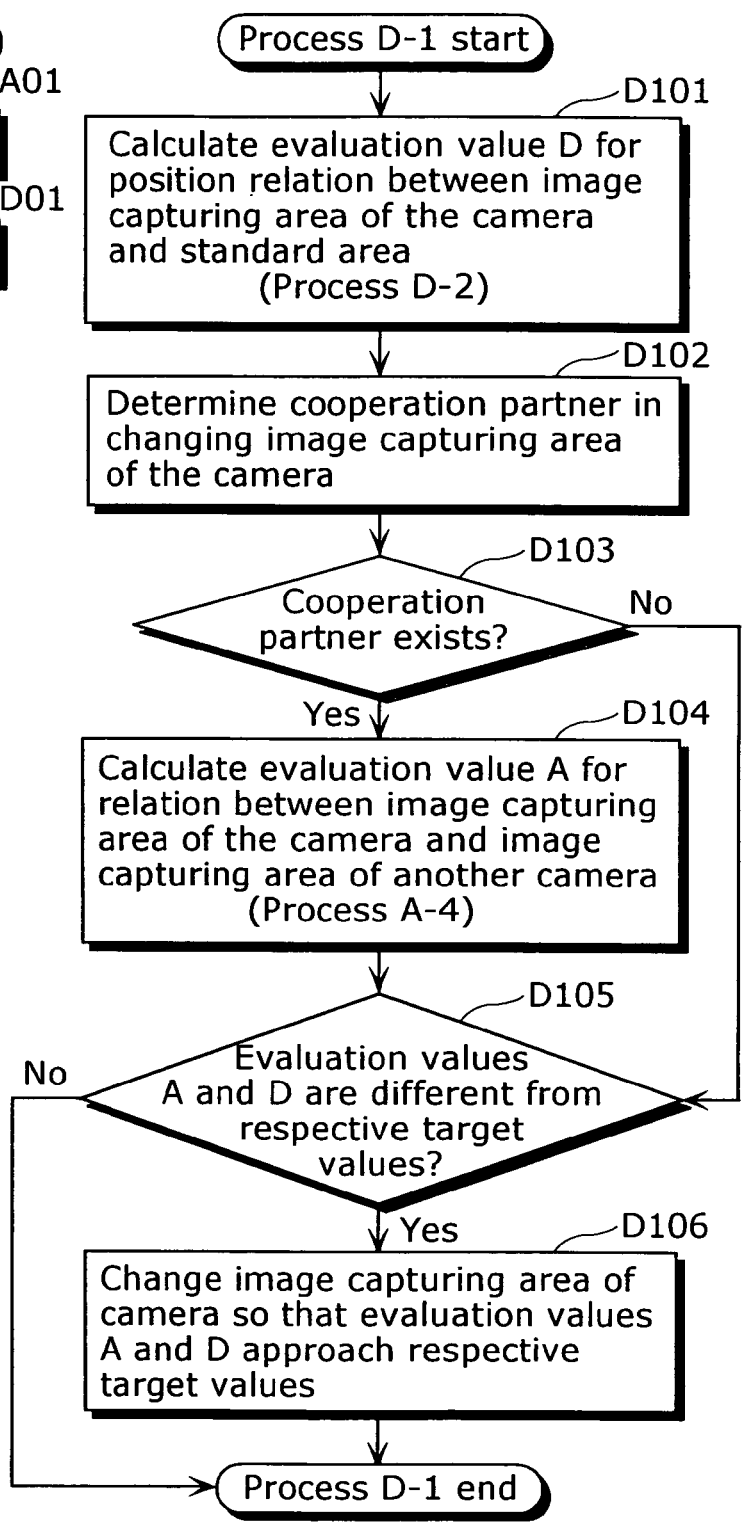

FIGS. 31A and 31B are flow charts showing the procedures in which the camera 401 changes the image capturing area. Here, in FIGS. 31A and 31B, the same operational procedures as described in FIGS. 10A, 10B and 10C are assigned with the same codes, the explanation will be omitted.

(Process D)

(Step D01) The process in the image capturing characteristics change unit 405 is started.

(Process D-1)

(Step D101) The border area evaluation unit 411 calculates an evaluation value D for the position relation between the image capturing area of the camera 401 and the border area whose image can be captured.

(Step D102) The cooperation partner determination unit 106 determines a cooperation partner in changing the image capturing area of the camera 401.

(Step D103) The cooperation partner determination unit 106 judges whether or not the cooperation partner exists in changing the image capturing area of the camera 401. In the case where the cooperation partner exists, the process is proceeded to step D104. In the case where the cooperation partner does not exist, the process is proceeded to step D105.

(Step D104) The area difference evaluation unit 107 calculates an evaluation value A for the position relation between the image capturing area of the cooperation partner and the image capturing area of the camera.

(Step D105) The image capturing area change unit 413 judges whether or not the evaluation values A and D are different from predetermined target values A and D. In the case where the evaluation values are different from the respective target values, the process is proceeded to the step D106. In the case where the evaluation values are equal to the respective target values, the process D-2 is ended.

(Step D106) The image capturing area change unit 413 changes the area determination parameters of the camera 401 so that the evaluation values A and D approach the respective target values, and the process D-1 is ended.

The steps A01 (process A-1) and D01 (process D-1) are repeated subsequently.

Figure 32:
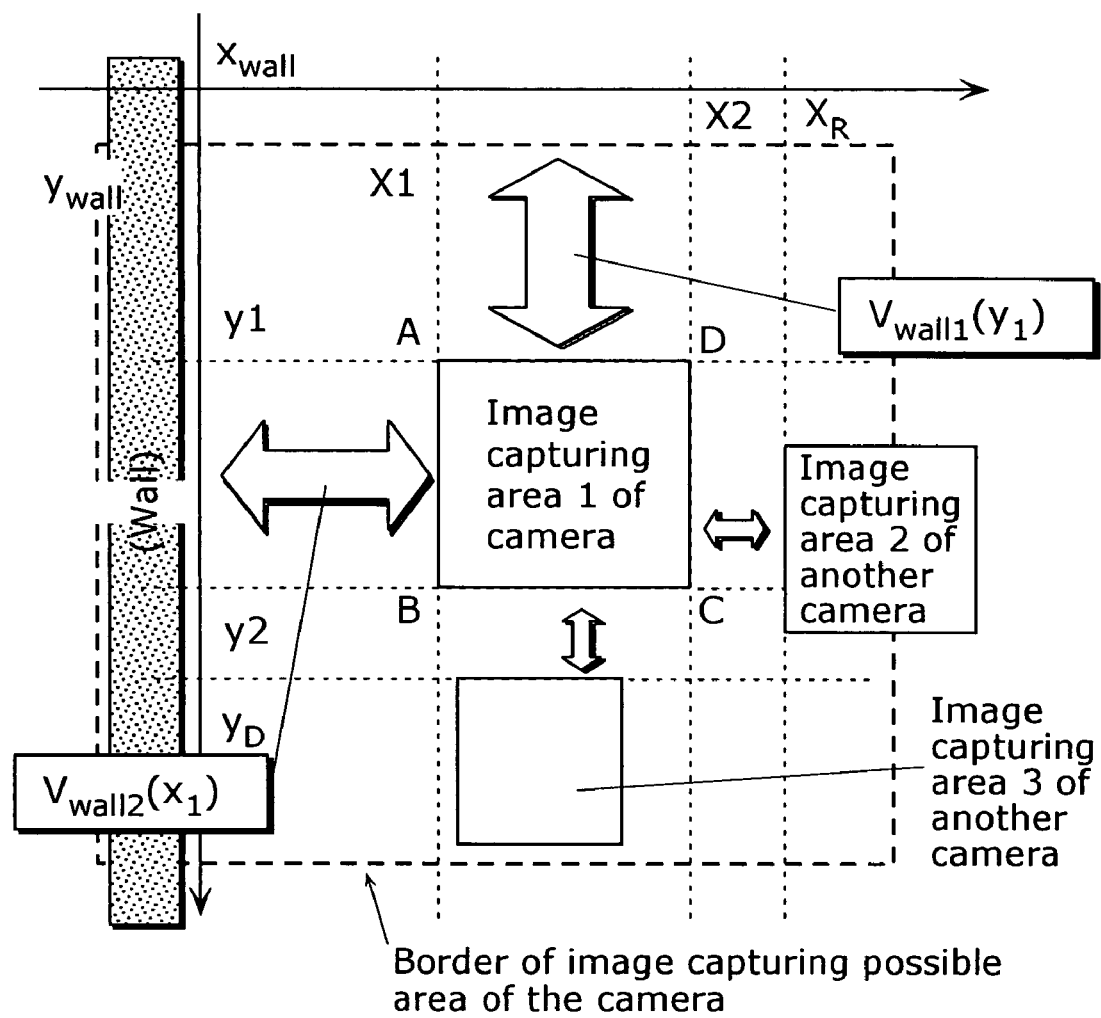
FIG. 32 is a diagram illustrating an evaluation function D of a camera.
Figure 33:
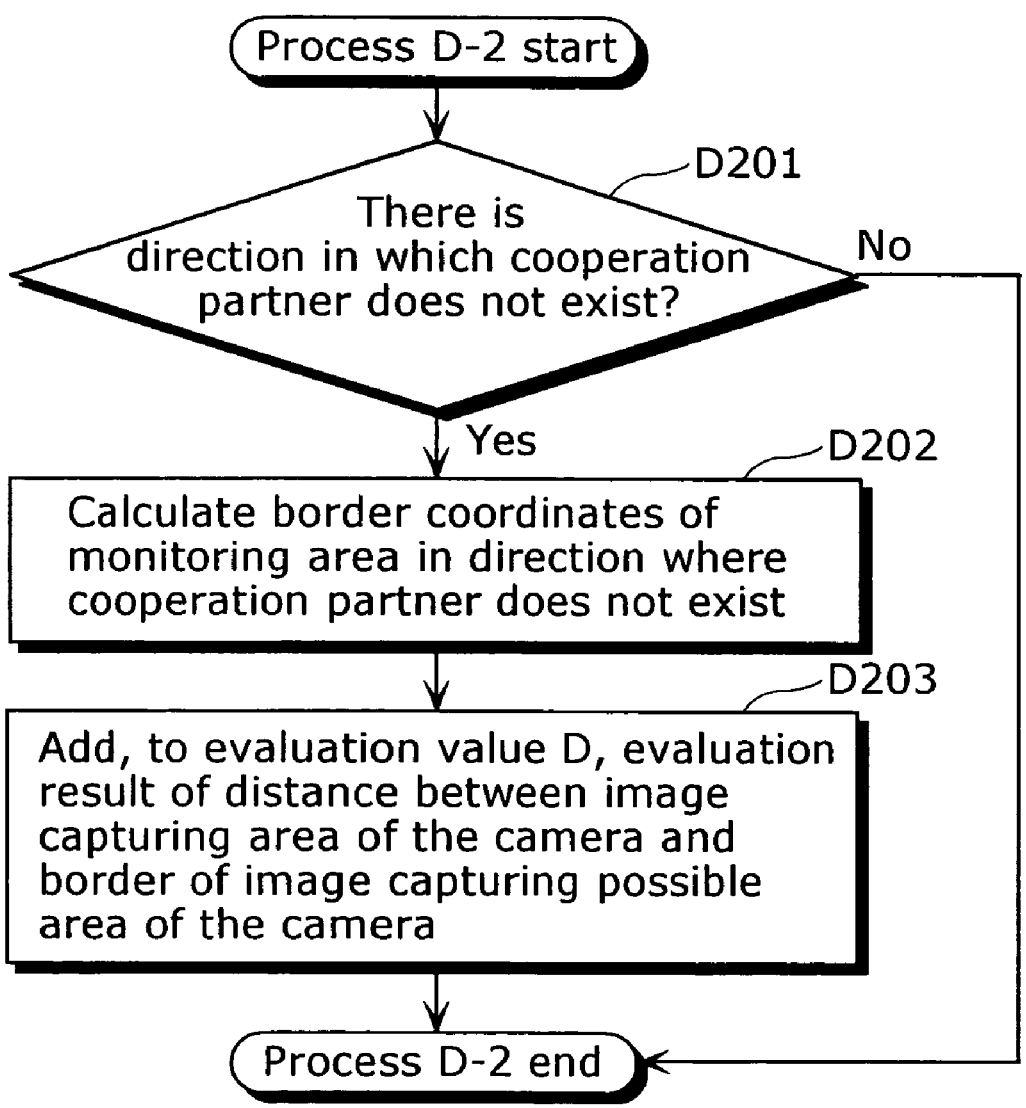
FIG. 33 is a flow chart explaining procedures for evaluating an image capturing area of a camera.

Next, the procedures of the step D101 will be explained using the flow chart as shown in FIG. 33. In the procedures the border area evaluation unit 411 provides the evaluation value D for the distance between the image capturing area of the camera 401 and the border area whose image can be captured. FIG. 32 is a diagram for explaining the following equations 35 and 36 respectively expressing: a position relation between an image capturing area 1 of the camera 401 and the border area whose image can be captured; and an evaluation function D which evaluates the position relation.

$$V_{wall1}(y_1) = (y_1 - y_{wall} - C)^2 \quad \text{(Equation 35)}$$

$$V_{wall2}(x_1) = (x_1 - x_{wall} - C)^2 \quad \text{(Equation 36)}$$

Here, C is constant.

(Process D-2)

(Step D201) It is judged whether or not a cooperation partner 401b having an adjacent image capturing area exists in a movable direction of the image capturing area of the camera 401. In the case where there is a direction in which the cooperation partner does not exist, the process is proceeded to step D202. In the case where there is no direction in which the cooperation partner does not exist, the process D-2 is ended.

(Step D202) The position of border area whose image can be captured by the camera 401 is calculated in the direction where the cooperation partner does not exist.

(Step D203) The distance between the image capturing area of the camera 401 and the border area whose image can be captured is evaluated, and the process D-2 is ended.

Here, details of evaluating the distance between the image capturing area of the camera 401 and the border area whose image can be captured will be explained using an example of the relation between the image capturing area of the camera 401 and the wall on the left side as shown in FIG. 32.

First, the distance ($X_L - X_{wall2}$) between the image capturing area of the camera 201 and the wall on the left side is calculated. Then, the evaluation value D is calculated for the difference between the calculated distance and the predetermined distance C using the above equation 35 expressing the evaluation function D. Also, in addition to the above equation 35, the evaluation function D may be a function by which, within the range in which the area determination parameters ($\theta_P$, $\theta_T$, f) of the camera 401 can be changed, (i) the evaluation value D becomes the smallest (or largest) when the distance ($X_L - X_{wall}$) is equal to the predetermined distance C, and (ii) the evaluation value D monotonically increases (or decreases) as the difference between the distance ($X_L - X_{wall}$) and the predetermined distance C increases. Also, the evaluation value D for the border on the top side as shown in FIG. 32 is expressed by the equation 36. Subsequently, the steps D201, D202 and D203 are repeated as well, and the evaluation value D is calculated.

Next, the procedures for changing the image capturing area of the camera 401 (step D106) will be explained.

The image capturing area change unit 413 changes the area determination parameters ($\theta_P$, $\theta_T$) so that the evaluation values A and D approach the minimum value (or the maximum value) respectively as the target values A and D.

The procedures for having the evaluation value A approach the minimum value (or the maximum value) are the same as the first embodiment.

In the procedures for having the evaluation value D approach the minimum value (or the maximum value), for example, the area determination parameters ($\theta_P$, $\theta_T$) are changed by the following update equations 37, 38 and 39 which use derivatives derived by partially differentiating the above mentioned evaluation function D using the area determination parameters ($\theta_P$, $\theta_T$).

$$\frac{d\theta_P}{dt} = -\frac{\alpha_P}{N} \frac{\partial \sum_{n=1}^{N} V_{walln}}{\partial \theta_P} \quad \text{(Equation 37)}$$

$$\frac{d\theta_T}{dt} = -\frac{\alpha_T}{N} \frac{\partial \sum_{n=1}^{N} V_{walln}}{\partial \theta_T} \quad \text{(Equation 38)}$$

$$\frac{df}{dt} = -\frac{\alpha_f}{N} \frac{\partial \sum_{n=1}^{N} V_{walln}}{\partial \theta f} \quad \text{(Equation 39)}$$

Here, $\alpha_P$, $\alpha_T$, $\alpha_f$ are coefficients.

N is number of walls that interact with current camera.

Next, an operational example of the camera 401 according to the fourth embodiment will be explained using FIGS. 34, 35, 36 and 37. Here, it is assumed that a plurality of cameras 401 are arbitrarily set in the ceiling of a room where the ceiling level is equal and the floor is rectangular. And, the image of the floor is captured.

Figure 34:
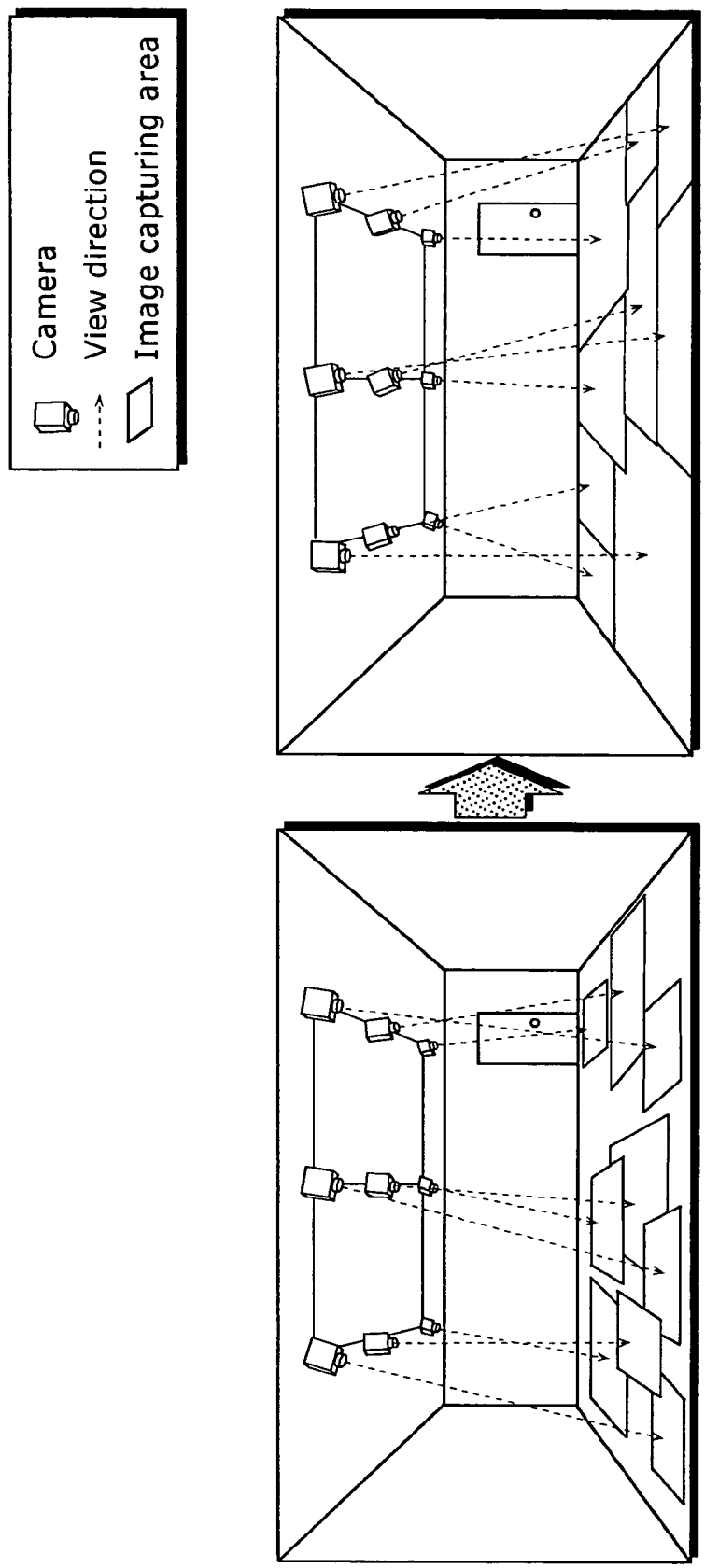
FIG. 34 is a diagram illustrating operations of a camera.

In the case where a plurality of cameras 401 are set as shown in FIG. 34, when the number of the cameras 401 is sufficient for the size of the whole monitoring area, the whole monitoring area can be thoroughly monitored.

Figure 35:
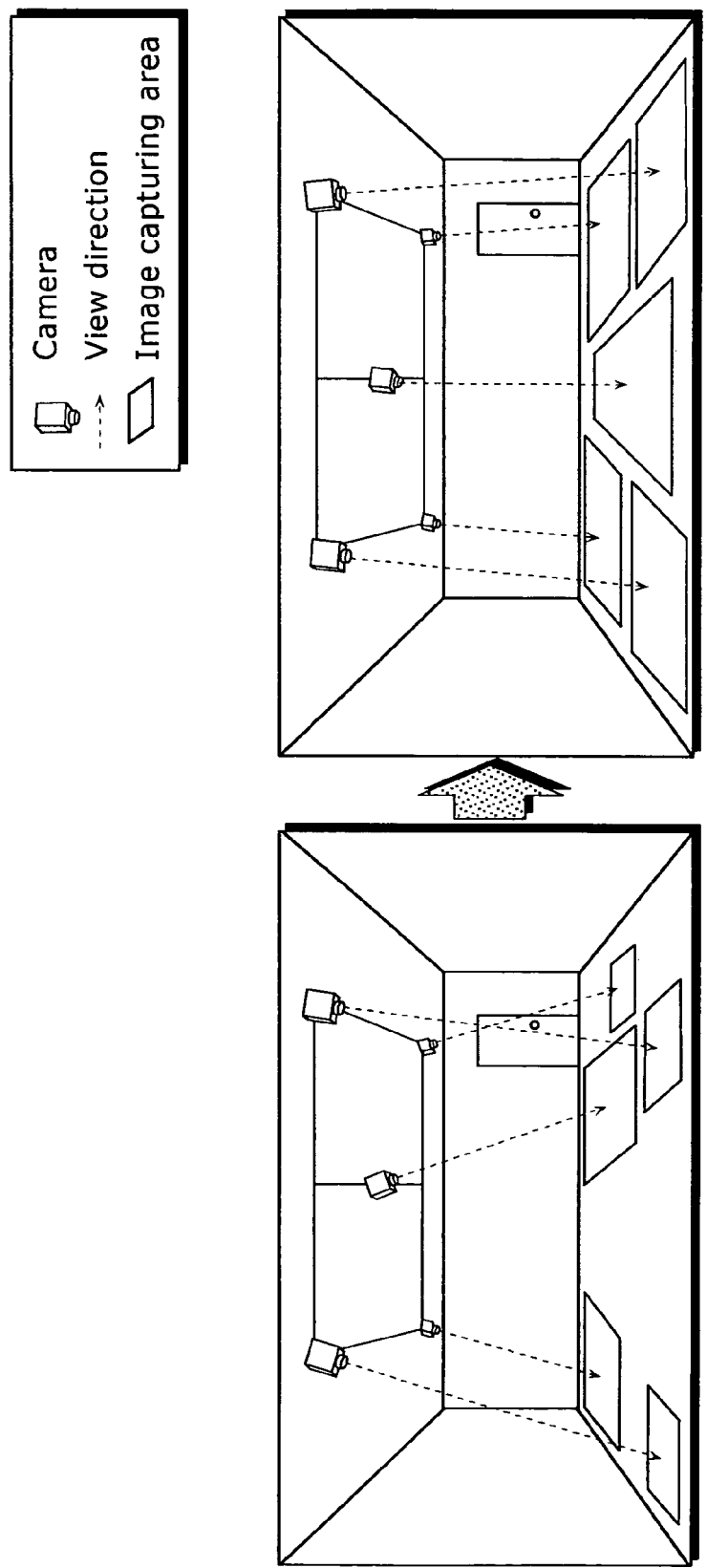
FIG. 35 is a diagram illustrating operations of a camera.

When the number of cameras 401 included in the monitor system is not sufficient for the size of the whole monitoring area, as shown in FIG. 35, the image capturing areas can be changed so that the image capturing areas of the cameras do not concentrate on one area, and are equally distributed.

Figure 36:
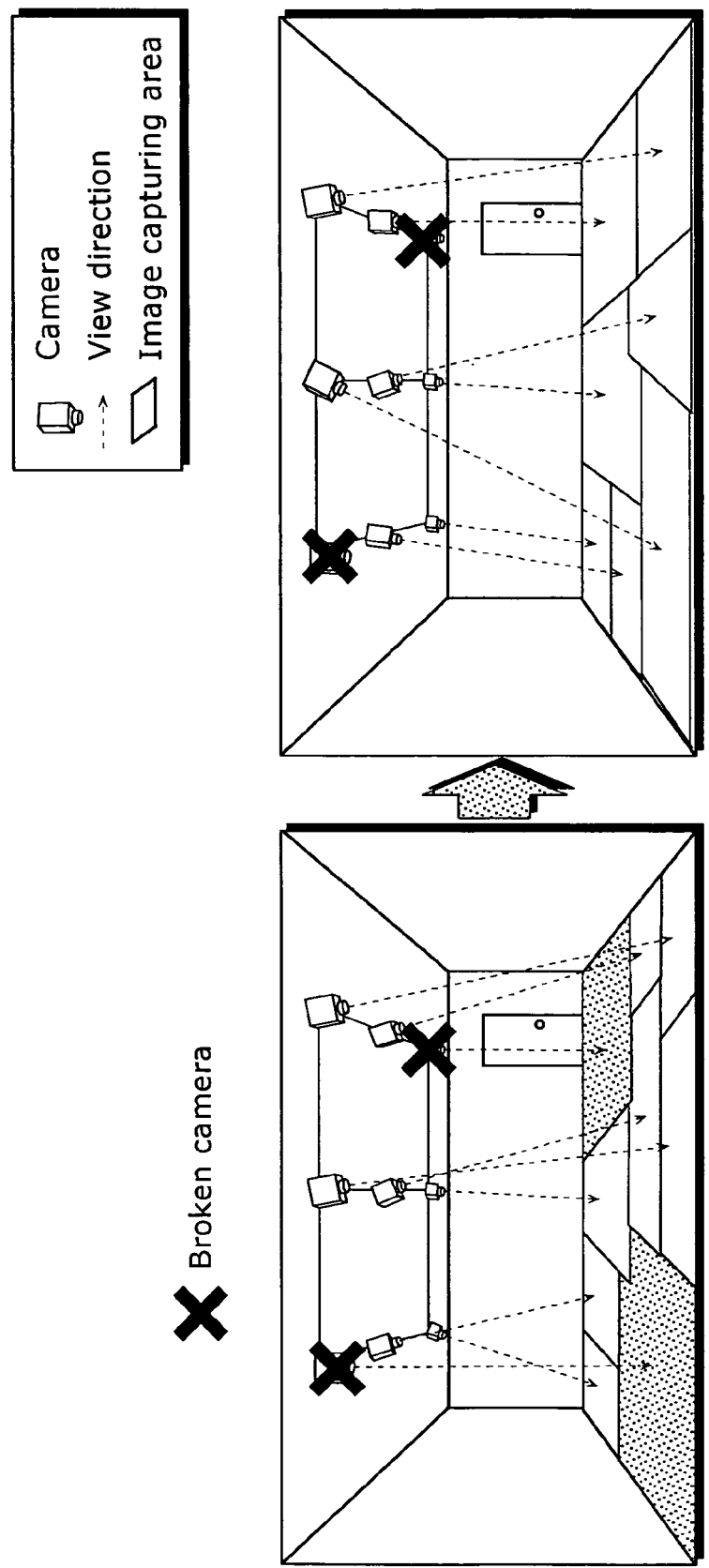
FIG. 36 is a diagram illustrating operations of a camera.

Also, as shown in FIG. 36, even in the case where arbitrary cameras 401 included in the monitor system lose each image capturing function due to breakdown or stop, when the number of the other cameras 401b is sufficient for the size of the whole monitoring area, the cameras 401b cooperatively change each image capturing area. Thus, the whole monitoring area can be thoroughly monitored.

Figure 37:
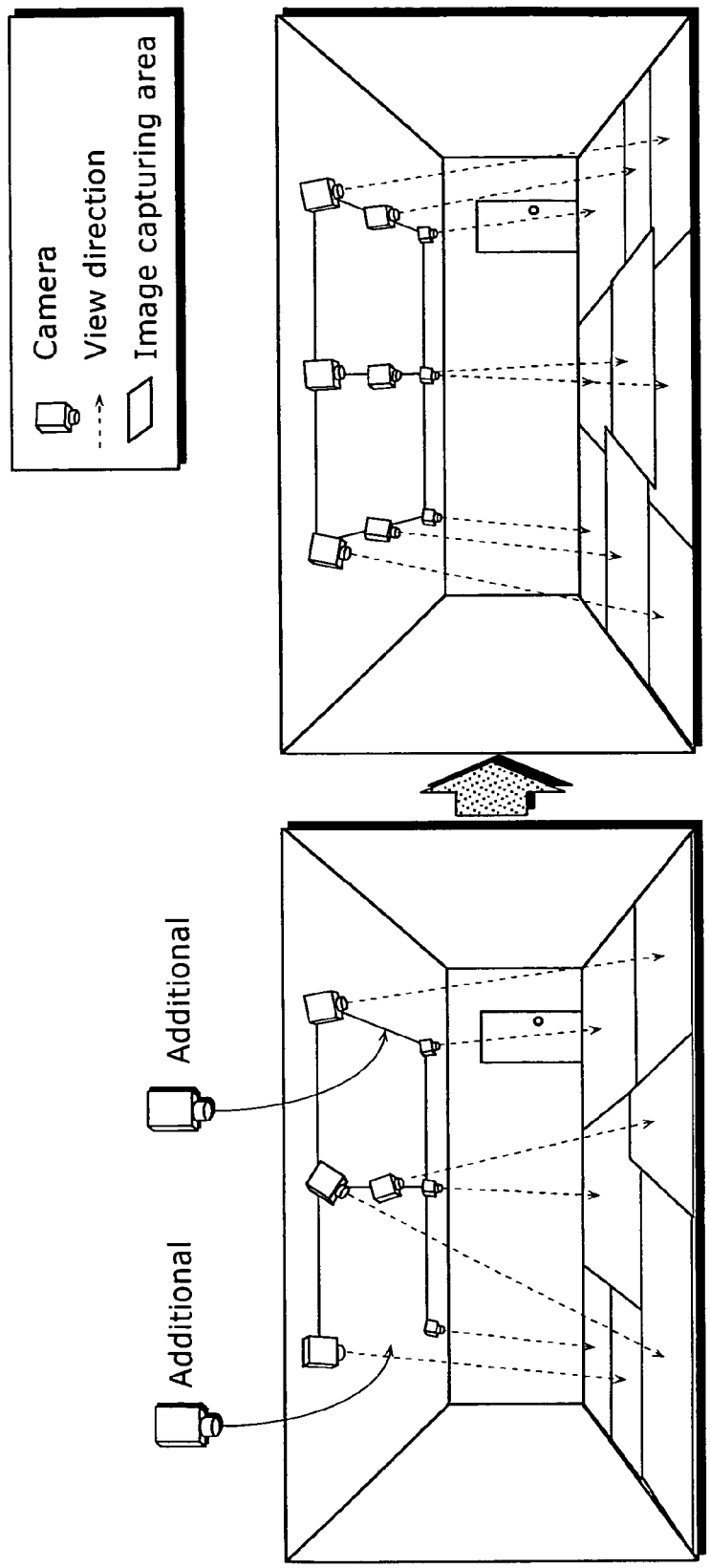
FIG. 37 is a diagram illustrating operations of a camera.

Also, as shown in FIG. 37, in the case where the monitor system is extended by arbitrarily setting additional cameras 401, the cameras 401 cooperatively change each image capturing area. Thus, the image capturing area of each camera 401 can be changed so that each function of the newly added cameras 401 can be effectively used.

As described above, even in the case where the cameras 401 are arbitrarily set in the monitoring area, the image capturing area of each camera 401 is automatically determined so that the monitor system can capture the image of the whole monitoring area. Also, in the case where the monitor system is extended or broken down, image capturing of the whole monitoring area can be maintained on the side of the monitor system. Thus, cost for setting and maintaining the monitor system can be reduced.

Fifth Embodiment

Next, the fifth embodiment of the present invention will be explained.

Figure 38:
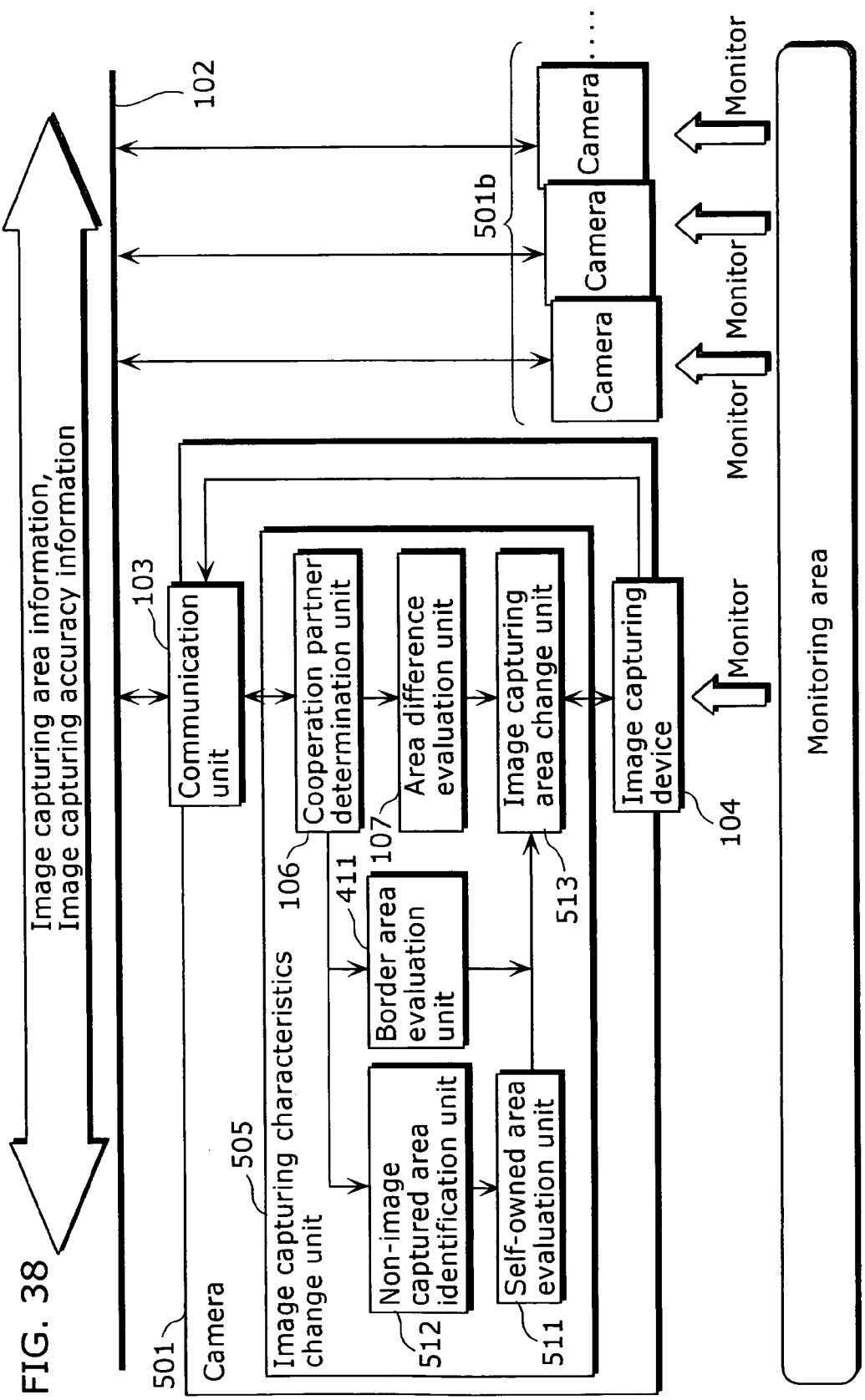
FIG. 38 is a block diagram showing a structure of the fifth embodiment according to the present invention.

FIG. 38 is a diagram showing a structure of a monitor system according to the fifth embodiment of the present invention. This monitor system includes: a plurality of cameras 501 and 501b made up of the same components; and a communication medium 102 which transmits information related to image capturing characteristics of each of the cameras 501 and 501b. In addition to controlling the image capturing area as described in the first embodiment, each of the cameras adjusts the image capturing area so that the non-image captured area in the monitoring area can be reduced. One camera 501 will be mainly explained as follows. Here, in FIG. 38, the same components as described in FIGS. 9 and 30 are assigned with the same codes, and the explanation will be omitted.

The camera 501 is an autonomous cooperation camera according to the fifth embodiment.

The image capturing characteristics change unit 505 is a processing unit which changes image capturing characteristics in cooperation with the other cameras. And, the image capturing characteristics change unit 505 includes: a cooperation partner determination unit 106; an area difference evaluation unit 107; a border area evaluation unit 411; a self-owned area evaluation unit 511; a non-image captured area identification unit 512; and an image capturing area change unit 513.

The self-owned area evaluation unit 511 is a processing unit which (i) provides a target value E for a position relation in the case where the central coordinates of the image capturing area of the camera 501 and the predetermined position exist in the same position, and (ii) provides an evaluation value E for a position relation, the evaluation value E monotonically receding from the target value as the distance increases.

The non-image captured area identification unit 512 is a processing unit which identifies the position of the non-image captured area whose image is not captured by any of the cameras having the adjacent image capturing areas to the image capturing area of the camera 501.

The image capturing area change unit 513 is a processing unit which changes area determination parameters of the image capturing device 104 so that the evaluation value E approaches the target value as well as the evaluation value A. In other words, in addition to the function of the image capturing area change unit 108 as described in the first embodiment, the image capturing area change unit 513 changes the image capturing area by controlling the image capturing device 104 of the camera 501 so that the non-image captured area in the monitoring area is reduced (for example, the non-image captured area is removed).

Figure 43:
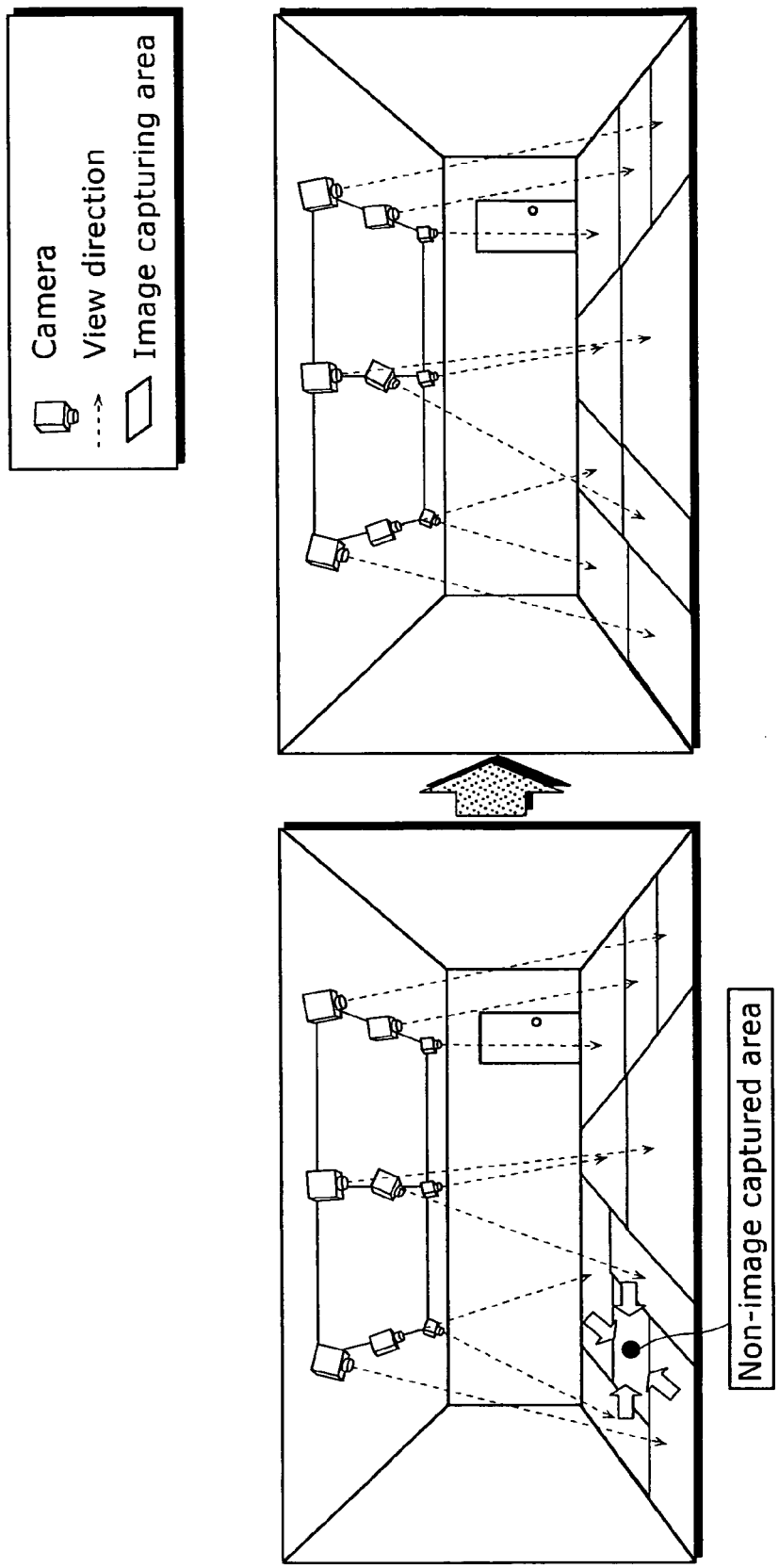
FIG. 43 is a diagram illustrating operations of a camera.

In the fourth embodiment, in the case where the number of the cameras 401 included in the monitor system is not sufficient for the size of the monitoring area, as shown in the left diagram of FIG. 43, there is a case where each position relation between the adjacent image capturing areas is fulfilled while non-image captured area exists depending on the position relation between the adjacent image capturing areas and the way the cooperation partner is determined.

On the other hand, according to the structure of the fifth embodiment, the camera 501 identifies the non-image captured area which is adjacent to the image capturing area of the camera 501 using the non-image captured area identification unit 512, evaluates the distance between the gravity center of the non-image captured area and the center of the image capturing area using the self-owned area evaluation unit 511, and then changes the image capturing area of the camera 501 using the image capturing area change unit 513 so that the non-image captured area is reduced.

Next, the operational procedures in changing the image capturing area of the camera 501 according to the fifth embodiment will be explained.

Figure 39A:
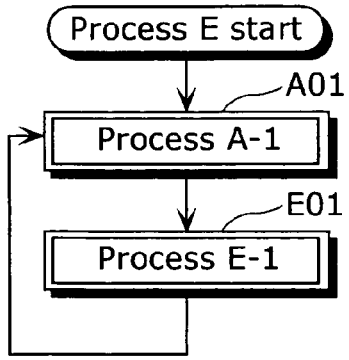
FIGS. 39A and 39B are flow charts explaining operations of the fifth embodiment.
Figure 39B:
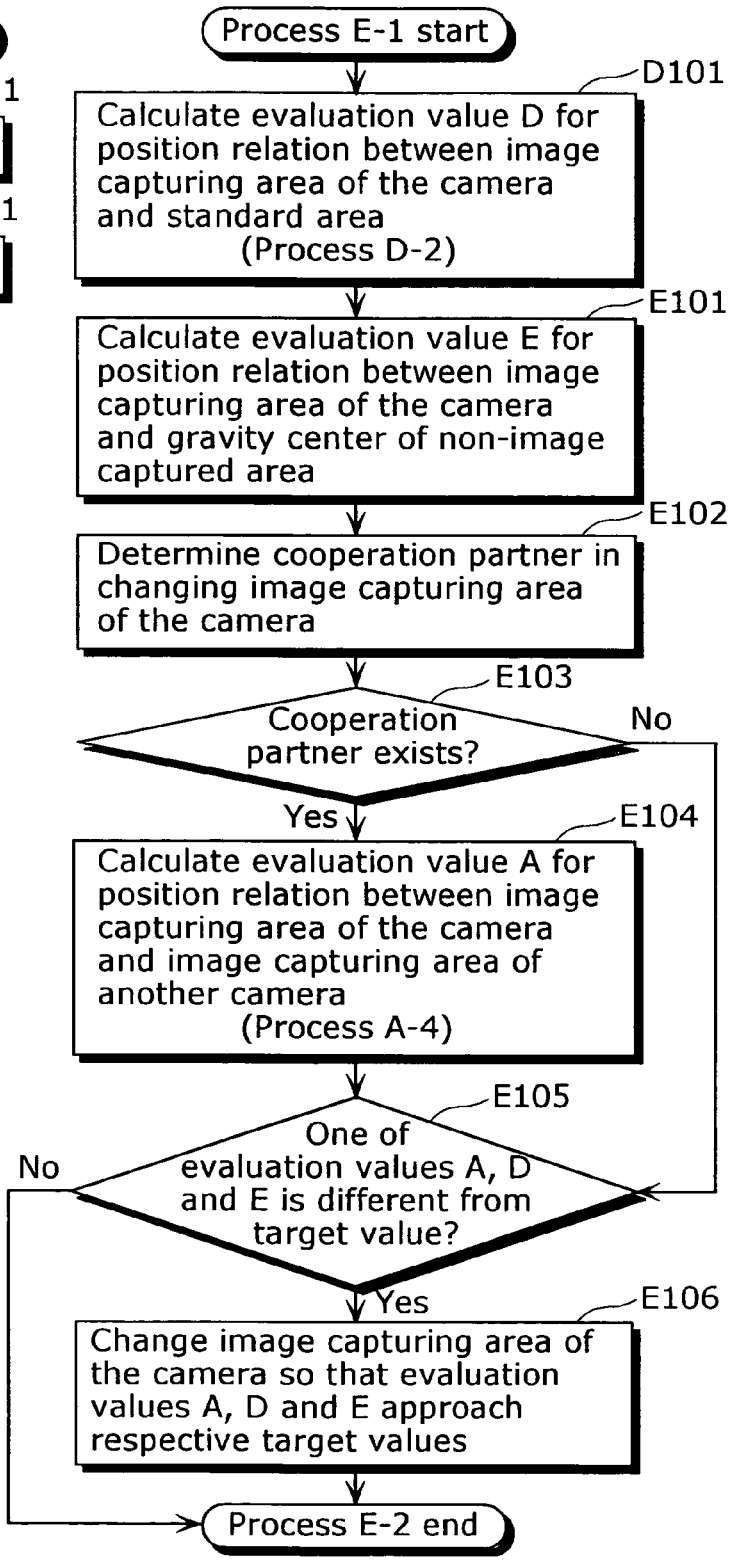

FIGS. 39A and 39B are flow charts showing procedures in which the camera 501 changes the image capturing area. Here, in FIGS. 39A and 39B, the same operational procedures as described in FIGS. 10A, 10B, 10C, 31A and 31B are assigned with the same codes, and the explanation will be omitted.

(Process E)
(Step E01) The process in the image capturing characteristics change unit 505 is started.

(Process E-1)
(Step E101) The self-owned area evaluation unit 511 calculates the evaluation value E for the position relation between the image capturing area of the camera 501 and the non-image captured area.
(Step E102) The cooperation partner determination unit 106 determines the cooperation partner in changing the image capturing area of the camera 501.
(Step E103) The cooperation partner determination unit 106 judges whether or not the cooperation partner exists in changing the image capturing area of the camera 501. In the case where the cooperation partner exists, the process is proceeded to the step E104. In the case where the cooperation partner does not exist, the process is proceeded to the step E105.
(Step E104) The area difference evaluation unit 107 calculates the evaluation value A for the position relation between the image capturing area of the cooperation partner and the image capturing area of the camera.
(Step E105) The image capturing area change unit 413 judges whether or not the evaluation values A, D and E are different from the predetermined target values A, D and E. In the case where the evaluation values are different from the respective target values, the process is proceeded to the step E106. In the case where the evaluation values are equal to the respective target values, the process E-2 is ended.
(Step E106) The image capturing area change unit 513 changes the area determination parameters of the camera 501 so that the evaluation values A, D and E approach the respective target values, and the process E-1 is ended.

The steps A01 (process A-1) and E01 (process E-1) are repeated subsequently.

Figure 40:
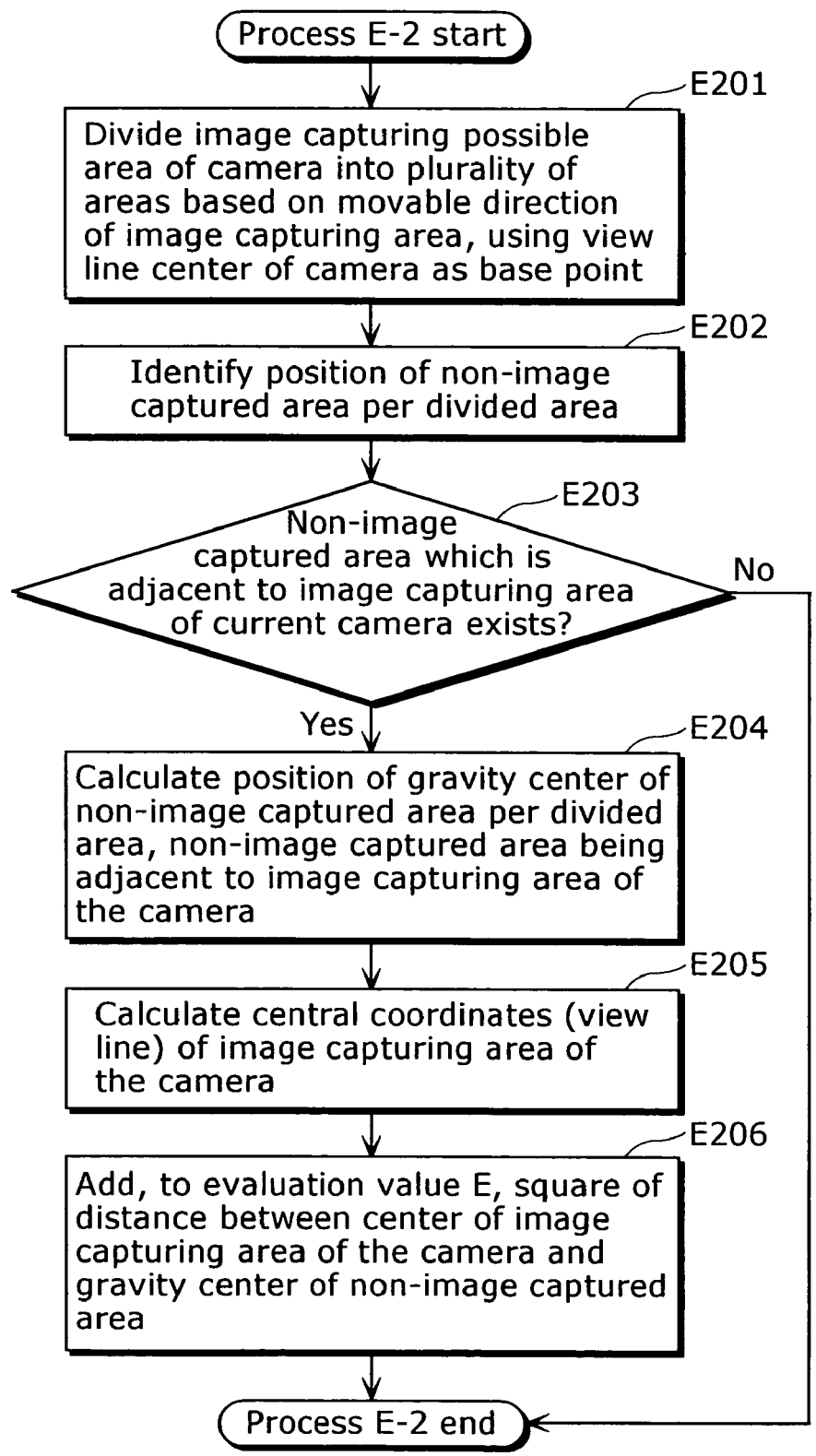
FIG. 40 is a flow chart explaining procedures for evaluating an image capturing area of a camera.
Figure 41:
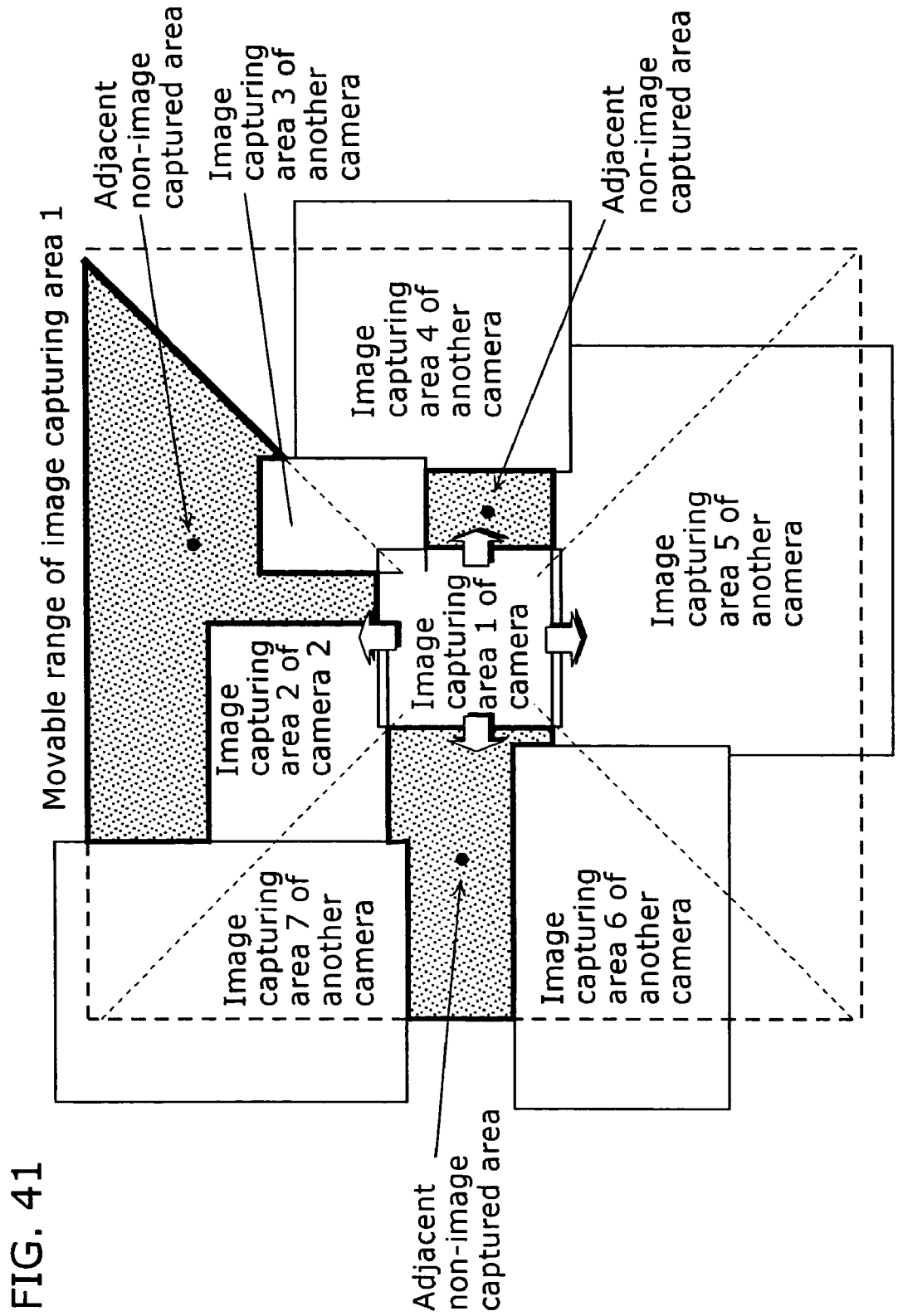
FIG. 41 is a diagram illustrating procedures for identifying a non-image captured area of a camera.
Figure 42:
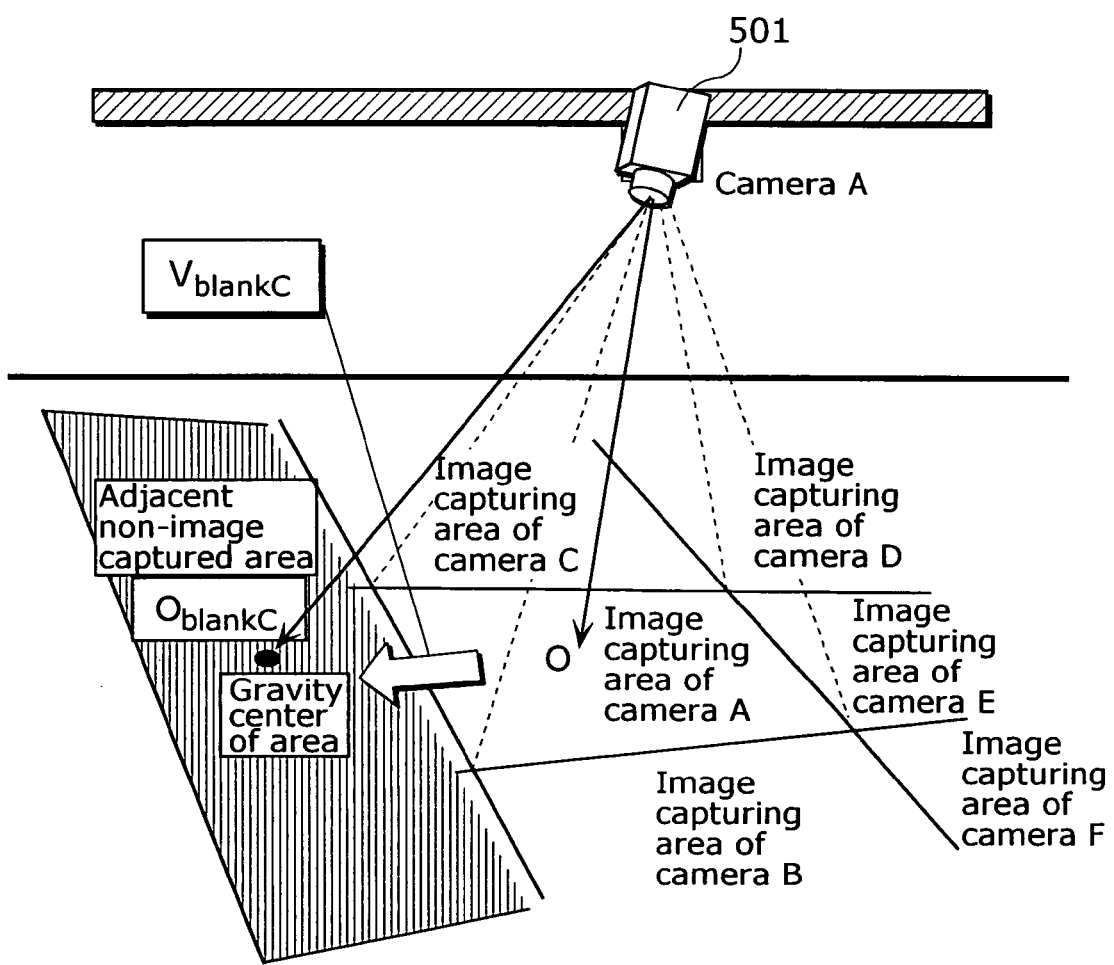
FIG. 42 is a diagram illustrating an evaluation function E of a camera.

Next, procedures of the step E101 will be explained using the flow chart as shown in FIG. 40. In the procedures, the self-owned area evaluation unit 511 provides the evaluation value E for the position relation between the image capturing area of the camera 501 and the non-image captured area. Here, it is assumed that the position relation between the image capturing area of the camera 501 and each adjacent image capturing area is arranged as shown in FIG. 41. Also, FIG. 42 is a diagram for explaining the following equations which are an example of (i) the position relation between the image capturing area of the camera 501 and non-image captured area and (ii) the evaluation function E that evaluates the position relation.

$$\begin{cases} V_{blankCx}(x) = (x - x_{blankC})^2 & \text{(Equation 40)} \\ V_{blankCy}(y) = (y - y_{blankC})^2 & \text{(Equation 41)} \\ V_{blankCz}(z) = (z - z_{blankC})^2 & \text{(Equation 42)} \end{cases}$$

or $$\begin{cases} V_{blankC\theta P}(\theta_P) = (\theta_P - \theta_{PblankC})^2 & \text{(Equation 43)} \\ V_{blankC\theta T}(\theta_T) = (\theta_T - \theta_{TblankC})^2 & \text{(Equation 44)} \end{cases}$$

Here, coordinates of object: $O_{blankC}(x_{blankC}, y_{blankC}, z_{blankC})$ (directions of object: $\theta_{blankC}(\theta_{PblankC}, \theta_{Tblankc})$)

(Process E-2)

(Step E201) The image capturing possible area of the camera 501 is divided into a plurality of areas based on a movable direction of the image capturing area, using the center of the image capturing area of the camera 501 as a base point.

In FIG. 41, the image capturing area of the camera 501 is divided into four areas in the movable pan direction and tilt direction, using the central coordinates of the image capturing area of the camera 501 as a base point.

(Step E202) The position of the non-image captured area is identified per divided area.

In FIG. 41, each of the areas surrounded by the heavy lines is the non-image captured area which is adjacent to the image capturing area of the camera 501.

(Step E203) It is judged whether or not the non-image captured area which is adjacent to the image capturing area of the camera 501 exists. In the case where the adjacent non-image captured area exists, the process is proceeded to step E204. In the case where the adjacent non-image captured area does not exist, the process E-2 is ended.

(Step E204) The gravity center coordinates of the non-image captured area is calculated per divided area, the non-image captured area being adjacent to the image capturing area of the camera 501.

(Step E205) The central coordinates of the image capturing area or view line of the camera 501 is calculated.

(Step E206) The evaluation value E is calculated for the distance difference between the central coordinates of the image capturing area of the camera 501 and the gravity center coordinates of the non-image captured area, using the above equations 40, 41 and 42 or 43 and 44 expressing the evaluation function E. After calculating each evaluation value E for all of the adjacent non-image captured areas, the process E-2 is ended.

Here, in addition to the above equations 40, 41, 42, 43 and 44, the evaluation function E may be a function by which, within the range the area determination parameters can be changed, (i) when the central coordinates of the image capturing area of the camera 501 and the gravity center coordinates of the adjacent non-image captured area are equal, the evaluation value E is the smallest (or the largest) and (ii) as the distance between the central coordinates of the image capturing area of the camera 501 and the gravity center coordinates of the adjacent non-image captured area increases, the evaluation value E monotonically increases (or decreases).

Next, changing the image capturing area of the camera 501 (step E205) will be explained.

The image capturing are change unit 513 changes the area determination parameters ($\theta_P$, $\theta_T$) so that the evaluation values A, D and E approach the minimum value (or the maximum value) respectively as the target values A, D and E. The procedures for having the evaluation value A approach the minimum value (or the maximum value) are the same as the first embodiment. The procedures for having the evaluation value D approach the minimum value (or the maximum value) are the same as the fourth embodiment.

Next, in the procedures for having the evaluation value E approach the minimum value (or the maximum value), the area determination parameters ($\theta_P$, $\theta_T$, f) of the camera 501 are changed according to the update equations of the following equations 45 and 46 or 47 and 48 which use the respective derivatives derived by partially differentiating the above mentioned evaluation function E using the area determination parameters ($\theta_P$, $\theta_T$).

$$\frac{d\theta_P}{dt} = -\frac{\alpha_P}{N} \frac{\partial \sum_{n=1}^{N}(V_{blankCxn} + V_{blankCyn} + V_{blankCzn})}{\partial \theta_P} \quad \text{(Equation 45)}$$

$$\frac{d\theta_T}{dt} = -\frac{\alpha_T}{N} \frac{\partial \sum_{n=1}^{N}(V_{blankCxn} + V_{blankCyn} + V_{blankCzn})}{\partial \theta_T} \quad \text{(Equation 46)}$$

or $$\frac{d\theta_P}{dt} = -\frac{\alpha_P}{N} \frac{\partial \sum_{n=1}^{N}(V_{blankC\theta Tn} + V_{blankC\theta Pn})}{\partial \theta_P} \quad \text{(Equation 47)}$$

$$\frac{d\theta_T}{dt} = -\frac{\alpha_T}{N} \frac{\partial \sum_{n=1}^{N}(V_{blankC\theta Tn} + V_{blankC\theta Pn})}{\partial \theta_T} \quad \text{(Equation 48)}$$

Here, $\alpha_P$, $\alpha_T$, $\alpha_f$ are coefficients.

N is number of adjacent non-image captured areas.

Next, an operational example of the camera 501 according to the fifth embodiment will be explained using FIG. 43. Here, a plurality of cameras 501 are arbitrarily set in the ceiling of a room where the ceiling level is equal and the floor is rectangular. And, the image of the floor is captured.

As shown in the left diagram of FIG. 43, in the case where the position relation between the adjacent image capturing areas is fulfilled while the non-image captured area exists depending on the position relation of the image capturing areas and the way the cooperation partner is determined, the cameras 501 surrounding the non-image captured area change the image capturing areas so that the view line of each camera 501 can approach the gravity center of the non-image captured area. Also, the surrounding cameras 501*b* change the image capturing areas so that the overlapping areas between the adjacent image capturing areas can be kept in a predetermined size. Thus, the proportion of the image capturing area in the whole monitoring area can be improved as the whole monitor system.

Sixth Embodiment

Next, the sixth embodiment of the present invention will be explained.

FIG. 44 is a diagram showing a structure of a monitor system according to the sixth embodiment of the present invention. This monitor system includes: a plurality of cameras 601 and 601b made up of the same components; and a communication medium 102 which transmits information related to the image capturing characteristics of each of the cameras 601 and 601b. And, the monitor system according to the present embodiment adjusts the image capturing accuracy of each camera so that a constant relation can be kept between the image capturing accuracies. One camera 601 will be mainly explained as follows. Here, in FIG. 44 the same components as in FIG. 9 are assigned with the same codes, and the explanation will be omitted.

The camera 601 is an autonomous cooperation camera according to the sixth embodiment.

The communication unit 603 is a communication interface which communicates image capturing accuracy information and accuracy determination parameters of the camera 601.

The image capturing device 604 is a CCD camera and the like which can change the above mentioned image capturing accuracy.

The image capturing characteristics change unit 605 is a processing unit which changes image capturing characteristics in cooperation with the surrounding cameras. And, the image capturing characteristics change unit 605 includes: a cooperation partner determination unit 606; an accuracy difference evaluation unit 609; and an image capturing accuracy change unit 610.

The cooperation partner determination unit 606 determines the cameras 601b whose image capturing areas are adjacent to the image capturing area of the camera 601 from among the other cameras 601b.

The accuracy difference evaluation unit 609 provides an evaluation value F for the difference between the image capturing accuracy of each camera 601b and the image capturing accuracy of the camera 601, based on the respective image capturing accuracy information and accuracy determination parameters of each camera 601b determined by the cooperation partner determination unit 606 and the camera 601.

The image capturing accuracy change unit 610 changes the area determination parameters of the image capturing device 604 so that the evaluation value E approaches the target value F. In other words, the image capturing accuracy change unit 610 changes the image capturing accuracy by controlling the image capturing device 604 of the camera 601 so that the image capturing accuracy of each camera 601b and the image capturing accuracy of the camera 601 have a constant relation (for example, equal to each other), based on the respective image capturing accuracy information and accuracy determination parameters of each camera 601b determined by the cooperation partner determination unit 606 and the camera 601.

In the background art, one camera captures an image in a wide range. And, the other camera captures a detailed image of an object. The images captured by the respective cameras have different resolutions and the like. Thus, it is not easy to compare the size of or synthesize the images of the object captured by these cameras.

On the other hand, according to the structure of the sixth embodiment, a plurality of cameras 601 are used, and the image capturing accuracies of the adjacent cameras 601 are made equal. Thereby, the images suitable for size comparison or image synthesis can be captured.

Figure 45A:
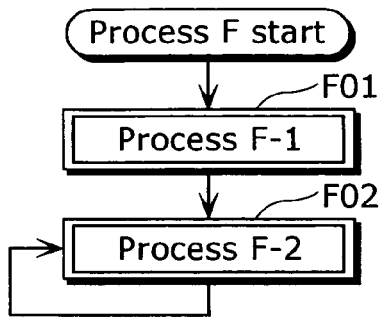
FIGS. 45A, 45B and 45C are flow charts explaining operations of the sixth embodiment.
Figure 45B:
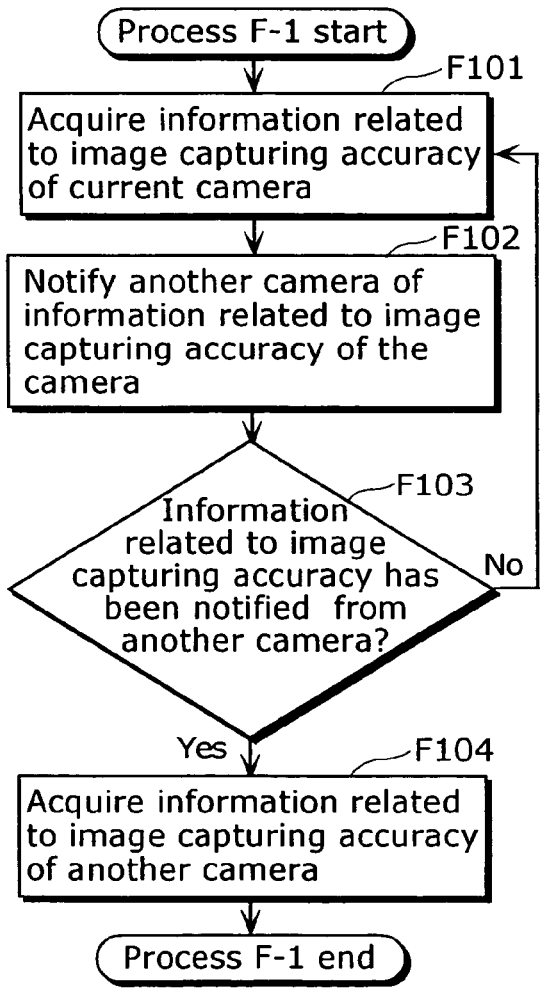
Figure 45C:
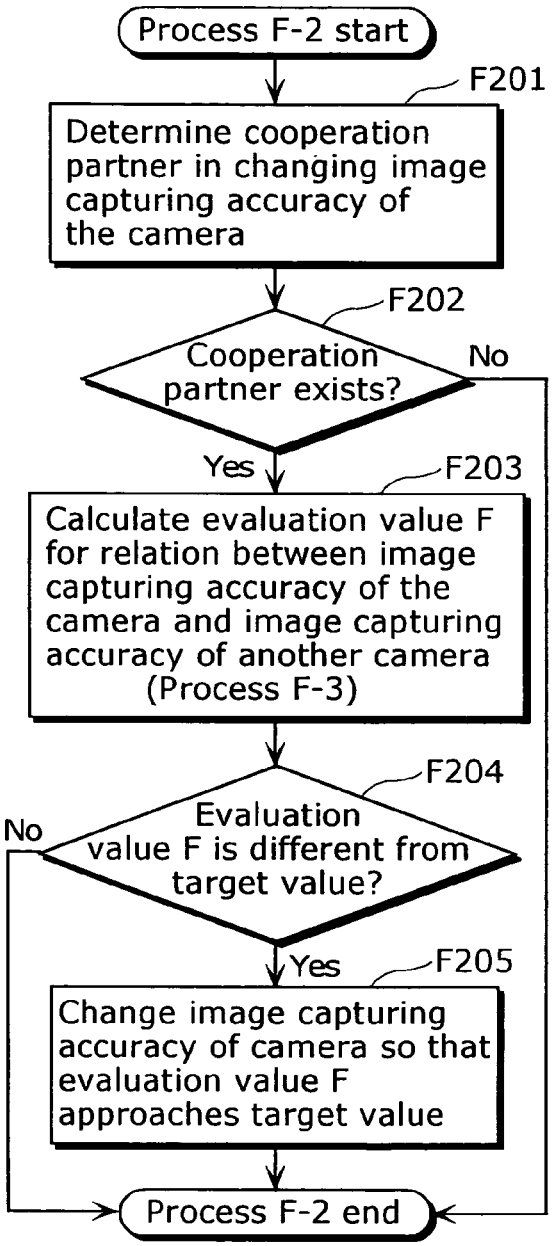

Next, the procedures for changing each image capturing accuracy of the cameras 601 included in the monitor system will be explained using the flow charts as shown in FIGS. 45A, 45B and 45C.

(Step F01) First, the process in the communication unit 603 is started.

(Process F-1)
(Step F101) The image capturing accuracy information and accuracy determination parameters of a camera 601 are acquired.
(Step F102) The respective image capturing accuracy information and accuracy determination parameters of the camera 601 are notified to another camera 601b.
(Step F103) It is judged whether or not the image capturing accuracy information and accuracy determination parameters have been notified from the other camera 601b. In the case where there has been the notification, the process is proceeded to step F104. In the case where there has not been the notification, the process is returned to the step F101.
(Step F104) The image capturing accuracy information and accuracy determination parameters notified from the other camera 601b are acquired, and the process F-1 is ended.
(Step F02) Next, the process in the image capturing characteristic change unit 605 is started.

(Process F-2)
(Step F201) The cooperation partner determination unit 606 determines the cooperation partner in changing the image capturing accuracy of the camera 601.
(Step F202) The cooperation partner determination unit 606 judges whether or not the cooperation partner exists in changing the image capturing accuracy of the camera 601. In the case where the cooperation partner exists, the process is proceeded to the step F203. In the case where the cooperation partner does not exist, the process C-2 is ended.
(Step F203) The accuracy difference evaluation unit 609 calculates an evaluation value F for the relation between (i) the image capturing accuracy information and the accuracy determination parameters of the cooperation partner and (ii) the image capturing accuracy information and the accuracy determination parameters of the camera 601.
(Step F204) The accuracy difference evaluation unit 609 judges whether or not the evaluation value F is different from the target value F. In the case where the evaluation value F is different from the target value F, the process is proceeded to step F205. In the case where the evaluation value F is equal to the target value F, the process F-2 is ended.
(Step F205) The image capturing accuracy change unit 610 changes the accuracy determination parameters of the camera 601 so that the evaluation value F approaches the predetermined target value F, and the process F-2 is ended.

The steps F01 (process F-1) and F02 (process F-2) are repeated subsequently.

Next, the procedures for determining the cooperation partner in changing the image capturing accuracy (step F201) according to the sixth embodiment will be explained. The procedures for determining the cooperation partner according to the sixth embodiment are the same as the determination procedures in the first embodiment as shown in FIGS. 13A and 13B.

Figure 47:
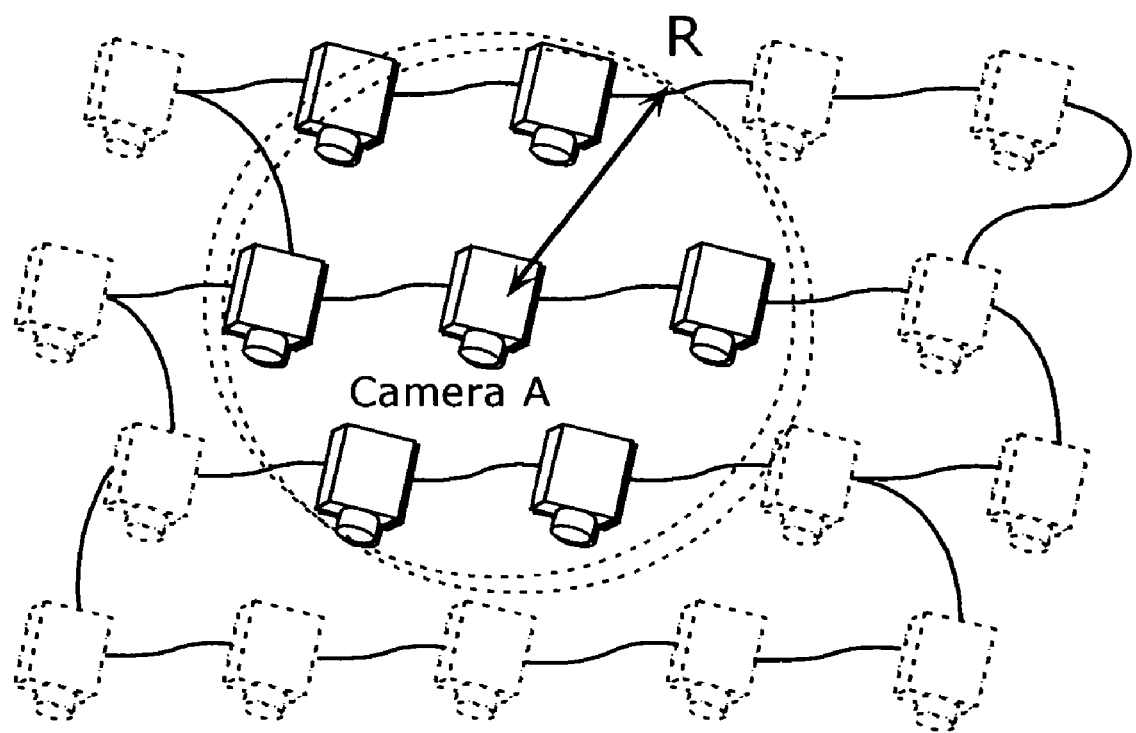
FIG. 47 is a diagram illustrating procedures for determining a cooperation partner in changing image capturing accuracy of a camera.

In the sixth embodiment, the cooperation partner may be determined based on (i) the connection relation in the network of the camera A and the other cameras or (ii) the physical position relation of the setting position between the camera A and the other cameras as shown in FIG. 47.

Figure 46:
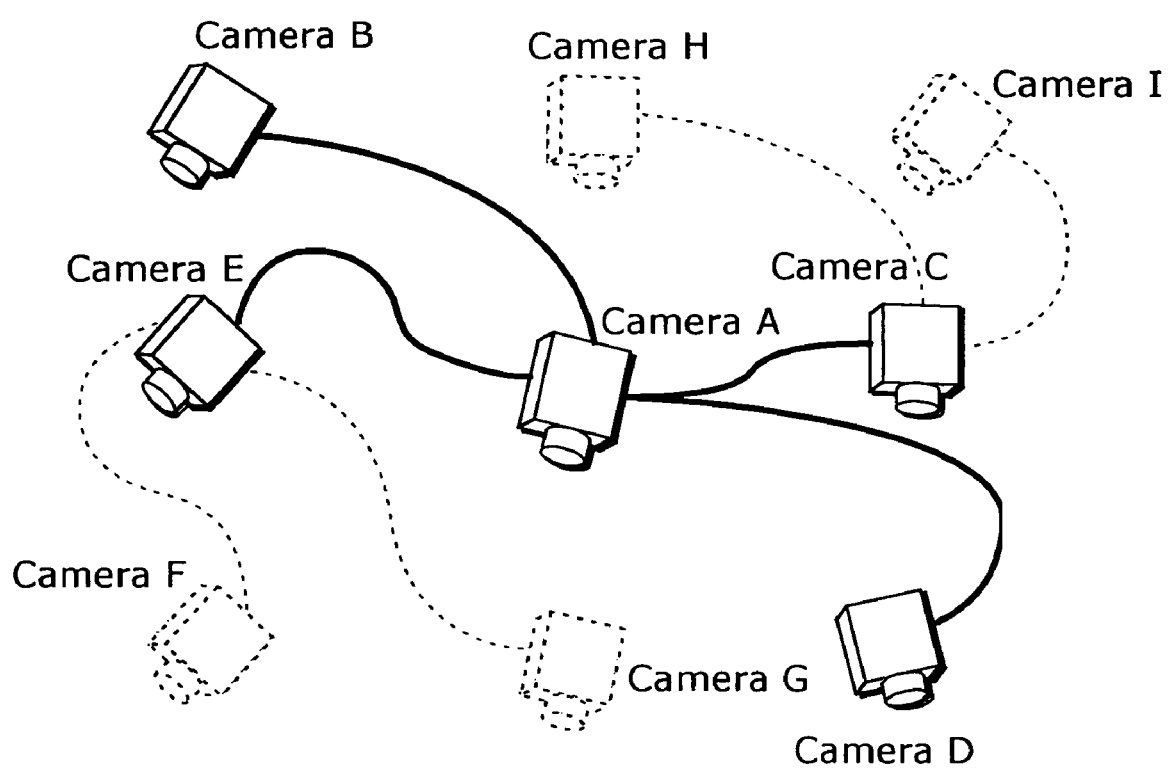
FIG. 46 is a diagram illustrating procedures for determining a cooperation partner in changing image capturing accuracy of a camera.

In the example of FIG. 46, the other cameras directly connected to the camera A in the network are selected as the cooperation partners in changing the image capturing accuracy of the camera A. Also, the other cameras indirectly connected to the camera A in the network may be selected as the cooperation partners as long as the number of the relay cameras is within a predetermined range. Thus, it is possible to restrict the range of communication in the network. And, it is possible to prevent the increase of the communication traffic in the network caused by the increased number of cameras.

Also, in the example of FIG. 47, the cameras exchange respective setting position information with each other, and select the other cameras as the cooperation partners, each physical position relation between the setting positions of the other cameras and the camera A being in a predetermined distance range. Thus, it is possible to select the cooperation partners based on the distance relation, regardless of the wiring path or the connection structure of the network which connects the cameras.

Figure 48:
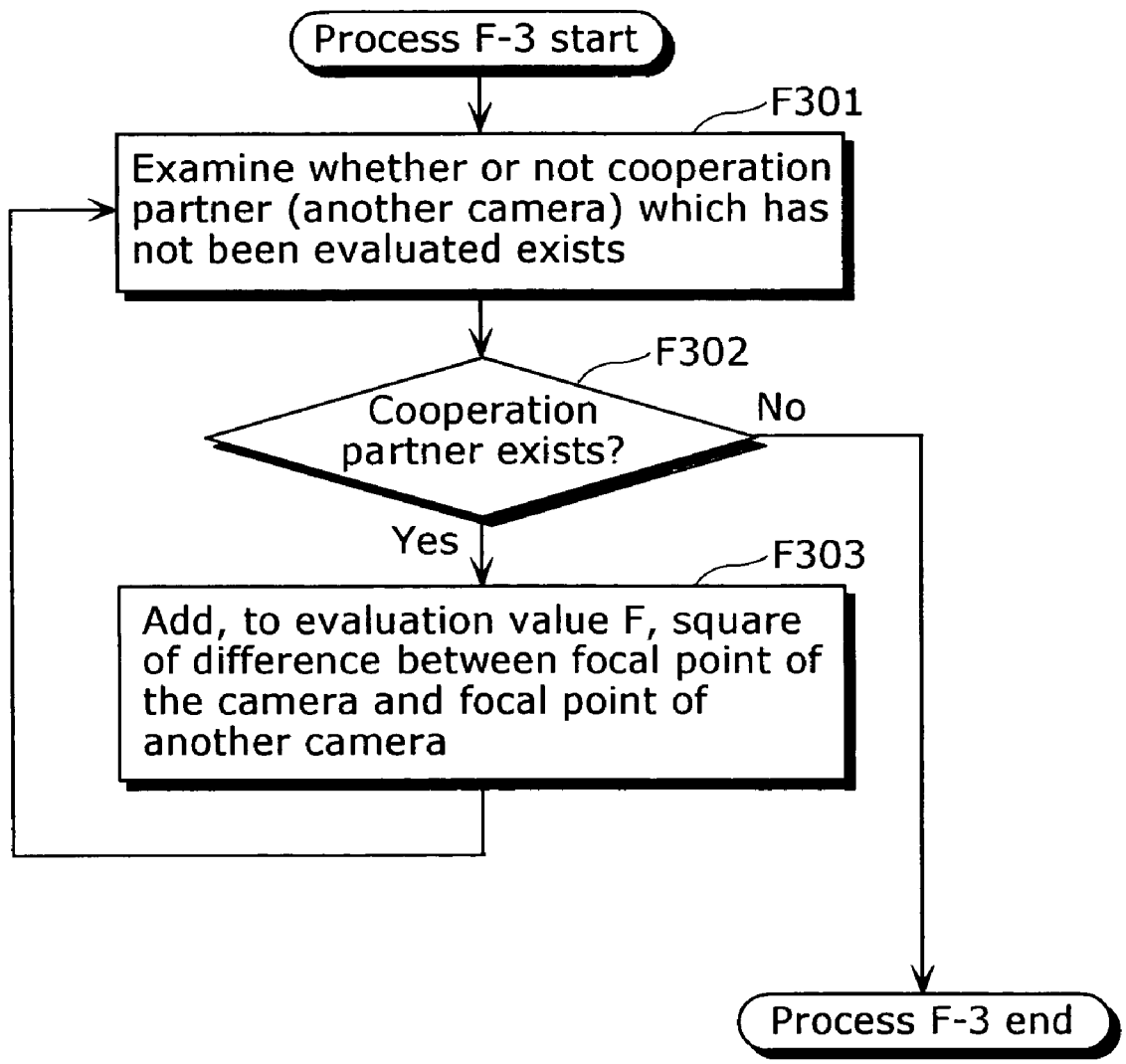
FIG. 48 is a flow chart explaining procedures for evaluating image capturing accuracy of a camera.
Figure 49:
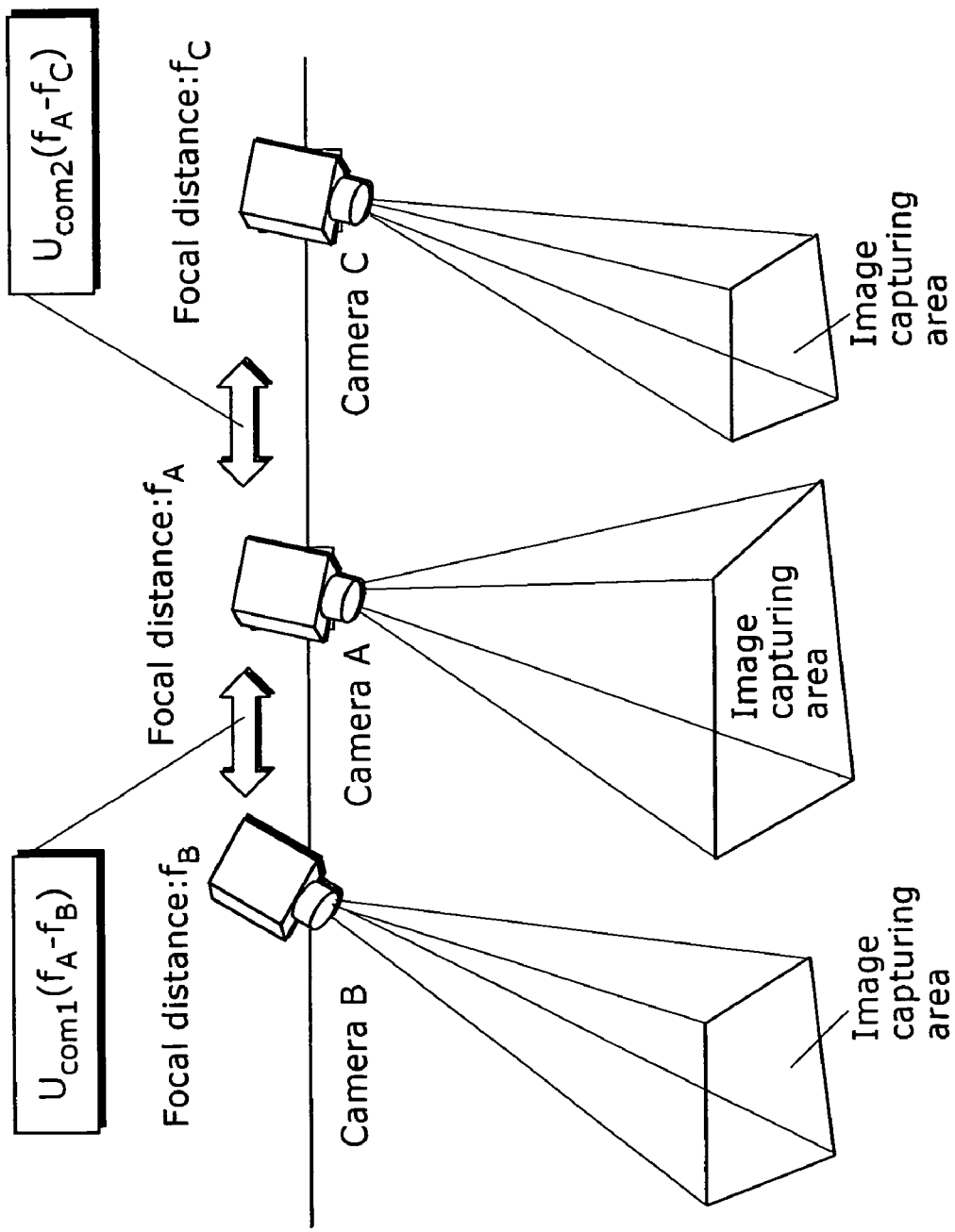
FIG. 49 is a diagram illustrating an evaluation function F of a camera.

Next, an example of the procedures for calculating the evaluation value F for the difference between the image capturing accuracy of the camera 601 and the image capturing accuracy of each camera 601b in the step F203 will be explained using the flow chart as shown in FIG. 48. FIG. 49 shows the difference between the image capturing accuracy of the camera 601 and the image capturing accuracy of each camera 601b. The following equations 49 and 50 express the evaluation function F which determines the evaluation value F for the difference between the image capturing accuracies.

$$U_{com1}(f_A - f_B) = (f_A - f_B)^2 \quad \text{(Equation 49)}$$

$$U_{com2}(f_A - f_C) = (f_A - f_C)^2 \quad \text{(Equation 50)}$$

(Process F-3)

(Step F301) It is judged whether or not a cooperation partner exists among the cooperation partners in changing the image capturing accuracies of the camera 601 and the other cameras 601b, the cooperation partner for which the difference of the image capturing accuracy not having been evaluated compared to the camera 601.

In the example of FIG. 49, it is judged whether or not evaluation of the image capturing accuracy information and the accuracy determination parameters has been finished for the camera B and the camera C determined as the cooperation partners for the camera A.

(Step F302) As a result of judging whether or not the cooperation partner exists, in the case where the cooperation partner exists, the process is proceeded to step F303. In the case where the cooperation partner does not exist, the process F-3 is ended.

(Step F303) An evaluation value F is calculated for the relation between (i) the image capturing accuracy information and the accuracy determination parameters of the cooperation camera 601b and (ii) the image capturing accuracy information and the accuracy determination parameters of the camera 601.

In the example of FIG. 49, the evaluation value F is calculated for the relation between the focal distances of the cameras A, B and C, using the above equations 49 and 50 expressing the evaluation function. In addition to the above equations 49 and 50, the evaluation function F may be a function by which, within the range the accuracy determination parameters (f) of the camera 610 can be changed, (i) when each difference of the predetermined image capturing accuracy information and accuracy determination parameters between the cameras is equal, the evaluation value F is the smallest (or largest) and (ii) the evaluation value F monotonically increases (or decreases) as the difference of the predetermined image capturing accuracy information and accuracy determination parameters between the cameras increases.

Next, the procedures for changing the accuracy determination parameters of the camera 601 (step F205) will be explained.

The image capturing accuracy change unit 610 changes the accuracy determination parameters (f) of the camera 601 according to the following update equation 51 which uses a derivative derived by partially differentiating the above mentioned evaluation function F using each accuracy determination parameters (f) so that the evaluation value F can approach the minimum value (or the maximum value) as the target value F.

$$\frac{df}{dt} = -\frac{\alpha_f}{N} \frac{\partial \sum_{n=1}^{N} U_{comn}}{\partial f} \quad \text{(Equation 51)}$$

Here, $\alpha_P$, $\alpha_T$, $\alpha_f$ are coefficients.

N is number of cooperation partners.

Next, an example of the cooperation operation performed by the cameras according to the sixth embodiment will be explained using FIG. 50.

Figure 50:
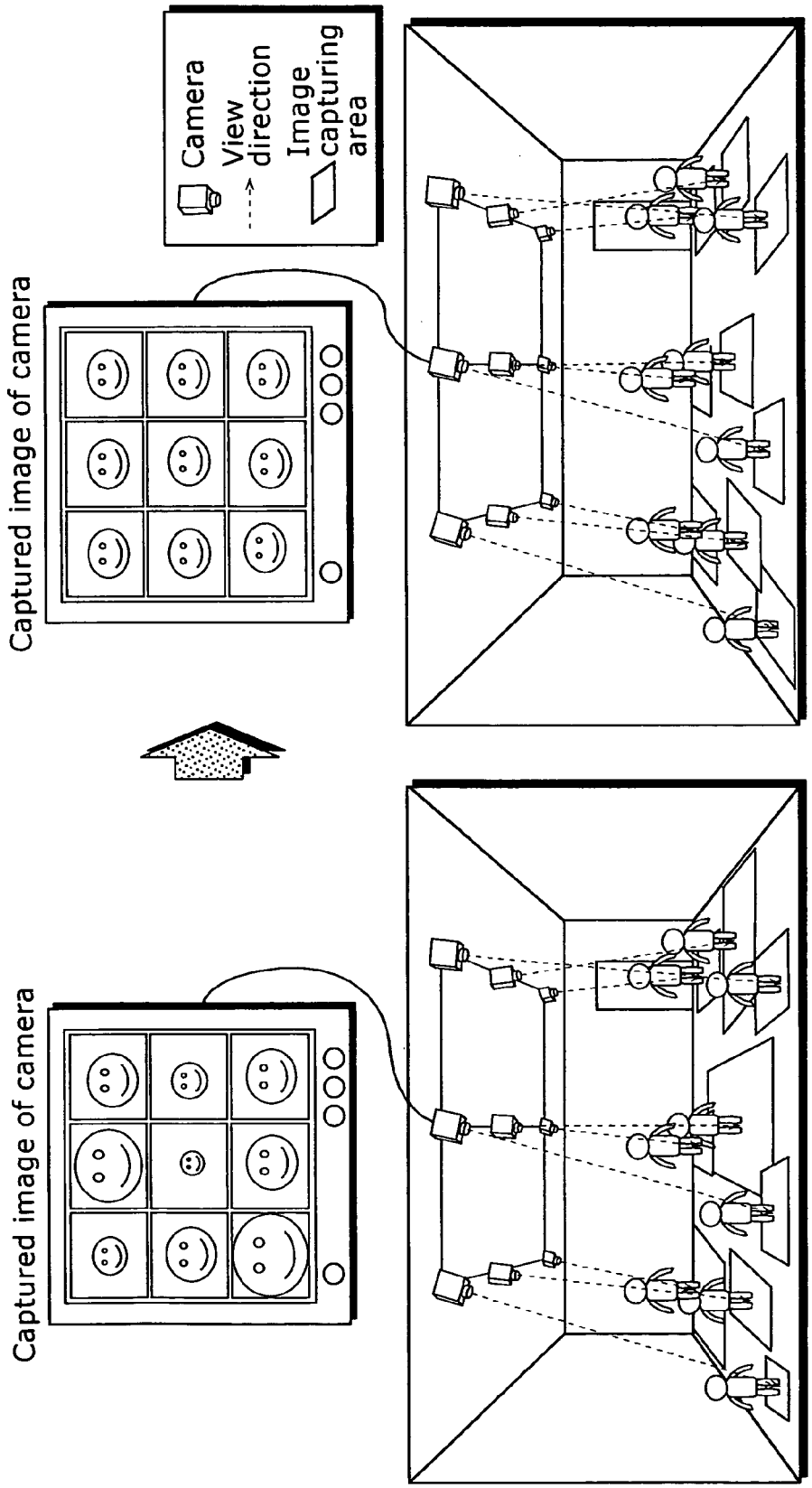
FIG. 50 is a diagram illustrating operations of a camera.

FIG. 50 shows an example in which a plurality of cameras 601 are set in the ceiling of the room where the ceiling level is equal and the floor is rectangular. And the image of the floor is captured.

As shown in the left diagram of FIG. 50, in the case where each camera 601 has a different focal distance, and the resolution of each captured image (for example, an image of a human face) is different, there is a problem that the process of recognizing the face of the object and the like cannot be performed under the same conditions. In order to solve this problem, each camera 601 equalizes the predetermined image capturing accuracy in cooperation with the other cameras 601b. And, each camera 601 captures the image having the same resolution as shown in the right diagram of FIG. 50. Thus, the process of recognizing the face of the object and the like can be performed under the same conditions.

Seventh Embodiment

Next, the seventh embodiment of the present invention will be explained.

Figure 51:
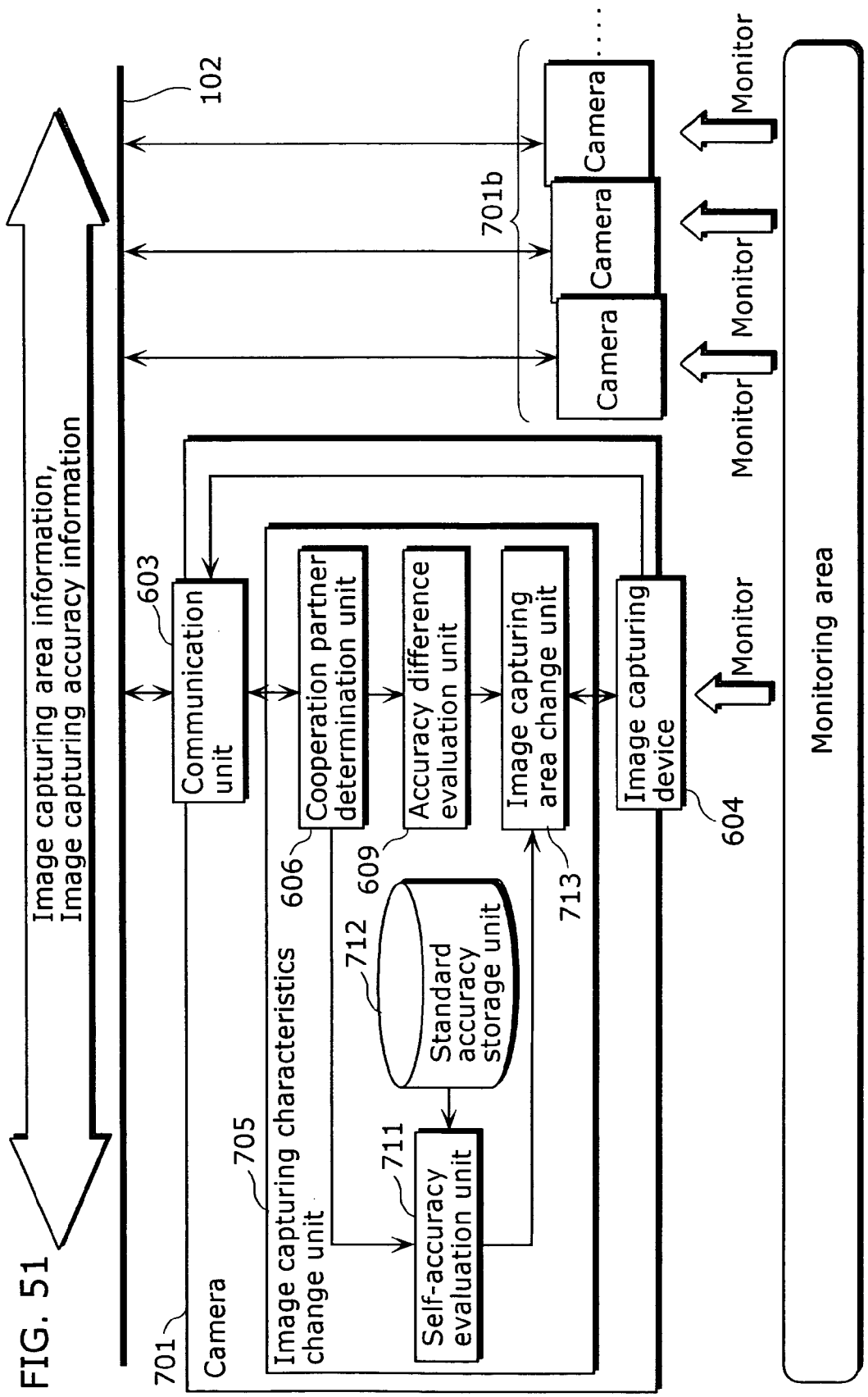
FIG. 51 is a block diagram showing a structure of the seventh embodiment according to the present invention.

FIG. 51 is a diagram showing a structure of a monitor system according to the seventh embodiment. This monitor system includes: a plurality of cameras 701 and 701b made up of the same components; and a communication medium 102 which transmits information related to the image capturing characteristics of each of the cameras 701 and 701b. In addition to controlling the image capturing accuracy according to the sixth embodiment, each camera adjusts the image capturing accuracy so that the image capturing accuracy has a constant position relation with the predetermined standard accuracy. One camera 701 will be mainly explained as follows. In FIG. 51, the same components as shown in FIG. 44 are assigned with the same codes, and the explanation will be omitted.

The camera 701 is an autonomous cooperation camera according to the seventh embodiment.

The image capturing characteristics change unit 705 is a processing unit which changes the image capturing characteristics in cooperation with the surrounding cameras. And, the image capturing characteristics change unit 705 includes: a cooperation partner determination unit 606; an accuracy difference evaluation unit 609; a self-accuracy evaluation unit 711; a standard accuracy storage unit 712; and an image capturing accuracy change unit 713.

The self-accuracy evaluation unit 711 is a processing unit which (i) provides a target value G in the case where the image capturing accuracy of the camera 701 has a predetermined value (standard accuracy stored in the standard accuracy storage unit 712), and (ii) provides an evaluation value G monotonically receding from the target value G as the accuracy recedes from the predetermined value.

The standard accuracy change unit 713 is a processing unit which changes the accuracy determination parameters of the image capturing device 604 so that the evaluation value G approaches the predetermined target value as well as the evaluation value F. In other words, in addition to the function of the image capturing accuracy change unit 610 according to the sixth embodiment, the image capturing accuracy change unit 713 changes the image capturing accuracy by controlling the image capturing device 604 of the camera 701 so that the image capturing accuracy of the camera 701 corresponds with the predetermined value (standard accuracy).

The camera 601 according to the sixth embodiment can equalize the image capturing accuracy of the camera 601 and the surrounding cameras 601b, but cannot change the accuracy to a target value.

On the other hand, the camera 701 according to the seventh embodiment sets the desired image capturing accuracy as the standard accuracy, and equalizes the image capturing accuracy of the cameras 701 while having the accuracy approach the desired image capturing accuracy.

Next, the operational procedures for changing the image capturing area of the camera 701 according to the seventh embodiment will be explained.

Figure 52A:
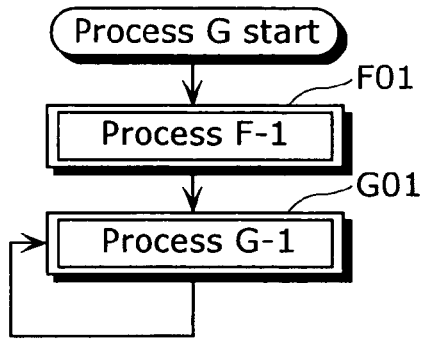
FIGS. 52A and 52B are flow charts explaining operations of the seventh embodiment.
Figure 52B:
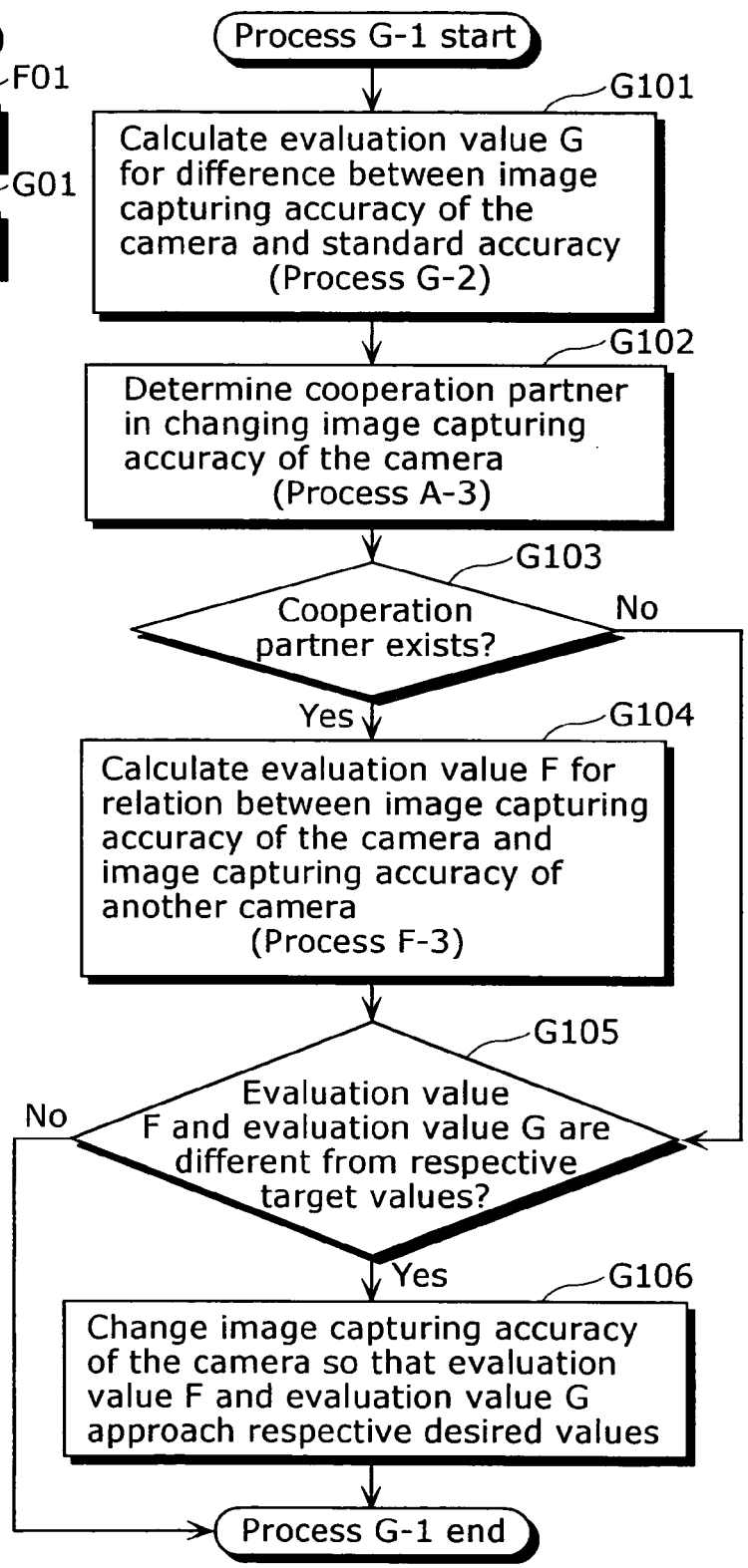

FIGS. 52A and 52B are flow charts showing procedures in which the camera 701 changes the image capturing area. In FIGS. 52A and 52B, the same operational procedures as shown in FIGS. 45A, 45B and 45C are assigned with the same codes, and the explanation will be omitted.

(Process G)
(Step G01) The process in the image capturing characteristics change unit 705 is started.

(Process G-1)
(Step G101) The self-accuracy evaluation unit 711 calculates an evaluation value G for the image capturing accuracy of the camera 701.
(Step G102) The cooperation partner determination unit 606 determines a cooperation partner in changing the image capturing accuracy of the camera 701.
(Step G103) The cooperation partner determination unit 606 judges whether or not a cooperation partner exists in changing the image capturing accuracy of the camera 701. In the case where the cooperation partner exists, the process is proceeded to step G104. In the case where the cooperation partner does not exist, the process is proceeded to step G105.
(Step G104) The accuracy difference evaluation unit 609 calculates the evaluation value F for the difference between (i) the predetermined image capturing accuracy of the cooperation partner and (ii) the predetermined image capturing accuracy of the camera 701.
(Step G105) The accuracy difference evaluation unit 609 judges whether or not the evaluation values F and G are different from the respective predetermined target values. In the case where the evaluation values are different from the respective target values, the process is proceeded to step G106. In the case where the evaluation values are equal to the respective target values, the process G-1 is ended.
(Step G106) The image capturing accuracy change unit 713 changes the accuracy determination parameters of the camera 701 so that the evaluation values F and G approach the respective target values, and the process G-1 is ended.

The steps F01 (process F-1) and G01 (process G-1) are repeated subsequently.

The procedures for determining the cooperation partner in changing the image capturing accuracy information (step G102) according to the seventh embodiment are the same as the sixth embodiment.

Figure 53:
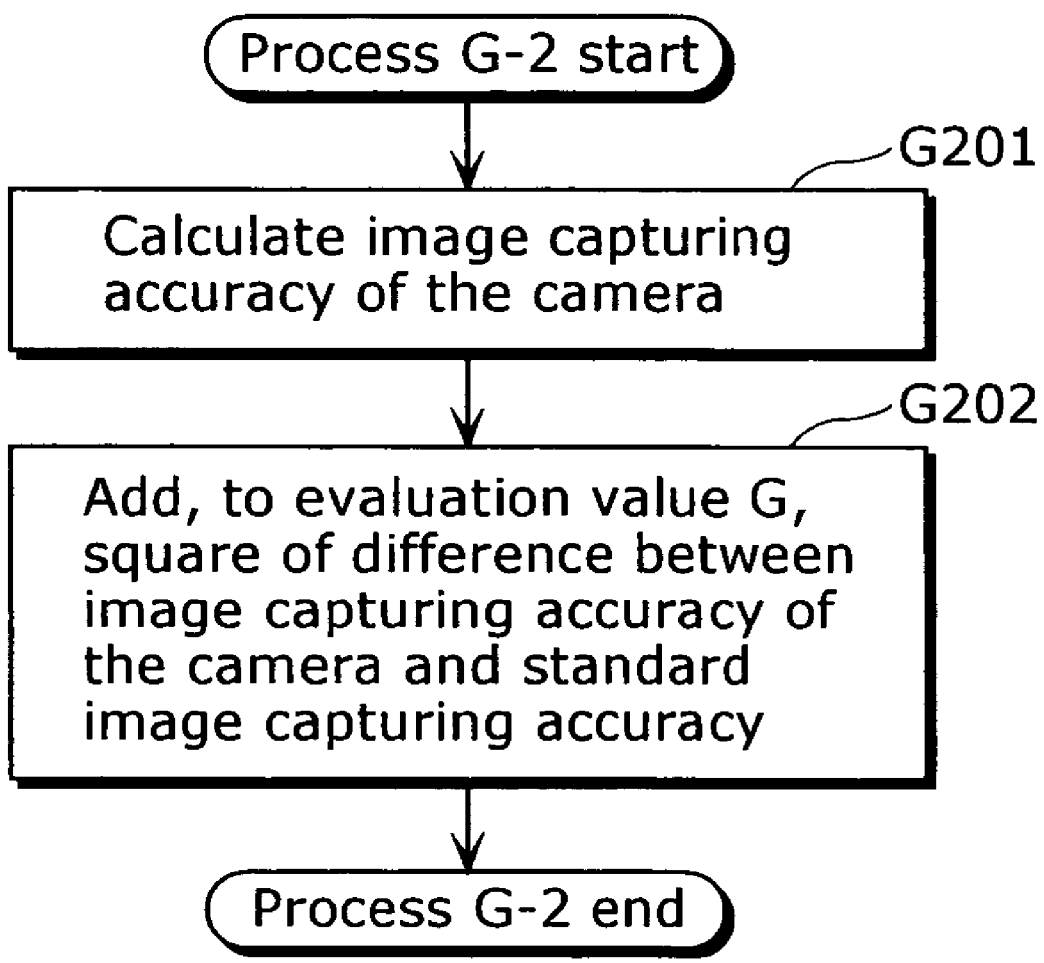
FIG. 53 is a flow chart explaining orders for evaluating image capturing accuracy of a camera.
Figure 54:
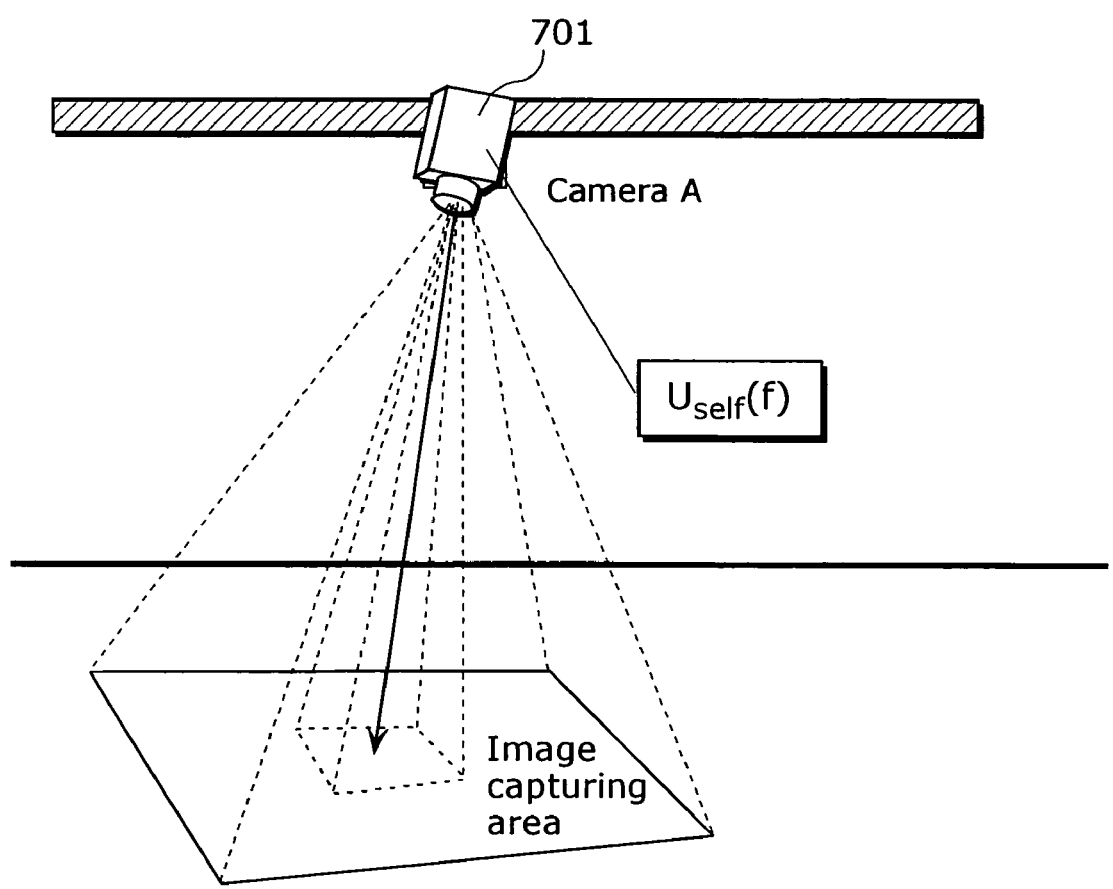
FIG. 54 is a diagram illustrating an evaluation function G of a camera.

Next, the procedures in which the self-accuracy evaluation unit 711 provides the evaluation value G for the difference between the image capturing accuracy of the camera 701 and the standard accuracy in the step G101 will be explained using the flow chart as shown in FIG. 53. FIG. 54 is a diagram for explaining the following equation 52 which is an example of the evaluation function G that evaluates the difference between the image capturing accuracy of the camera 701 and the standard accuracy.

$$U_{self}(f) = (f - f_0)^2 \quad \text{(Equation 52)}$$

Here, standard focal distance: $f_0$ (Process G-2)
(Step G201) The image capturing accuracy information and the accuracy determination parameters of the camera 701 are determined.
(Step G202) The evaluation value G is calculated for the relation between (i) the image capturing accuracy information and accuracy determination parameters of the camera 701 and (ii) the standard accuracy, using the above equation 52 expressing the evaluation function G. After the evaluation value G is calculated, the process G-2 is ended.

Here, in addition to the equation 52, the evaluation function G may be a function by which, within the range the accuracy determination parameters (f) of the camera 701 can be changed, (i) when the predetermined image capturing accuracy information and accuracy determination parameters of the camera 701 are equal to the standard accuracy, the evaluation value G is the smallest (or the largest), and (ii) as the difference between the standard accuracy and the predetermined image capturing accuracy information and accuracy determination parameters of the camera 701 increases, the evaluation value G monotonically increases (or decreases).

Next, changing the image capturing accuracy of the camera 701 (step G106) will be explained.

The image capturing accuracy change unit 713 changes the accuracy determination parameters (f) so that the evaluation values F and G approach the minimum value (or the maximum value) as the respective target values F.

The procedures for having the evaluation value F approach the minimum value (or the maximum value) are the same as the sixth embodiment. As the procedures for having the evaluation value G approach the minimum value (or the maximum value), for example, the accuracy determination parameters (f) of the camera 701 are changed according to the following update equation 53 which uses the derivative derived by partially differentiating the above mentioned evaluation function F using the accuracy determination parameters (f).

$$\frac{df}{dt} = -\alpha_f \frac{\partial U_{self}}{\partial f}$$ (Equation 53)

Here, $\alpha_f$ is coefficient.

Next, the operational example of the camera according to the seventh embodiment will be explained using FIG. 55. Here, a plurality of cameras 701 are set in the ceiling of a room where the ceiling level is equal and the floor is rectangular. And, the image of the floor is captured.

Figure 55:
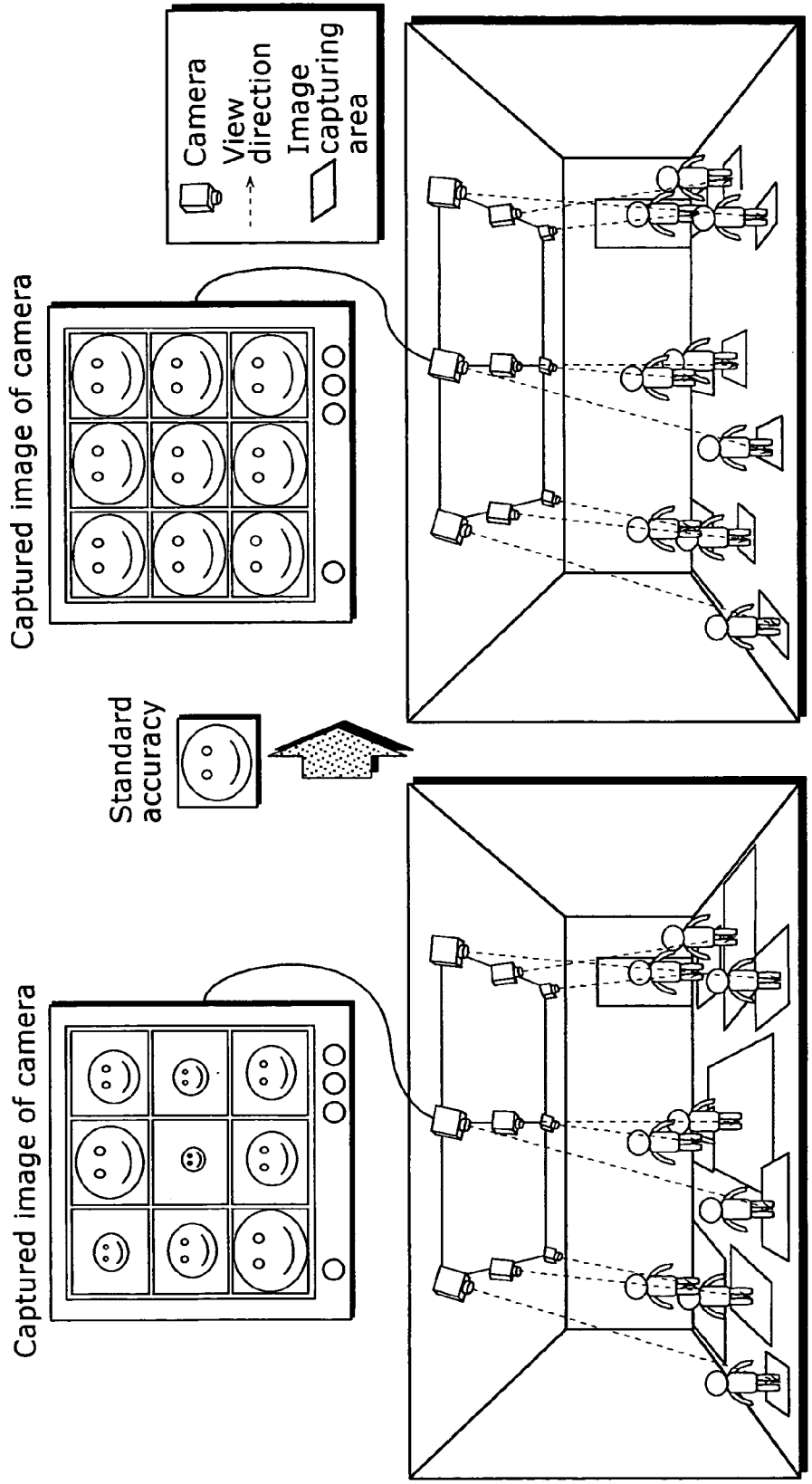
FIG. 55 is a diagram illustrating operations of a camera.

In FIG. 55, the standard accuracy is provided to each of the cameras 701, and the image capturing accuracy of each camera 701 can be equalized.

Thus, for example, in recognizing a face and the like, in the case where a template image is previously prepared for comparison, image capturing accuracy is set for the standard accuracy, the image capturing accuracy enabling to capture the image having the same resolution as the template image. Thus, the images can be acquired from all of the cameras 701 included in the monitor system, the images having the resolution suitable for the process of recognizing the face.

Eighth Embodiment

Next, the eighth embodiment will be explained.

Figure 56:
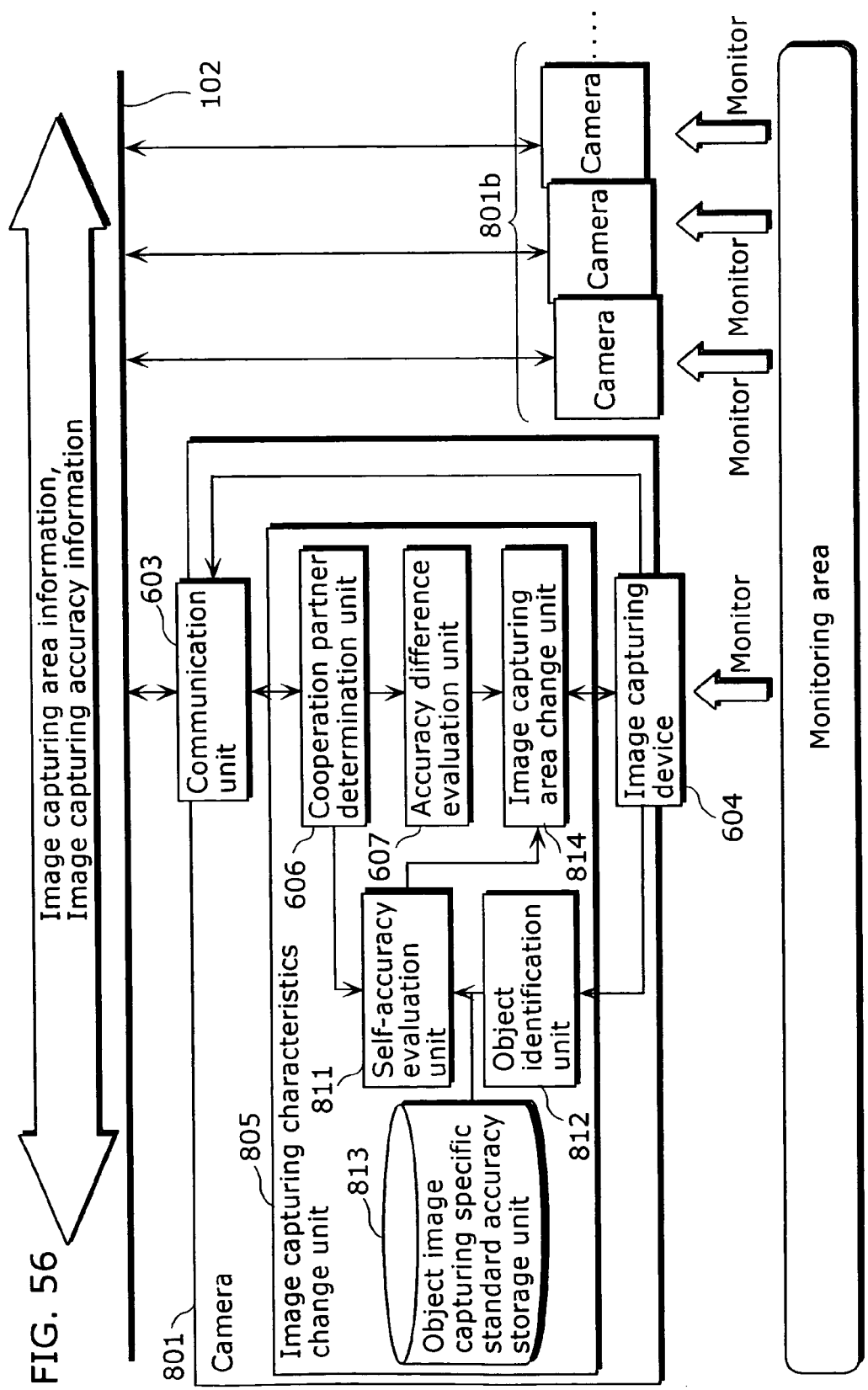
FIG. 56 is a block diagram showing a structure of the eighth embodiment according to the present invention.

FIG. 56 is a diagram showing a structure of a monitor system according to the eighth embodiment of the present invention. This monitor system includes: a plurality of cameras 801 and 801b made up of the same components; and a communication medium 102 which transmits information related to the image capturing characteristics of each of the cameras 801 and 801b. And, the image capturing accuracy is changed depending on whether or not each camera has detected an object in the image capturing area. One camera 801 will be mainly explained as follows. In FIG. 56, the same components as shown in FIG. 44 are assigned with the same codes, and the explanation will be omitted.

The camera 801 is an autonomous cooperation camera according to the eighth embodiment.

The image capturing characteristics change unit 805 is a processing unit which changes the image capturing characteristics in cooperation with the surrounding cameras. And, the image capturing characteristics change unit 801 includes: a cooperation partner determination unit 606; an accuracy difference evaluation unit 609; a self-accuracy evaluation unit 811; an object identification unit 812; an object image capturing specific standard accuracy storage unit 813; and an image capturing accuracy change unit 814.

The self-accuracy evaluation unit 811 is a processing unit which provides, for the image capturing accuracy of the camera 801, (i) a target value H in the case where the image capturing accuracy has a predetermined value, and (ii) an evaluation value H which monotonically recedes from the target value H as the accuracy recedes from the predetermined value.

The object identification unit 812 is a processing unit which judges whether or not an object exists in the image capturing area.

The object image capturing specific standard accuracy storage unit 813 is a memory and the like which store the image capturing accuracy for capturing the image of the object.

The image capturing accuracy change unit 814 is a processing unit which changes the accuracy determination parameters of the image capturing device 604 so that the evaluation value H approaches the target value H as well as the evaluation value F. Concretely, in the case where the object identification unit 812 identifies an object in the image capturing area, the image capturing accuracy change unit 814 controls the image capturing device 604 so that the image capturing accuracy of the camera 801 becomes the image capturing accuracy stored in the object image capturing specific standard accuracy storage unit 813. In the case where the object identification unit 812 does not identify an object, as well as the sixth embodiment, the image capturing accuracy change unit 814 controls the image capturing device 604 so that the image capturing accuracy of the camera 801 becomes the same as the other cameras.

In the background art, one camera captures an image in a wide range, and the other camera captures a specific image of an object. And, these functions cannot be switched depending on the situation.

On the other hand, according to the structure of the eighth embodiment, when an object intrudes in the image capturing area of the camera 801, the camera 801 changes the image capturing accuracy in order to capture a detailed image of the object. And, when the object disappears from the image capturing area, the camera 801 can change the image capturing accuracy again so that the image capturing accuracy of the camera 801 can be equal to the image capturing accuracy of the surrounding cameras. Thereby, the functions can be automatically switched so that the camera 801 existing close to the object captures a detailed image of the object, and the other cameras 801b capture the image of the area surrounding the object using the same image capturing accuracy.

Figure 57A:
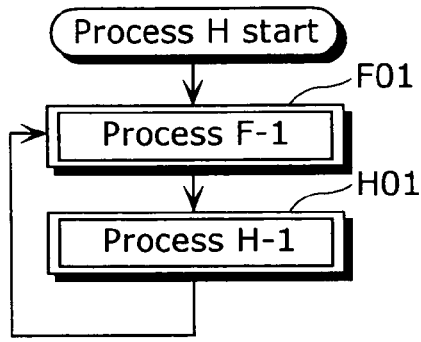
FIGS. 57A and 57B are flow charts explaining operations of the eighth embodiment.
Figure 57B:
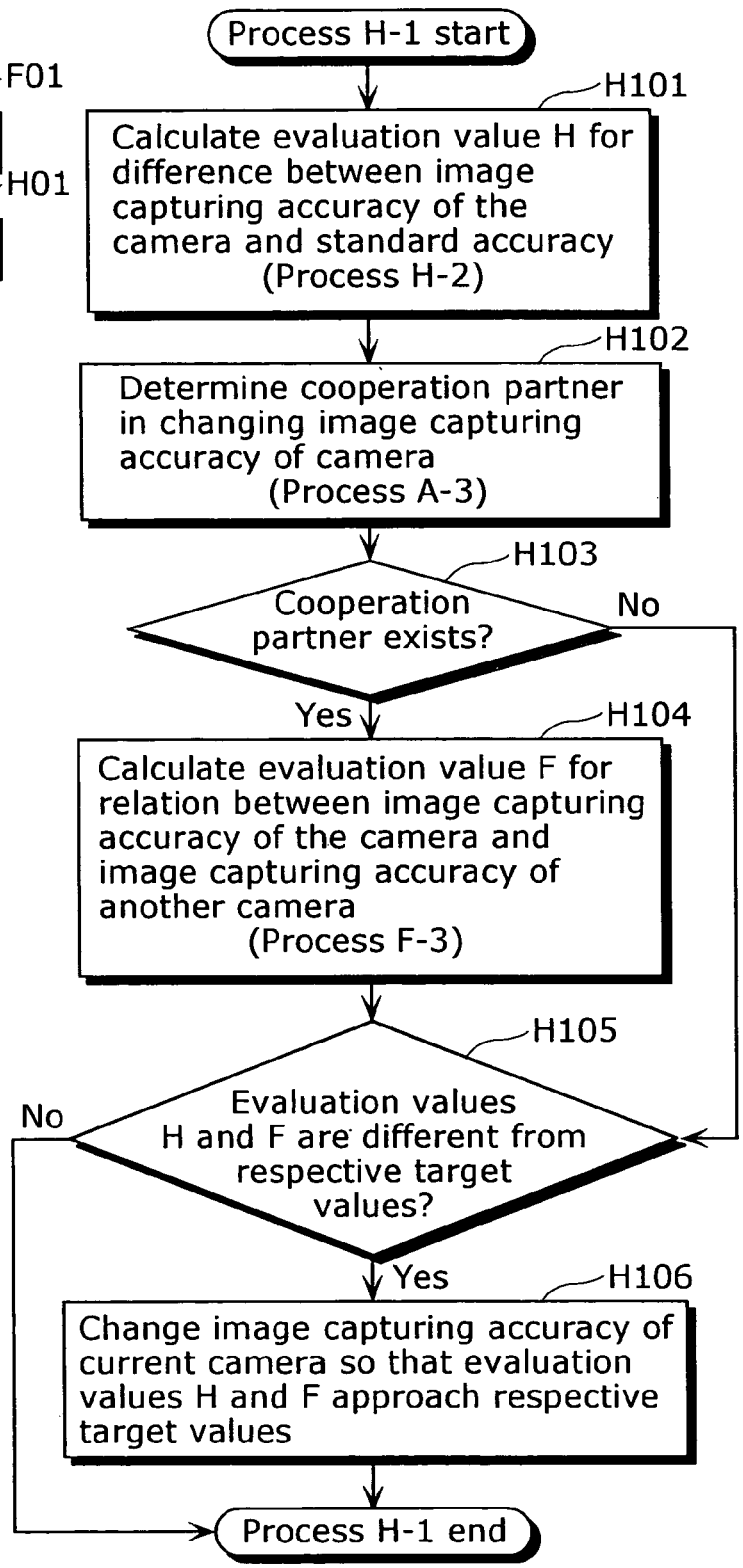

Next, the procedures for changing the image capturing accuracy of the camera 801 included in the monitor system will be explained using the flow charts as shown in FIGS. 57A and 57B. FIGS. 57A and 57B are flow charts showing the procedures in which the camera 801 changes the image capturing accuracy. In FIGS. 57A and 57B, the same operational procedures as shown in FIGS. 45A, 45B and 45C are assigned with the same codes, and the explanation will be omitted.

(Process H)
(Step H01) The process in the image capturing characteristics change unit 805 is started.

(Process H-1)
(Step H101) The self-accuracy evaluation unit 811 calculates an evaluation value H for the image capturing accuracy of the camera 801.
(Step H102) The cooperation partner determination unit 606 determines the cooperation partner in changing the image capturing accuracy of the camera 801.
(Step H103) The cooperation partner determination unit 606 judges whether or not the cooperation partner exists in changing the image capturing accuracy of the camera 801. In the case where the cooperation partner exists, the process is proceeded to step H104. In the case where the cooperation partner does not exist, the process is proceeded to step H105.
(Step H104) The accuracy difference evaluation unit 609 calculates an evaluation value F for the difference between (i) the predetermined image capturing accuracy of the cooperation partner and (ii) the predetermined image capturing accuracy of the camera 801.
(Step H105) The accuracy difference evaluation unit 609 judges whether or not the evaluation values F and H are different from the respective predetermined target values. In the case where the evaluation values are different from the respective target values, the process is proceeded to step H106. In the case where the evaluation values are equal to the target values, the process H-1 is ended.

(Step H106) The image capturing accuracy change unit 814 changes the accuracy determination parameters of the camera 801 so that the evaluation values F and H approach the respective target values, and the process H-1 is ended.

The steps F01 (process F-1) and H01 (process H-1) are repeated subsequently.

Figure 58:
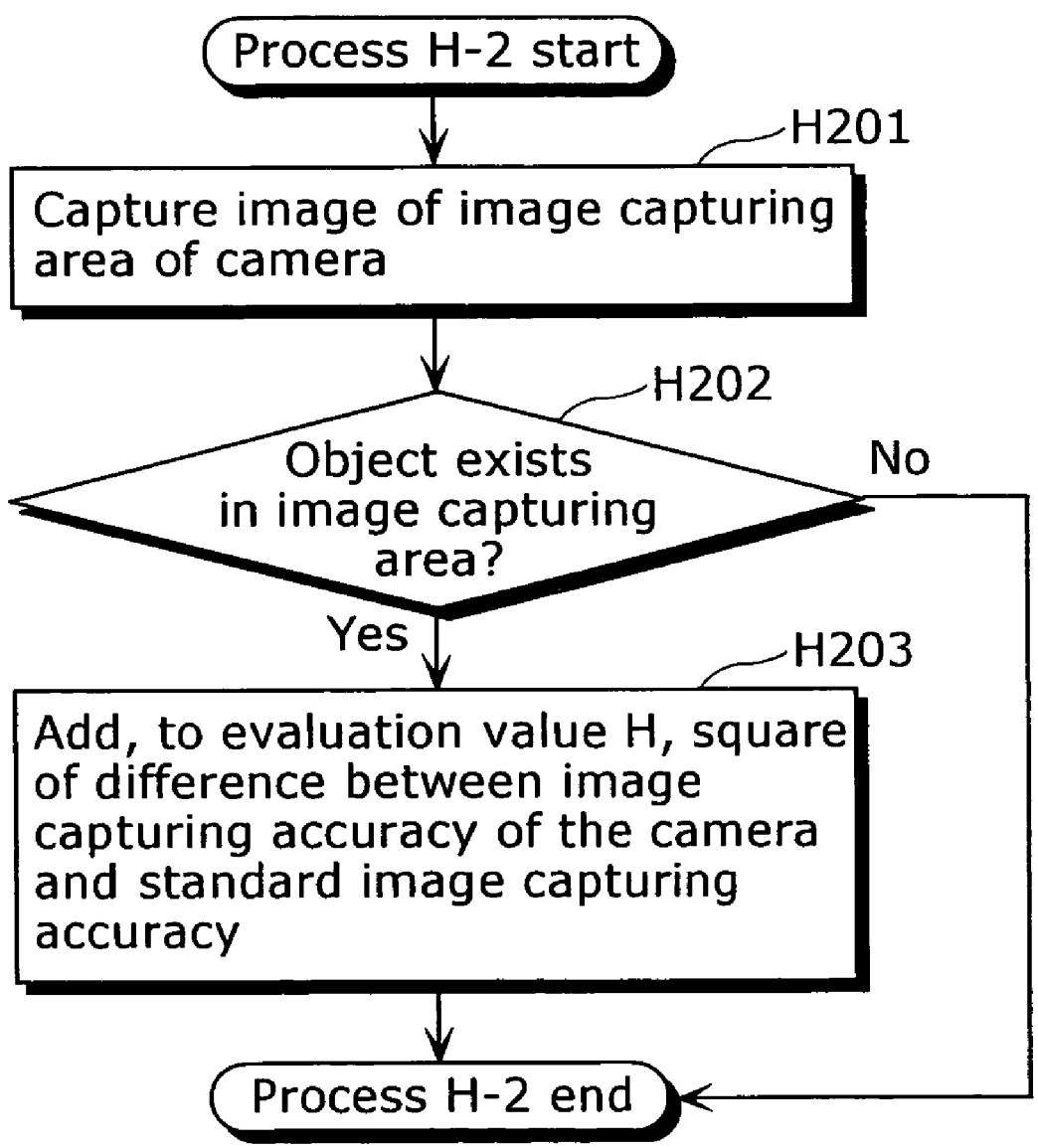
FIG. 58 is a flow chart explaining orders for evaluating image capturing accuracy of a camera.
Figure 59:
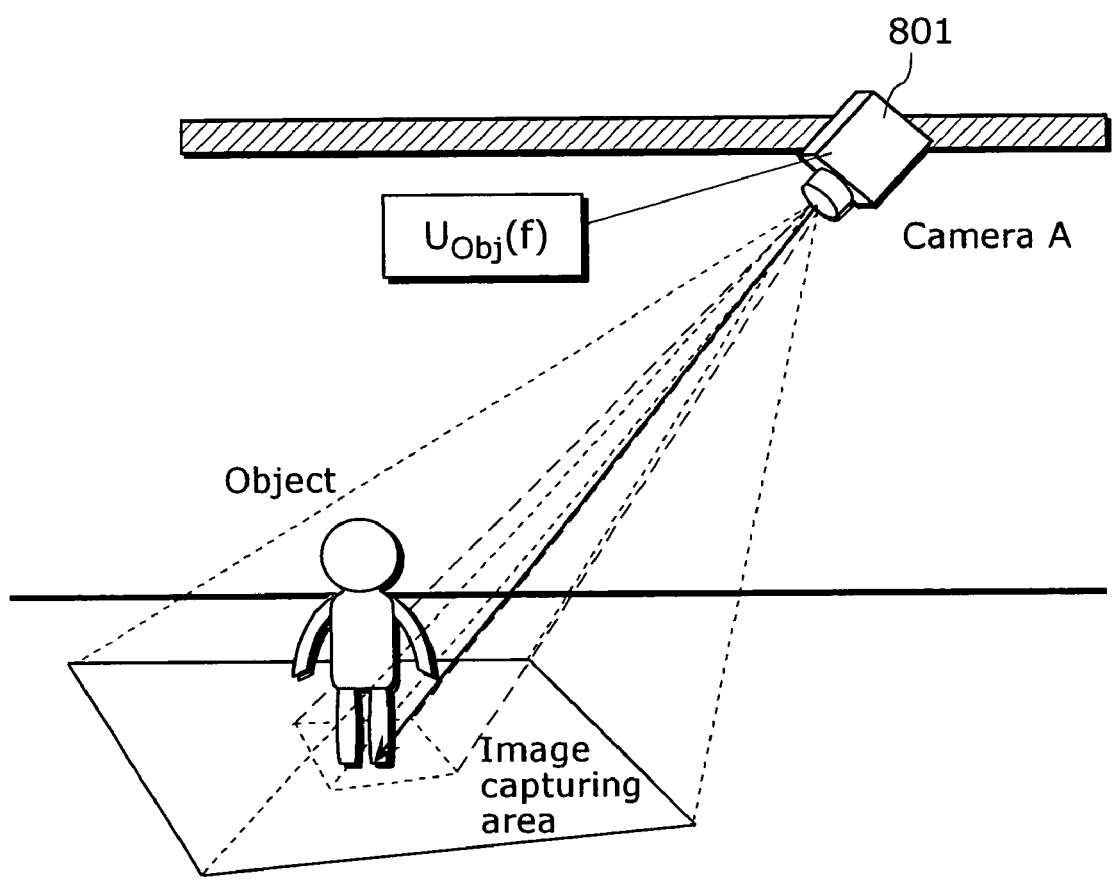
FIG. 59 is a diagram illustrating en evaluation function H of a camera.

Next, the procedures in which the self-accuracy evaluation unit 811 provides an evaluation value H for the difference between the image capturing accuracy of the camera 801 and the standard accuracy for capturing the image of the object will be explained using the flow chart as shown in FIG. 58. FIG. 59 is a diagram for explaining the following equation 54 which is an example of the evaluation function H that evaluates the difference between the image capturing accuracy of the camera 801 and the standard accuracy for capturing the image of the object.

If Object ∈ "image capturing area" then $$U_{obj}(f) = (f - f_{obj})^2 \qquad \text{(Equation 54)}$$

Here, standard focal distance: $f_{obj}$ (Process H-2)

(Step H201) The image capturing area of the camera 801 is captured.

(Step H202) It is judged whether or not an object exists in the image capturing area. In the case where an object exists, the process is proceeded to step H203. In the case where an object does not exist, the process H-2 is ended.

(Step H203) An evaluation value H is calculated for the relation between the standard accuracy ($f_{obj}$) and the image capturing accuracy information and accuracy determination parameters (f) of the camera 801, using the above equation 54 expressing the evaluation function H. And, the process H-2 is ended.

Here, in addition to the equation 54, the evaluation function H may be a function by which, within the range the accuracy determination parameters (f) of the camera 801 can be changed, (i) when the predetermined image capturing accuracy of the camera 801 are equal to the standard accuracy for capturing the image of the object, the evaluation value H becomes the smallest (or the largest), and (ii) as the difference between the predetermined image capturing accuracy of the camera and the standard accuracy for capturing the image of the object increases, the evaluation value H monotonically increases (or decreases).

Next, changing the image capturing accuracy of the camera 801 (step H106) will be explained.

The image capturing accuracy change unit 814 according to the eighth embodiment changes the accuracy determination parameters (f) so that the evaluation values F and H approach the minimum value (or the maximum value) as the respective target values F and H.

The procedures for having the evaluation value F approach the minimum value (or the maximum value) are the same as the sixth embodiment. As the procedures for having the evaluation value H approach the minimum value (or the maximum value), for example, the accuracy determination parameters (f) of the camera 801 are changed according to the following update equation 55 which uses a derivative derived by partially differentiating the above mentioned evaluation function H using the accuracy determination parameters (f).

If Object ∈ "image capturing area" then $$\frac{df}{dt} = -\alpha_f \frac{\partial U_{obj}}{\partial f} \qquad \text{(Equation 55)}$$

Here, $\alpha_f$ is coefficient.

Next, an operational example of the camera 801 according to the eighth embodiment will be explained using FIG. 60. Here, a plurality of cameras 801 are set in the ceiling of a room where the ceiling level is equal and the floor is rectangular. And, the image of the floor is captured.

Figure 60:
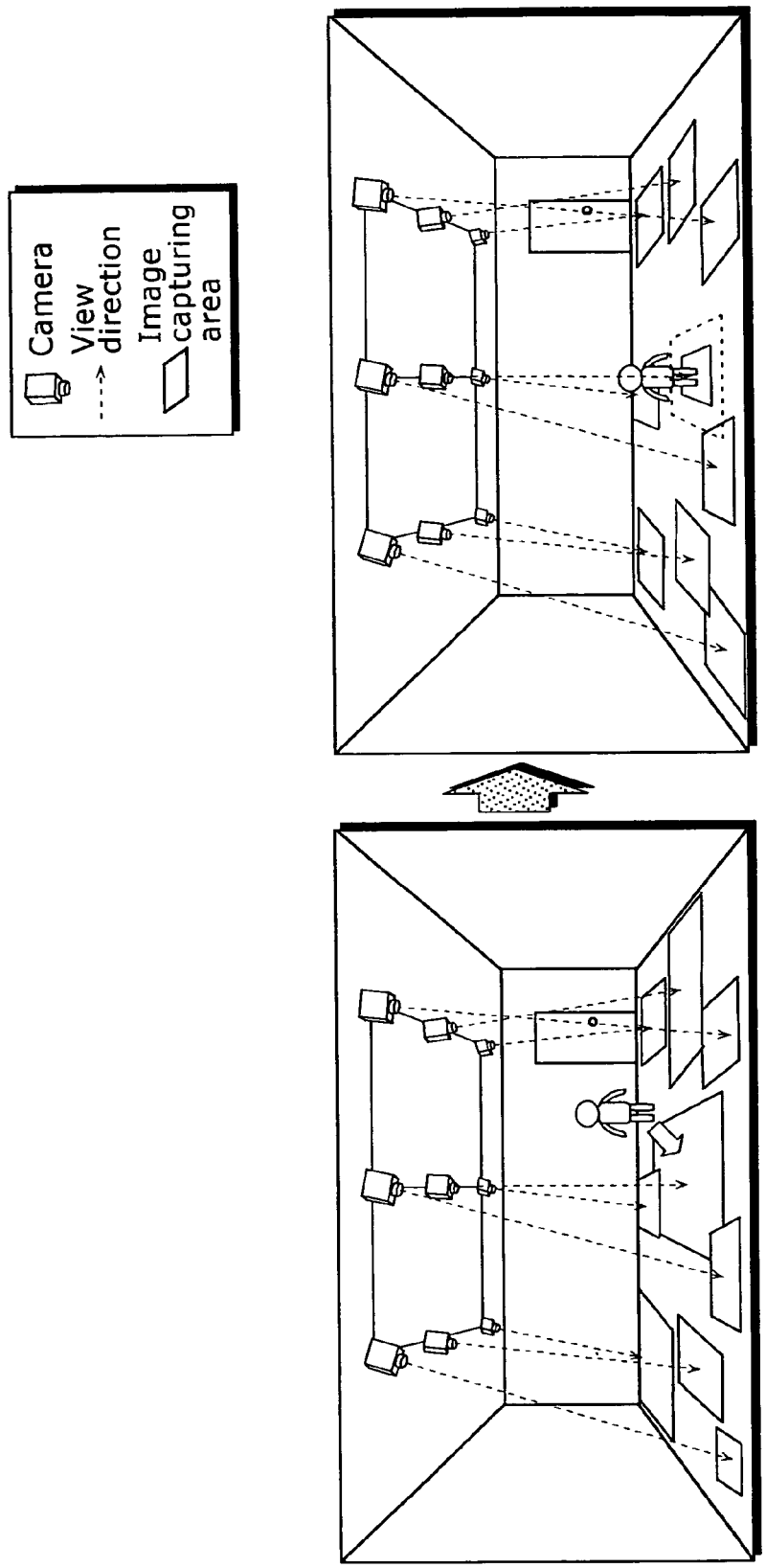
FIG. 60 is a diagram illustrating operations of a camera.

As shown in FIG. 60, when a predetermined object appears in the image capturing area, each camera 801 captures an image of the object using the predetermined standard accuracy. Also, when an object disappears from the image capturing area, each camera 801 equalizes the image capturing accuracies of the camera 801 and the surrounding cameras 801b again.

Thus, in the case where an object does not exist in the monitoring area, all of the cameras 801 capture the image of the monitoring area using the same image capturing accuracy. In the case where an object exists, it is possible to cause only the camera 801 which has captured the object to monitor the object in detail.

Ninth Embodiment

Next, the ninth embodiment of the present invention will be explained.

Figure 61:
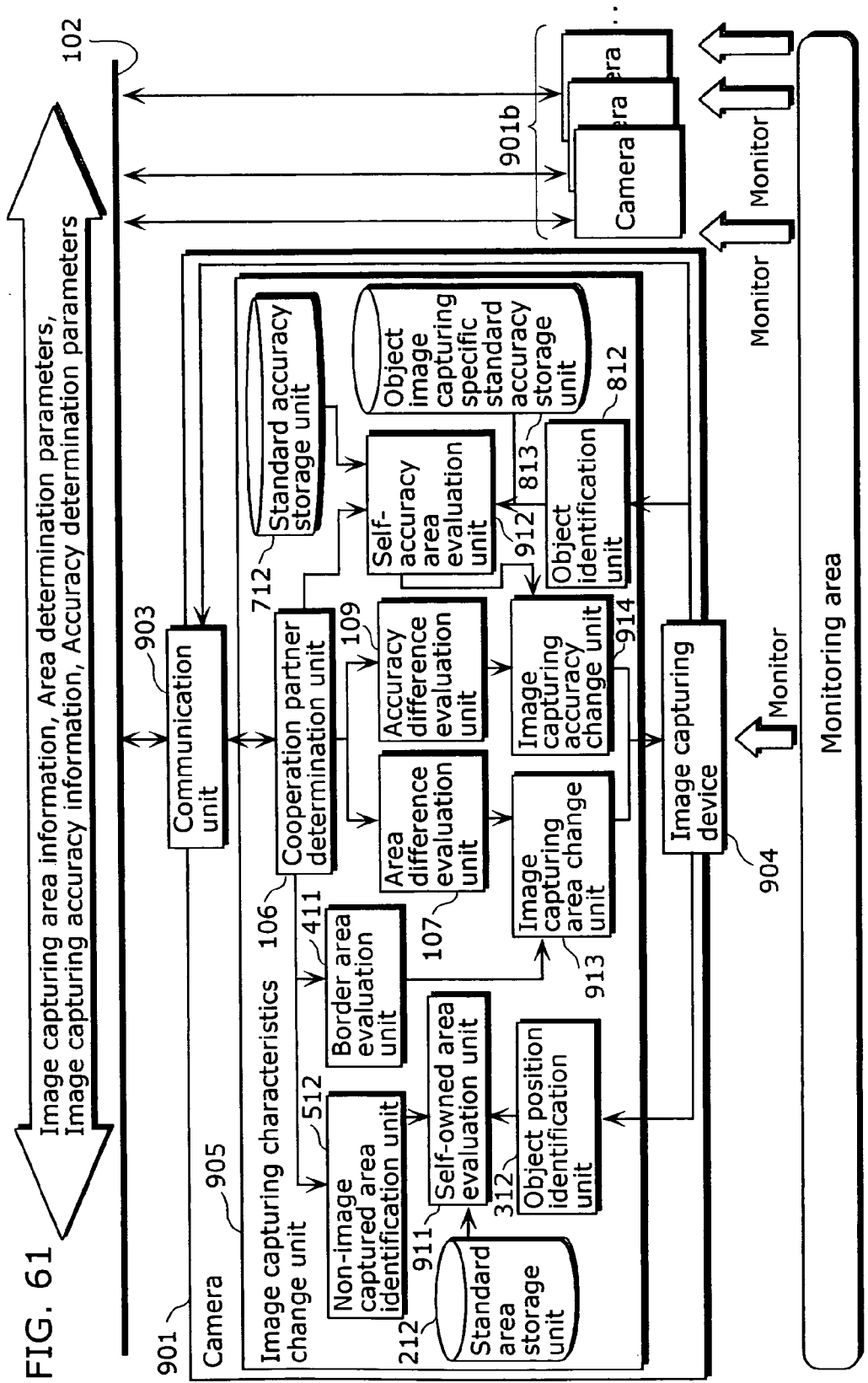
FIG. 61 is a block diagram showing a structure of the ninth embodiment according to the present invention.
Figure 62:
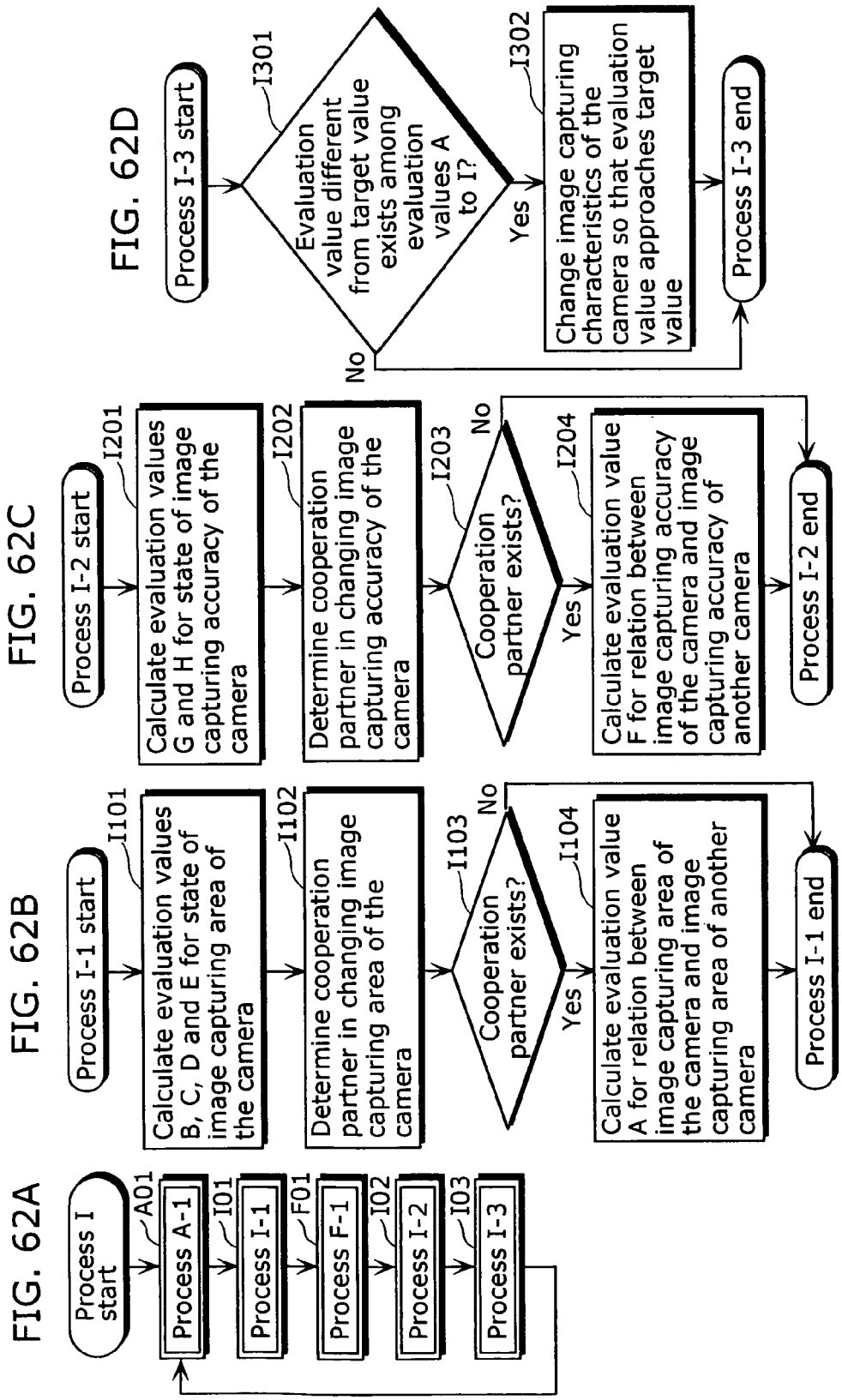
FIGS. 62A, 62B, 62C and 62D are flow charts explaining operations of the ninth embodiment.

FIG. 61 is a diagram showing a structure of a monitor system according to the ninth embodiment of the present invention. This monitor system includes: a plurality of cameras 901 and 901b made up of the same components; and a communication medium 102 which transmits information related to image capturing characteristics of each of the cameras 901 and 901b. And, each camera has a function of adjusting the image capturing area and image capturing accuracy according to the first to eighth embodiments. One camera 901 will be mainly explained as follows. In FIG. 61, the same components as shown in FIGS. 9, 20, 25, 30, 38, 44, 51 and 56 are assigned with the same codes, and the explanation will be omitted.

The camera 901 is an autonomous cooperation camera according to the ninth embodiment.

The communication unit 903 is a communication interface which communicates the image capturing area information, area determination parameters, image capturing accuracy information and accuracy determination parameters of the camera 901.

The image capturing characteristics change unit 905 is a processing unit which changes image capturing characteristics in cooperation with the surrounding cameras. And, the image capturing characteristics change unit 905 includes: a cooperation partner determination unit 106; an area difference evaluation unit 107; an accuracy difference evaluation unit 109; a standard area storage unit 212; an object position identification unit 312; a border area evaluation unit 411; a non-image captured area identification unit 512; a standard accuracy storage unit 712; an object identification unit 812; an object image capturing specific standard accuracy storage unit 813; a self-owned area evaluation unit 911; a self-accuracy evaluation unit 912; an image capturing area change unit 913; and an image capturing accuracy change unit 914.

The self-owned are evaluation unit 911 is a processing unit which provides evaluation values B, C, D and E for the image capturing area of the camera 901.

The self-accuracy evaluation unit 912 is a processing unit which provides evaluation values G and H for the image capturing accuracy of the camera 901.

The image capturing area change unit 913 is a processing unit which changes the area determination parameters so that the evaluation values A, B, C, D and E approach the respective target values. In other words, the image capturing area change unit 913 has a function of the image capturing area change unit according to the first to the fifth embodiments.

In the background art, it is not possible to simultaneously (i) capture the image of the whole monitoring area thoroughly by operating a plurality of cameras in cooperation and (ii) track and capture the detailed image of an object which exists in the monitoring area.

On the other hand, according to the structure of the ninth embodiment, the area difference evaluation unit 107, the border area evaluation unit 411 and the self-owned area evaluation unit 911 respectively calculate the evaluation values A, B, C, D and E for the image capturing area of the camera 901. And, the image capturing area change unit 913 changes the image capturing area so that the evaluation values A, B, C, D and E approach the respective predetermined target value. Thus, the image of the whole monitoring area can be thoroughly captured, the image having few distortions.

Also, the accuracy difference evaluation unit 109 and the self-accuracy evaluation unit 912 calculate the evaluation values F and G for the image capturing accuracy of the camera 901. And, the image capturing accuracy change unit 914 changes the image capturing accuracy so that the evaluation values F and G approach the respective predetermined target values. Thus, all of the cameras 901 can capture the image having the same image capturing accuracy.

Also, in the case where an object exists in the image capturing area of the camera 901, the object position identification unit 312 and the object identification unit 812 identify the object and the position. The self-owned area evaluation unit 911 calculates the evaluation value C. The self-accuracy evaluation unit 912 calculates the evaluation value H. The image capturing area change unit 913 and the image capturing accuracy change unit 914 change the image capturing area and the image capturing accuracy so that the evaluation values C and H approach the respective target values. Thus, it is possible to track and capture the detailed image of the object using the changed image capturing accuracy.

Next, the procedures for changing the image capturing area and image capturing accuracy of the camera 901 included in the monitor system will be explained using the flow charts as shown in FIGS. 62A, 62B, 62C and 62D. FIGS. 62A, 62B, 62C and 62D are flow charts showing the procedures in which the camera 901 changes the image capturing accuracy. In FIGS. 62A, 62B, 62C and 62D, the same operational procedures as shown in FIGS. 10A, 10B and 10C and FIGS. 45A, 45B and 45C are assigned with the same codes, and the explanation will be omitted.

(Process I)

(Step I101) The self-owned area evaluation unit 911 calculates the evaluation values B, C, D and E for the image capturing area of the camera 901.

(Step I102) The cooperation partner determination unit 106 determines the cooperation partner in changing the image capturing area of the camera 901.

(Step I103) The cooperation partner determination unit 106 judges whether or not the cooperation partner exists in changing the image capturing area of the camera 901. In the case where the cooperation partner exists, the process is proceeded to step I104. In the case where the cooperation partner does not exist, the process I-1 is ended.

(Step I104) The area difference evaluation unit 107 calculates an evaluation value A for the position relation between the image capturing area of the cooperation partner and the image capturing area of the camera 901, and the process I-1 is ended.

(Process I-2)

(Step I201) The self-accuracy evaluation unit 912 calculates the evaluation values G and H for the image capturing accuracy of the camera 901.

(Step I202) The cooperation partner determination unit 106 determines the cooperation partner in changing the image capturing accuracy of the camera 901.

(Step I203) The cooperation partner determination unit 106 judges whether or not the cooperation partner exists in changing the image capturing accuracy. In the case where the cooperation partner exists, the process is proceeded to step I204. In the case where the cooperation partner does not exist, the process E-2 is ended.

(Step I204) The accuracy difference evaluation unit 109 calculates an evaluation value F for the difference between the image capturing accuracy of the cooperation partner and the image capturing accuracy of the camera 901, and the process I-2 is ended.

(Process I-3)

(Step I301) It is judged whether or not a predetermined target value exists among the evaluation values A, B, C, D, E, F, G and H. In the case where the evaluation value different from the target value exists, the process is proceeded to step I302. In the case where the evaluation value different from the target value does not exist, the process I-3 is ended.

(Step I302) The area determination parameters ($\theta_P$, $\theta_T$, f) and the accuracy determination parameters (f) are changed so that the evaluation values A, B, C, D, E, F, G and H approach the respective predetermined target values. And, the process I-3 is ended.

The steps A01 (process A-1), I01 (process I-1), F01 (process F-1), I02 (process I-2) and I03 (process I-3) are repeated subsequently.

The image capturing change unit 913 and the image capturing accuracy change unit 914 according to the ninth embodiment change the area determination parameters ($\theta_P$, $\theta_T$, f) and the accuracy determination parameters (f) of the camera according to the following update equations 56, 57 and 58 which uses derivatives derived by partially differentiating the evaluation values A, B, C, D, E, F, G and H using the are determination parameters ($\theta_P$, $\theta_T$, f) and accuracy determination parameters (f).

$$\frac{d\theta_P}{dt} = -\frac{\alpha_P}{N}\frac{\partial \sum_{n=1}^{N} V_{con}}{\partial \theta_P} - \beta_P \frac{\partial V_{self}}{\partial \theta_P} - \gamma_P \frac{\partial V_{obj}}{\partial \theta_P} - \frac{\delta_P}{Q}\frac{\partial \sum_{q=1}^{Q} V_{wallq}}{\partial \theta_P} - \frac{\varepsilon_P}{R}\frac{\partial \sum_{r=1}^{R} V_{blankCr}}{\partial \theta_P} - \frac{\zeta_P}{S}\frac{\partial \sum_{s=1}^{S} V_{blankSs}}{\partial \theta_P}$$

(Equation 56)

-continued $$\frac{d\theta_T}{dt} = -\frac{\alpha_T}{N}\frac{\partial \sum_{n=1}^{N} V_{con}}{\partial \theta_T} - \beta_T \frac{\partial V_{self}}{\partial \theta_T} - \gamma_T \frac{\partial V_{obj}}{\partial \theta_T} -$$
$$\frac{\delta_T}{Q}\frac{\partial \sum_{q=1}^{Q} V_{wallq}}{\partial \theta_T} - \frac{\varepsilon_T}{R}\frac{\partial \sum_{r=1}^{R} V_{blankCr}}{\partial \theta_T} -$$
$$\frac{\zeta_T}{S}\frac{\partial \sum_{s=1}^{S} V_{blankSs}}{\partial \theta_T}$$

(Equation 57)

$$\frac{df}{dt} = -\frac{\alpha_f}{N}\frac{\partial \sum_{n=1}^{N} V_{con}}{\partial f} - \frac{\beta_f}{M}\frac{\partial \sum_{m=1}^{M} U_{com}}{\partial f} -$$
$$\gamma_f \frac{\partial U_{self}}{\partial f} - \delta_f \frac{\partial U_{obj}}{\partial f} - \frac{\varepsilon f}{L}\frac{\partial \sum_{l=1}^{L} V_{wallI}}{\partial \theta_f} -$$
$$\frac{\zeta f}{S}\frac{\partial \sum_{s=1}^{S} V_{blankSs}}{\partial f}$$

(Equation 58)

Here, $\alpha_P, \alpha_T, \alpha_f, \beta_P, \beta_T, \beta_f, \gamma_P, \gamma_T, \gamma_f, \delta_P, \delta_T, \delta_f, \epsilon_P, \epsilon_T, \epsilon_f, \zeta_P, \zeta_T, \zeta_f$ are coefficients.

N, M are numbers of cooperation partners.

Q is number of walls which interact with current camera.

R, S are numbers of adjacent non-image captured areas.

Next, an operational example of the camera 901 according to the ninth embodiment will be explained using FIG. 63. Here, a plurality of cameras 901 are arbitrarily set in the ceiling of a room where the ceiling level is equal and the floor is rectangular. And, the image of the floor is captured.

Figure 63:
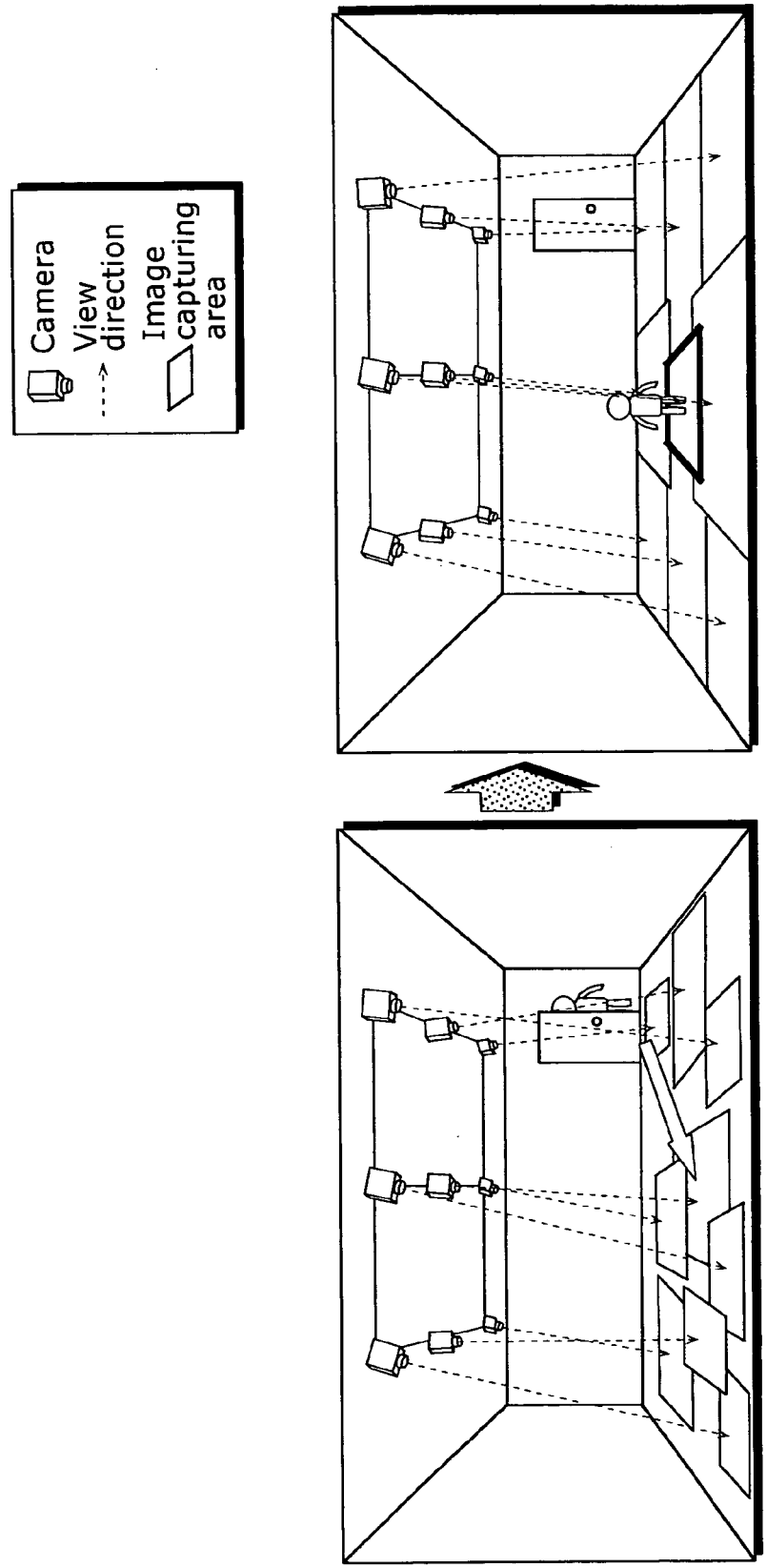
FIG. 63 is a diagram illustrating operations of a camera.

As shown in FIG. 63, even in the case where a plurality of cameras 901 are set in the arbitrary positions of the ceiling, assigning the image capturing area of each camera 901 and setting the image capturing accuracy can be automatically performed.

Also, in the case where an object exists in the monitoring area, while monitoring the whole monitoring area can be maintained as a monitor system, the object can be tracked and monitored in detail by an arbitrary camera 901.

Next, the procedures for changing the image capturing area in the case where the image capturing area is not rectangular will be explained.

Figure 64:
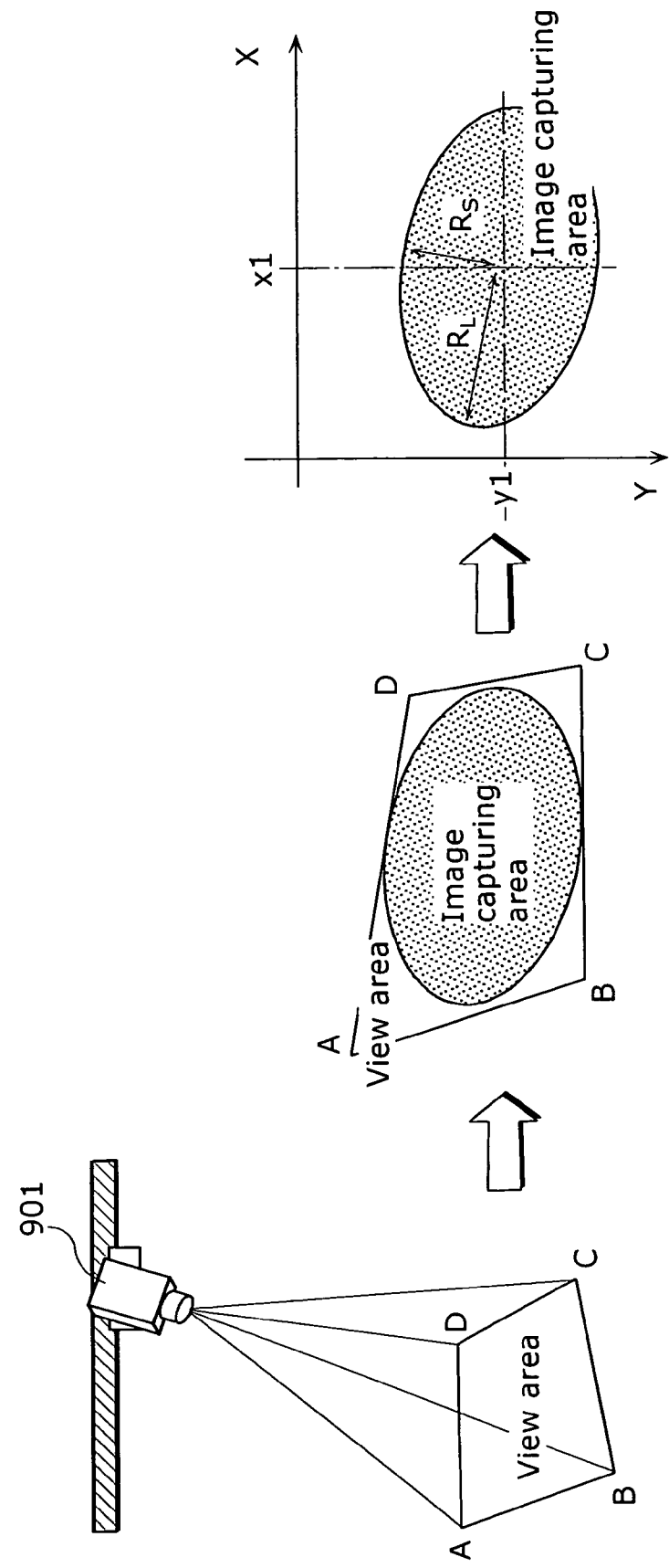
FIG. 64 is a diagram illustrating a relation between a view area and an image capturing area.
Figure 65:
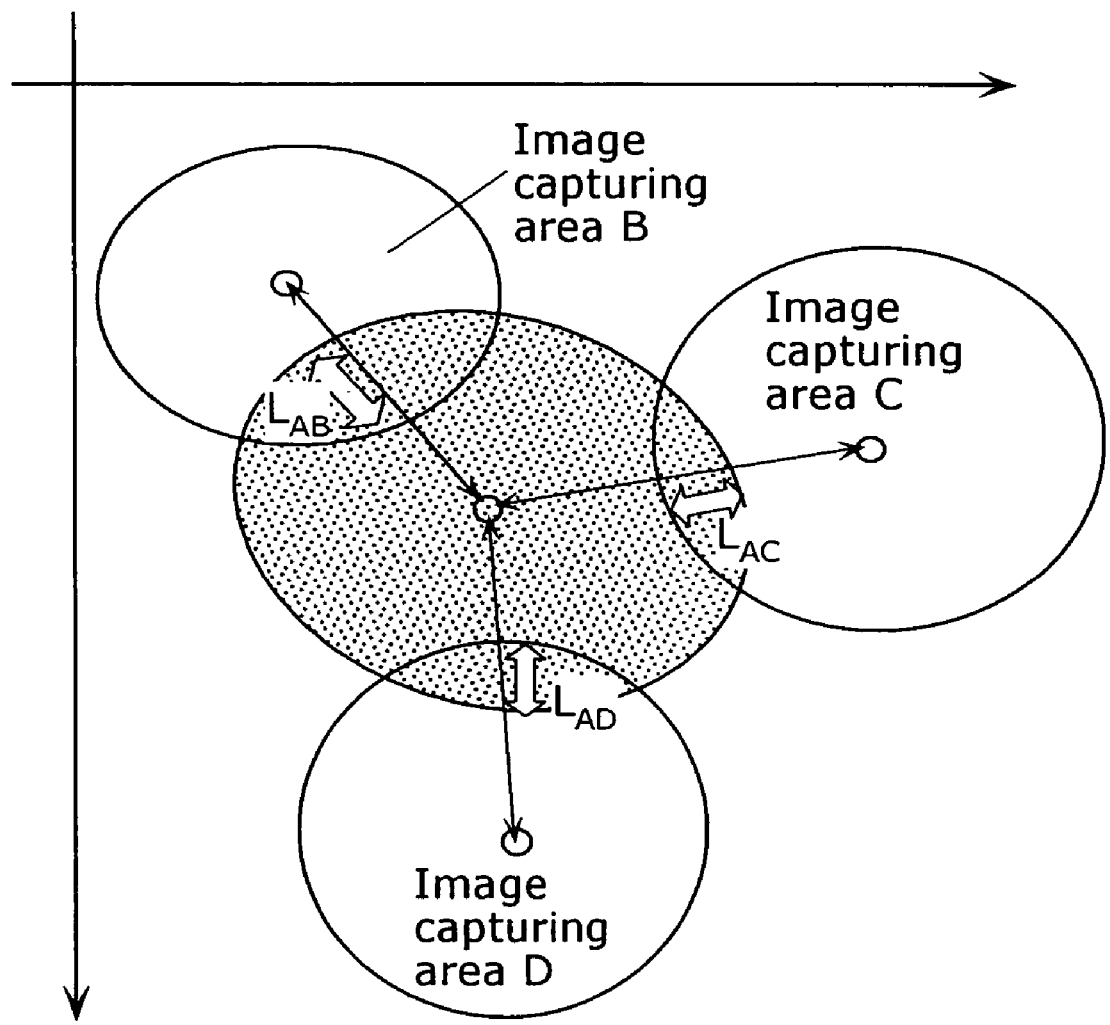
FIG. 65 is a diagram illustrating an evaluation function I of a camera.

In the case where the shape of the image capturing area is an oval inscribed in the view area as shown in FIG. 64, on each of the straight lines connecting the gravity centers of the image capturing areas as shown in FIG. 65, the difference between the distance L for which two image capturing areas overlap and a constant C is evaluated. The evaluation value is calculated by the following equations 59, 60 and 61 expressing an evaluation function I for the relation between the image capturing area A and the surrounding image capturing areas B, C and D as shown in FIG. 65.

$$V_{conB}(L_{AB})=(L_{AB}-C)^2$$ (Equation 59)

$$V_{conC}(L_{AC})=(L_{AC}-C)^2$$ (Equation 60)

$$V_{con}(L_{AD})=(L_{AD}-C)^2$$ (Equation 61)

Here, in addition to the above equations 59, 60 and 61, the evaluation function I may be a function by which, within the range the area determination parameters ($\theta_P$, $\theta_T$, f) of the camera 901 can be changed, (i) when the overlapping distance L between the camera 901 and the other camera 901b is equal to a predetermined constant C, the evaluation value is the smallest (or the largest), and (ii) as the distance L recedes from a predetermined constant C, the evaluation value monotonically increases (or decreases).

Next, an example of the cooperation operation performed by the cameras which have image capturing areas that are not rectangular according to the ninth embodiment will be explained using FIG. 66. Here, a plurality of cameras 901 are set in arbitrary positions in the ceiling of a room where the ceiling level is equal and the floor is rectangular. And, the image of the floor is captured.

Figure 66:
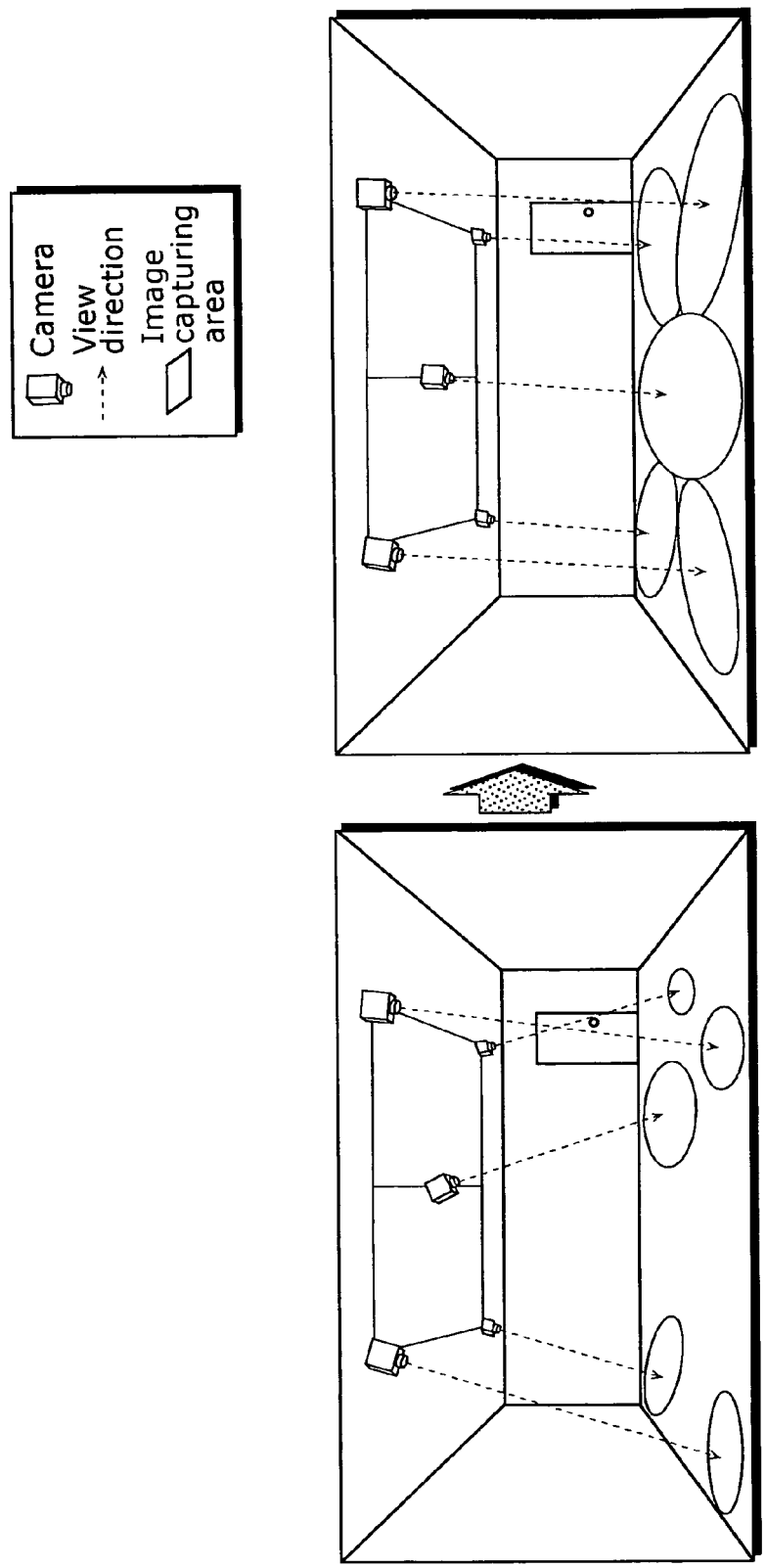
FIG. 66 is a diagram illustrating operations of a camera.

As shown in FIG. 66, each camera 901 has the width L approach a predetermined constant C, the width L being the distance for which the image capturing areas overlap. Thus, even in the case where the shape of the image capturing area is not rectangular, monitoring can be performed so that the image capturing area of each camera 901 is equally distributed in the whole monitoring area.

Also, even in the case where the shape of the image capturing area is a polygon or other shapes, by connecting the gravity centers of the image capturing areas of the cameras 901, and evaluating the overlapping width L on the connected straight lines, the image capturing area information of each camera can be changed.

Figure 67:
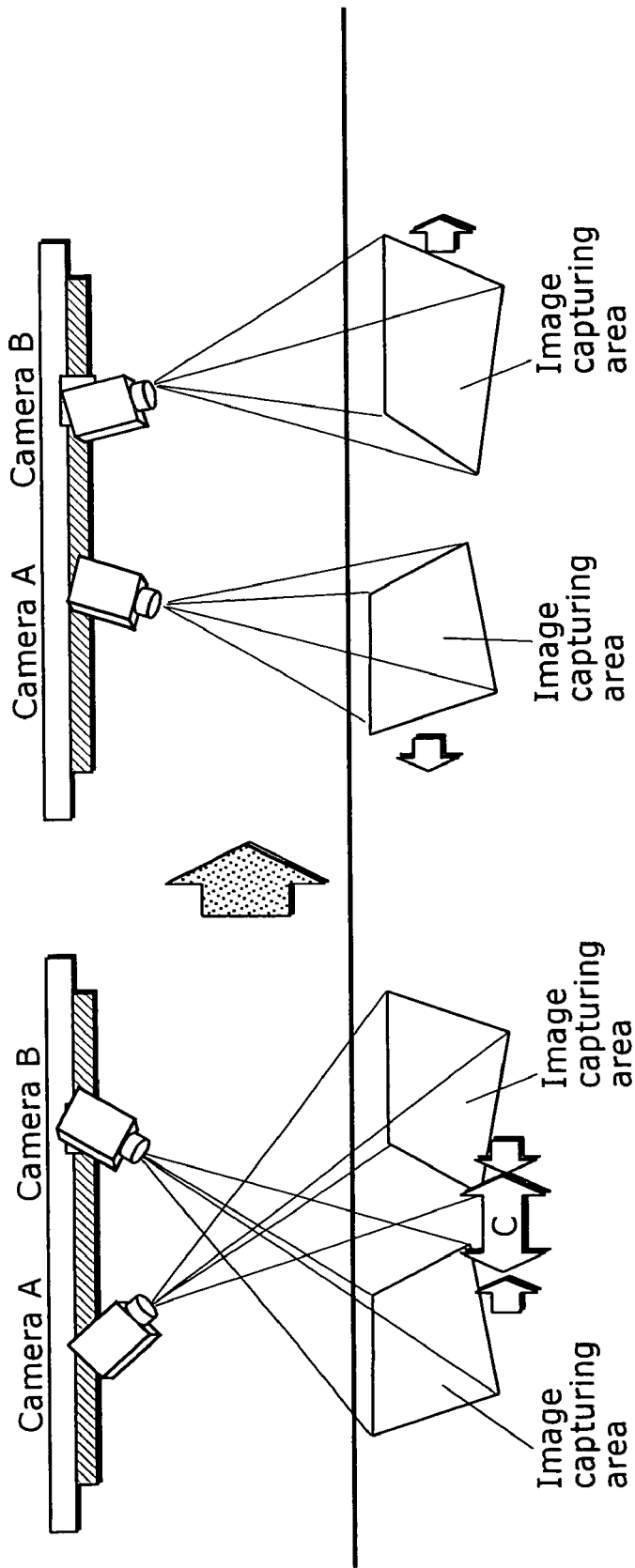
FIG. 67 is a diagram illustrating operations of cameras whose respective setting positions and image capturing areas cross each other.

Next, the procedures for determining the cooperation partner will be explained using FIGS. 67 and 68. In the procedures, the area just under the setting position of the camera is preferentially monitored by excluding the camera whose view line crosses the view line of the camera 901 from the candidates for the cooperation partners.

Figure 69:
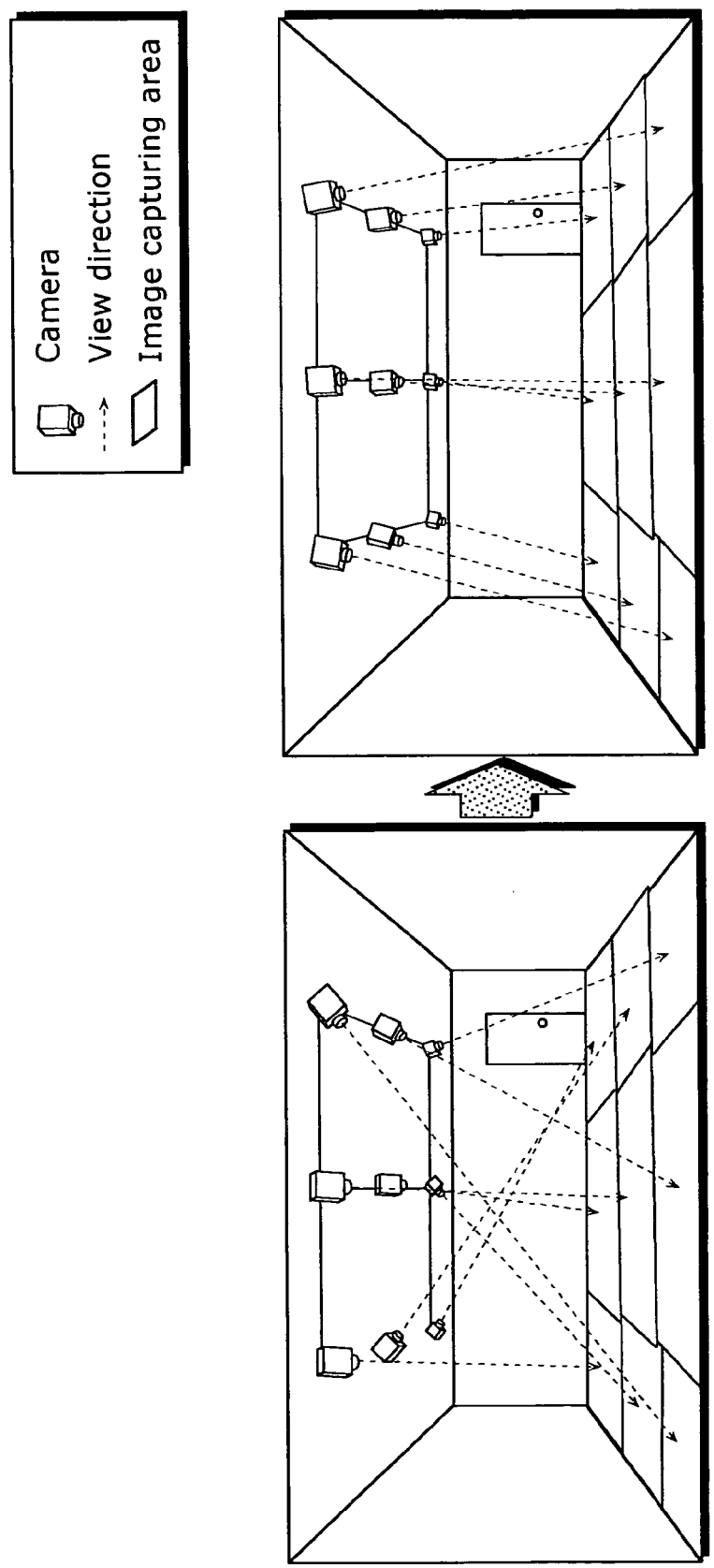
FIG. 69 is a diagram illustrating operations of a camera.

In changing the image capturing area according to the first, second, third, fourth, fifth and ninth embodiments, as shown in the left diagram of FIG. 69, in the case where assigned areas of the image capturing areas are determined while the position relations of the setting positions of the cameras and the image capturing areas cross each other, the view directions of the cameras deviate from the vertical direction. Thus, the image capturing area is turned into a distorted shape from a rectangle. To solve this problem, by excluding the cameras whose view lines cross each other from the cooperation partners, it is possible to prevent the view lines of the cameras from crossing each other as shown in the right diagram of FIG. 69.

Figure 68:
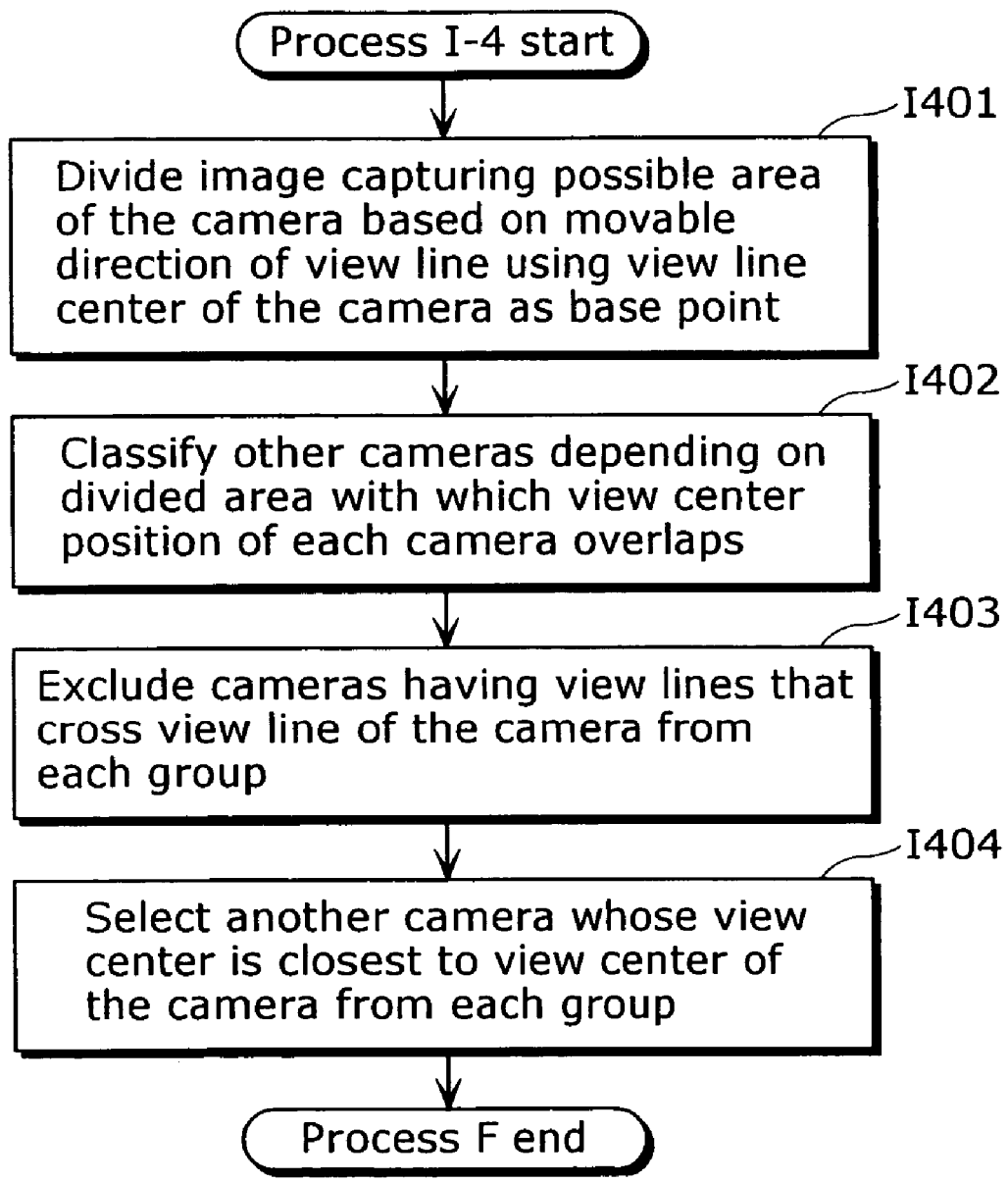
FIG. 68 is a flow chart explaining order for determining a cooperation partner in changing image capturing information of a camera.

FIG. 68 is a flow chart showing procedures for identifying cameras which have image capturing areas adjacent to the image capturing area of the camera by excluding the cameras whose view lines cross the view line of the camera from the cooperation partners, the cameras according to the first, second, third, fourth, fifth and ninth embodiments.

(Process I-4)

(Step I401) The image capturing possible area is divided into a plurality of areas based on a movable direction of the view line of the camera 901, using the center of the image capturing area of the camera 901 as a base point.

(Step I402) The other cameras 901b are classified into groups depending on the area the center of the image capturing area of each of the other cameras 901b is included among the areas divided in the step I401.

(Step I403) The other cameras 901b whose view lines cross the view line of the camera 901 are excluded from each group.

(Step I404) Each camera whose center of the image capturing area is the closest to the center of the image capturing area of the camera 901 is determined as the cooperation partner of the camera 901 from the respective divided areas.

FIG. 69 shows an example of cooperation operation performed by the cameras 901 in the case where the cameras whose view lines cross each other are excluded from the cooperation partners. Here, a plurality of cameras 901 are arbitrarily set in the ceiling of a room where the ceiling level is equal and the floor is rectangular. And, the image of the floor is captured.

Under the state where the cameras 901 included in the monitor system have their view lines crossed with each other as shown in the left diagram of FIG. 69, in the case where the cameras whose view lines cross each other are excluded from the cooperation partners according to the flow chart as shown in FIG. 68, it is possible to change the image capturing area of each camera so that the image capturing area becomes the area just under the setting position of the camera.

Tenth Embodiment

Next, the tenth embodiment of the present invention will be explained.

Figure 70:
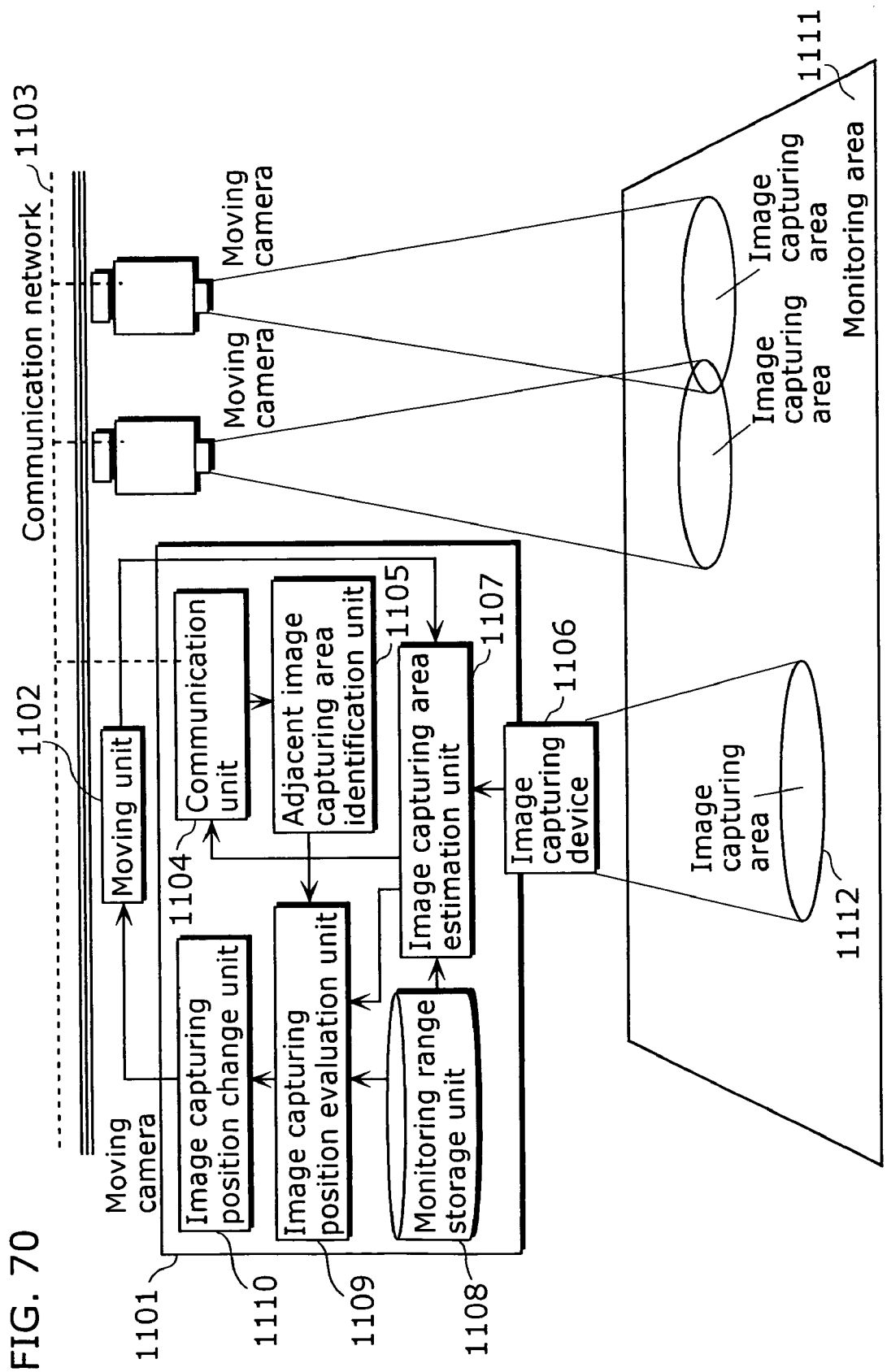
FIG. 70 is a block diagram showing a structure of the tenth embodiment according to the present invention.
Figure 71:
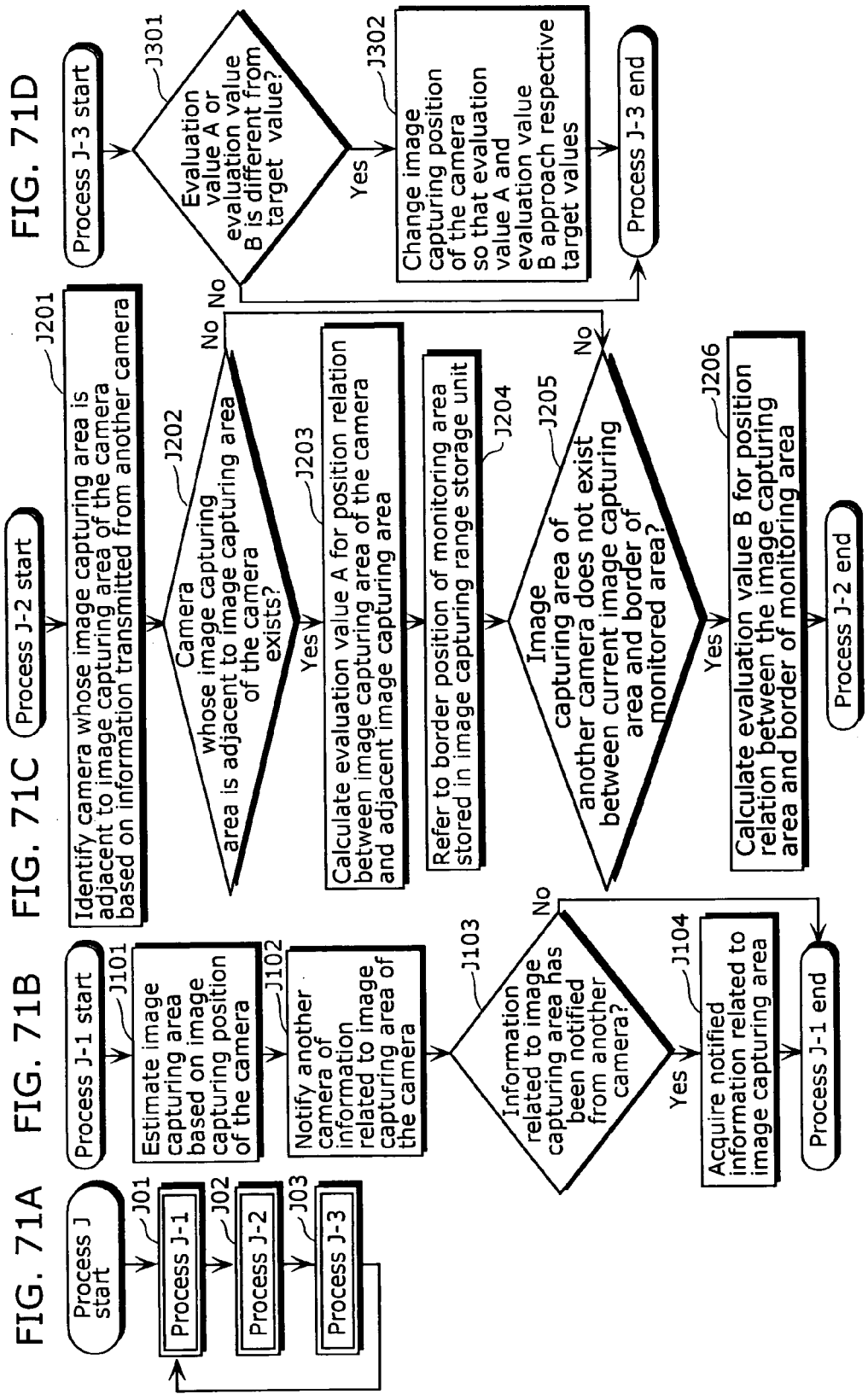
FIGS. 71A, 71B, 71C and 71D are flow charts explaining operations of the tenth embodiment.

FIG. 70 is a block diagram showing a structure of a monitor system according to the tenth embodiment of the present invention. This monitor system includes a plurality of cameras connected via a communication network 1103, each of which is made up of a moving camera 1101 and a moving unit 1102. And, the plurality of moving cameras 1101 move in autonomous cooperation so that the monitoring area 1111 can be thoroughly monitored.

The communication network 1103 is a transmission path which connects the plurality of cameras 1101.

The moving unit 1102 is a mechanical section and the like which change the image capturing position of the moving camera 1101.

The moving camera 1101 is a camera which moves being supported by the moving unit 1102. And, the moving camera 1101 includes: a communication unit 1104; an adjacent image capturing area identification unit 1105; an image capturing device 1106; an image capturing area estimation unit 1107; a monitored range storage unit 1108; an image capturing position evaluation unit 1109; and an image capturing position change unit 1110.

The communication unit 1104 is a communication interface by which the moving camera 1101 exchanges information with other moving cameras via the communication network 1103.

The adjacent image capturing area identification unit 1105 is a processing unit which estimates moving cameras whose image capturing areas are adjacent to the image capturing area of the current moving camera according to the information transmitted from other moving cameras.

The image capturing device 1106 is a CCD camera and the like which takes in the image of the monitoring area.

The image capturing area estimation unit 1107 is a processing unit which estimates the image capturing area of the moving camera 1101 based on the characteristics of the image capturing device 1106 and the position of the moving unit 1102.

The monitored range storage unit 1108 is a memory and the like which store the range of the area which the moving camera 1101 should monitor.

The image capturing position evaluation unit 1109 is a processing unit which evaluates the distance (i) of the overlapping area between the image capturing area of the moving camera 1101 and the adjacent image capturing area and (ii) between the image capturing area of the moving camera 1101 and the border of the monitoring area.

The image capturing position change unit 1110 is a control unit which controls the moving unit 1102 and changes the image capturing position of the moving camera 1101 so that the evaluation value provided by the image capturing position evaluation unit 1109. Concretely, in the case where the distance of the overlapping area of the adjacent image capturing areas does not correspond with a constant target value, the moving unit 1102 is controlled so that the distance of the overlapping area corresponds with the target value. In the case where the distance between the image capturing area of the moving camera 1101 and the border of the monitoring area does not correspond with a constant target value, the moving unit 1102 is controlled so that the distance corresponds with the target value. As a result, the position of each moving camera is controlled so that the portion of the image capturing area is increased, the image capturing area being captured simultaneously by a plurality of moving cameras. And, the position of each moving camera is controlled so that the image capturing areas of the plurality of moving cameras are equally distributed in the monitoring area.

The monitoring area 1111 is an area which the moving camera 1101 should monitor.

The image capturing area 1112 is an area which is captured by the moving camera 1101.

According to the tenth embodiment as described above, the moving camera 1101 exchanges, with the surrounding moving cameras, information related to the image capturing area estimated by its own image capturing position and the characteristics of the image capturing device 106. And, the moving camera 1101 changes the image capturing position in cooperation with the surrounding moving cameras so that (i) the size of the overlapping area between the adjacent image capturing areas and (ii) the distance between the image capturing area of the moving camera 1101 and the border of the monitoring area approach respective predetermined states. Thus, the image capturing positions can be moved so that the blind spots can be reduced in the monitoring area in the simultaneous image capturing by the plurality of cameras 1101.

Next, the operational procedures of the moving cameras included in the monitor system will be explained using the flow charts as shown in FIGS. 71A, 71B, 71C and 71D.

The moving camera 1101 repeatedly performs three processes (processes J-1 to J-3).

First, the following process J-1 (step J01) is performed.

The image capturing are estimation unit 1107 estimates the image capturing area of the moving camera 1101 based on the image capturing position of the moving camera 1101 and the characteristics of the image capturing device (step J101).

The communication unit 1104 notifies the surrounding moving cameras of information related to the image capturing area estimated in the step 3101 (step J102).

The communication unit 1104 judges whether or not information related to the image capturing area has been notified from another moving camera (step J103). In the case where there has been notification from another moving camera, the process is proceeded to step 3104. In the case where there has not been notification, the process is proceeded to the step J101.

The communication unit 1104 acquires information related to the image capturing area notified from another moving camera (step J104), and the process J-1 is ended.

Figure 72:
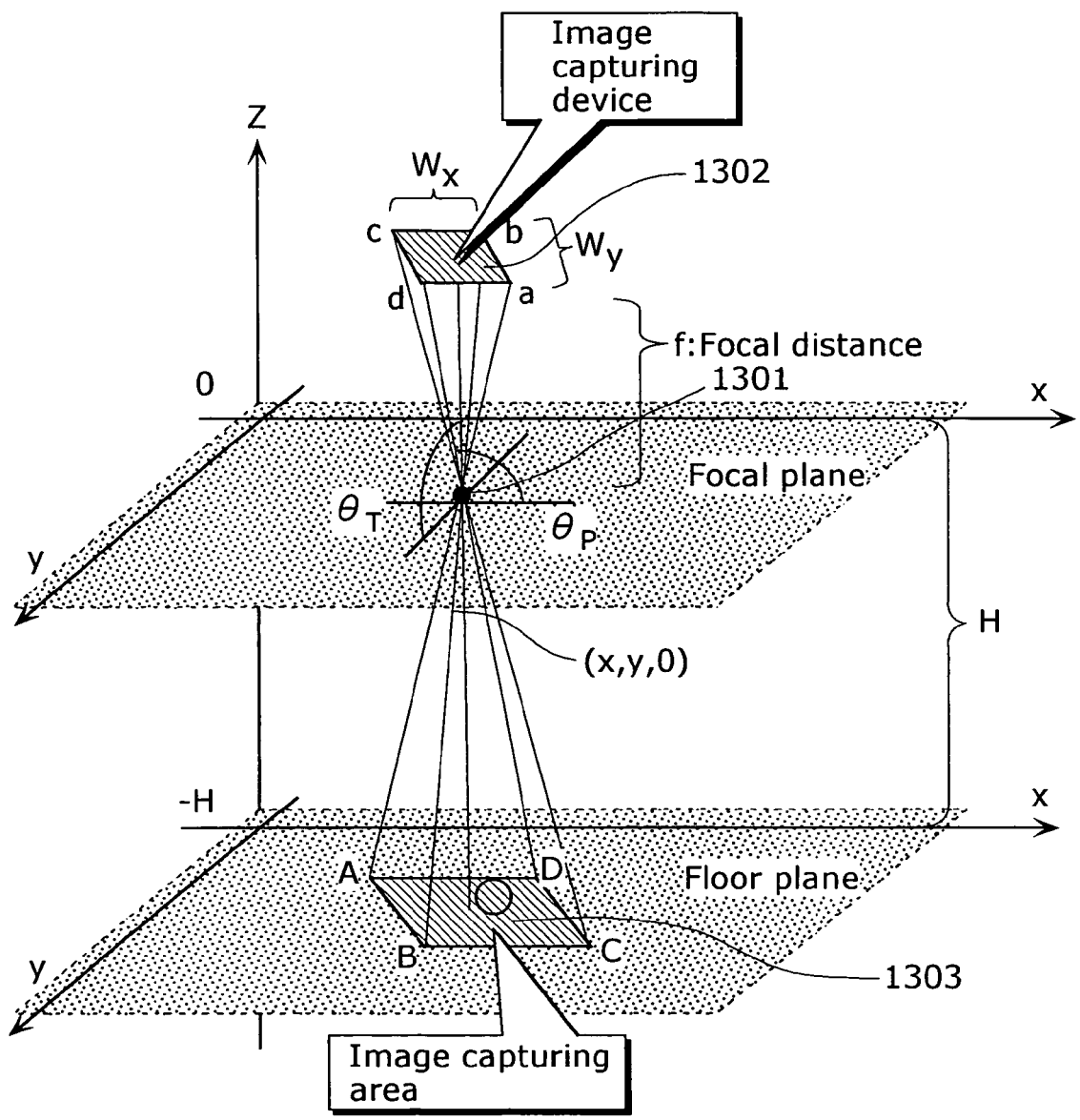
FIG. 72 is a diagram illustrating a method for estimating an image capturing area of a moving camera.

Here, an example method for estimating the image capturing area of the moving camera 1101 in the step 3101 will be explained using FIG. 72. In FIG. 72, a focal point 1301 is the focal point of the moving camera 1101. An image capturing device 1302 is the image capturing device 1106 of the moving camera 1101. An image capturing area 1303 is an area whose image can be captured by the image capturing device 1106 of the moving camera 1101 through the focal point.

In FIG. 72 the moving camera is set in the ceiling facing the direction of the floor. In the case where the focal position of the moving camera is (x, y, 0), the ceiling level is H, the shape of the image capturing device is rectangular whose vertical and horizontal lengths are ($W_x$, $W_y$), the focal distance is f, the pan angle and the tilt angle indicating the view direction of the moving camera are $\theta_P$, $\theta_T$, the position of the floor area whose image is captured by the moving camera 1101 can be expressed by the following equations 61, 62, 63 and 64. Here, the equations 66, 67, 68 and 69 are the equations for calculating the position coordinates of the image capturing device used for setting up the above equations 62, 63, 64 and 65.

$$\begin{pmatrix} A_x \\ A_y \\ A_z \end{pmatrix}^T = \begin{pmatrix} -(a_x - x)H/a_z + x \\ -(a_y - y)H/a_z + y \\ -H \end{pmatrix}^T \quad \text{(Equation 62)}$$

$$\begin{pmatrix} B_x \\ B_y \\ B_z \end{pmatrix}^T = \begin{pmatrix} -(b_x - x)H/b_z + x \\ -(b_y - y)H/b_z + y \\ -H \end{pmatrix}^T \quad \text{(Equation 63)}$$

$$\begin{pmatrix} C_x \\ C_y \\ C_z \end{pmatrix}^T = \begin{pmatrix} -(c_x - x)H/c_z + x \\ -(c_y - y)H/c_z + y \\ -H \end{pmatrix}^T \quad \text{(Equation 64)}$$

$$\begin{pmatrix} D_x \\ D_y \\ D_z \end{pmatrix}^T = \begin{pmatrix} -(d_x - x)H/d_z + x \\ -(d_y - y)H/d_z + y \\ -H \end{pmatrix}^T \quad \text{(Equation 65)}$$

$$\begin{pmatrix} a_x \\ a_y \\ a_z \end{pmatrix}^T = \frac{1}{2} \begin{pmatrix} w_x \cos\theta_P - 2f\sin\theta_P + 2x \\ w_x \sin\theta_T \sin\theta_P + w_y \cos\theta_T + 2f\sin\theta_T \cos\theta_P + 2y \\ w_x \cos\theta_T \sin\theta_P - w_y \sin\theta_T + 2f\cos\theta_T \cos\theta_P \end{pmatrix}^T \quad \text{(Equation 66)}$$

$$\begin{pmatrix} b_x \\ b_y \\ b_z \end{pmatrix}^T = \frac{1}{2} \begin{pmatrix} w_x \cos\theta_P - 2f\sin\theta_P + 2x \\ w_x \sin\theta_T \sin\theta_P - w_y \cos\theta_T + 2f\sin\theta_T \cos\theta_P + 2y \\ w_x \cos\theta_T \sin\theta_P + w_y \sin\theta_T + 2f\cos\theta_T \cos\theta_P \end{pmatrix}^T \quad \text{(Equation 67)}$$

$$\begin{pmatrix} c_x \\ c_y \\ c_z \end{pmatrix}^T = \frac{1}{2} \begin{pmatrix} -w_x \cos\theta_P - 2f\sin\theta_P + 2x \\ -w_x \sin\theta_T \sin\theta_P - w_y \cos\theta_T + 2f\sin\theta_T \cos\theta_P + 2y \\ -w_x \cos\theta_T \sin\theta_P + w_y \sin\theta_T + 2f\cos\theta_T \cos\theta_P \end{pmatrix}^T \quad \text{(Equation 68)}$$

$$\begin{pmatrix} d_x \\ d_y \\ d_z \end{pmatrix}^T = \frac{1}{2} \begin{pmatrix} -w_x \cos\theta_P - 2f\sin\theta_P + 2x \\ -w_x \sin\theta_T \sin\theta_P + w_y \cos\theta_T + 2f\sin\theta_T \cos\theta_P + 2y \\ -w_x \cos\theta_T \sin\theta_P - w_y \sin\theta_T + 2f\cos\theta_T \cos\theta_P \end{pmatrix}^T \quad \text{(Equation 69)}$$

In estimating the image capturing area as shown in FIG. 72, the floor whose image is captured by the moving camera 1101 is used as a standard area. However, a plane which is at a predetermined height h from the floor may be used as a standard area. In addition to the plane, the image capturing area may be estimated as a three-dimensional space which can be captured by the moving camera 1101.

Next, the moving camera 1101 starts the following process J-2 (step J02).

The adjacent image capturing area identification unit 1105 identifies moving cameras whose image capturing areas are adjacent to the image capturing area of the current moving camera based on information transmitted from the surrounding moving cameras (step J201).

The adjacent image capturing area identification unit 1105 judges whether or not moving cameras whose image capturing areas are adjacent to the image capturing area of the current moving camera exist or not (step J202). In the case where such moving cameras exist, the process is proceeded to step J203. In the case where such moving cameras do not exist, the process is proceeded to step J204.

The image capturing position evaluation unit 1109 calculates an evaluation value A for the position relation between the image capturing area of the moving camera 1101 and the adjacent image capturing area (step J203).

The range of the area which should be monitored is referred to, the range of the area being stored in the monitored range storage unit 1108 (step J204).

The image capturing position evaluation unit 1109 judges whether or not the image capturing area of another moving camera exists between the image capturing area and the border of the monitoring area in the moving camera's movable direction (step J205). In the case where such image capturing area does not exist, the process is proceeded to step 3206. In the case where such image capturing area exists, the process J-2 is ended.

The image capturing position evaluation unit 1109 calculates an evaluation value B for the position relation between the image capturing area and the border of the monitoring area (step J206), and the process is ended.

Here, an example method for identifying a moving camera whose image capturing area is adjacent to the image capturing area of the moving camera 1101 from among the surrounding moving cameras will be explained using FIG. 73.

Figure 73:
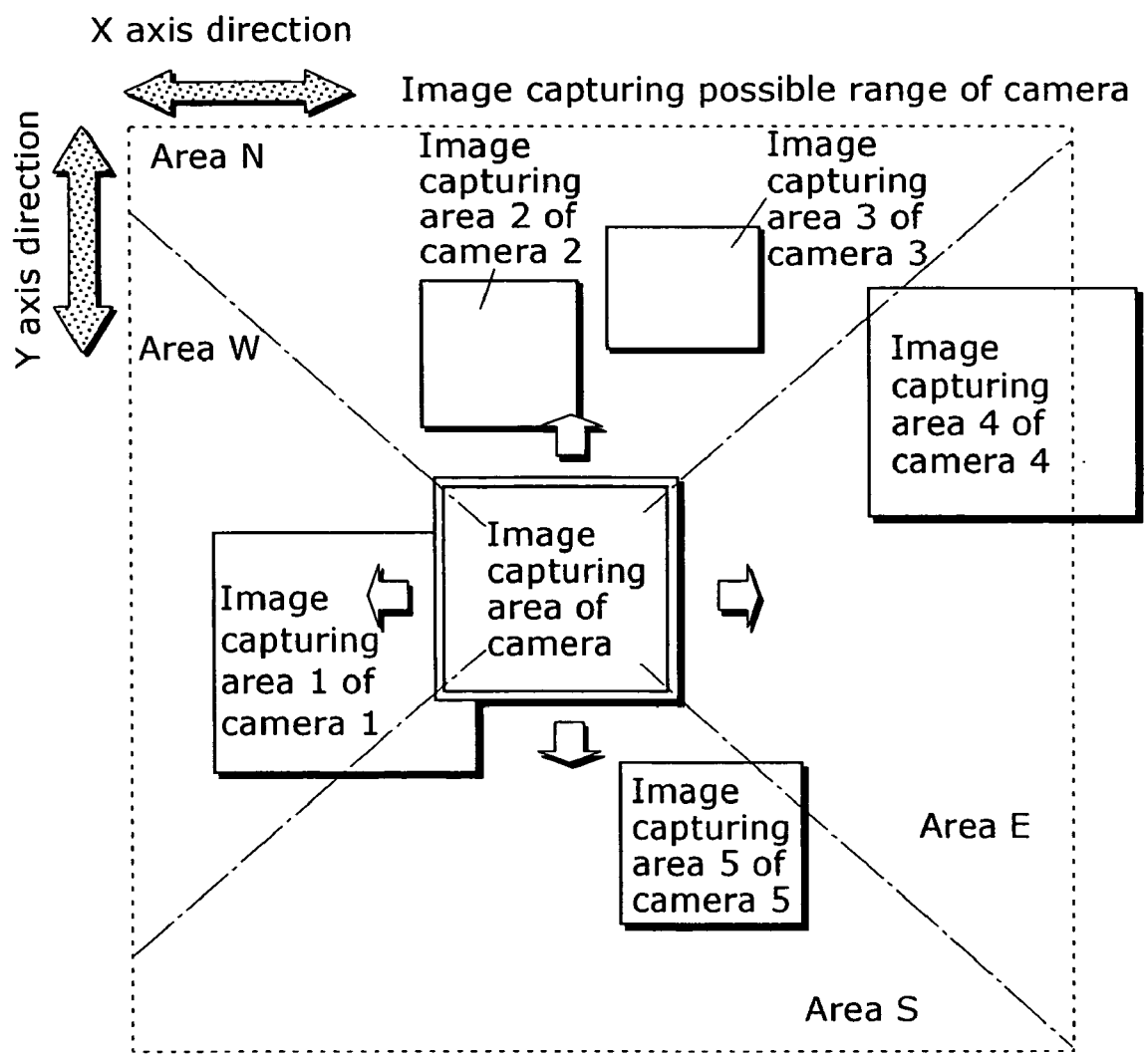
FIG. 73 is a diagram illustrating a method for identifying an image capturing area adjacent to an image capturing area of a moving camera.

FIG. 73 shows a state of position relations between the image capturing areas of the plurality of moving cameras, seen from a direction vertical to the floor.

As shown in FIG. 73, using the central coordinates of the image capturing area of the moving camera 1101 as a base point, the image capturing possible area is divided based on the movable direction of the moving camera 1101 so that the image capturing area adjacent to the image capturing area of the moving camera 1101 can be identified in each of the movable directions of the moving camera 1101. In FIG. 73 the image capturing possible area is divided into four areas, the areas E, S, W and N, based on X axis direction and Y axis direction, using the center of the image capturing area of the moving camera as a base point.

Next, it is identified to which of the four divided areas the image capturing areas of the surrounding moving cameras belong. And, the surrounding moving cameras are classified based on the position of the central coordinates of the image capturing areas of the moving cameras. In FIG. 73, the image capturing area 1 belongs to the area W; the image capturing areas 2 and 3 belong to the area N; the image capturing area 4 belongs to the area E; and the image capturing area 5 belongs to the area S.

Next, a moving camera is identified in each of the four areas, the moving camera having an image capturing area whose central coordinates are close to the central coordinates of the image capturing area of the current moving camera 1101. And, the image capturing area of each of the identified moving cameras is adjacent to the image capturing area of the current moving camera 1101. In FIG. 73, the image capturing are 1 is adjacent in the left direction; the image capturing area 2 is adjacent in the top direction; the image capturing area 4 is adjacent in the right direction; and the image capturing area 5 is adjacent in the bottom direction.

In FIG. 73 the image capturing area adjacent to the image capturing area of the current moving camera 1101 is identified in each of the movable directions of the moving camera 1101. However, the image capturing area adjacent to the image capturing area of the current moving camera 1101 may be identified in other directions.

Next, an example method will be explained using FIG. 74, the method being used for providing an evaluation value A for the position relation between the image capturing area of current camera and the adjacent image capturing area.

Figure 74:
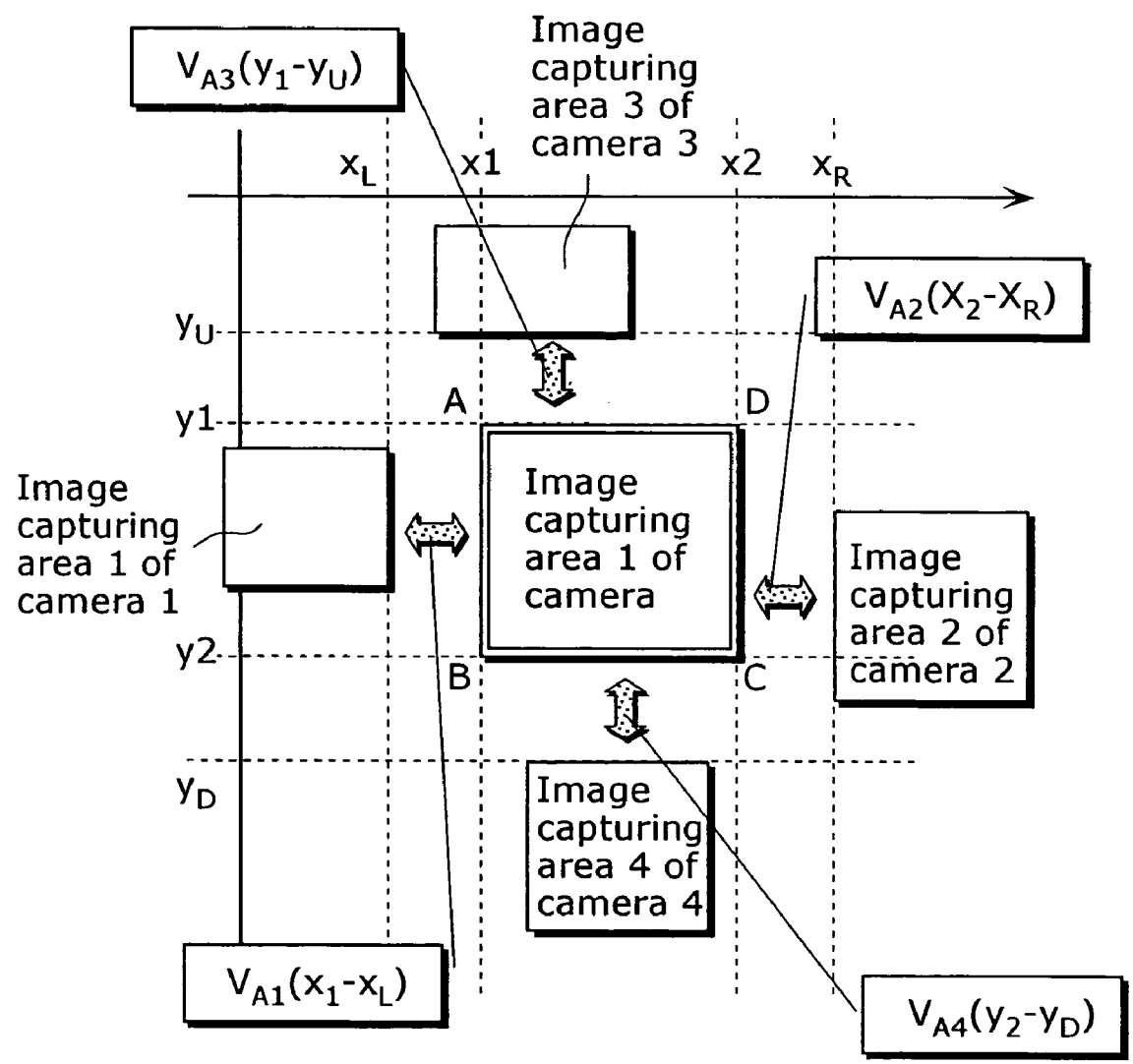
FIG. 74 is a diagram illustrating an evaluation function A of a moving camera.

FIG. 74 is a diagram for explaining: a position relation between the image capturing area of current camera and the adjacent image capturing area; and an evaluation function A which provides an evaluation value A for the position relation. The evaluation value A for the moving camera 1101 is provided by the evaluation function A expressed by the following equations 70, 71, 72 and 73, based on each position relation with the surrounding image capturing areas.

$$V_{A1}(x_1-x_L)=((x_1-x_L)-C)^2 \qquad \text{(Equation 70)}$$

$$V_{A2}(x_2-x_R)=((x_2-x_R)+C)^2 \qquad \text{(Equation 71)}$$

$$V_{A3}(y_1-y_U)=((y_1-y_U)-C)^2 \qquad \text{(Equation 72)}$$

$$V_{A4}(y_2-y_D)=((y_2-y_D)+C)^2 \qquad \text{(Equation 73)}$$

Here, C is constant.

Here, in addition to the equations 70, 71, 72 and 73, the evaluation function A may be a function which provides an evaluation value A that (i) becomes the smallest (or the largest) when a predetermined overlapping width of the adjacent image capturing areas becomes a predetermined constant C and (ii) monotonically increases (or decreases) as the overlapping width (distance) of the adjacent image capturing areas recedes from a constant C within the range the moving camera 1101 can move.

Also, the value of the constant C used in the equations 70, 71, 72 and 73 may be a different value for each moving camera. Also, in the same moving camera, a different constant C may be a different value in each of the adjacent directions. Furthermore, the constant C may be a variable which changes in proportion to the size of the image capturing area of the moving camera 1101.

Next, an example method for providing an evaluation value B for the position relation between the image capturing area and the border of the monitoring area in the step 3206 will be explained using FIG. 75.

Figure 75:
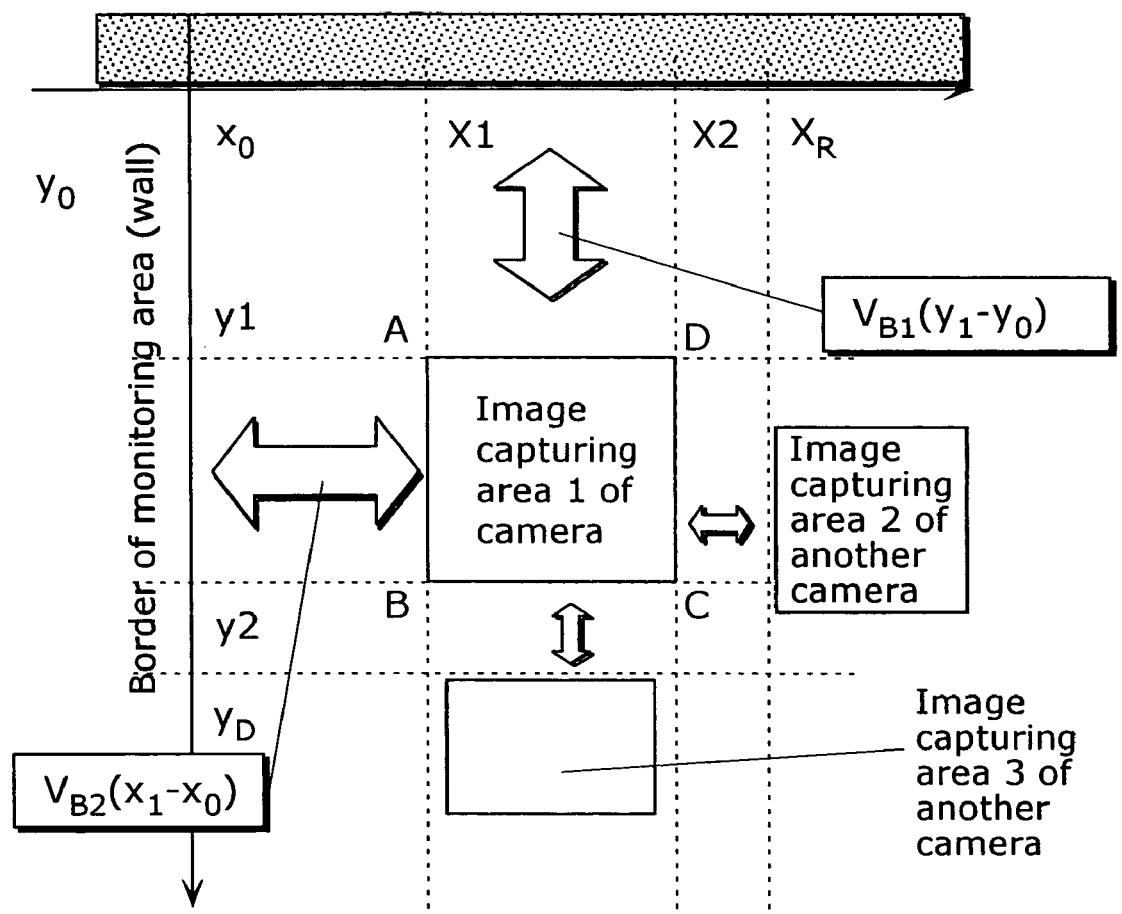
FIG. 75 is a diagram illustrating an evaluation function B of a moving camera.
Figure 76:
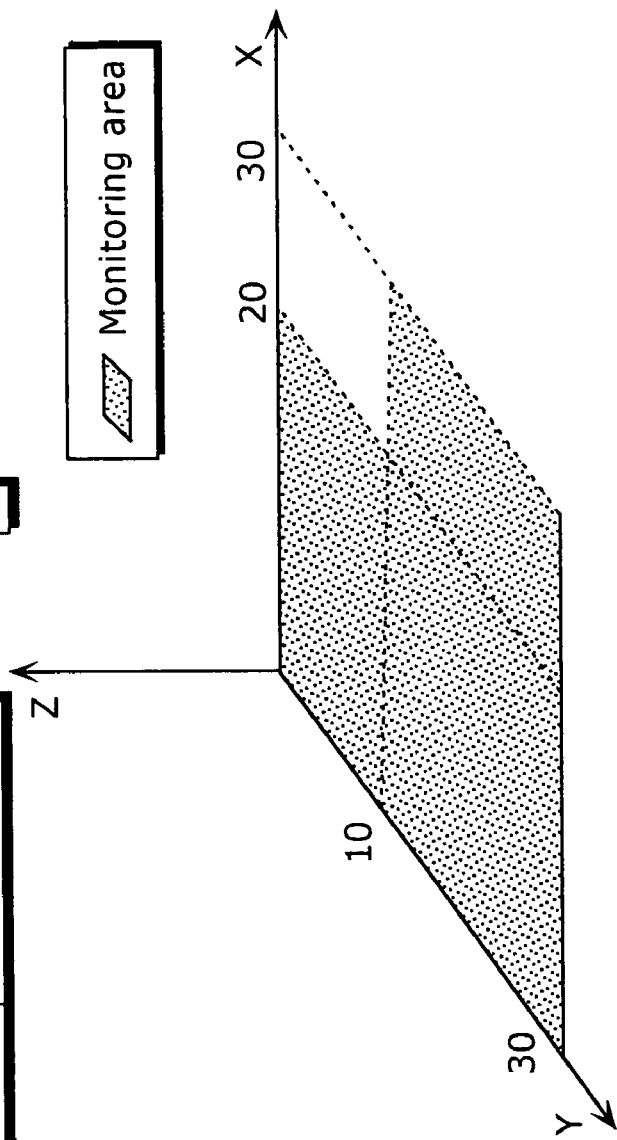
FIG. 76 is a diagram showing en example of monitoring area information stored in a monitored range storage unit.

FIG. 75 is a diagram for explaining the following equations 74 and 75 which are an example of (i) the position relation between the image capturing area of the moving camera 1101 and the border of the monitoring area and (ii) an evaluation function B that provides an evaluation value B for the position relation. As expressed in the following equations, in the case where the image capturing area of another camera does not exist between the image capturing area of the moving camera 1101 and the border of the monitoring area, the evaluation value B is provided by the evaluation function B expressed by the following equations 74 and 75.

$$V_{B1}(y_1-y_0)=(y_1-y_0-D)^2 \qquad \text{(Equation 74)}$$

$$V_{B2}(x_1-x_0)=(x_1-x_0-D)^2 \qquad \text{(Equation 75)}$$

Here, D is constant.

The position of the border of the monitoring area can be identified by referring to the monitored range information indicating a range that should be monitored, the monitored range information being stored in the monitored range storage unit 1108.

Here, in addition to the equations 74 and 75, the evaluation function B may be other functions which provide the evaluation value B that (i) becomes the smallest (or the largest)

when the distance between the image capturing area of the moving camera 1101 and the border of the monitoring area becomes a predetermined constant D and (ii) monotonically increases (or decreases) as the distance between the image capturing area of the moving camera 1101 and the border of the monitoring area recedes from the predetermined constant D within the range the moving camera 1101 can move.

Also, the value of the constant D used in the equations 74 and 75 may be different for each moving camera. In addition, in the same moving camera, a different constant D may be provided for each of the adjacent directions.

The constant D may be a variable D which changes in proportion to the size of the image capturing area of the moving camera 1101.

Next, the moving camera 1101 starts the following process J-3 (step J03).

The image capturing position change unit 1110 judges whether or not one of the evaluation values A and B is different from the target value (step J301). In the case where the evaluation value is different from the target value, the process is proceeded to the step J302. In the case where the evaluation value is the same as the target value, the process J-3 is ended.

The image capturing position change unit 1110 changes the image capturing position so that the evaluation values A and B approach the respective target values (step J302), and the process J-3 is ended.

Here, in the step J301, the respective target values of the evaluation values A and B are the minimum value (or the maximum value) of each evaluation value.

Also, in the step J302, an example method for having the evaluation values A and B approach the respective target values are as follows. In other words, the image capturing position (x, y, z) of the moving camera 1101 is changed according to the update equations 76, 77 and 78 which include derivatives derived by partially differentiating the respective evaluation functions A and B using the variables (x, y, z) indicating the image capturing position of the moving camera 1101.

$$\frac{dx}{dt} = -\frac{\alpha_x}{N} \frac{\partial \sum_{n=1}^{N} V_{An}}{\partial x} - \frac{\beta_x}{M} \frac{\partial \sum_{m=1}^{M} V_{Bm}}{\partial x} \quad \text{(Equation 76)}$$

$$\frac{dy}{dt} = -\frac{\alpha_y}{N} \frac{\partial \sum_{n=1}^{N} V_{An}}{\partial y} - \frac{\beta_y}{M} \frac{\partial \sum_{m=1}^{M} V_{Bm}}{\partial y} \quad \text{(Equation 77)}$$

$$\frac{dz}{dt} = -\frac{\alpha_z}{N} \frac{\partial \sum_{n=1}^{N} V_{An}}{\partial z} - \frac{\beta_z}{M} \frac{\partial \sum_{m=1}^{M} V_{Bm}}{\partial z} \quad \text{(Equation 78)}$$

Here, $\alpha_x, \alpha_y, \alpha_z, \beta_x, \beta_y, \beta_z$ are coefficients.

N is number of adjacent image capturing areas.

M is number of borders of adjacent monitored areas.

By repeating the above mentioned procedures, each moving camera 1101 changes the image capturing area so that (i) the constant overlapping width C is kept between the image capturing area of the current moving camera 1101 and the adjacent image capturing area and (ii) the constant distance D is kept between the image capturing area of the current moving camera 1101 and the border of the monitoring area. As a result, the position of each moving camera is controlled so that (i) the proportion of the image capturing area is increased, the image capturing area being captured by a plurality of moving cameras and (ii) the image capturing areas of the plurality of moving cameras are equally distributed in the monitoring area.

Figure 77:
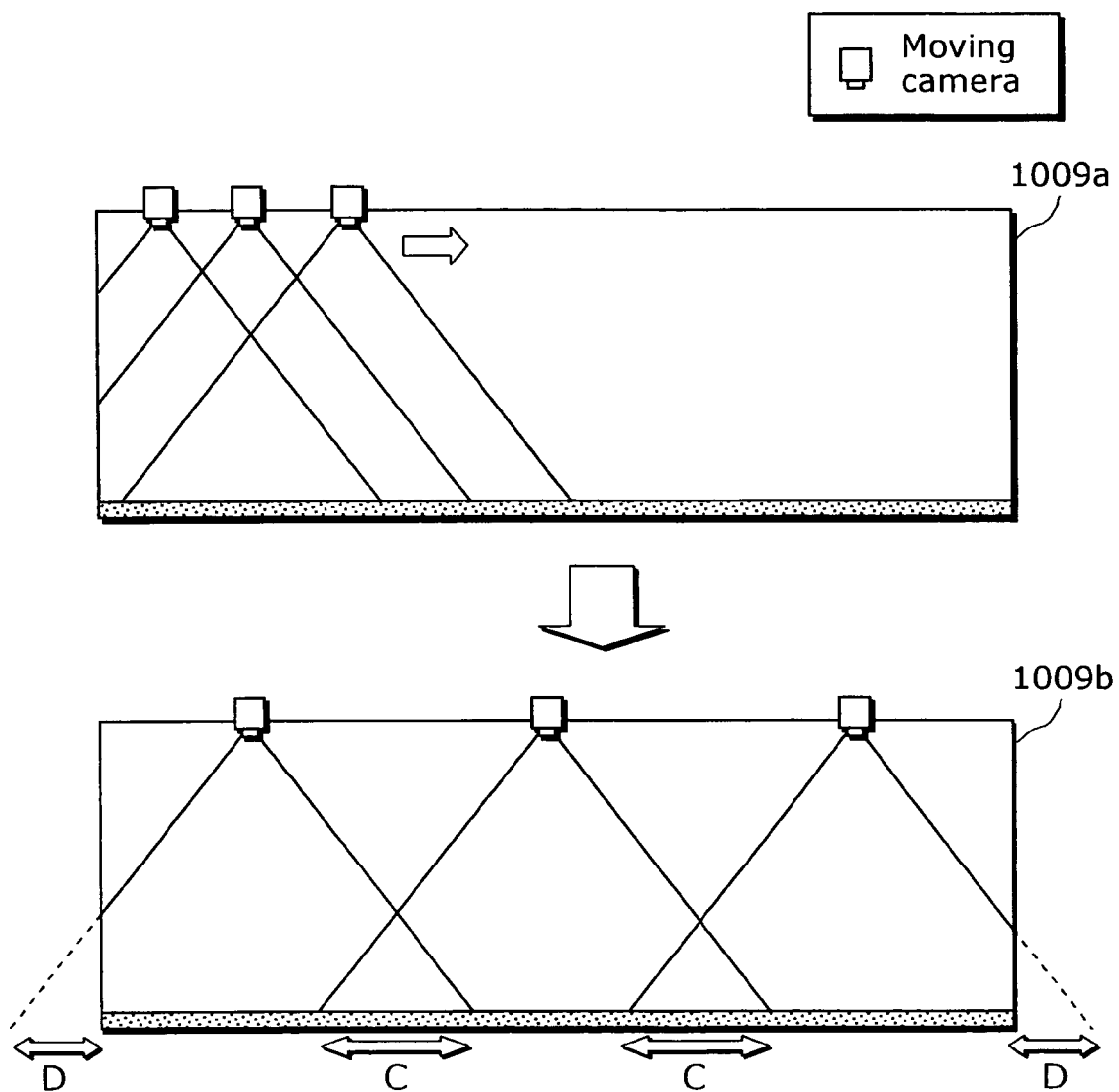
FIG. 77 is a diagram illustrating operations of a moving camera.

FIG. 77 shows an operation of the moving camera 1101 according to the tenth embodiment. In FIG. 77, to simplify the explanation, moving cameras 1101 which can move in horizontal directions (one-dimensionally) are set in the ceiling of a room where the ceiling level is equal. And, the floor is monitored.

As shown in the position relation 1009*a* of FIG. 77, even in the case where the moving cameras 1101 are set in the arbitrary positions of the ceiling, each of the moving cameras changes the image capturing area so that the width C of the overlapping area between the adjacent image capturing areas and the distance D between the image capturing area and the border of the monitoring area approach the predetermined values. Thus, as shown in the position relation 1009*b* of FIG. 77, the image capturing areas can be automatically moved to the positions where the plurality of cameras can simultaneously capture the image of the whole monitoring area.

Moreover, even in the case where moving cameras 1101 are collectively set in a place where setting operation is difficult, such as a high ceiling, the moving cameras automatically move to the positions where there are few blind spots in the simultaneous image capturing by the plurality of moving cameras. Thus, the cost for determining the setting positions of the moving cameras and setting operation can be reduced.

Figure 78:
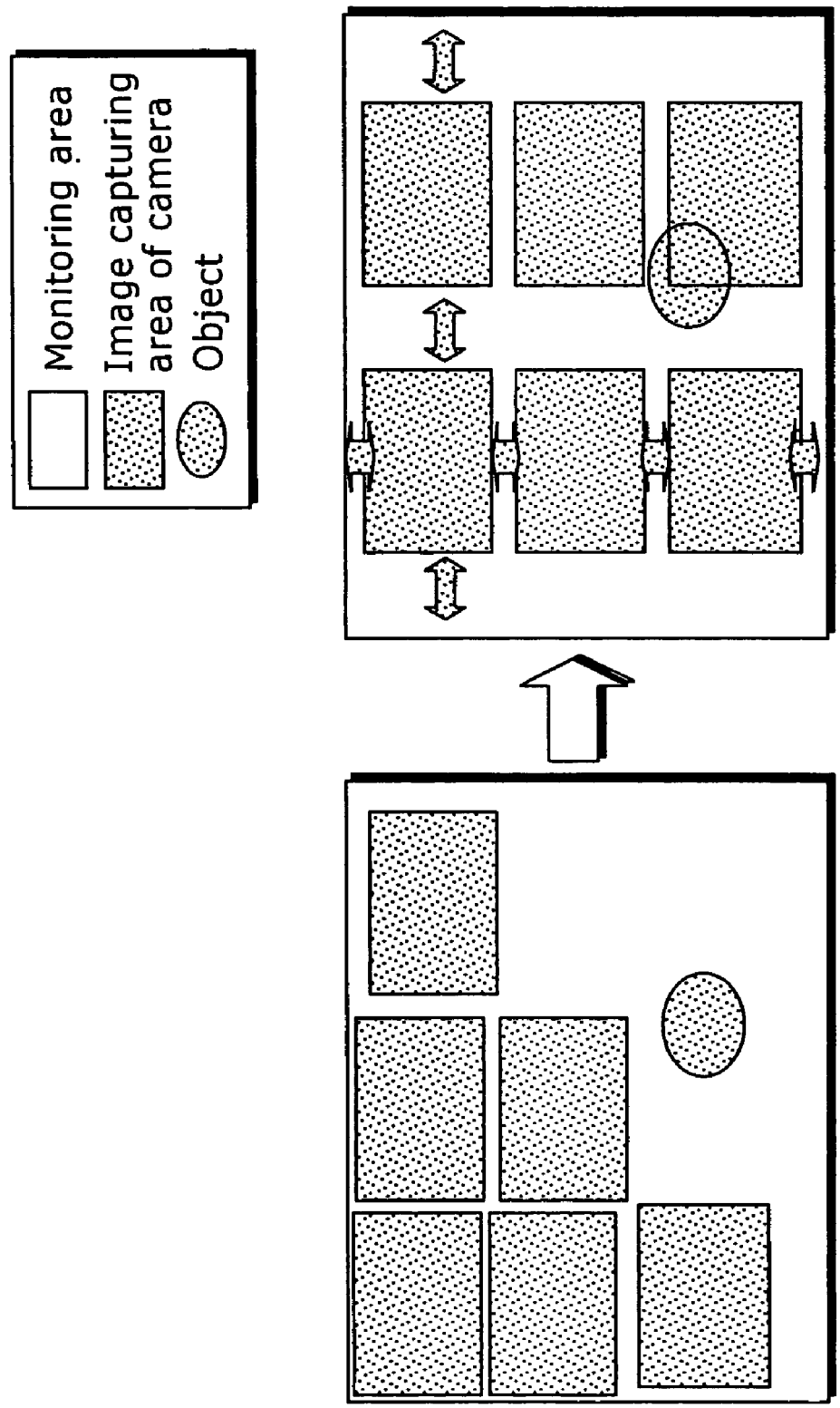
FIG. 78 is a diagram illustrating operations of a moving camera.

Also, FIG. 78 shows a state in which the moving cameras 1101 move two-dimensionally. FIG. 78 shows a state of the monitoring area seen from a vertical direction to the floor. As shown in FIG. 78, in the case where N % (<100%: N is a natural number) of the monitoring area is captured by the moving cameras, the moving cameras 1101 according to the tenth embodiment change the image capturing positions in the monitoring area from the state 10*a* to the state 10*b* so that the distance between the adjacent image capturing areas becomes equal. Thus, the continuous large blind spots area is prevented from being generated in the monitoring area.

As described above, according to the tenth embodiment, the movement of the plurality of cameras are controlled so that (i) the portion of the image capturing area simultaneously captured by the plurality of cameras increases in the monitoring area and (ii) the image capturing areas of the plurality of moving cameras are equally distributed in the monitoring area. In other words, even under the state of being set in arbitrary positions, the moving camera 1101 according to the tenth embodiment can automatically change the image capturing position of each moving camera so that, in the simultaneous image capturing by the plurality of moving cameras, (i) the monitoring area has few blind spots and (ii) the blind spot area generated in the monitoring area does not become a continuous area larger than the size of the object. Thus, the portion of the simultaneous image capturing area can be improved in the monitoring area, and the cost for setting the cameras can be reduced.

Eleventh Embodiment

Next, the eleventh embodiment of the present invention will be explained.

Figure 79:
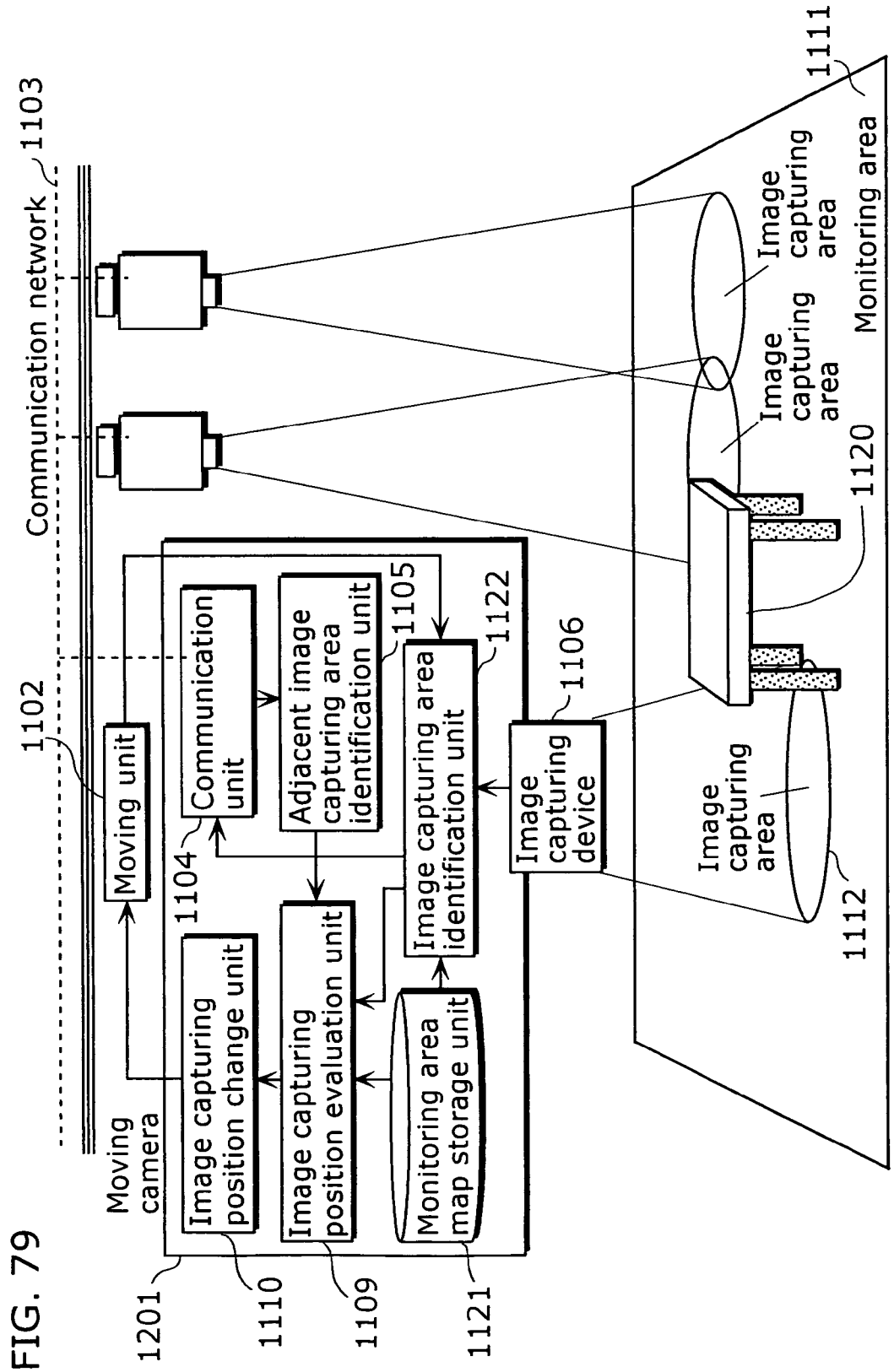
FIG. 79 is a block diagram showing a structure of the eleventh embodiment.

FIG. 79 is a diagram showing a structure of a monitor system according to the eleventh embodiment of the present invention. This monitor system includes a plurality of cameras 1201 connected via a communication network 1103, each of which is made up of a moving camera 1201 and a moving unit 1102. And, the plurality of cameras 1201 move in autonomous cooperation so that the monitoring area 1111 can be thoroughly monitored. In addition, the moving cameras 1201 identify a correct image capturing area considering the position, the shape and the direction of the object, in reference to the predetermined monitoring area map information. In FIG. 79, the same components as shown in FIG. 70 are assigned with the same codes, and the explanation will be omitted.

An object 1120 is an object to be monitored in the monitoring area 1111.

The monitoring area map storage unit 1121 is a memory and the like which store the range of the monitoring area 1111 and the position, size and state of the object 1120 placed in the monitoring area 1111.

The moving camera 1201 is a camera which moves being supported by the moving unit 1102. And, the moving camera 1201 includes: a communication unit 1104; an adjacent image capturing area identification unit 1105; an image capturing device 1106; an image capturing position evaluation unit 1109; an image capturing position change unit 1110; a monitoring area map storage unit 1121; and an image capturing area identification unit 1122.

The image capturing area identification unit 1122 is a processing unit which identifies a position of the image capturing area based on the position of the moving camera 1201, characteristics of the image capturing device 1106 and details of the monitoring area map.

According to the structure of the eleventh embodiment as described above, the moving camera 1201 refers to information such as the position, the shape and the direction of the object 1120 stored in the monitoring area map information, and identifies the image capturing area 1112 based on the image capturing position of the moving camera 1201 per se and the characteristics of the image capturing device. And, the moving camera 1201 exchanges information related to the image capturing area with the surrounding moving cameras, and moves the image capturing position so that (i) the overlapping area between the adjacent image capturing areas and (ii) the distance between the image capturing area and the border of the monitoring area can approach a predetermined state. Thus, even in the case where blind spots are generated in the shade of the object 1120 existing in the monitoring area 1111, the moving cameras 1201 can automatically move to the image capturing position having few blind spots in the monitoring area in cooperation with the surrounding moving cameras, in the simultaneous image capturing by the plurality of moving cameras.

Figure 80A:
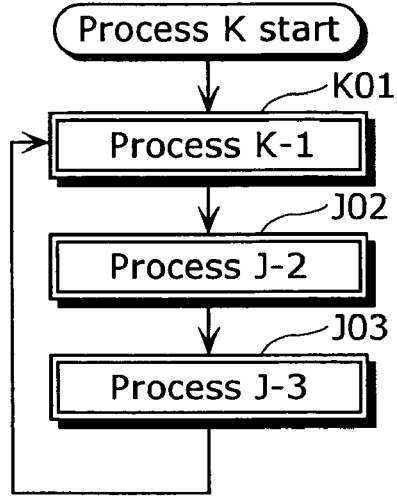
FIGS. 80A and 80B are flow charts explaining operations of the eleventh embodiment.
Figure 80B:
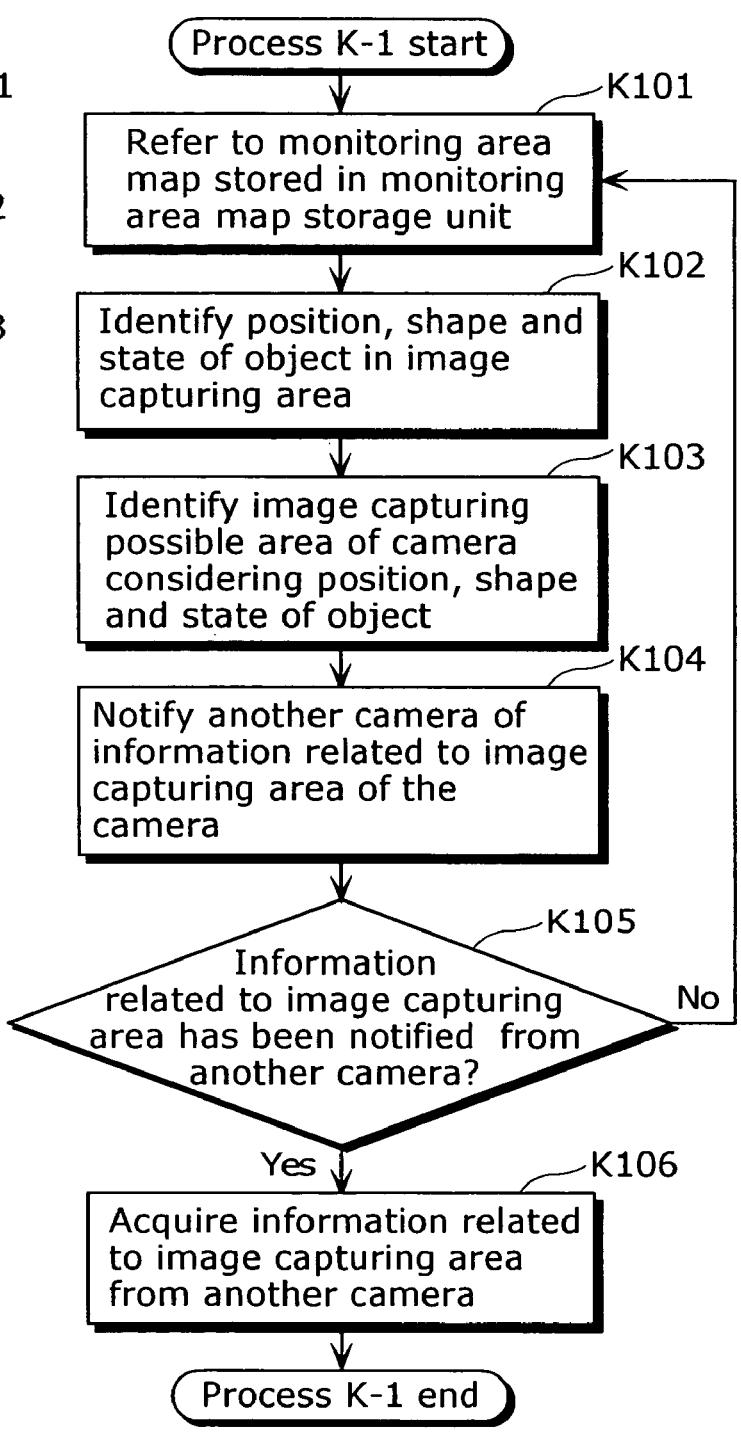

Next, the operational procedures performed by the moving cameras 1201 included in the monitor system will be explained using flow charts as shown in FIGS. 80A and 80B. In FIGS. 80A and 80B, the same procedures as shown in FIGS. 71A, 71B, 71C and 71D are assigned with the same codes, and the explanation will be omitted.

The moving camera 1201 repeatedly performs three processes (processes K-1, J-2 and J-3).

First, the following process K-1 is started (step K01).

The image capturing area identification unit 1122 refers to the monitoring area map information stored in the monitoring area map storage unit 1121 (step K101).

The image capturing area identification unit 1122 identifies the position, the shape and the direction of the object 1120 in the monitoring area 1111 (step K102).

The image capturing area identification unit 1122 identifies the image capturing area 1112 of the moving camera 1201 based on the image capturing position of the moving camera 1201, the characteristics of the image capturing device 1106 and the position, the shape and the direction of the object 1120 (step K103).

The communication unit 1104 notifies the surrounding moving cameras of information related to the image capturing area 1112 identified in the step K1103 (step K104).

The communication unit 1104 judges whether or not information related to the image capturing area has been notified from another moving camera (step K105). In the case where there has been notification from another moving camera, the process is proceeded to step K106. In the case where there has not been notification, the process is proceeded to the step K101.

The communication unit 1104 acquires information related to the image capturing area notified from another moving camera (step K106), and the process K-1 is ended.

Here, the monitoring area map information which is referred to in the step K101 is information such as the position, the shape and the direction of the furniture and partition panels placed in the monitoring area, the information being previously prepared for the moving camera 1201. The example details of such monitoring area map information are shown in FIG. 81.

Figure 81:
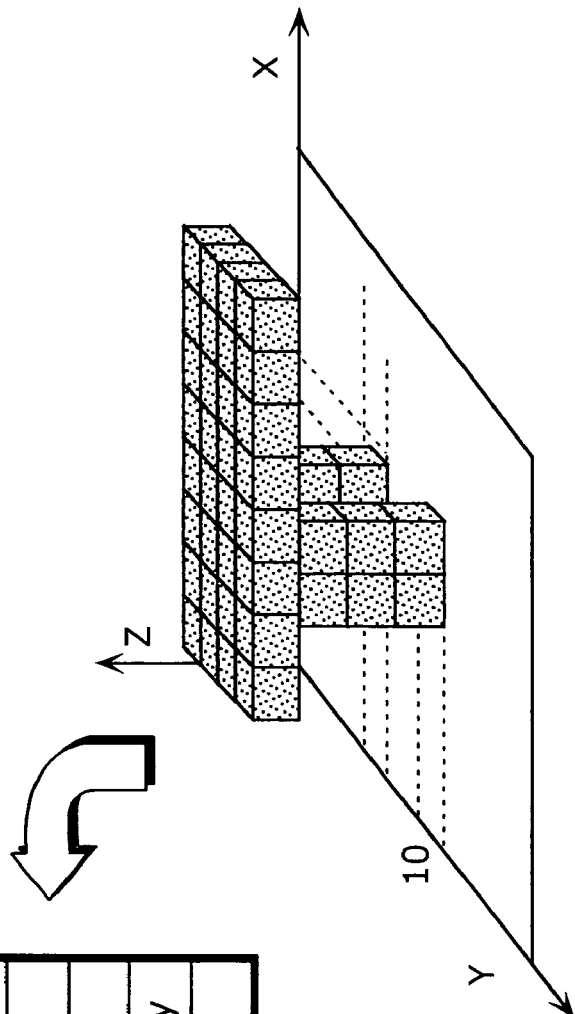
FIG. 81 is a diagram showing an example of monitoring area map information stored in a monitoring area map storage unit.

FIG. 81 shows a state in which the monitoring area 1111 is divided into tiny unit areas, and whether or not the object 1120 exists (Full) or not (Empty) is recorded per unit area as the details of the monitoring area map information. By referring to such monitoring area map information, the position, the shape and the direction of the object 1120 existing in the view field of each moving camera 1201 can be identified. And, the image capturing area can be identified considering the area that becomes a blind spot depending on the object 1120.

In FIG. 81, the monitoring area is divided into the unit areas, and the state per the unit area is recorded as the monitoring area map information. However, the position, the shape and the direction of the object 1120 may be directly recorded in the map information.

Next, the moving camera 1201 performs the process J-2 and the process J-3 (steps J02 and J03). These processes are the same as the tenth embodiment.

By repeating the above mentioned procedures, each moving camera 1201 changes the image capturing area so that (i) the constant overlapping width C is kept between the image capturing area 1112 of the current moving camera 1201 and the adjacent image capturing area, the image capturing area 1112 being identified considering the blind spot position generated by the object 1120 which exists in the monitoring area 1111, and (ii) the constant distance D is kept between the image capturing area of the current moving camera 1201 and the border of the monitoring area.

FIG. 82 shows operations performed by the moving camera 1201 according to the eleventh embodiment. In FIG. 82, to simplify the explanation, the moving cameras 1201 which can move in horizontal directions (one-dimensionally) are set in the ceiling of a room where the ceiling level is equal. And, the image of the floor is captured.

As shown in the state 1014*a* of FIG. 82, each of the moving cameras 1201 changes the image capturing area so that (i) the constant overlapping width C is kept between the image capturing area of the current moving camera 1201 and the adjacent image capturing area, the image capturing area being identified considering the object 1120*a* placed in the monitoring area 1111 and the position, the shape and the direction of the object 1120*b*, and (ii) the constant distance D is kept between the image capturing area of the current moving camera 1201 and the border of the monitoring area. As shown in the state 1014*b* of FIG. 82, each of the moving cameras 1201 can automatically move to the position where the plurality of moving cameras can simultaneously capture the image of the whole monitoring area. Here, capturing the image of the whole monitoring area means simultaneously capturing the image of the whole plane parallel to the floor from the direction vertical to the floor. In addition to such image capturing as described above, for example, a monitor system may be built in which (i) a monitoring area may be defined so as to include the bottom area of the object 1120*a* (desk), (ii) the moving range and moving direction of each moving camera may be changed according to the monitor purpose so that the image of the whole monitoring area can be simultaneously captured by the plurality of moving cameras and (iii) the necessary monitoring area map information is used.

As described above, the moving camera 1201 according to the eleventh embodiment refers to the predetermined monitoring area map information, thus can identify the correct image capturing area considering the position, the shape and the direction of the object 1120. The image capturing area of each moving camera 1201 can be automatically changed so that the blind spots can be reduced in the monitoring area in the simultaneous image capturing by the plurality of cameras 1201, the monitoring area having possibility of including blind spots generated by the shade of the object 1120.

Twelfth Embodiment

Next, the twelfth embodiment will be explained.

Figure 83:
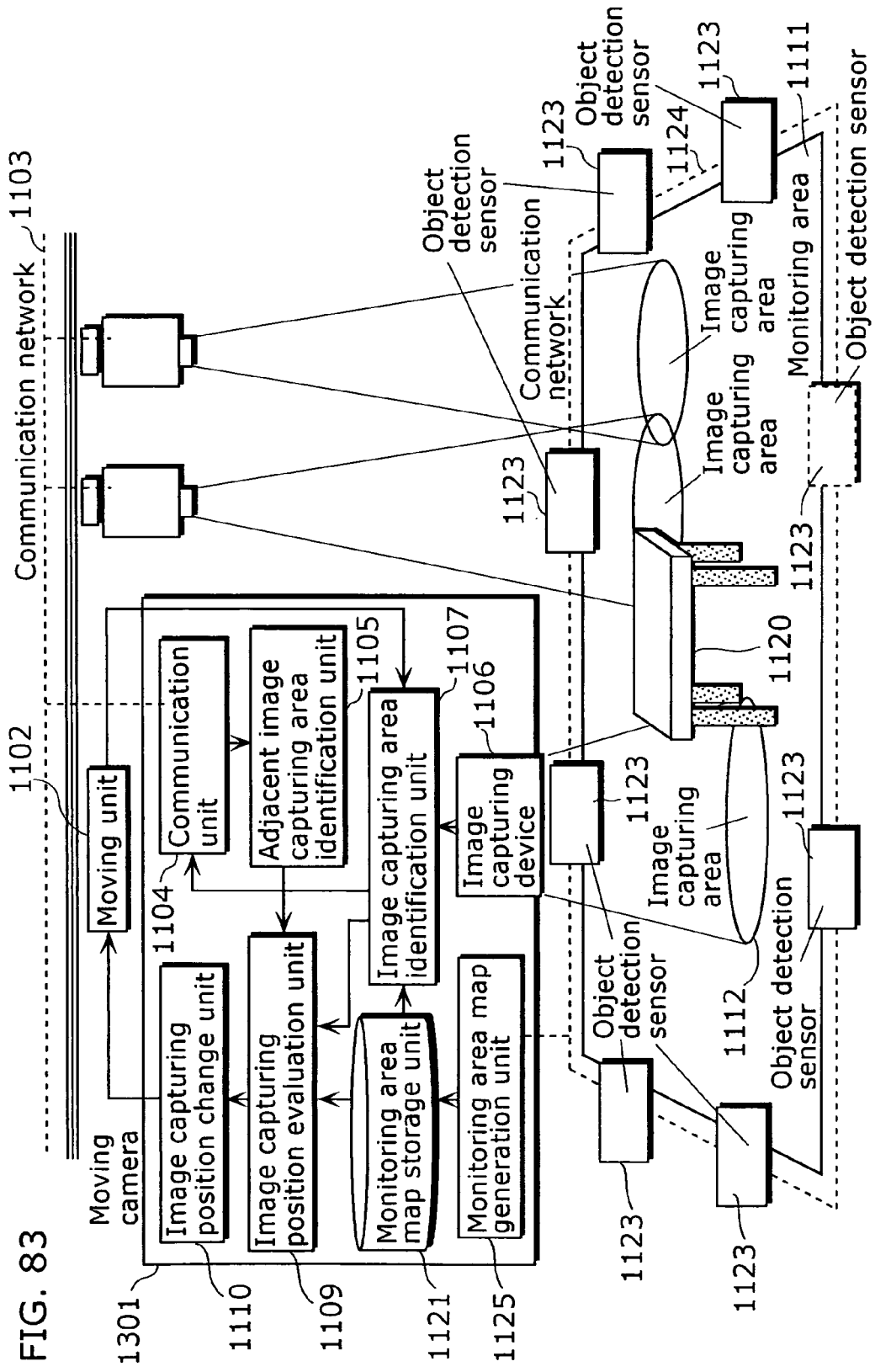
FIG. 83 is a block diagram showing a structure of the twelfth embodiment according to the present invention.

FIG. 83 is a diagram showing a structure of a monitor system according to the twelfth embodiment. This monitor system includes a plurality of cameras connected via a communication network 1103, each of which is made up of a moving camera 1301 and a moving unit 1102. The plurality of moving cameras 1301 move in autonomous cooperation so that the monitoring area 1111 can be thoroughly monitored. And the monitoring area map information is continued to be generated. Thus, even in the case where the position, the shape and the direction of the object change, the image capturing area of each moving camera 1301 can be correctly identified. In FIG. 83, the same components as shown in FIGS. 70 and 79 are assigned with the same codes, and the explanation will be omitted.

The object detection sensor 1123 is a sensor which detects information such as the position, the shape and the direction of the object 1120 existing in the monitoring area 1111.

The communication network 1124 is a transmission path which transmits information detected by the object detection sensor 1123.

The moving camera 1301 is a camera which moves being supported by the moving unit 1102. And, the moving camera 1301 includes: a communication unit 1104; an adjacent image capturing area identification unit 1105; an mage capturing device 1106; an image capturing area estimation unit 1107; an image capturing position evaluation unit 1109; an image capturing position change unit 1110; a monitoring area map storage unit 1121; and a monitoring area map generation unit 1125.

The monitoring area map generation unit 1125 is a processing unit which generates or changes the monitoring area map information stored in the monitoring area map storage unit 1121 using information such as the position, the shape and the direction of the object 1120 existing in the monitoring area 1111 detected by the object detection sensor 1123.

According to the structure of the twelfth embodiment as described above, even in the case where the monitoring area map information is not predetermined in the monitoring area map storage unit 1121 of the moving camera 1301, the monitor system can acquire information related to the state of the object 1120 such as the position, the shape and the direction using the object detection sensor 1123, the object 1120 existing in the monitoring area 1111. Thus, the monitoring area map generation unit 1125 can automatically generate the monitoring area map information. Also, in the case where the position, the shape and the direction of the object 1120 existing in the monitoring area 1111 change, the object detection sensor 1123 detects the change at predetermined timing. And, the monitoring area map generation unit 1125 can update the monitoring area map information. In association with the change of the state of the object 1120, the image capturing area of each moving camera 1301 can be automatically moved to the image capturing position where there are few blind spots, in cooperation with the surrounding moving cameras, in the simultaneous image capturing by the plurality of moving cameras.

Figure 84A:
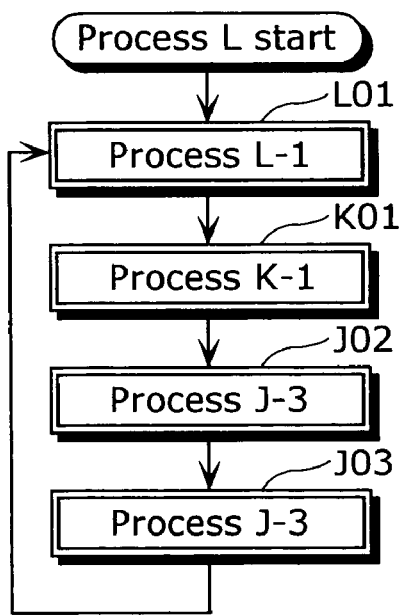
FIGS. 84A and 84B are flow charts explaining operations of the twelfth embodiment.
Figure 84B:
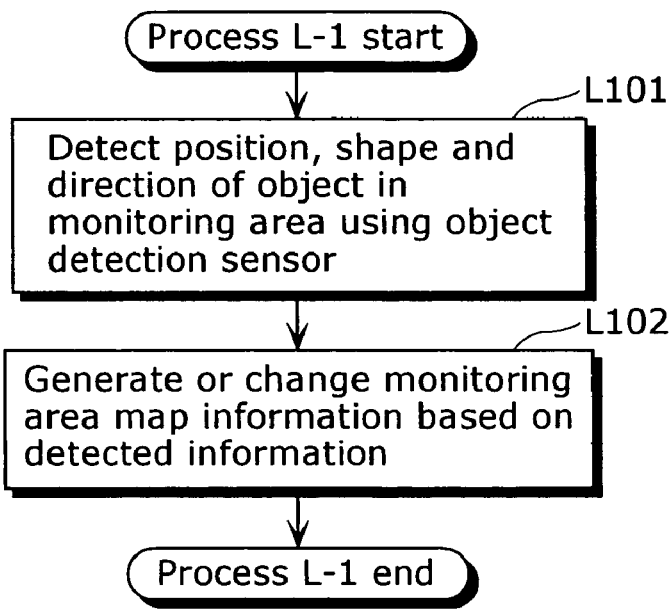

Next, the operational procedures performed by the moving cameras 1301 included in the monitor system will be explained using the flow charts as shown in FIGS. 84A and 84B. In FIGS. 84A and 84B, the same operational procedures as shown in FIGS. 71A, 71B, 71C, 71D, 80A and 80B are assigned with the same codes, and the explanation will be omitted.

The moving camera 1301 repeatedly performs four processes (processes L-1, K-1, J-2 and J-3).

First, the following process L-1 is started (step L01).

The object detection sensor 1123 detects the position, the shape and the direction of the object 1120 existing in the monitoring area 1111, and notifies the detected details to the monitoring area map generation unit 1125 (step L101).

The monitoring area map generation unit 1125 (i) generates monitoring area map information in which the position, the shape and the direction of the object 1120 existing in the monitoring area are recorded or (ii) changes the details of the monitoring area map information (step L102). And, the process L-1 is ended.

Here, in the step L101, as an example of a concrete method by which the object detection sensor 1123 detects the position, the shape and the direction of the object 1120, there is a method in which a plurality of ultrasonic sensors are set at predetermined interval in the monitoring area 1111, and the state of the object in the monitoring area 1111 is identified by synthesizing information acquired from each of the ultrasonic sensors.

Also, as the object detection sensor 1123, in addition to the ultrasonic sensor, a sensor which can detect information necessary for identifying the position, the shape and the direction of the object 1120 existing in the monitoring area 1111, such as a method in which the position, the shape and the direction of the object 1120 are identified by synthesizing three dimensional images based on the images captured by a plurality of cameras.

Figure 85:
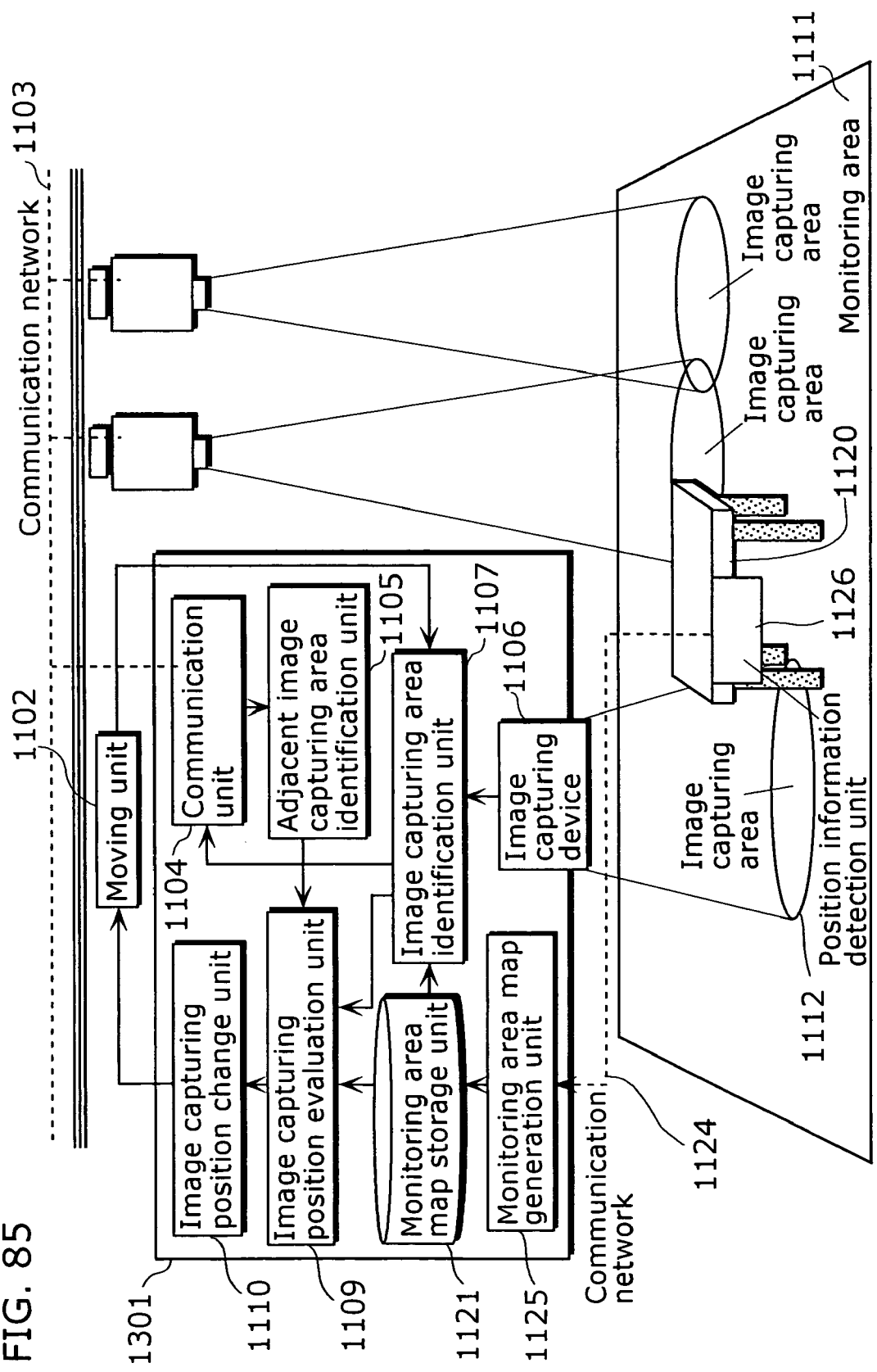
FIG. 85 is a block diagram showing another structure of the twelfth embodiment according to the present invention.

Also, as a variation of the present embodiment, the object 1120 may detect its own position, shape and direction, and notify the details to the monitor system. FIG. 85 shows an example of such structure as described above.

A position information detection unit 1126 is a processing unit which detects the position, the shape and the direction of the object, and notifies the details to the monitoring area map generation unit 1125.

Here, as an example of a concrete method for detecting the position, the shape and the direction of the object in the position information detection unit 1126, there is a method in which the object 1120 (i) previously stores its own shape, (ii) detects its own position and direction using the Global Positioning System (GPS) and (iii) identifies its own position, shape and direction.

In addition to the method using the GPS, other methods in which the object 1120 can identify its own position, shape and direction may be used, such as a method in which (i) an RF tag for identifying position information is put in the monitoring area 1111, (ii) the object 1120 reads the information of the an RF tag put in the monitoring area 1111 and (iii) the object 1120 identifies its own position and direction.

Moreover, the monitoring area map information may be generated by combining the object detection sensor 1123 and the position information detection unit 1126 as shown in FIGS. 83 and 85 respectively.

Next, the moving camera 1301 performs the processes K-1, J-2 and J-3 (steps K01, J02 and J03). These processes are the same as the tenth embodiment and the eleventh embodiment.

By repeating such procedures as described above, each moving camera 1301 changes the image capturing area in association with the change of its own image capturing area generated by the change of the position, the shape and the direction of the object 1120 existing in the monitoring area 1111 so that (i) a constant overlapping width C is kept between the image capturing area of the moving camera 1301 and the adjacent image capturing area of each surrounding moving camera and (ii) a constant distance D is kept between the image capturing area of the moving camera 1301 and the border of the monitoring area in the case where the image capturing area of the moving camera 1301 is adjacent to the border of the monitoring area.

Figure 86:
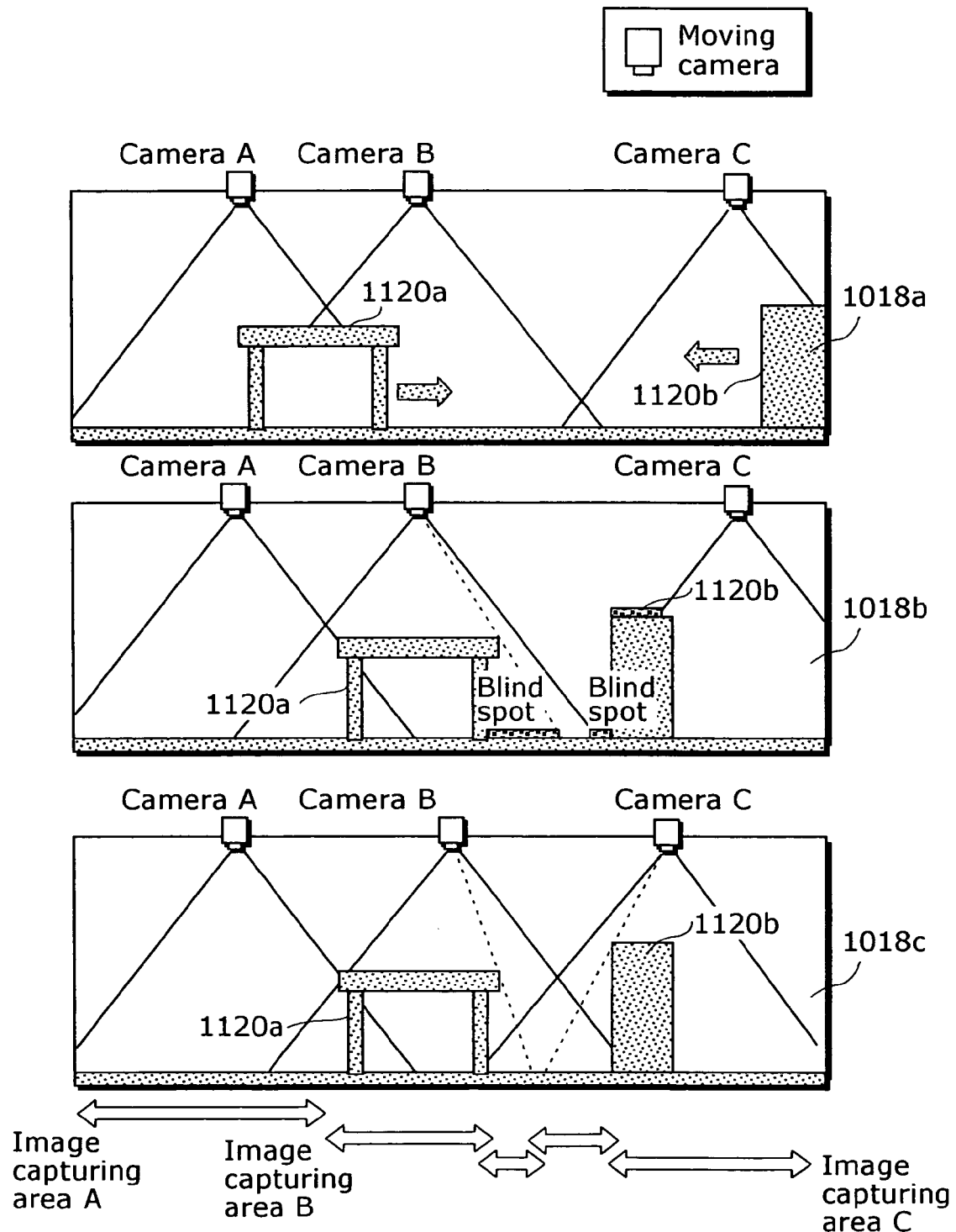
FIG. 86 is a diagram illustrating operations of a moving camera.

FIG. 86 shows operations performed by the moving camera 1301 according to the twelfth-embodiment. In FIG. 86, to simplify the explanation, the moving cameras 1301 which can move in horizontal directions (one-dimensionally) are set in the ceiling of a room where the ceiling level is equal, and the image of the floor is captured.

In the monitor system according to the twelfth embodiment, in the case where the objects 1120a and 1120b are moved as shown in the state 1018b of FIG. 86 from the state in which the moving cameras 1301 monitor the whole monitoring area as shown in the state 1018a of FIG. 86, the blind spot areas which cannot be captured by the moving cameras are generated. However, the position of the object can be detected by the object detection sensor set in the monitoring area and by the position information notification unit attached to the object. And, the monitoring area map generation unit 1125 included in each moving camera 1301 can change the details of the monitoring area map information. Then, the image capturing areas after the objects 1120a and 1120b are moved can be identified. The image capturing position can be changed so that (i) a constant overlapping width C is kept between the image capturing area of the moving camera 1301 and the adjacent image capturing area of each surrounding moving camera and (ii) a constant distance D is kept between the image capturing area of the moving camera 1301 and the border of the monitoring area. As shown in the state 1018c of FIG. 86, the image capturing positions can be changed to the positions where the plurality of moving cameras can simultaneously capture the image of the whole monitoring area.

Here, as shown in the state 1018c of FIG. 86, there is a case where the image capturing area of one camera is divided into a plurality of areas depending on the position relation between the object and each moving camera. In this case, an adjacent image capturing area is identified per divided image capturing area. And, evaluation values are calculated for (i) an overlapping width between the divided image capturing area and the adjacent image capturing area and (ii) distance between the divided image capturing area and the border of the monitoring area. The image capturing position can be changed to the direction where the total sum of the evaluation values decreases (or increases). Thus, the moving cameras can be arranged in the positions where the plurality of cameras can simultaneously capture the image of the whole monitoring area.

Here, capturing the image of the whole monitoring area means simultaneously capturing the image of the plane parallel to the floor from the direction vertical to the floor. In addition to such image capturing as described above, for example, a monitor system may be built in which (i) a monitoring area may be defined so as to include the bottom area of the object 1120a (desk), (ii) the moving range and moving direction of each moving camera may be changed according to the monitor purpose so that the image of the whole monitoring area can be simultaneously captured by the plurality of moving cameras and (iii) the necessary monitoring area map information is used.

As described above, the moving camera 1301 according to the twelfth embodiment detects the position of the object by the object detection sensor set in the monitoring area or by the position information notification unit attached to the object. And, each moving camera 1301 continues to generate the details of the monitored are map information by the monitoring area map generation unit 1125. Thus, the image capturing area of the moving current camera can be correctly identified even in the case where the position, shape and direction of the object are changed. As a result, even in the case where the object 1120 is moved or the state of the object 1120 changes, the image capturing position of each moving camera 1301 can be automatically changed so that the blind spots can be reduced in the monitoring area in the simultaneous image capturing by the plurality of cameras 1301.

Thirteenth Embodiment

Next, the thirteenth embodiment of the present invention will be explained.

Figure 87:
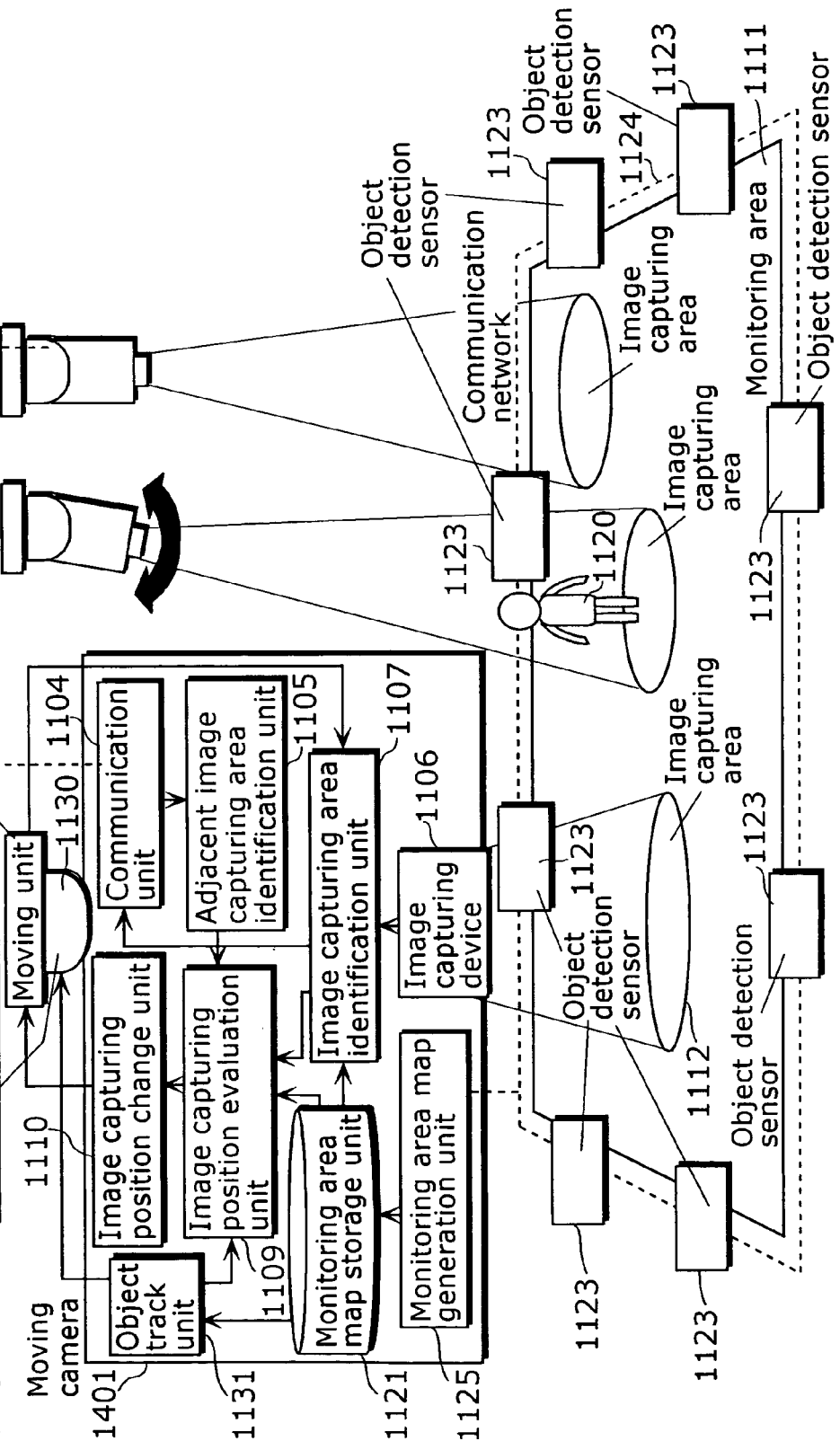
FIG. 87 is a block diagram showing a structure of the thirteenth embodiment according to the present invention.

FIG. 87 is a diagram showing a structure of a monitor system according to the thirteenth embodiment of the present invention. This monitor system includes a plurality of cameras connected via a communication network 1103, each of which is made up of a moving camera 1401, a moving unit 1102 and an image capturing direction change unit 1130. The plurality of cameras 1401 move in autonomous cooperation so that the monitoring area 1111 can be thoroughly monitored. And, the moving cameras 1401 can be automatically arranged in the positions where the images suitable for recognizing the face of the intruder. In FIG. 87, the same components as shown in FIGS. 70, 79 and 83 are assigned with the same codes, and the explanation will be omitted.

The image capturing direction change unit 1130 is a mechanical section and the like which change the view direction of each moving camera 1401.

The moving camera 1401 is a camera which moves being supported by the moving unit 1102. The moving camera 1401 includes: a communication unit 1104; an adjacent image capturing area identification unit 1105; an image capturing device 1106; an image capturing area estimation unit 1107; an image capturing position evaluation unit 1109; an image capturing position change unit 1110; a monitoring area map storage unit 1121; a monitoring area map generation unit 1125; and an object track unit 1131.

The object track unit 1131 is a control unit which refers to the monitoring area map information stored in the monitoring area map storage unit, and causes the view direction of the moving camera to the position direction of the object.

In addition to evaluating (i) the overlapping area between the image capturing area of the moving camera 1401 and the adjacent image capturing area and (ii) the distance between the image capturing area of the moving camera 1401 and the border of the monitoring area, the image capturing position evaluation unit 1109 provides an evaluation value C for the position relation (distance and direction) between the object and each moving camera.

According to the structure of the thirteenth embodiment as described above, each moving camera 1401 changes the image capturing position so that (i) the overlapping area between the image capturing area of the moving camera 1401 and the adjacent image capturing area and (ii) the distance between the image capturing area of the moving camera 1401 and the border of the monitoring area become a predetermined state. Thereby, each moving camera 1401 can automatically move to the image capturing position having few blind spots in the monitoring area in cooperation with the surrounding moving cameras, in the simultaneous image capturing by the plurality of moving cameras. Moreover, an arbitrary moving camera 1401 can move to a position where the image of the object 1120 existing in the monitoring area can be captured from a predetermined position (distance and direction).

Figure 88C:
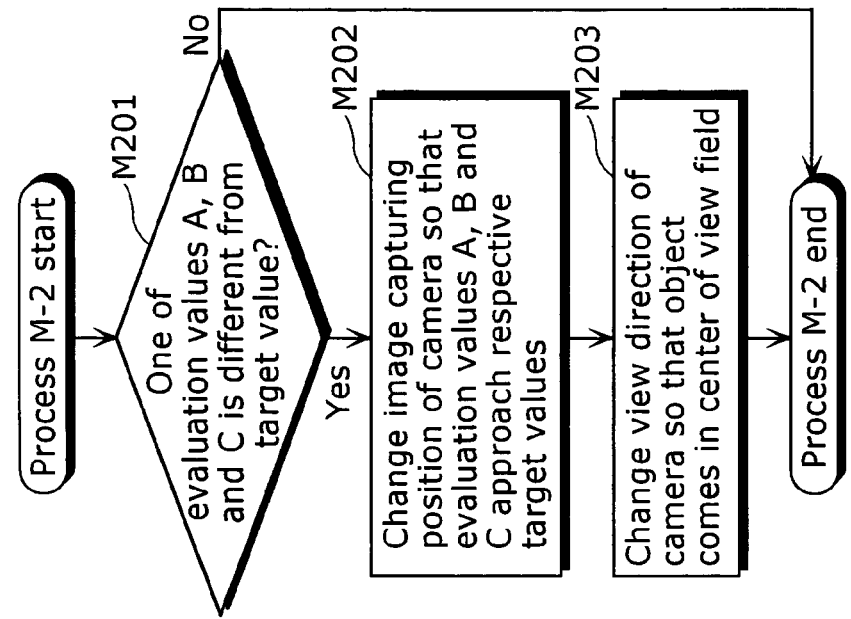
FIGS. 88A, 88B and 88C are flow charts explaining operations of the thirteenth embodiment.
Figure 88B:
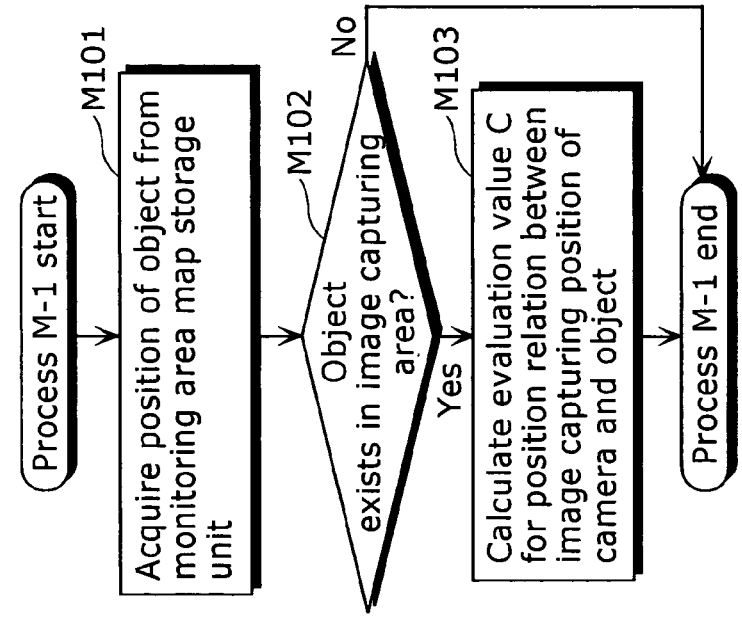
Figure 88A:
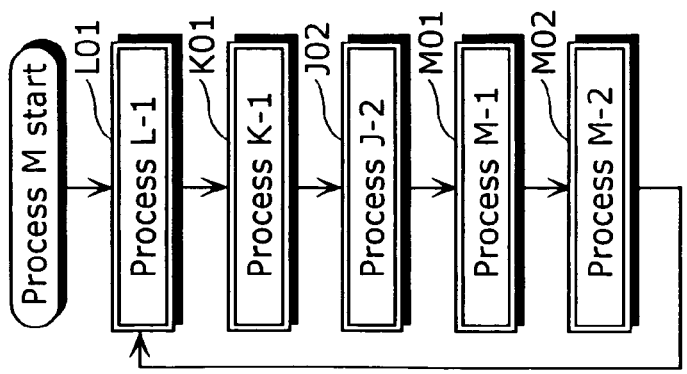

Next, operational procedures of the moving cameras 1401 included in the monitor system will be explained using the flow charts as shown in FIGS. 88A, 88B and 88C. In FIGS. 88A, 88B and 88C, the same operational procedures as shown in FIGS. 71A, 71B, 71C, 71D, 80A, 80B, 84A and 84B are assigned with the same codes, and the explanation will be omitted.

The moving camera 1401 repeatedly performs five processes (processes L-1, K-1, J-2, M-1 and M-2).

The moving camera 1401 performs the following process as the process M-1 (step M01).

The image capturing position evaluation unit 1109 and the object track unit 1131 refer to the monitoring area map information stored in the monitoring area map storage unit 1121, and acquires the position of the predetermined object 1120 existing in the monitoring area 1111 (step M101).

The object track unit 1131 judges whether or not the object 1120 exists in the image capturing area 1112 (step M102). In the case where the object 1120 exists, the process is proceeded to the step M1103. In the case where the object 1120 does not exist, the process M-1 is ended.

The image capturing position evaluation unit 1109 calculates an evaluation value C for the position relation between the image capturing position of the moving camera 1401 and the object (step M1103), and the process M-1 is ended.

Next, an example of the method for providing an evaluation value C for the position relation between the object 1120 and the moving camera 1401 in the step M1103 will be explained using FIG. 89.

Figure 89:
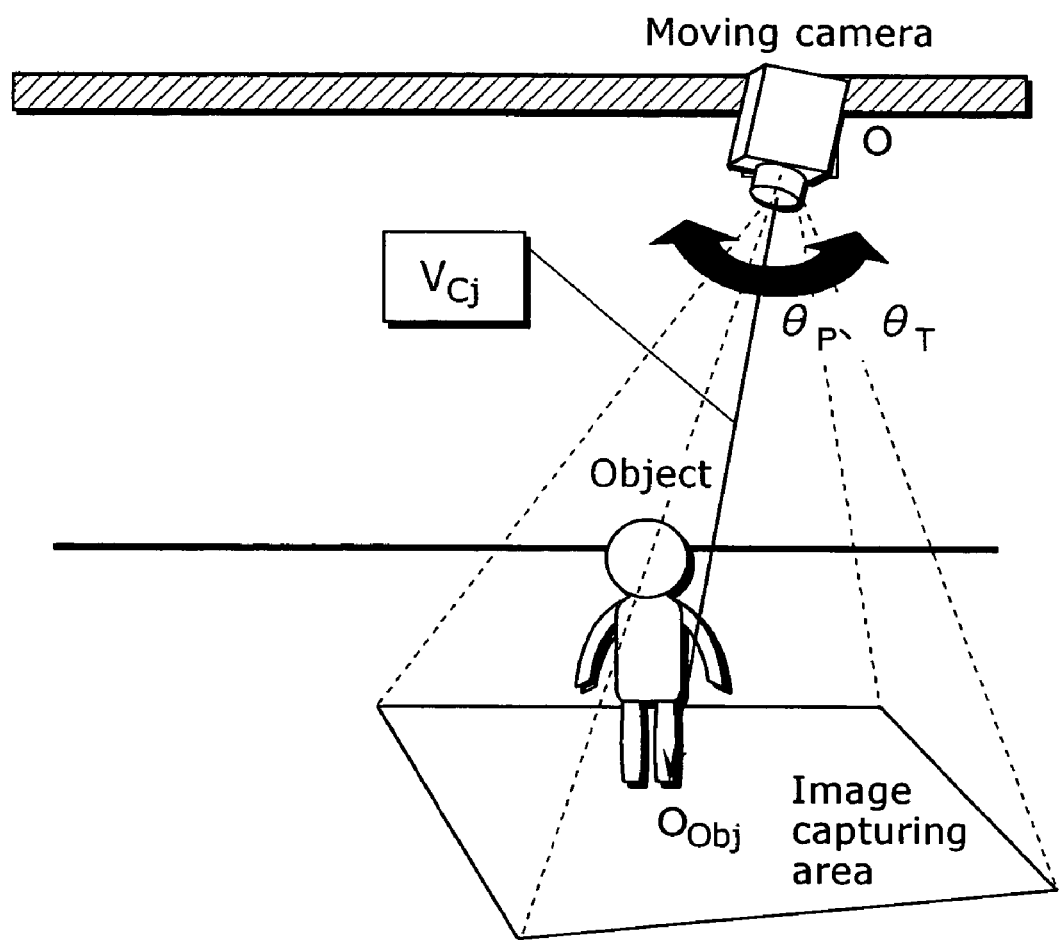
FIG. 89 is a diagram illustrating an evaluation function C of a moving camera.

FIG. 89 is a diagram for explaining: the position relation between the object 1120 and the moving camera 1401; and the following equations which are an example of an evaluation function C that provides the evaluation value C for the position relation. The evaluation value C for the moving camera 1401 is provided by the evaluation function C expressed by the equations 79, 80 and 81 based on the position relation of the object 1120 and the moving camera 1401.

If Object ∈ "image capturing area" then $$\begin{cases} V_{Cx}(x) = (x - x_{obj} - E_x)^2 & \text{(Equation 79)} \\ V_{Cy}(y) = (y - y_{obj} - E_y)^2 & \text{(Equation 80)} \\ V_{Cz}(z) = (z - z_{obj} - E_z)^2 & \text{(Equation 81)} \end{cases}$$

$$\therefore E = \sqrt{E_x^2 + E_y^2 + E_z^2}$$

$$\begin{cases} V_{\theta P}(\theta_P) = (\theta_P - \theta_{Pobj})^2 & \text{(Equation 82)} \\ V_{\theta T}(\theta_T) = (\theta_T - \theta_{Tobj})^2 & \text{(Equation 83)} \end{cases}$$

Here, coordinates of object: $O_{obj}(x_{obj}, y_{obj}, z_{obj})$
(directions of object: $\theta_{obj}(\theta_{Pobj}, \theta_{Tobj})$)

Here, the evaluation function C is not limited to the equations 79, 80 and 81, and may be other functions which provide an evaluation value C that (i) is the smallest (or the largest) when the distance between the object 1120 and the moving camera 1401 becomes a predetermined constant E, and (ii) monotonically increases (or decreases) as the distance between the object 1120 and the moving camera 1401 recedes from the constant E within the range the moving camera 1401 can move.

Also, the value of the constant E used in the equations 79, 80 and 81 may be different depending on the moving camera. Moreover, the constant E may be a variable C which changes depending on the position of the object 1120.

Next, the moving camera 1401 starts the process M-2 (step M02).

The image capturing position change unit 1110 judges whether or not one of the evaluation values A, B, C and D is different from the target value (step M201). In the case where one of the evaluation values A, B, C and D is different from the target value, the process is proceeded to step M202. In the case where the evaluation values A, B, C and D are the same as the respective target values, the process M-2 is ended.

The image capturing position change unit 1110 changes the image capturing area so that the evaluation values A, B, C and D approach the respective target values (step M202).

The object track unit 1131 changes the view direction of the moving camera 1401 so that the object 1120 comes in the center of the view field of the moving camera 1401 (step M203), and the process M-2 is ended.

In the step M201, the target values of the evaluation values A, B and C are the minimum value (or the maximum value) of the respective evaluation values.

Also, in the step M202, an example of the method for having the evaluation values A, B and C approach the target values is as follows. In other words, the image capturing position (x, y, z) of the moving camera 1401 is changed according to the following equations 84, 85 and 86 and the update equations 76, 77 and 78 which include derivatives derived by partially differentiating the evaluation values A, B and C using the variables (x, y, z) expressing the image capturing position of the moving camera 1401.

$$\frac{dx}{dt} = -\alpha_x \frac{\partial(V_{Cx} + V_{Cy} + V_{Cz})}{\partial x} \qquad \text{(Equation 84)}$$

$$\frac{dy}{dt} = -\alpha_y \frac{\partial(V_{Cx} + V_{Cy} + V_{Cz})}{\partial y} \qquad \text{(Equation 85)}$$

$$\frac{dz}{dt} = -\alpha_z \frac{\partial(V_{Cx} + V_{Cy} + V_{Cz})}{\partial z} \qquad \text{(Equation 86)}$$

-continued $$\frac{d\theta_P}{dt} = -\alpha_P \frac{\partial(V_{obj\theta T} + V_{obj\theta P})}{\partial \theta_P} \quad \text{(Equation 87)}$$

$$\frac{d\theta_T}{dt} = -\alpha_T \frac{\partial(V_{obj\theta T} + V_{obj\theta P})}{\partial \theta_T} \quad \text{(Equation 88)}$$

Here, $\alpha_x$, $\alpha_y$, $\alpha_z$, $\alpha_P$, $\alpha_T$ are coefficients.

An example of the method for changing the view direction so that the object 1120 comes in the center of the view line of the moving camera 1401 in the step M203 is as follows. In other words, in the case where the moving camera 1401 can change the view direction in pan direction and tilt direction, and the respective angles are $\theta_P$ and $\theta_T$, an evaluation value is provided for the angle difference between the view direction $(\theta_P, \theta_T)$ of the moving camera 1401 and the direction $(\theta_{Pobj}, \theta_{Tobj})$ in which the moving camera 1401 can see the object 1120, using the above equations 82 and 83. The view direction $(\theta_P, \theta_T)$ of the moving camera 1401 is changed using the above update equations 87 and 88 which include derivatives derived by partially differentiating the equations 82 and 83 using the angles $\theta_P$ and $\theta_T$. Thus, the view direction of the moving camera 1401 can be changed to the direction of the object 1120.

By repeating the above mentioned procedures, each moving camera 1401 changes the image capturing area in cooperation with the surrounding image capturing cameras so that (i) a constant overlapping width C is kept between the image capturing area of the moving camera 1401 and the adjacent image capturing area, (ii) a constant distance D is kept between the image capturing area of the moving camera 1401 and the border of the monitoring area in the case where the image capturing are of the moving camera 1401 is adjacent to the border of the monitoring area and (iii) the moving camera 1401 can capture the image of the object 1120 from a predetermined position (distance and direction), the moving camera 1401 having the object 1120 in its own image capturing area.

Figure 90:
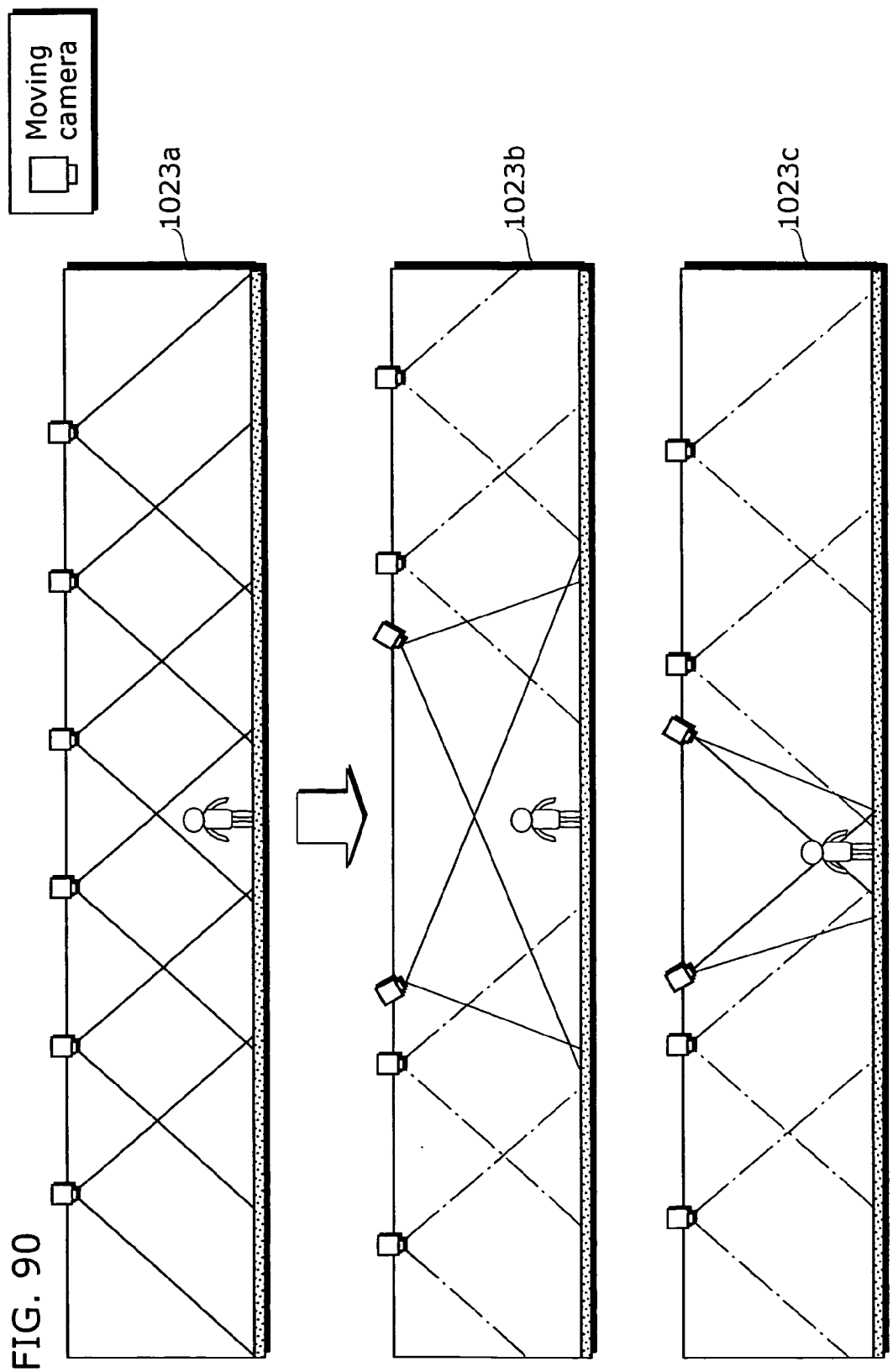
FIG. 90 is a diagram illustrating operations of a moving camera according to the thirteenth embodiment.

FIG. 90 shows operations performed by the moving camera 1401 according to the thirteenth embodiment. In FIG. 90, to simplify the explanation, the moving cameras 1401 which can move in horizontal directions (one-dimensionally) are set in the ceiling of a room where the ceiling level is equal, and the image of the floor is captured.

In the monitor system according to the thirteenth embodiment, as shown in the state 1023a of FIG. 90, in the case where (i) the moving cameras 1401 are arranged in the positions where the plurality of moving cameras can capture the image of the whole monitoring area and (ii) it is predetermined that each moving camera 1401 should capture the image of the side view of the person when two moving cameras 1401a and 1401b discover the predetermined object 1120 (person), as shown in the state 1023b of FIG. 90, the plurality of cameras 1401 move to the positions which are suitable for capturing the image of the side view of the person while maintaining the simultaneous image capturing of the whole monitoring area in cooperation with the surrounding moving cameras.

Also, in such case as described above, the moving cameras may have a zoom image-capturing function. According to need, the image may be captured using zoom as shown in the state 1023c of FIG. 90.

As described above, the moving cameras 1401 according to the thirteenth embodiment can be automatically arranged in the positions where the image suitable for recognizing the intruder's face can be captured while constantly performing the simultaneous image capturing of the whole service entrance, in the case where the service entrance of a building is monitored and the intruder's face is recognized.

Fourteenth Embodiment

Next, the fourteenth embodiment will be explained.

Figure 91:
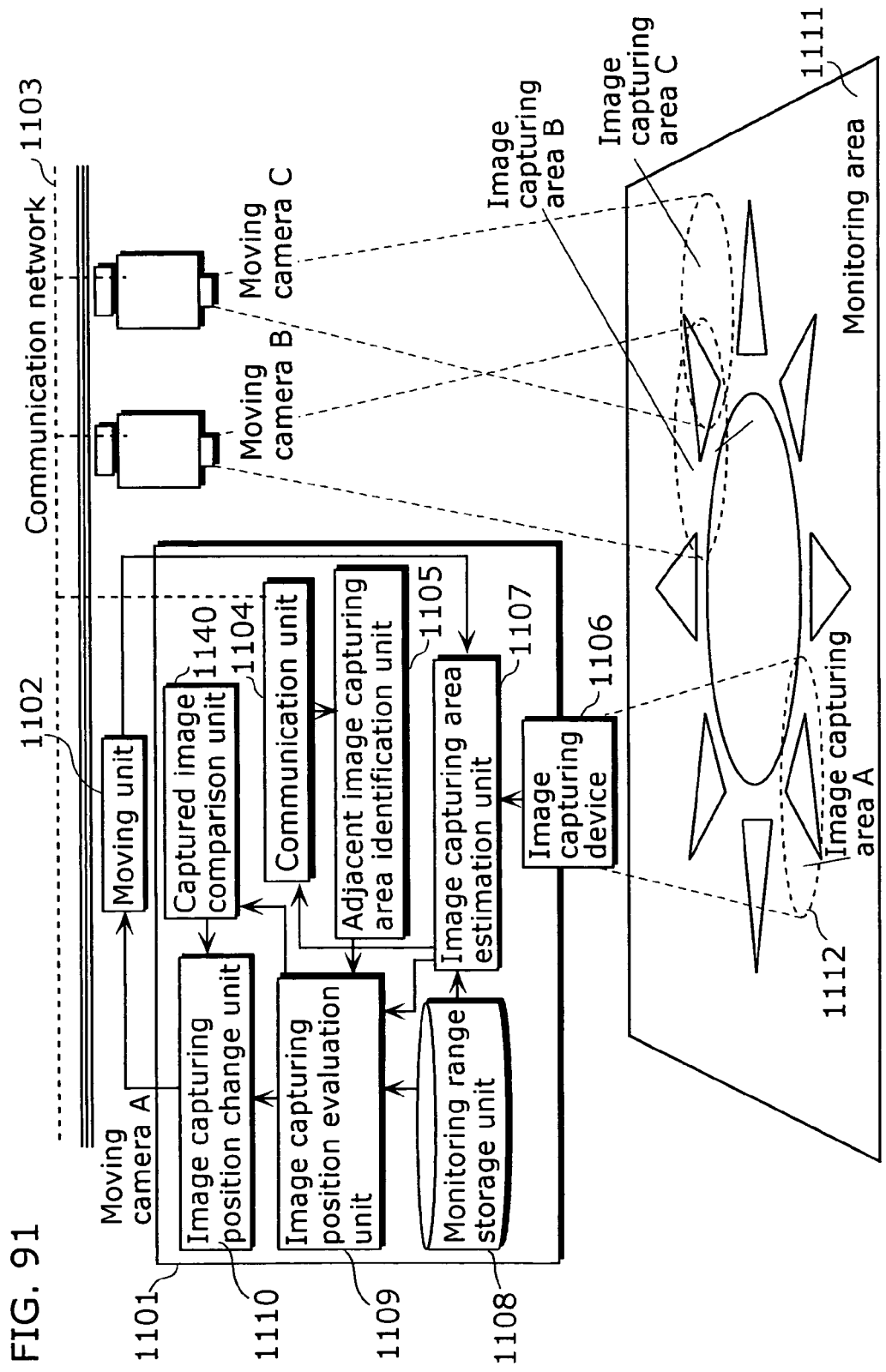
FIG. 91 is a block diagram showing a structure of the fourteenth embodiment according to the present invention.

FIG. 91 is a diagram showing a structure of a monitor system according to the fourteenth embodiment. This monitor system includes a plurality of cameras connected via a communication network 1103, each of which is made up of a moving camera 1501 and a moving unit 1102. The plurality of moving cameras 1501 move in autonomous cooperation so that the monitoring area 1111 can be thoroughly monitored. And, the image capturing area is changed without the monitoring area map information, while judging that the overlapping area with each adjacent image capturing area is constantly kept so that a constant overlapping area is kept with each adjacent image capturing area of the surrounding moving cameras. In FIG. 91, the same components as shown in FIG. 70 are assigned with the same codes, and the explanation will be omitted.

The moving camera 1501 is a camera which moves being supported by the moving unit 1102. And, the moving camera 1501 includes: a communication unit 1104; an adjacent image capturing area identification unit 1105; an image capturing device 1106; an image capturing area estimation unit 1107; a monitored range storage unit 1108; an image capturing position evaluation unit 1109; an image capturing position change unit 1110; and a captured image comparison unit 1140.

The captured image comparison unit 1140 is a processing unit which compares, by image processing (contour extraction, pattern matching and the like), an image captured by a moving camera 1501 and an image captured by a moving camera having an adjacent image capturing area to the moving camera 1501, and judges whether or not there is a part in which the same area is captured in the images.

In the present embodiment, a pattern (here, a picture of the sun) as shown in FIG. 91 is drawn on the floor plane which is the monitoring area 1111.

According to the structure of the fourteenth embodiment as described above, even in the case where the monitoring area map information is not previously prepared for each of the moving cameras 1501, the captured image comparison unit 1140 compares the images captured in the image captured areas of the moving camera 1501 to the adjacent camera, and judges whether or not there is a part in which the same area is captured in the images. Thus, it is judged whether or not an overlapping area actually exists between the adjacent image capturing areas.

Figure 92A:
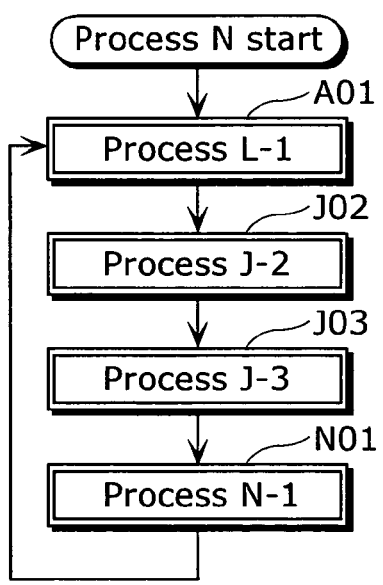
FIGS. 92A and 92B are flow charts explaining operations of the fourteenth embodiment.
Figure 92B:
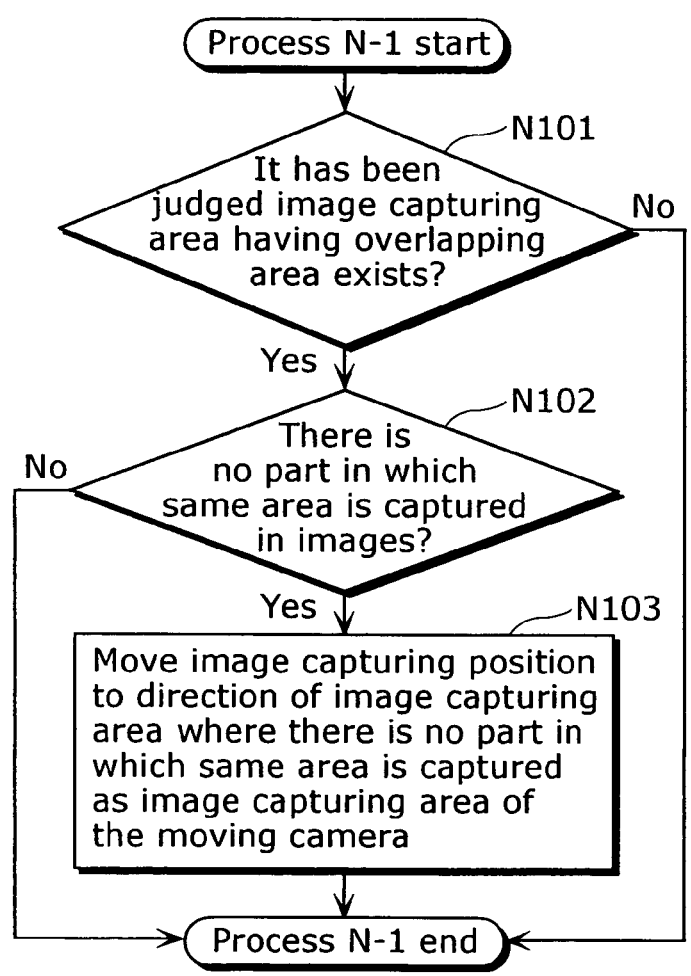

Next, the operational procedures performed by the moving cameras 1501 included in the monitor system will be explained using the flow charts as shown in FIGS. 92A and 92B. In FIGS. 92A and 92B, the same operational procedures as shown in FIGS. 71A, 71B, 71C and 71D are assigned with the same codes, and the explanation will be omitted.

The moving camera 1401 repeatedly performs the four procedures (processes J-1, J-2, J-3 and N-1).

The moving camera 1401 performs the following process as the process N-1 (step N01).

The image capturing position evaluation unit judges whether or not the image capturing area having the overlapping area exists (step N101). In the case where the image capturing area having the overlapping area exists, the process is proceeded to step N102. In the case where the image capturing area having the overlapping area doe not exist, the process N-1 is ended.

The captured image comparison unit 1140 compares (i) the image captured by the moving camera whose image capturing area is estimated as adjacent to the image capturing area of the current moving camera to (ii) the image captured by the current moving camera, and judges whether or not there is a part in which the same area is captured in the images (step N102). In the case where there is a part in which the same area is captured in the images, the process N-1 is ended. In the case where there is no part in which the same area is captured in the images, the process is proceeded to step N1103.

Figure 93:
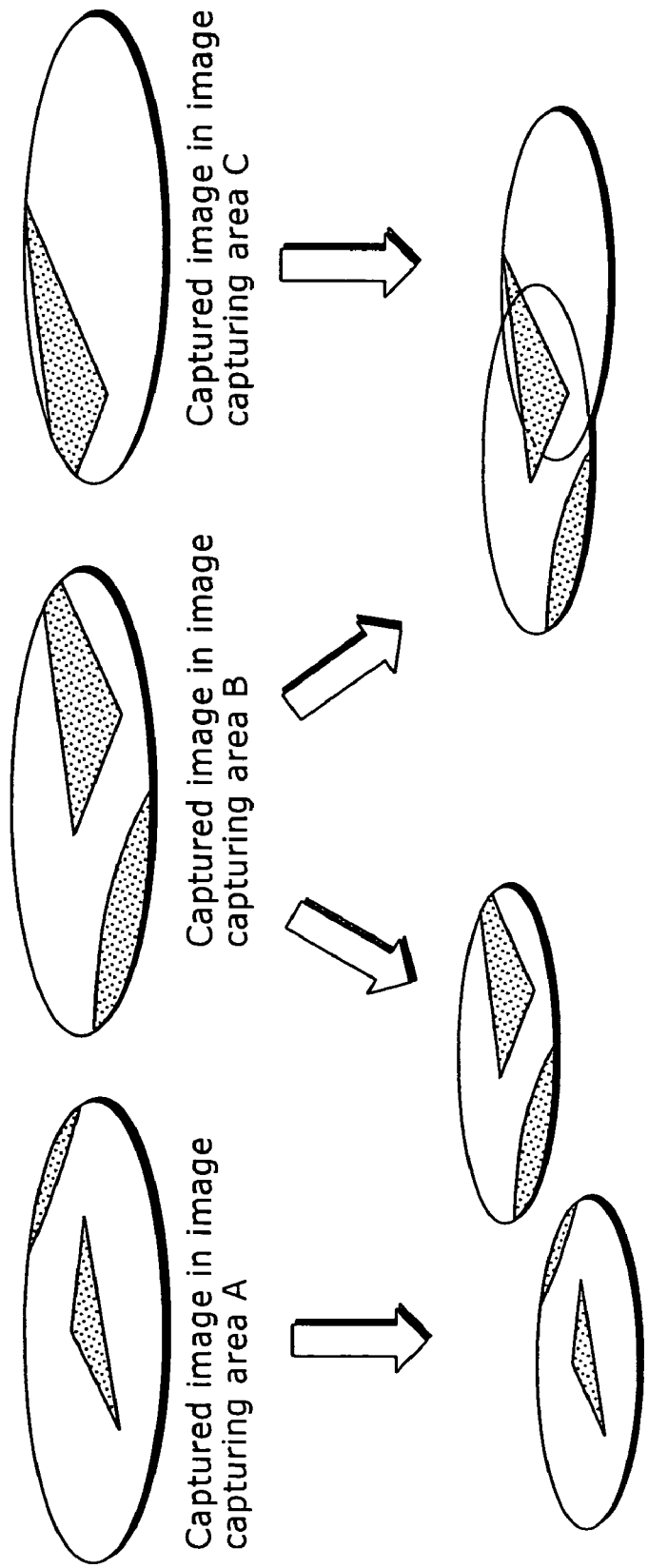
FIG. 93 is a diagram illustrating operations of a captured image comparison unit.

For example, in the case where each of the images captured in the image capturing areas A, B and C are a part of the picture drawn in the monitoring area 1111 (floor plane), as shown in the illustration of FIG. 93, the images having a common pattern of the floor plane are not captured in the image capturing areas A and B. Thereby, it is judged that the same image part does not exist (in other words, a blind spot exists between the image capturing areas A and B). On the other hand, the image of a common pattern of the floor plane is captured in the image capturing areas B and C. Thereby, it is judged that the same image part exists (in other words, the image capturing areas B and C are adjacent to each other, and have an overlapping area).

The image capturing position change unit 1110 moves the moving camera 1501 to the direction of the image capturing area where there is no part in which the same area is captured as the image capturing area of the current moving camera (step N103), the image capturing area being judged as having an overlapping area with the image capturing area of the current moving camera. And, the process N-1 is ended.

By repeating the procedures as described above, each moving camera 1501, without having the monitoring area map information, changes the image capturing area while judging that the overlapping area with each adjacent image capturing area is constantly kept so that a constant overlapping area is kept with each adjacent image capturing area of the surrounding moving cameras.

Thus, the moving camera 1501 according to the fourteenth embodiment can automatically move each moving camera to the image capturing position having few blind spots in the simultaneous image capturing by the plurality of moving cameras, even in the area where the position, the attitude and the direction of the object 1120 change frequently and the object detection sensor 1123 and the position information detection unit 1126 according to the twelfth embodiment cannot be set, such as outside.

Figure 94:
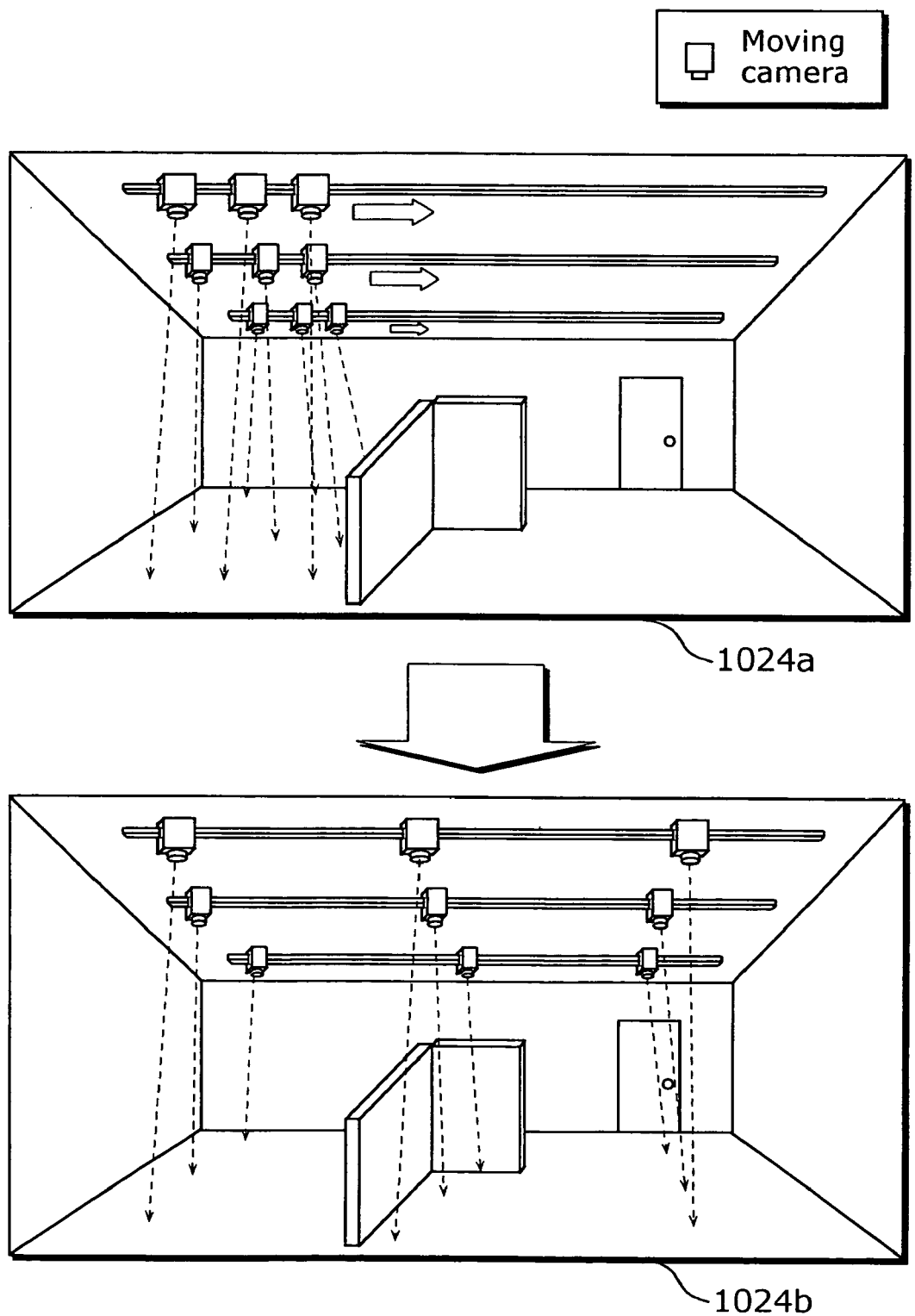
FIG. 94 is a diagram showing an example of a concrete method for setting a moving camera.

In the operations performed by the moving cameras according to the above mentioned embodiments, an example of the case where the moving cameras move in one-dimensional direction is explained. As an example method for realizing specific operations in one-dimensional direction, as shown in FIG. 94, rails can be set in the monitoring area. And, the moving cameras move on the orbit of the rails. Thus, movement in one-dimensional direction can be realized.

Figure 95:
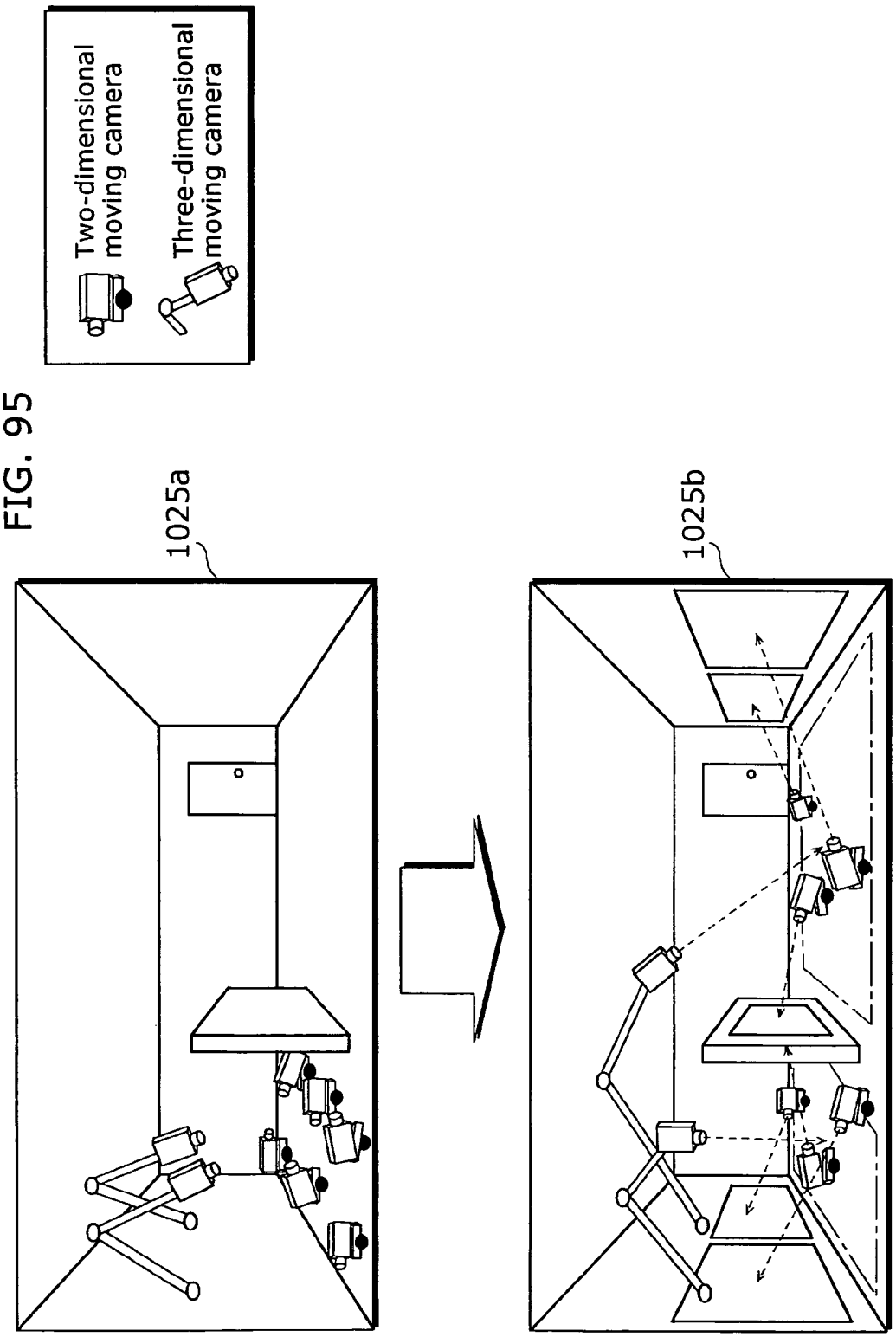
FIG. 95 is a diagram showing another example of a concrete method for setting a moving camera.

Also, as shown in FIG. 95, two-dimensional moving cameras which can move in two-dimensional directions may be used by attaching tires to the moving cameras; and three-dimensional cameras which can move in three-dimensional directions may be used by using arms and the like. FIG. 95 shows an example of a monitor system which uses: two-dimensional moving cameras whose monitoring areas are the wall surfaces; and three-dimensional moving cameras whose monitoring area is the floor plane of the room. Here, the initial state 1025a automatically changes into the state 1025b having less blind spots.

In addition, in the tenth, eleventh, twelfth and fourteenth embodiments, the view direction of each moving camera is vertical to the floor plane during the image capturing. However, the view direction of each moving camera may be determined according to the moving range of the moving camera and the monitoring purpose. For example, the rails may be set in the corner of the room, and the moving cameras may be set so that the view lines are directed to the center of the room.

As described above, the monitor system according to the present invention has been explained based on the embodiments. However, the present invention is not limited to these embodiments. In each embodiment, various modifications or functional additions may be made by persons skilled in the art within the range the purport of the invention is protected. Also, the respective components of each embodiment may be arbitrarily combined as long as they can functionally coexist. For example, the image capturing characteristics change unit 905 according to the ninth embodiment may be included in the moving camera 1101 of the tenth embodiment. The plurality of moving cameras move, and each image capturing area is dispersed equally without concentration in the monitoring area. And, a monitor system in which the image capturing accuracy of each moving camera is equal can be realized.

Figure 96:
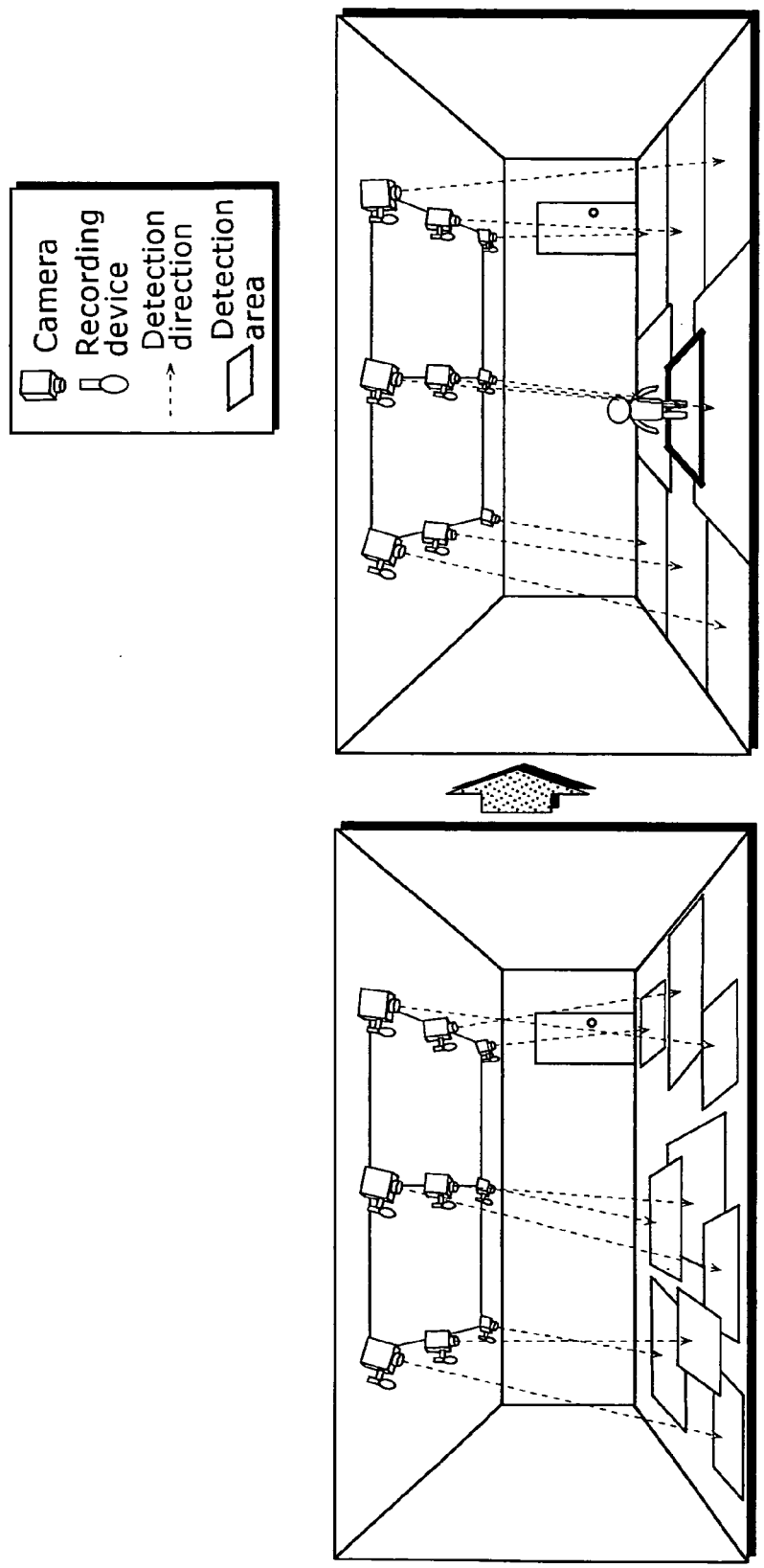
FIG. 96 is a diagram showing a monitor system including a recording device in addition to an image capturing device of a camera.

Also, in the above embodiments, each camera includes only the image capturing device for capturing an image. However, as shown in FIG. 96, in addition to the image capturing device, a recording device may be included. And, audio information may be further acquired in addition to the image information from the monitoring area. Moreover, the object may be image-captured and recorded in association with the object's movement.

Figure 97:
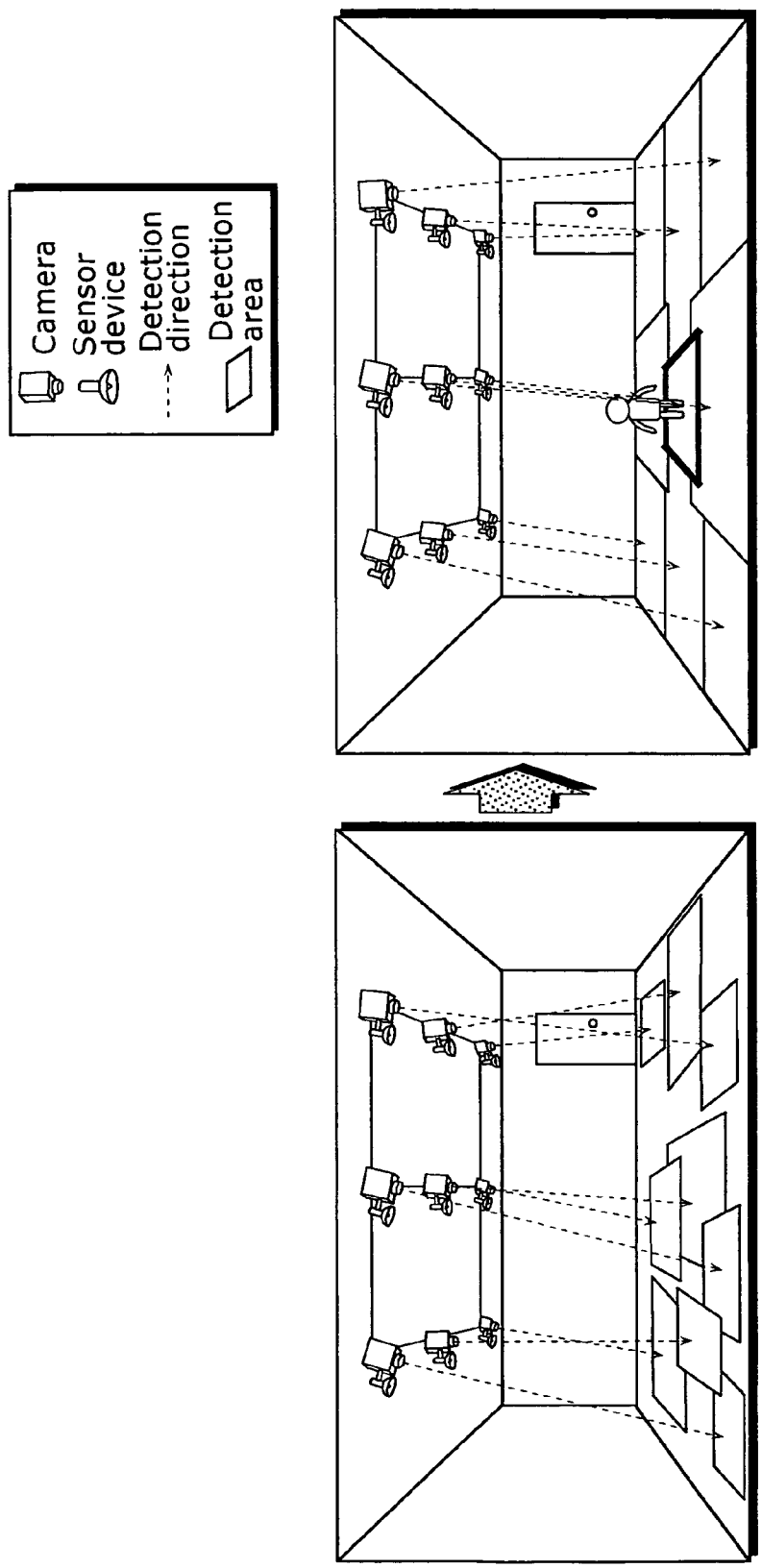
FIG. 97 is a diagram showing a monitor system including a sensor device in addition to an image capturing device of a camera.

In the above embodiments, in addition to the recording device, sensors such as an infrared sensor, an ultrasonic sensor, a temperature sensor and an ultraviolet and X-ray sensor may be included. As shown in FIG. 97, in addition to the image information acquired from the monitoring area, a predetermined physical quantity may be measured. Moreover, the image of the object may be captured and the predetermined physical quantity may be measured in association with the object's movement.

Furthermore, the present invention can be applied not only to a camera, but also to the above mentioned various sensors. In other words, in stead of the cameras according to the above embodiments, the monitor system may include sensors such as a tangent sensor, a pressure sensor, a temperature sensor, pneumatic sensor and sound sensor (microphone). In this case, a direction (detection area) in which the sensor detects the physical quantity may be associated with the image capturing area of the camera. For example, for the microphone having a directional pattern as shown in FIG. 98A, a direction (area) is defined as a detection area, in the direction (area) sound being able to be detected with sensitivity that is equal to or more than a predetermined sensitivity as shown in FIG. 98B. Thereby, a monitor system including various sensors can be built. In other words, the monitor system includes a plurality of sensor terminals connected via a communication path. And, in the monitor system, the monitoring area is monitored by detecting the physical quantity in the monitoring area. The monitor system can be realized in which the plurality of sensor terminals detect the physical quantity in the detection area included in the monitoring area. And, each of the plurality of sensor terminals includes: a sensor having a unit to change the detection area; a communication unit which (i) transmits detection characteristics information that is information identifying the detection area to another sensor via a communication path and (ii) receives detection characteristics information from another sensor; and a detection characteristics change unit which changes the detection area by controlling the sensor of the current sensor terminal based on the detection characteristics information of the current sensor terminal and the detection characteristics information of another sensor terminal received in the communication unit so that the detection area of the current sensor terminal and the detection area of another sensor terminal have a predetermined relation.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention includes, in particular, a plurality of moving cameras which can change the image capturing position as a monitor system including a plurality of cameras, a sensing system in which a physical quantity is measured using a plurality of sensor devices. The present invention can be used as a monitor system and the like in which an area is monitored, the area needing change of the image capturing position, so that the blind spots generated in the monitoring area can be reduced (i) in the service entrance and salesroom of a shop where it is required that the blind spots are not generated and (ii) in the environment where the positions of the blind spots change due to the position change of furniture and a person's movement.

What is claimed is:

1. A monitor system for capturing an image of a monitoring area, the system comprising:
    a plurality of cameras connected via a communication path,
    wherein each camera of the plurality of cameras includes:
    an image capturing device operable to capture an image of an image capturing area included in the monitoring area, and to change the image capturing area;
    a communication unit operable to transmit, to another camera via the communication path, image capturing characteristics information for identifying the image capturing area, and to receive image capturing characteristics information from said another camera;
    an image capturing characteristics change unit operable to change the image capturing area by controlling the camera based on the image capturing characteristics information of the camera and the image capturing characteristics information of said another camera received by said communication unit so that the image capturing area of the camera and the image capturing area of said another camera have a predetermined relation, and
    wherein the image capturing characteristics information includes information for identifying a position of the image capturing area, and
    said image capturing characteristics change unit includes:
    a cooperation partner determination unit operable to identify another camera whose image capturing area is adjacent to the image capturing area of the camera;
    an area difference evaluation unit operable to provide an overlapping area evaluation value for an overlapped area in which the image capturing area of said another camera which has been identified and the image capturing area of the camera overlap each other, based on the image capturing characteristics information from said another camera and the image capturing characteristics information of the camera; and
    an image capturing area change unit operable to change the image capturing area of the camera so as to generate the overlapped area by controlling said camera so that the overlapping area evaluation value approaches a predetermined overlapping area target value so as to form a gapless wide range image, the overlapping area evaluation value being provided by said area difference evaluation unit.

2. The monitor system according to claim 1,
wherein said image capturing characteristics change unit further includes:
a standard area storage unit operable to store position information indicating a standard area predetermined in the monitoring area; and
a self-area evaluation unit operable to provide a standard area evaluation value for a position relation between the standard area and the image capturing area of the camera, the standard area being indicated by the position information stored in said standard area storage unit, and
said image capturing area change unit is operable to control the camera so that the standard area evaluation values approach predetermined standard area target values respectively, the standard area evaluation values being provided by said area difference evaluation unit and said self-area evaluation unit.

3. The monitor system according to claim 2,
wherein the predetermined standard area is an area in which an image captured by each of the plurality of cameras has few distortions.

4. The monitor system according to claim 1,
wherein said image capturing characteristics change unit further includes:
an object position identification unit operable to identify a position of an object existing in the monitoring area; and
a self-area evaluation unit operable to provide an object evaluation value for a position relation between the identified position of the object and the image capturing area of the camera, and
said image capturing area change unit is operable to control the camera so that the object evaluation values approach predetermined object target values respectively, the object evaluation values being provided by said area difference evaluation unit and said self-area evaluation unit.

5. The monitor system according to claim 1,
wherein said image capturing characteristics change unit further includes a border area evaluation unit operable to provide a self-owned area evaluation value for a position relation between a border area of the monitoring area and the image capturing area of the camera, and
said image capturing area change unit is operable to control the camera so that the self-owned area evaluation values approach predetermined self-owned area target values respectively, the self-owned area evaluation values being provided by said area difference evaluation unit and said border area evaluation unit.

6. The monitor system according to claim 1,
wherein said image capturing characteristics change unit further includes:
a non-image captured area identification unit operable to identify a position of a non-image captured area which has not been image-captured by none of the plurality of cameras in the monitoring area; and a self-area evaluation unit operable to provide an non-image captured area evaluation value for a position relation between the identified non-image captured area and the image capturing area of the camera, and said image capturing area change unit is operable to control the camera so that the non-image captured area evaluation values approach predetermined non-image captured area target values respectively, the non-image captured area evaluation values being provided by said area difference evaluation unit and said self-area evaluation unit.

7. The monitor system according to claim 1, wherein each camera of said plurality of cameras is operable to change image capturing accuracy in capturing the image of the image capturing area, the image capturing characteristics information includes the image capturing accuracy in capturing the image of the image capturing area, and said image capturing characteristics change unit is operable to change the image capturing accuracy by controlling the camera based on the image capturing characteristics information of the camera and the image capturing characteristics information of said another camera received by said communication unit so that the image capturing accuracy of the camera and the image capturing accuracy of said another camera have a predetermined relation.

8. The monitor system according to claim 7, wherein said image capturing characteristics change unit includes:

an accuracy difference evaluation unit operable to provide an image capturing accuracy evaluation value for the difference between the image capturing accuracy of said another camera and the image capturing accuracy of the camera; and an image capturing accuracy change unit operable to change image capturing accuracy by controlling the camera so that the image capturing accuracy evaluation value approaches a predetermined image capturing accuracy target value, the image capturing accuracy evaluation value being provided by said accuracy difference evaluation unit.

9. The monitor system according to claim 8, wherein said image capturing accuracy change unit is operable to control the camera so that the image capturing accuracy of said another camera and the image capturing accuracy of the camera become the same.

10. The monitor system according to claim 8, wherein said image capturing characteristics change unit further includes:

a standard accuracy storage unit operable to store a value of standard accuracy which is predetermined image capturing accuracy; and a self-accuracy evaluation unit operable to provide a first standard accuracy evaluation value for difference between the standard accuracy stored in said standard accuracy storage unit and the image capturing accuracy of the camera, and said image-capturing area change unit is operable to control the camera so that the first standard accuracy evaluation values approach predetermined first standard accuracy target values, the first standard accuracy evaluation values being provided by said accuracy difference evaluation unit and said self-accuracy evaluation unit.

11. The monitor system according to claim 8, wherein said image capturing characteristics change unit further includes:

an object image capturing specific standard accuracy storage unit operable to store predetermined standard accuracy for capturing an image of an object;

a self-accuracy evaluation unit operable to provide a second standard accuracy evaluation value for difference between (i) the standard accuracy stored in said object image capturing specific standard accuracy storage unit and (ii) the image capturing accuracy of the camera; and an object identification unit operable to judge whether or not the object exists in the image capturing area of the camera, and said image capturing area change unit is operable to control the camera so that (i) the second standard accuracy evaluation value approaches a predetermined second standard accuracy target value, the second standard accuracy evaluation value being provided by said self-accuracy evaluation unit, in the case where said object identification unit judges that the object exists and (ii) the second standard accuracy evaluation value approaches a predetermined second standard accuracy target value, the second standard accuracy evaluation value being provided by said accuracy difference evaluation unit, in the case where said object identification unit judges that the object does not exist.

12. The monitor system according to claim 1, wherein each of said plurality of cameras further includes:

a moving unit operable to move the camera; and a moving control unit operable to change the position of the image capturing area of the camera by controlling said moving unit, and said moving control unit is operable to control said moving unit based on the image capturing characteristics information of the camera and the image capturing characteristics information of said another camera received by said communication unit so that the monitoring area can be thoroughly image-captured simultaneously by said plurality of cameras.

13. The monitor system according to claim 12, wherein said moving control unit is operable to control said moving unit so that a portion of the image capturing area can be increased, the portion of the image capturing area being image-captured simultaneously by said plurality of cameras.

14. The monitor system according to claim 12, wherein said moving control unit is operable to control said moving unit so that the image capturing areas of said plurality of cameras can be equally dispersed in the monitoring area.

15. The monitor system according to claim 12, wherein said moving control unit includes:

a cooperation partner determination unit operable to identify another camera whose image capturing area is adjacent to the image capturing area of the camera;

a monitored range storage unit operable to store information which identifies the monitoring area;

an image capturing area estimation unit operable to estimate an image capturing area of the camera based on the characteristics of the camera and the position of the camera;

an image capturing position evaluation unit operable to evaluate (i) a size of an overlapping area between the estimated image capturing area and the image capturing area of said another camera and (ii) a distance between the estimated image capturing area and a border of the monitoring area; and an image capturing position change unit operable to control said moving unit based on the evaluation result in said image capturing position evaluation unit.

16. The monitor system according to claim 12, wherein an object to be monitored is placed in the monitoring area, each of said plurality of cameras further includes a map information storage unit operable to store position information indicating a position of the object in the monitoring area, and said moving control unit is operable to identify a blind spot area generated due to the object in the monitoring area based on the information stored in said map information storage unit, and to control said moving unit so that the identified blind spot area can be reduced.

17. The monitor system according to claim 16, wherein said map information storage unit is operable to further store shape information regarding a three-dimensional shape of the object, and said moving control unit is operable to identify a blind spot area generated due to the object in the monitoring area based on the shape information stored in said map information storage unit.

18. The monitor system according to claim 16, wherein each of said plurality of cameras further includes:

an object detection unit operable to detect a position of the object in the monitoring area; and a map generation unit operable to store information indicating the detected position into said map information storage unit.

19. The monitor system according to claim 18, wherein said object detection unit is operable to detect the position of the object by identifying a space position of said object detection unit which is attached to the object.

20. The monitor system according to claim 12, wherein an object to be monitored is placed in the monitoring area, and said moving control unit is operable to control said moving unit so that the camera is placed in a position suitable for the image capturing of the object.

21. The monitor system according to claim 20, wherein said moving control unit is operable to control said moving unit so that an image of the object can be captured from a predetermined direction.

22. The monitor system according to claim 20, wherein the object is a moving object, and each of said plurality of cameras further includes a track moving control unit operable to control said moving unit so that an image of the object can be captured by the camera.

23. The monitor system according to claim 12, wherein said communication unit is operable to acquire an image captured by another camera adjacent to the camera, each of said plurality of cameras further includes an image comparison unit operable to compare the image captured by said another camera with an image acquired by said communication unit, and to judge whether or not there is an overlapping area between the image capturing area of the camera and the image capturing area of said another camera, and said moving control unit is operable to control said moving unit so that the two image capturing areas have the overlapping area in the case where said image comparison unit judges that the two image capturing areas do not have the overlapping area.

24. The monitor system according to claim 23, wherein said monitoring area is a plane area on whose surface a pattern is drawn, and said image comparison unit is operable to compare the images depending on whether or not the image of the common pattern is captured in the two images.

25. A camera included in the monitor system according to claim 1.

26. A monitor method for monitoring a monitoring area, using a plurality of cameras connected via a communication path, wherein each camera of the plurality of cameras is operable to capture an image of an image capturing area included in the monitoring area, and to change the image capturing area, and said monitor method comprises:

transmitting, to another camera via the communication path, image capturing characteristics information for identifying the image capturing area of the camera, and receiving image capturing characteristics information from said another camera;

changing the image capturing area of the camera based on the image capturing characteristics information of the camera and the image capturing characteristics information of said another camera received in said communication so that the image capturing area of the camera and the image capturing area of said another camera have a predetermined relation;

providing an evaluation value for an overlapped area in which the image capturing area of the another camera and the image capturing area of the camera overlap each other, based on the image capturing characteristics information from the another camera and the image capturing characteristics information of the camera; and changing the image capturing area of the camera so as to generate the overlapped area by controlling the camera so that the evaluation value approaches a predetermined target value, thereby forming a gapless wide range image.

27. A computer program product embodied on a non-transitory computer readable storage medium for a camera included in a monitor system for monitoring a monitoring area, wherein the camera includes:

an image capturing device operable to capture an image of an image capturing area included in the monitoring area, and to change the image capturing area; and a communication unit operable to transmit, to another camera via the communication path, image capturing characteristics information for identifying the image capturing area of the camera, and to receive image capturing characteristics information from said another camera, and said computer program product causing the monitor system to execute a method comprising:

changing the image capturing area of the camera by controlling the camera based on the image capturing characteristics information of the camera and the image capturing characteristics information of said another camera received in said communication so that the image capturing area of the camera and the image capturing area of said another camera have a predetermined relation;

providing an evaluation value for an overlapped area in which an image capturing area of the another camera and the image capturing area of the camera overlap each other, based on the image capturing characteristics information from the another camera and the image capturing characteristics information of the camera; and changing the image capturing area of the camera so as to generate the overlapped area by controlling the camera so that the evaluation value approaches a predetermined target value, thereby forming a gapless wide range image.

28. A monitor system for monitoring a monitoring area by detecting a physical quantity in the monitoring area, the system comprising a plurality of sensors connected via a communication path, wherein each sensor of said plurality of sensors includes:

a sensor operable to detect a physical quantity in a detection area included in the monitoring area, and to change the detection area;

a communication unit operable to transmit, to another sensor via the communication path, detection characteristics information for identifying the detection area, and to receive detection characteristics information from said another sensor; and a detection characteristics change unit operable to change a detection area by controlling the current sensor based on the detection characteristics information of the current sensor and the detection characteristics information of said another sensor received in said communication unit so that the detection area of the current sensor and the detection area of said another sensor have a predetermined relation, and wherein the detection characteristics information includes information for identifying a position of the detection area, and said detection characteristics change unit includes:

a cooperation partner determination unit operable to identify another sensor whose detection area is adjacent to the detection area of the sensor;

an area difference evaluation unit operable to provide an evaluation value for an overlapped area in which the detection area of said another sensor which has been identified and the detection area of the sensor overlap each other, based on the detection characteristics information from said another sensor and the detection characteristics information of the sensor; and a detection area change unit operable to change the detection area of the sensor so as to generate the overlapped area by controlling said sensor so that the evaluation value approaches a predetermined target value so as to form a gapless wide range image, the evaluation value being provided by said area difference evaluation unit.

* * * * *